United States Patent
Seki et al.

(10) Patent No.: US 8,967,663 B2
(45) Date of Patent: Mar. 3, 2015

(54) VEHICLE SEAT

(75) Inventors: Yuichiro Seki, Tochigi (JP); Takaya Kurisu, Tochigi (JP); Kenichi Niitsuma, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/119,523

(22) PCT Filed: May 25, 2012

(86) PCT No.: PCT/JP2012/063464
§ 371 (c)(1),
(2), (4) Date: Nov. 22, 2013

(87) PCT Pub. No.: WO2012/161309
PCT Pub. Date: Nov. 29, 2012

(65) Prior Publication Data
US 2014/0103626 A1    Apr. 17, 2014

(30) Foreign Application Priority Data

| May 25, 2011 | (JP) | 2011-117310 |
|---|---|---|
| May 31, 2011 | (JP) | 2011-122777 |
| Jun. 29, 2011 | (JP) | 2011-144955 |
| Jun. 29, 2011 | (JP) | 2011-144956 |
| Jun. 29, 2011 | (JP) | 2011-144957 |
| Jun. 29, 2011 | (JP) | 2011-144958 |
| Jun. 29, 2011 | (JP) | 2011-144959 |
| Jun. 29, 2011 | (JP) | 2011-144960 |
| Aug. 31, 2011 | (JP) | 2011-189299 |
| Sep. 28, 2011 | (JP) | 2011-213154 |
| Sep. 28, 2011 | (JP) | 2011-213155 |
| Sep. 28, 2011 | (JP) | 2011-213156 |
| Nov. 29, 2011 | (JP) | 2011-260696 |

(51) Int. Cl.
*B60N 2/42* (2006.01)
*B60R 21/207* (2006.01)
(Continued)

(52) U.S. Cl.
CPC .......... *B60R 21/207* (2013.01); *B60N 2/42* (2013.01); *B60N 2/42709* (2013.01); *B60R 21/23138* (2013.01)

USPC ............ 280/730.2; 297/216.13; 297/216.14; 297/216.1

(58) Field of Classification Search
CPC .................................................. B60N 2/42709
USPC .......... 297/216.13, 216.14, 216.1; 280/730.2
See application file for complete search history.

(56) References Cited

U.S. PATENT DOCUMENTS 3,501,200 A * 3/1970 Ohta .................... 297/452.19
6,450,528 B1 * 9/2002 Suezawa et al. .......... 280/730.2
(Continued)

FOREIGN PATENT DOCUMENTS

JP    10-230767 A    9/1998
JP    10-278644 A    10/1998
(Continued)

OTHER PUBLICATIONS

Ichikawa et al., Seat Back Frame Structure, Jul. 3, 2001, JPO, JP 2001-178584 A, Machine Translation of Description.*
(Continued)

*Primary Examiner* — James English
(74) *Attorney, Agent, or Firm* — Drinker Biddle & Reath LLP

(57) ABSTRACT

Provided is a vehicle seat capable of efficiently absorbing impact energy generated upon a rear end collision in a manner such that the vehicle seat is stably deformed at a specific position with respect to a complex input load generated upon a rear end collision. A vehicle seat includes: frame side portions that are located at the right and left sides of a seat back frame and extend in the up to down direction; and frame extension portions that extend from the frame side portions toward the inside in the right and left direction. A connection portion that connects the frame side portions to the frame extension portions is provided with a deformation portion that is deformed when an impact load is applied thereto. The deformation portion is formed adjacent to other deformation portions having deformation characteristics different from that of the deformation portion.

25 Claims, 78 Drawing Sheets

(51) Int. Cl.
    *B60N 2/427*     (2006.01)
    *B60R 21/231*    (2011.01)

(56) References Cited

U.S. PATENT DOCUMENTS

| | | | |
|---|---|---|---|
| 7,070,236 B2 * | 7/2006 | Kawashima | 297/216.14 |
| 7,537,283 B2 * | 5/2009 | Niitsuma et al. | 297/216.13 |
| 8,210,606 B2 * | 7/2012 | Meghira et al. | 297/216.1 |
| 8,313,140 B2 * | 11/2012 | Niitsuma et al. | 297/216.12 |
| 2005/0093352 A1 * | 5/2005 | Yasuda et al. | 297/284.1 |
| 2009/0179477 A1 | 7/2009 | Yamazaki et al. | |
| 2013/0099532 A1 * | 4/2013 | Izumida et al. | 297/216.14 |
| 2013/0119724 A1 * | 5/2013 | Adachi et al. | 297/216.14 |
| 2013/0187417 A1 * | 7/2013 | Seo et al. | 297/216.13 |

FOREIGN PATENT DOCUMENTS

| | | |
|---|---|---|
| JP | 2001-178584 A | 7/2001 |
| JP | 2001-186957 A | 7/2001 |
| JP | 2002-012072 A | 1/2002 |
| JP | 4151827 B2 | 9/2008 |
| JP | 4200580 B2 | 12/2008 |
| JP | 4250128 B2 | 4/2009 |
| JP | 2009-166658 A | 7/2009 |
| JP | 2010-179753 A | 8/2010 |

OTHER PUBLICATIONS

Ichikawa et al., Seat Back Frame Structure, Jul. 10, 2001, JPO, JP 2001-186957 A, Machine Translation of Description.*

Akifumi Saiguchi, Seat for Moving Body, Jan. 15, 2002, JPO, JP 2002-012072 A, Machine Translation of Description.*

Kenichi Niitsuma, Vehicle Seat, Aug. 19, 2010, JPO, JP 2010-179753 A, Machine Translation of Description.*

* cited by examiner

VEHICLE SEAT

CROSS REFERENCE TO RELATED APPLICATIONS

This application is the U.S. national phase of the International Patent Application No. PCT/JP2012/063464, filed May 25, 2012, which claims the benefit of the following Japanese Patent Applications:

| Japanese Patent Application No. | Date Filed |
| --- | --- |
| 2011-117310 | May 25, 2011 |
| 2011-122777 | May 31, 2011 |
| 2011-144955 | Jun. 29, 2011 |
| 2011-144956 | Jun. 29, 2011 |
| 2011-144957 | Jun. 29, 2011 |
| 2011-144958 | Jun. 29, 2011 |
| 2011-144959 | Jun. 29, 2011 |
| 2011-144960 | Jun. 29, 2011 |
| 2011-189299 | Aug. 31, 2011 |
| 2011-213154 | Sep. 28, 2011 |
| 2011-213155 | Sep. 28, 2011 |
| 2011-213156 | Sep. 28, 2011 |
| 2011-260696 | Nov. 29, 2011 | the entire content of all being incorporated herein by reference.

BACKGROUND

Disclosed herein is a vehicle seat, and particularly, a vehicle seat capable of stably absorbing impact energy generated upon a rear end collision.

Generally, upon a so-called rear end collision in which another vehicle collides with a rear part of a vehicle such as an automobile or the vehicle collides with another vehicle in a rearward running mode, an occupant sitting on a vehicle seat abruptly moves rearward and an upper body of the occupant is inclined rearward due to the inertia force.

In general, a seatback of the vehicle seat is formed in a manner such that a cushion material is placed on a metallic seat back frame and is coated by a skin material. However, as described above, since the occupant abruptly moves rearward upon a rear end collision or the like, there is a case in which the deformation amount of the seatback with respect to the movement is not sufficient and a load applied to the human body of the occupant may not be efficiently reduced. Further, since a large load is applied to the seatback, there is a concern that a problem may occur in the seatback.

In order to solve such problems, Japanese Patent No. 4200580 ("the '580 patent") discloses a technique of reducing a load applied to an occupant in a rearward movement state by employing a configuration in which a side frame is bent when a rearward load is applied to an upper portion of a seat back frame.

In the seat back frame disclosed in the '580 patent, when a rearward load is applied to the seat back frame with the rearward movement of the occupant upon a rear end collision or the like, the side frame is bent so that the rearward impact energy is absorbed by the seat back frame. However, since the seat back frame of the '580 patent may not deform the side frame by confining the deformation position (the bent position) thereof, the side frame is bent at any point in the up to down direction. As a result, since the bent point may not be confined, the impact energy is transmitted to the entire seat back frame so that the impact energy absorption efficiency is degraded. Accordingly, it is difficult to stably reduce the impact energy.

Therefore, the present applicant has proposed a technique of absorbing the impact energy by deforming the seat back frame (Japanese Patent Application No. 2010-273867). Specifically, a flexible bent portion is formed in a lower frame, and when an impact load generated upon a rear end collision or the like is applied to the seat back frame, the bent portion is first bent to efficiently absorb the impact energy. In this way, the impact energy may be efficiently absorbed by confining the deformation position of the seat back frame.

However, in the above-described related art, there has been demanded a technique capable of stably absorbing the impact energy by further confining the bent portion. That is, there has been demanded a vehicle seat that is stably bent by causing a specific position to be easily deformed with respect to a complex input load applied to a seat back frame upon a rear end collision.

Further, there has been demanded a technique capable of more efficiently absorbing the impact energy in a manner such that the rigidity of the portion other than the specific position (deformation portion) which is easily bent is improved to easily regulate the position of the deformation portion and the specific position is deformed without deforming the portion other the specific position even when a complex input load is applied thereto.

Further, in the above-described related art, when the seat back frame is deformed to be inclined rearward, the rearward inclined angle increases too much, depending on the magnitude of the applied impact energy, and hence there is a concern that an occupant sitting posture may change and hence a sitting feeling may be degraded. Accordingly, there has been demanded a technique capable of controlling the seat deformation amount (the rearward inclined angle) by regulating the warpage amount in the vehicle seat of which the seat back frame is warped and inclined rearward when the impact load is applied thereto.

Further, in the seat back frame that confines the deformation position, a configuration is supposed in which two or more deformation positions are provided to highly efficiently absorb the impact energy. That is, as the configuration of the seat back frame that is warped when the impact load is applied thereto, a configuration is supposed which includes a deformation portion that is deformed when the impact load is applied thereto and other deformation portions that are deformed when the deformation of the deformation portion is transmitted thereto. In such a configuration, from the viewpoint of efficiently absorbing the impact energy, there is a need to appropriately transmit the deformation of the seat back frame generated by using the deformation portion as a starting point from the deformation portion to other deformation portion(s). That is, in the vehicle seat equipped with the seat back frame including plural deformation portions, there has been demanded a technique capable of smoothly absorbing the impact energy by appropriately transmitting the deformation generated upon a rear end collision or the like from one deformation portion to the other deformation portion.

SUMMARY

An object of various embodiments of the present invention is to provide a vehicle seat capable of efficiently absorbing impact energy generated upon a rear end collision by stably deforming a specific position with respect to a complex input load generated upon a rear end collision. Further, another object is to provide a vehicle seat capable of efficiently and stably absorbing impact energy even when a complex input load is applied to the seat back frame upon a rear end collision by improving the rigidity of a portion other than a specific portion (deformation portion) which is easily deformable to easily regulate the position of the deformation portion.

Further, another object is to provide a vehicle seat capable of reducing an influence on an occupant sitting posture by regulating a warpage amount and controlling a seat deformation amount (rearward inclined angle) in a case where a seat back frame is warped when impact energy generated upon a (rear end) collision is applied thereto to absorb the impact energy.

Further, another object is to provide a vehicle seat equipped with a seat back frame including plural deformation portions and appropriately transmitting a deformation generated upon a rear end collision or the like from one deformation portion to the other deformation portion(s) to smoothly absorb the impact energy.

The above-described problems are solved by various embodiments of a vehicle seat disclosed herein including: frame side portions that are located at right and left sides of a seat back frame and extend in the up to down direction; and a frame extension portion that extends from each frame side portion toward an inside of the seat in the right and left direction, wherein a connection portion that connects the frame side portion to the frame extension portion is provided with a deformation portion that is deformed when an impact load is applied thereto, and wherein the deformation portion is formed adjacent to other deformation portions having deformation characteristics different from that of the deformation portion.

In this way, since the deformation portion is formed at the boundary portion (the connection portion) between the frame side portion forming the seat back frame width and the frame extension portion extending from the frame side portion toward the inside in the seat width direction, the seat back frame may be easily warped rearward when the impact load generated upon a rear end collision or the like is applied thereto. In the seat back frame, since the connection portion between the frame side portion and the frame extension portion has high rigidity with respect to the load applied in the extension direction (the up to down direction) of the connection portion, in general, the connection portion is not easily bent when the impact load of the rear end collision is applied thereto. However, since the connection portion is provided with the deformation portion that is deformed by the impact load, the deformation portion is first deformed when the impact load is applied thereto, and the seat back frame may be easily deformed to be bent in the up to down direction by using the deformation portion as a starting point. Accordingly, when the impact load is applied to the seat back frame, the seat back frame may be stably bent by using the deformation portion as a starting point, and hence the impact energy may be efficiently absorbed.

Further, since the deformation portion is provided in a portion like the connection portion having high rigidity, the bent position may be confined as the vicinity of the deformation portion compared to the case where the deformation portion is formed in the other portions.

At this time, as in an embodiment, the other deformation portions may be a fragile portion that are provided in at least one of the frame side portion and the frame extension portion and is connected to the deformation portion.

In this way, in a case where at least one of the frame side portion and the frame extension portion is provided with the fragile portion as other deformation portions, when the impact load is applied to the seat back frame, the deformation portion at the connection portion between the frame side portion and the frame extension portion is deformed, and the fragile portion is deformed earlier than the other portions. In this way, in the configuration in which the fragile portion is formed as other deformation portions, the portion provided with the fragile portion in the seat back frame is first deformed. Accordingly, the deformation position and the deformation direction of the seat back frame may be controlled, and the impact energy may be efficiently absorbed.

Further, as in an embodiment, the deformation portion may be formed to be deformed by a smaller impact load compared to the other deformation portions.

In this way, since the deformation portion is formed to be easily deformed by the impact load compared to other deformation portions, the deformation portion is first deformed when the impact load is applied thereto, and then other deformation portions may be deformed. Although the complex input load is applied to the seat back frame upon a rear end collision or the like, since the deformation portion that is easily deformed compared to other deformation portions is provided, the deformation portion is deformed first, and then other deformation portions connected to the deformation portion are deformed. As a result, it is possible to confine the deformation (bent) position and the warpage (bent) position of the seat back frame.

That is, with the above-described configuration, the deformation of the deformation portion may be promoted when the impact load is applied to the seat back frame, and the deformation of other deformation portions may be induced by using the deformation portion as a starting point. Accordingly, when the impact load is applied to the seat back frame, the deformation portion and other deformation portions are sequentially deformed, and hence the impact energy may be stably absorbed.

Further, as in an embodiment, the vehicle seat may further include a lower frame that is provided at the lower side of the seat back frame, wherein the lower frame includes the frame side portion and the frame extension portion, wherein the deformation portion is formed in the connection portion connecting the frame side portion and the frame extension portion of the lower frame, and wherein the other deformation portions are fragile portions that are formed in the frame side portion of the lower frame and are connected to the deformation portion.

In this way, since the deformation portion is formed at the boundary portion, that is, the connection portion between the frame extension portion and the frame side portion of the lower frame and the fragile portion(s) as other deformation portions is formed in the frame side portion of the lower frame, the lower frame in the seat back frame may be selectively deformed when the impact load of the rear end collision or the like is applied to the seat back frame. That is, with the above-described configuration, it is possible to confine the bent position of the seat back frame when the impact load is applied thereto.

At this time, as in an embodiment, the deformation portion may be formed to be deformed by a smaller impact load compared to the fragile portion.

In this way, since the fragile portion is formed to be easily deformed compared to the deformation portion with respect to the impact load, the deformation portion may be first deformed, and then the fragile portion may be deformed. Accordingly, since it is possible to set the deformation order, the deformation of the specific position may be promoted to easily deform the seat back frame.

Further, as in an embodiment, the vehicle seat may further include a reinforcement portion that is provided in at least one of upper and lower sides of the other deformation portions.

In this way, when the reinforcement portion is provided in at least one of the upper and lower sides of other deformation portions, the reinforcement portion is provided at a position not overlapping other deformation portions in the front to back direction, and hence the portion other than other deformation portions is reinforced by the reinforcement portion. Accordingly, when the impact load is applied to the seat back frame, the seat back frame may be deformed from the portion other than other deformation portions, and hence the positional regulation of the deformation portion and the deformation guide of the seat back frame may be easily performed.

At this time, as in an embodiment, the reinforcement portion may be provided in at least one of front and rear sides of the other deformation portions.

In a case where the reinforcement portion is provided at the front side of other deformation portions, the input of the load from the front side with respect to the portion of the seat back frame overlapping the reinforcement portion in the front to back direction is regulated, and hence the deformation generated from the portion other than other deformation portions may be suppressed.

Further, in a case where the reinforcement portion is provided at the rear side of other deformation portions, the rearward deformation of the portion of the seat back frame overlapping the reinforcement portion in the front to back direction is regulated, and hence the deformation generated from the portion other than other deformation portions may be suppressed. In this way, since the reinforcement portion is provided in at least one of the front and rear sides of other deformation portions, when the impact load is applied to the seat back frame, it is possible to suppress the deformation of the seat back frame from the portion other than other deformation portions, and hence to easily perform the positional regulation of the deformation portion and the deformation guide of the seat back frame.

Further, as in an embodiment, one end of the reinforcement portion may be provided at a position that includes at least a boundary portion between the deformation portion and the other deformation portions and overlaps the deformation portion in a front to back direction.

In this way, since one end of the reinforcement portion is provided at a position including at least the boundary portion between the deformation portion and other deformation portions and overlapping the deformation portion in the front to back direction, the deformation of the deformation portion due to the impact load is not disturbed, and the deformation direction of the deformation portion with respect to the complex input load may be defined. Here, the deformation portion is connected to other deformation portions through the boundary portion, and when the impact load is applied to the seat back frame, the deformation portion is first deformed, and then the impact energy is transmitted to other deformation portions by using the deformation portion as a starting point. For this reason, in order to efficiently transmit the impact energy to other deformation portions, it is desirable to deform the deformation portion in a desired direction without disturbing the deformation of the deformation portion. When the reinforcement portion is provided like the above-described configuration, the deformation of the deformation portion may be regulated, and the deformation guide may be easily performed. Thus, the seat back frame may be appropriately deformed by efficiently absorbing the impact energy.

Further, as in an embodiment, the vehicle seat may further include regulation portions that are disposed at positions sandwiching a part of at least one deformation portion of the deformation portion and the other deformation portions and regulate a deformation amount of the at least one deformation portion.

In this way, since the regulation portions are formed at positions sandwiching at least one deformation portion to regulate the deformation amount of at least one deformation portion of the deformation portion and other deformation portions, when the at least one deformation portion is deformed to a predetermined position (shape), the facing regulation portions contact the at least one deformation portion, and hence the at least one deformation portion may be pressed and stopped to not be further deformed. Accordingly, the seat deformation amount may be controlled at a predetermined value or less so that the deformation amount of the at least one deformation portion does not become larger than a predetermined value. Then, as described above, since the seat deformation amount is regulated to not increase too much when the impact load is applied to the seat back frame, the influence on the occupant sitting posture is reduced.

At this time, as in an embodiment, the regulation portions may include two facing portions that are formed at positions sandwiching the at least one deformation portion, and the distance between the two facing portions may be smaller than a width of the at least one deformation portion in a direction in which the deformation portion is sandwiched by the regulation portions.

In this way, since the distance between two facing portions formed at positions sandwiching the at least one deformation portion in the regulation portions is formed smaller than the width (the width sandwiched between the regulation portions) of the at least one deformation portion, the facing portions of the regulation portions may easily contact each other when the at least one deformation portion is deformed by the impact load applied thereto. When the distance between the facing portions is set to be substantially equal to or larger than the width of the at least one deformation portion, in a case where the impact load is particularly large, at least one deformation portion may be completely bent before the deformation (bending) of the at least one deformation portion is pressed and stopped by the regulation portions, and hence it is difficult to regulate the deformation amount (the bent amount). However, with the above-described configuration, it is possible to press and stop the deformation of the at least one deformation portion by the regulation portions before the at least one deformation portion is completely deformed (bent), and hence to more accurately control the deformation amount of the at least one deformation portion at a predetermined value or less.

Further, it is possible to set the contact timing of the regulation portions by the distance between the facing portions of the regulation portions.

Further, as in an embodiment, the regulation portions may be formed by a first regulation portion and a second regulation portion that respectively include a regulation surface disposed facing each other at a position sandwiching the at least one deformation portion, and the regulation surface provided in at least one of the first regulation portion and the second regulation portion may be formed in a planar shape.

In this way, since the regulation surface of at least one regulation portion of the regulation surfaces, that is, the facing surfaces, is formed in a planar shape in the first regulation portion and the second regulation portion that face each other with the at least one deformation portion interposed therebetween, the other regulation portion may easily contact the at least one deformation portion when the at least one deformation portion is deformed. As a result, it is possible to more accurately control the deformation amount of the at least one deformation portion, and hence to easily and stably regulate the deformation of the at least one deformation portion.

Further, as in an embodiment, the regulation portions may comprise a contact portion that is provided in the seat back frame and a contacted portion that contacts the contact portion when the at least one deformation portion is deformed, and the seat back frame may be provided with an impact absorbing portion that absorbs an impact load when the contact portion and the contacted portion contact each other.

In this way, since the regulation portions are provided with the impact absorbing portion which absorbs the impact load when the contact portion contacts the contacted portion, it is possible to absorb the impact energy by the impact absorbing portion when the at least one deformation portion is deformed so that the contact portion contacts the contacted portion. In this way, since the impact energy is absorbed by the impact absorbing portion at the point in time at which the seat deformation amount is regulated by the regulation portions, the impact energy may be more efficiently absorbed.

At this time, as in an embodiment, the contact portion may include a first regulation portion that is disposed in a periphery of the at least one deformation portion, the contacted portion may include a second regulation portion that is disposed separated from the first regulation portion and is disposed in the periphery of the at least one deformation portion, and the impact absorbing portion may be formed by an impact absorbing member that is disposed between the first regulation portion and the second regulation portion.

In this way, since the periphery of the at least one deformation portion is provided with the first regulation portion as the contact portion and the second regulation portion as the contacted portion, the first regulation portion and the second regulation portion may easily contact each other when the at least one deformation portion is deformed, and hence the seat deformation amount may be easily controlled. Further, since the first regulation portion and the second regulation portion are provided in the periphery of the at least one deformation portion, the seat deformation amount may be more accurately regulated. Then, since the impact absorbing member is disposed between the first regulation portion and the second regulation portion, it is possible to absorb the impact energy generated when the first regulation portion and the second regulation portion contact each other with the deformation of the at least one deformation portion, and hence to reduce the uncomfortable feeling of the occupant. Further, the impact absorbing member or the first regulation portion and the second regulation portion may be provided with a simple configuration. Further, since the impact absorbing member is provided between the first regulation portion and the second regulation portion, the configuration in the periphery of the first regulation portion and the second regulation portion does not increase in size.

Further, as in an embodiment, the seat back frame may be provided with direction regulation portions that regulate a deformation transmission direction of the deformation portion so that the deformation transmission direction is not deviated from a direction from the deformation portion toward the other deformation portions.

In this way, since the direction regulation portions are provided, when the deformation portion is deformed, the deformation is transmitted to other deformation portions. As a result, the frame is deformed by using the deformation portion as a starting point, and then other deformation portions are deformed so that the entire frame is smoothly deformed. Accordingly, the impact energy may be more smoothly absorbed.

At this time, as in an embodiment, each of the direction regulation portions may be a member that is attached to a position deviated from a line connecting the deformation portion and the other deformation portions in the seat back frame.

In this way, when each of the direction regulation portions is attached to a position deviated from the horizontal line connecting the deformation portion to other deformation portions, the rigidity of each of the deformation portion and other deformation portions relatively decreases, and hence the deformation portion and other deformation portions are easily deformed. Accordingly, the deformation of the deformation portion is easily transmitted to other deformation portions. As a result, the impact energy may be more smoothly absorbed.

Further, as in an embodiment, the direction regulation portions may include a first facing portion and a second facing portion that face each other, and the first facing portion and the second facing portion may be located at positions sandwiching a center line of the other deformation portions.

In this way, since the first facing portion and the second facing portion are disposed at positions sandwiching the center line of the second fragile portion, the deformation transmission direction of the deformation portion is regulated at both upper and lower sides of other deformation portions so that the deformation transmission direction is not deviated from the specific direction. As a result, the impact energy may be smoothly absorbed.

Further, as in an embodiment, the vehicle seat may further include: a pressure receiving member that is connected to the seat back frame through a connection member to support an occupant; and an impact reducing member that is disposed in at least one frame side portion, is connected to the connection member, and rotates by a predetermined impact load applied to the pressure receiving member to move the pressure receiving member rearward, wherein the frame extension portion may be provided with the other deformation portions and regulation portions that are disposed at positions sandwiching a part of the other deformation portions and regulate a deformation amount of the other deformation portions, and wherein the other deformation portions and the regulation portions may be disposed above a rotation center of the impact reducing member.

In this way, since the regulation portions are provided at positions sandwiching other deformation portions to regulate the deformation amount of other deformation portions, when other deformation portions is deformed to a predetermined position (shape), the facing regulation portions contact each other so that the fragile portion may be pressed and stopped to prevent the further deformation of the fragile portion. Accordingly, the seat deformation amount may be controlled at a predetermined value or less so that the deformation amount of other deformation portions does not become larger than a predetermined value. Thus, since the seat deformation amount when the impact load is applied is regulated so that the seat deformation amount does not increase too much, the influence on the occupant sitting posture is reduced.

Further, in the configuration in which other deformation portions and the regulation portions are disposed above the rotation center of the impact reducing member, when the impact load of the rear end collision or the like is applied to the vehicle seat, the rotation center of the impact reducing member does not move due to the deformation of other deformation portions. That is, when the impact load of the rear end collision or the like is applied to the vehicle seat, the upper portion of the vehicle seat is tilted rearward by using other deformation portions as a starting point. However, since the rotation center of the impact reducing member is disposed below other deformation portions, the rotation center does not move along with the deformation (the rearward inclining operation). For this reason, the operation of the impact reducing member is not disturbed. Then, according to such a configuration, it is possible to effectively prevent degradation in operation efficiency of the impact reducing member due to the crushing of other deformation portions.

At this time, as in an embodiment, the seat back frame may be further provided with a waist entry prohibiting member that prohibits a movement in which the waist of the occupant moves rearward, and the rotation center of the impact reducing member may be disposed to be located above the waist entry prohibiting member.

In this way, if the rearward movement of the waist of the occupant is prohibited by the waist entry prohibiting member when the occupant moves rearward upon a rear end collision, the upper body of the occupant is kept in a state where the waist (that is, the lower torso) is held by the waist entry prohibiting member so as not to move rearward. A portion of the occupant from the neck to the vicinity of the chest (that is, the upper torso) moves rearward so that the upper body of the occupant is inclined rearward. Accordingly, the upper torso of the occupant largely moves rearward compared to the lower torso thereof. As a result, the occupant may be efficiently sunk to the pressure receiving member so that the upper torso of the occupant largely gets into the seatback and hence the head of the occupant may be highly efficiently supported by the headrest. Accordingly, it is possible to largely reduce the burden on the neck of the occupant. Further, when the rotation center of the impact reducing member is located above the waist entry prohibiting member, the upper body of the occupant rotates rearward about the waist by the waist holding effect of the waist entry prohibiting member so that the sinking force with respect to the pressure receiving member improves the operation efficiency of the impact reducing member.

Further, as in an embodiment, the vehicle seat may further include a side airbag unit that is provided in the frame side portion, wherein the fragile portion may be provided in the frame side portion to be located in a range deviated from an overlapping range of the side airbag unit when viewed from the right and left direction.

In this way, since the side airbag unit is attached to the frame side portion, the impact load applied to the occupant may be reduced by absorbing the impact energy generated by the side collision. Further, since the fragile portion that is deformed by the impact load applied thereto is provided in the frame side portion, when the impact load generated by not only the side collision but also the rear end collision is applied to the frame, the seat back frame is deformed by using the fragile portion as a starting point so that the impact energy may be absorbed. Accordingly, when the impact load is applied to the seat back frame, the seat back frame may be easily deformed by using the fragile portion as a starting point regardless of the direction of the impact load, and hence the impact energy may be absorbed. Then, since the fragile portion is provided at a position not overlapping the side airbag unit in the right and left direction, when the impact load is applied to the seat back frame, the side airbag unit and the fragile portion are respectively independently operated without any interference therebetween. As a result, when the impact load of the rear end collision or the side collision is applied to the seat back frame, the impact energy may be efficiently absorbed.

Further, as in an embodiment, the regulation portions may include a first regulation portion that is disposed in the periphery of the at least one deformation portion and a second regulation portion that is disposed separated from the first regulation portion and is disposed in the periphery of the at least one deformation portion, and the regulation portions may further include a regulation portion connecting portion that connects the first regulation portion to the second regulation portion.

In this way, when the first regulation portion is connected to the second regulation portion by the connection portion, a positional relation between the regulation portions is set in advance when attaching the first regulation portion and the second regulation portion. Thus, as not in the case where the first regulation portion and the second regulation portion are individually attached, that is, the case where one regulation portion is attached and the other regulation portion is attached, there is no need to attach the respective regulation portions while adjusting the regulation portions, and hence two regulation portions may be easily attached. Thus, the assembling workability is further improved.

Further, as in an embodiment, the regulation portions may be detachably attached to the seat back frame, and the regulation portions may further include attachment members that are used to attach the regulation portions to the seat back frame.

In this way, when the regulation member that regulates the deformation amount of at least one deformation portion of the deformation portion and other deformation portions may be detachably attached to the seat back frame and may be attached to the seat back frame by using the attachment member, the regulation member may be more easily provided in the seat back frame.

Further, as in an embodiment, the vehicle seat may further include a lower frame that is provided at the lower side of the seat back frame, wherein the lower ends of the frame side portions may form a part of the lower frame, wherein the lower frame may include a frame installation portion that is installed between the lower ends of the frame side portions, and wherein the deformation portion may be formed at a portion deviated from the same position as that of the frame installation portion of the connection portion in the up to down direction.

Since the frame installation portion is installed between the lower ends of the frame side portions, the lower end of the frame side portion, that is, the portion located at the same position as that of the frame installation portion in the up to down direction has rigidity particularly higher than that of the other portion in the frame side portion. Accordingly, when the deformation portion is formed in the portion connecting the lower end of the frame side portion to the frame extension portion in the connection portion between the frame side portion and the frame extension portion, there is a case in which the deformation portion is not easily deformed even when the impact load is applied to the seat back frame. To the contrary, since the deformation portion is provided in a portion deviated from the portion located at the same position as that of the frame installation portion in the up to down direction of the connection portion, the deformation portion is easily deformed when the impact load is applied to the seat back frame. As a result, since the seat back frame is easily deformed by using the deformation portion as a starting point, the impact energy may be efficiently absorbed.

Further, in the past, when the deformation portion is formed in the portion having high rigidity, the deformation portion needs to have a complex configuration in order to easily deform the deformation portion. However, as described above, when the deformation portion is formed at a position where the rigidity is not comparatively high, the impact energy may be efficiently absorbed without complicating the configuration of the deformation portion.

Further, as in an embodiment, the seat back frame may include an upper frame that extends upward from an upper side of the frame side portion, and the upper frame may be provided with a third deformation portion that is deformed when an impact load is applied thereto and regulation portions that are disposed at positions sandwiching the third deformation portion and regulate a deformation amount of the third deformation portion.

In this way, when the third deformation portion is formed in the upper frame that extends upward from the upper side of the frame side portion, the seat back frame may be deformed by using the third deformation portion as a starting point, and hence the impact energy may be efficiently absorbed. Further, when the regulation portions are formed at positions sandwiching the third deformation portion, the deformation amount may be controlled so that the deformation amount of the third deformation portion does not become larger than a predetermined value. Thus, since the seat deformation amount when the impact load is applied is regulated so that the seat deformation amount does not increase too much, the influence on the occupant sitting posture is reduced.

Further, as in an embodiment, the seat back frame may include an installation surface provided with the other deformation portions, the seat back frame may include a wire member at least a part of which is wired to face the installation surface, and a portion of the wire member facing the installation surface may be disposed to be separated from a portion in which the other deformation portions are in the installation surface.

In this way, when a portion of the wire member facing the installation surface provided with other deformation portions of the seat back frame is separated from the portion where other deformation portions is located in the installation surface, it is possible to suppress the interference of the wire member with respect to the deformation of other deformation portions. Thus, it is possible to suppress degradation in deformation of other deformation portions or a change in load applied to other deformation portions.

Further, as in an embodiment, the seat back frame may include the installation surface provided with the other deformation portions, the seat back frame may include a facing member that extends in a direction intersecting a formation direction of the other deformation portions and faces the seat back frame at the installation surface, the facing member may be assembled to the seat back frame at one end of the facing member in an extension direction and may include a fixing portion that is provided between both ends thereof in the extension direction to fix the facing member to the seat back frame, and the facing member may be fixed to the seat back frame so that one end and an other end of the other deformation portions in the extension direction are not simultaneously located within a range from one end of the facing member in the extension direction to the position provided with the fixing portion.

In this way, when a portion of the facing member from one end of the facing member in the extension direction to the fixing portion used to fix the facing member to the seat back frame is not disposed at a position where the portion does not completely cross other deformation portions in the extension direction, that is, the portion does not go over other deformation portions, it is possible to suppress the inference of the facing member during the deformation of other deformation portions, and hence to suppress the deformation of other deformation portions or a change in load applied to the fragile portion.

According to an embodiment, when the impact load is applied to the seat back frame, the seat back frame may be stably bent by using the deformation portion as a starting point, and hence the impact energy may be efficiently absorbed. Further, since the deformation portion is provided in the portion having high rigidity like the connection portion between the frame side portion and the frame extension portion, it is possible to confine the bent position to the vicinity of the deformation portion compared to the case where the deformation portion is formed in the other portion.

According to an embodiment, when the impact load is applied to the seat back frame, the deformation portion at the connection portion between the frame side portion and the frame extension portion is deformed. Further, since the fragile portion is deformed earlier than the other portion, the deformation position and the deformation direction of the seat back frame may be controlled, and the impact energy may be efficiently absorbed.

According to an embodiment, even when the complex input load is applied to the vehicle seat upon a rear end collision or the like, the deformation portion is first deformed, and then other deformation portions connected to the deformation portion are deformed. For this reason, since it is possible to confine the deformation (bent) position and the warpage (bent) position of the seat back frame, it is possible to stably absorb the impact energy.

According to an embodiment, when the impact load of the rear end collision or the like is applied to the seat back frame, the lower frame of the seat back frame may be selectively deformed, and hence the bent position of the seat back frame may be confined when the impact load is applied to the seat back frame.

According to an embodiment, since the deformation portion is first deformed and then the fragile portion is deformed, the deformation sequence may be set, and hence the deformation may be easily caused by promoting the deformation of the specific position.

According to an embodiment, at least one of the upper and lower sides of other deformation portions is provided with the reinforcement portion, the deformation of the seat back frame from the portion other than other deformation portions may be suppressed, and hence the positional regulation of the deformation portion of the seat back frame and the deformation guide thereof may be easily performed.

According to an embodiment, at least one of the front and rear sides of other deformation portions is provided with the reinforcement portion, the deformation of the seat back frame generated from the portion other than other deformation portions may be suppressed, and hence the positional regulation of the deformation portion of the seat back frame and the deformation guide thereof may be easily performed.

According to an embodiment, the deformation of the deformation portion due to the impact load is not disturbed, and the deformation direction of the deformation portion with respect to the complex input load may be defined. Further, the deformation guide may be easily performed by regulating the deformation of the deformation portion and the seat back frame may be appropriately deformed by efficiently absorbing the impact energy.

According to an embodiment, the deformation amount of at least one deformation portion of the deformation portion and other deformation portions does not become larger than a predetermined value, and hence the seat deformation amount may be controlled at a predetermined value or less. Thus, since the seat deformation amount when the impact load is applied is regulated so that the seat deformation amount does not increase too much, the influence on the occupant sitting posture is reduced.

According to an embodiment, the deformation of the deformation portion may be pressed and stopped before the deformation portion provided with the regulation portions among the deformation portion and other deformation portions is completely deformed (bent), and hence the deformation amount of the deformation portion may be more accurately controlled at a predetermined value or less. Further, it is possible to set the timing at which the regulation portions contact each other depending on the distance between the facing portions of the regulation portions.

According to an embodiment, when the deformation portion provided with the regulation portions among the deformation portion and other deformation portions is deformed, the other regulation portion may easily contact the deformation portion, and hence the deformation amount of the deformation portion may be more accurately controlled. Thus, the deformation of the deformation portion may be stably regulated.

According to an embodiment, when the deformation portion provided with the regulation portions among the deformation portion and other deformation portions is deformed so that the contact portion contacts the contacted portion, the impact energy may be absorbed by the impact absorbing portion, and the impact energy may be efficiently absorbed.

According to an embodiment, when the deformation portion provided with the regulation portions among the deformation portion and other deformation portions is deformed, the first regulation portion and the second regulation portion may easily contact each other, and hence the seat deformation amount may be easily controlled. Further, since the first regulation portion and the second regulation portion are provided in the periphery of the deformation portion, the seat deformation amount may be more accurately regulated. Then, since the impact absorbing member is disposed between the first regulation portion and the second regulation portion, it is possible to absorb the impact energy when the first regulation portion and the second regulation portion contact each other with the deformation of the deformation portion, and hence to reduce the uncomfortable feeling of the occupant. Further, the configuration of the impact absorbing member or the first regulation portion and the second regulation portion does not becomes complex, but becomes simple. Further, since the impact absorbing member is provided between the first regulation portion and the second regulation portion, the configuration in the periphery of the first regulation portion and the second regulation portion does not increase in size.

According to an embodiment, the frame is deformed by using the deformation portion as a starting point, and then other deformation portions are deformed. Thus, the entire frame is smoothly deformed so that the impact energy may be more smoothly absorbed.

According to an embodiment, since the rigidity of each of the deformation portion and other deformation portions relatively decreases and the deformation portion and other deformation portions are easily deformed, the deformation of the deformation portion is easily transmitted to other deformation portions so that the impact energy may be more smoothly absorbed.

According to an embodiment, since the deformation transmission direction of the deformation portion is regulated at both upper and lower sides of other deformation portions so that the deformation transmission direction is not deviated from the specific direction, the impact energy may be smoothly absorbed.

According to an embodiment, when other deformation portions is deformed to a predetermined position (shape), the facing regulation portions contacts thereto so that the fragile portion may be pressed and stopped so that the fragile portion is not further deformed. For this reason, the seat deformation amount may be controlled at a predetermined value or less so that the deformation amount of other deformation portions does not become larger than a predetermined value. Thus, since the seat deformation amount when the impact load is applied is regulated so that the seat deformation amount does not increase too much, the influence on the occupant sitting posture is reduced. Further, when the impact load of the rear end collision or the like is applied to the vehicle seat, the upper portion of the vehicle seat is tilted rearward by using other deformation portions as a starting point, but the rotation center of the impact reducing member does not move with the deformation (the rearward inclined operation), and hence the operation of the impact reducing member is not disturbed. Thus, it is possible to effectively prevent degradation in operation efficiency of the impact reducing member due to the crushing of other deformation portions.

According to an embodiment, since the occupant may be highly efficiently sunk to the pressure receiving member and the upper torso of the occupant may largely move into the seatback so that the head of the occupant is highly efficiently supported by the headrest. Accordingly, the burden on the neck of the occupant may be largely reduced. Further, when the rotation center of the impact reducing member is located above the waist entry prohibiting member, the upper body of the occupant rotates rearward about the waist by the waist holding effect of the waist entry prohibiting member so that the sinking force with respect to the pressure receiving member improves the operation efficiency of the impact reducing member.

According to an embodiment, it is possible to reduce the impact load applied to the occupant by absorbing the impact energy generated by the side collision using the side airbag unit and to absorb the impact energy by deforming the seat back frame when the impact load of the rear end collision is applied to the seat back frame. Accordingly, when the impact load is applied to the seat back frame, the seat back frame may be easily deformed by using the fragile portion as a starting point regardless of the direction of the impact load, and hence the impact energy may be absorbed. Then, since the fragile portion is provided at a position not overlapping the side airbag unit in the right and left direction, when the impact load is applied to the seat back frame, the side airbag unit and the fragile portion are respectively independently operated without any interference therebetween. As a result, when the impact load of the rear end collision or the side collision is applied to the seat back frame, the impact energy may be efficiently absorbed.

According to an embodiment, as not in the case where the first regulation portion and the second regulation portion are individually attached, that is, the case where one regulation portion is attached and the other regulation portion is attached, there is no need to attach the respective regulation portions while adjusting the regulation portions, and hence two regulation portions may be easily attached. Thus, the assembling workability is further improved.

According to an embodiment, since the regulation member may be detachably attached to the seat back frame and may be attached to the seat back frame by using the attachment member, the regulation member may be more easily provided in the seat back frame.

According to an embodiment, since the deformation portion is provided in a portion deviated from a portion located at the same position as that of the frame installation portion in the up to down direction at the connection portion between the frame side portion and the frame extension portion, the deformation portion may be easily deformed when the impact load is applied to the seat back frame. As a result, since the seat back frame is easily deformed by using the deformation portion as a starting point, the impact energy may be efficiently absorbed. Further, since the deformation portion is formed at a position in which the rigidity is not comparatively high, the impact energy may be efficiently absorbed without complicating the configuration of the deformation portion.

According to an embodiment, since the seat back frame may be deformed by using the third deformation portion as a starting point, the impact energy may be more efficiently absorbed. Further, when the regulation portions are formed at positions sandwiching the third deformation portion, the deformation amount may be controlled so that the deformation amount of the third deformation portion does not become larger than a predetermined value. Thus, since the seat deformation amount when the impact load is applied is regulated so that the seat deformation amount does not increase too much, the influence on the occupant sitting posture is reduced.

According to an embodiment, since a portion of the wire member facing the installation surface provided with other deformation portions of the seat back frame is separated from the portion where other deformation portions are located in the installation surface, it is possible to suppress the interference of the wire member with respect to the deformation of other deformation portions. Thus, it is possible to suppress degradation in deformation of other deformation portions or a change in load applied to other deformation portions.

According to an embodiment, since a portion of the facing member from one end of the facing member in the extension direction to the fixing portion used to fix the facing member to the seat back frame is not disposed at a position where the portion does not completely cross other deformation portions in the extension direction, that is, the portion does not go over other deformation portions, it is possible to suppress the inference of the facing member during the deformation of other deformation portions, and hence to suppress the deformation of other deformation portions or a change in load applied to the fragile portion.

BRIEF DESCRIPTION OF THE DRAWINGS

Various embodiments of the invention are illustrated in the following drawings.

DETAILED DESCRIPTION

Hereinafter, embodiments of the present invention will be described with reference to the drawings.

Moreover, the members, the arrangements, and the like described below do not limit the present invention, and may be, of course, modified into various forms in accordance with the spirit of the present invention.

Further, in the specification, a vehicle indicates a ground running vehicle with a vehicle wheel such as an automobile and a train, an airplane or a ship moving in a place other than a ground, and the like to which a seat can be mounted. In addition, a normal sitting load includes a sitting impact generated by a sitting operation and an acceleration load generated by an abrupt start-up of a conveyance.

Further, the impact energy upon a rear end collision indicates the energy caused by a large load generated upon a rear end collision, and is accompanied by a large rear-end collision from a rear conveyance and a large collision in a rearward running mode. In this situation, the impact energy does not include the energy generated by a load of the same load region as that of a load generated by a normal sitting operation.

Further, the right and left direction indicates the right and left direction in a state where a vehicle seat faces a front side of a vehicle and is a direction matching the width direction of a seat back frame 1 to be described later. Further, the front to back direction indicates the front to back direction in a state where an occupant sits on the vehicle seat.

FIGS. 1 to 8 are involved with a first embodiment of the present invention.

Basic Configuration of Vehicle Seat S According to First Embodiment

A vehicle seat S according to a first embodiment will be described with reference to FIGS. 1 to 8.

Figure 1:
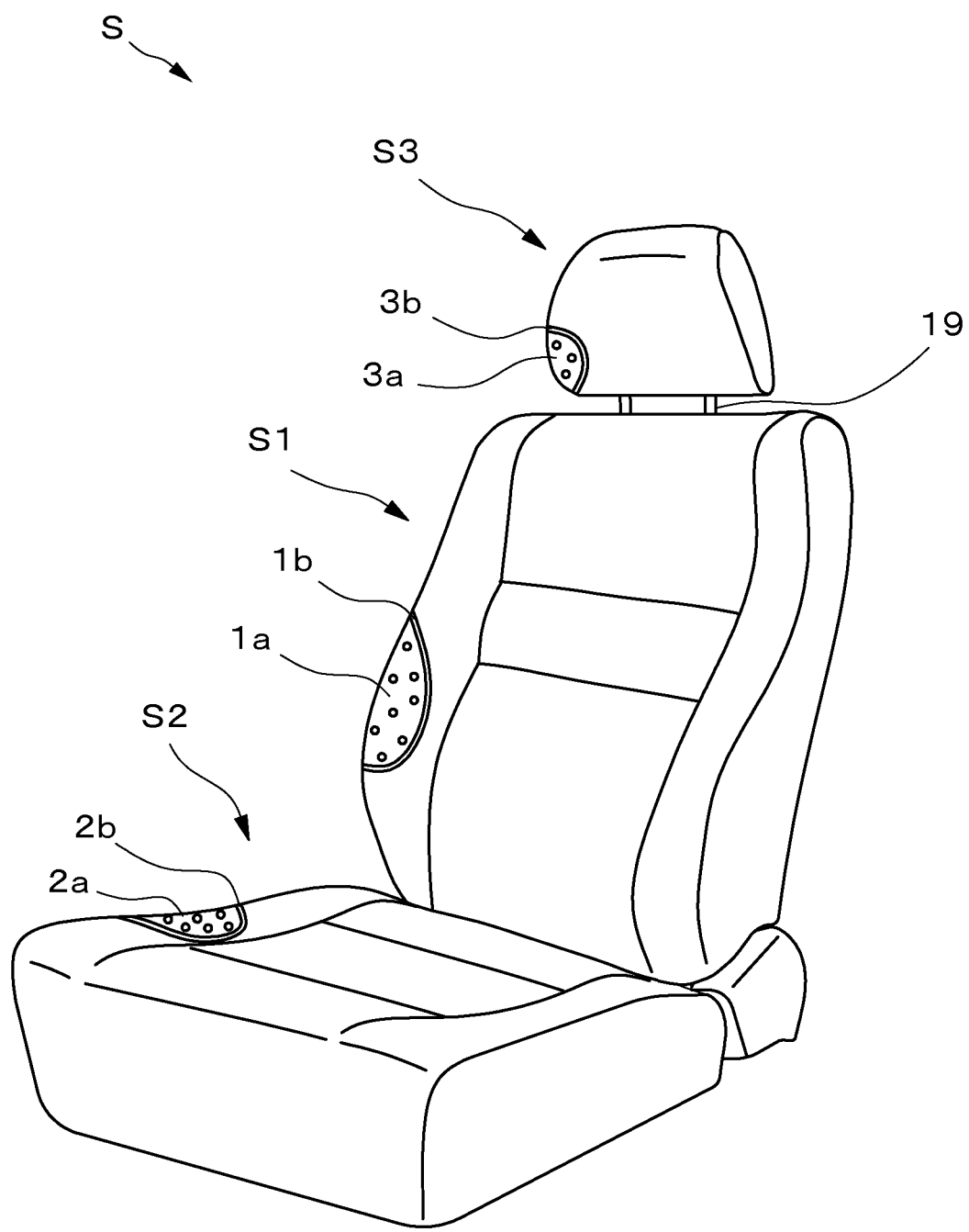
FIG. 1 is a schematic perspective view illustrating a vehicle seat according to a first embodiment of the present invention.

As illustrated in FIG. 1, the vehicle seat S includes a seatback S1 (a rear portion), a seat base portion S2, and a headrest S3, and the seatback S1 (the rear portion) and the seat base portion S2 are formed in a manner such that cushion pads 1a and 2a are placed on a seat frame F and are coated by skin materials 1b and 2b. Furthermore, the headrest S3 is formed in a manner such that a pad material 3a is disposed on a core (not illustrated) of a head and is coated by a skin material 3b. Further, a headrest pillar 19 supports the headrest S3.

Figure 2:
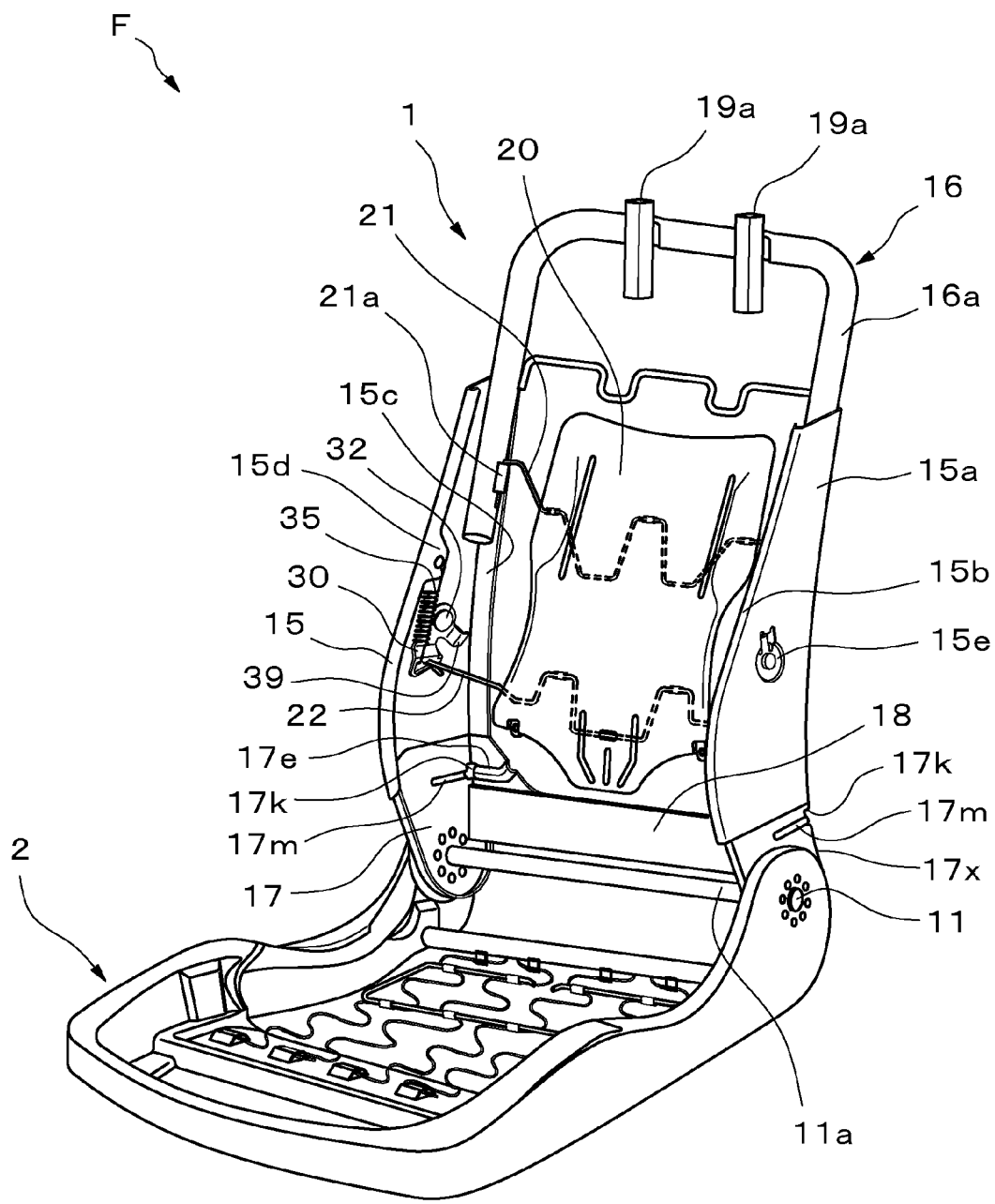
FIG. 2 is a schematic perspective view illustrating a seat frame according to the first embodiment of the present invention.
Figure 3:
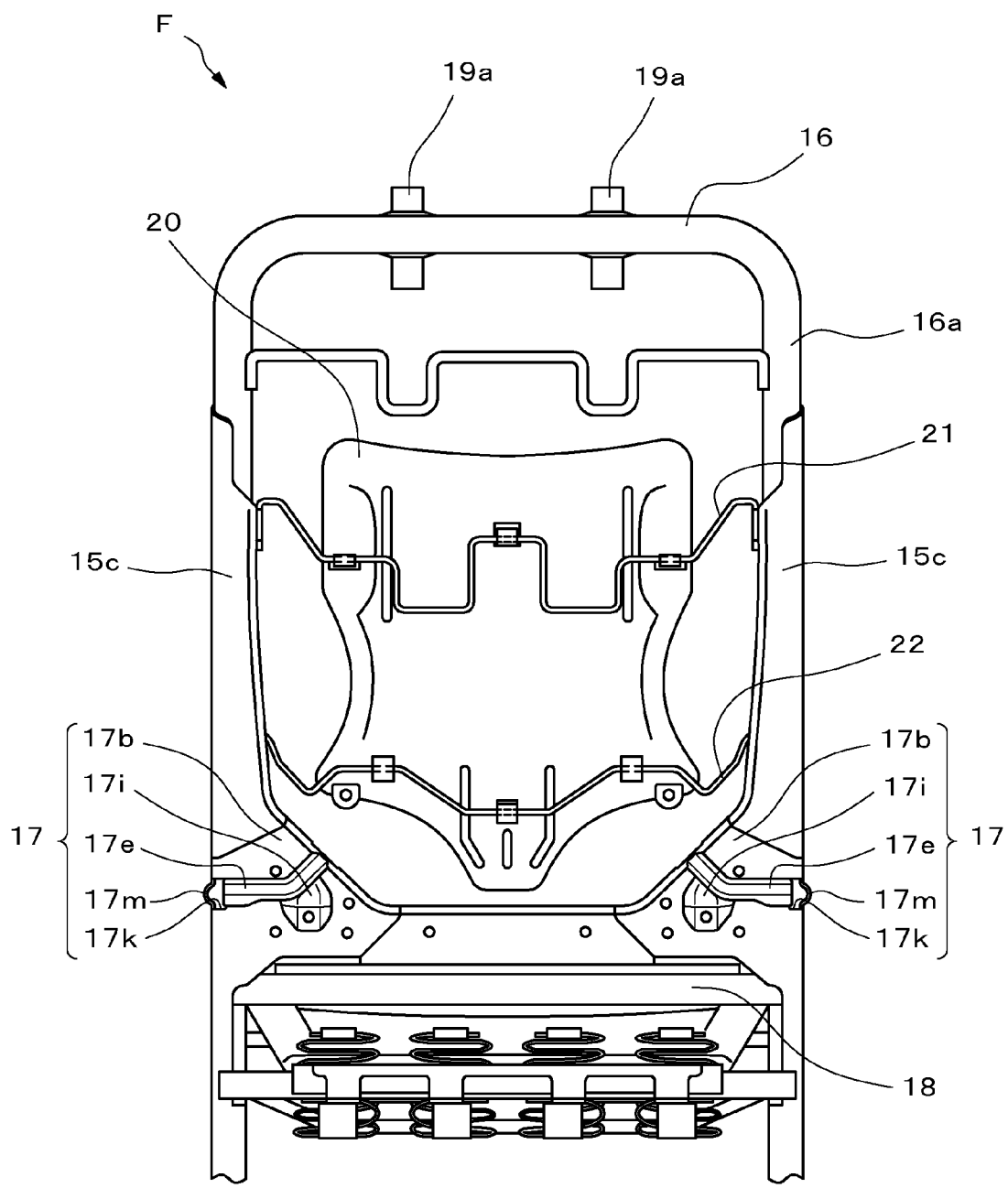
FIG. 3 is a rear view illustrating the seat frame according to the first embodiment of the present invention.

As illustrated in FIG. 2, the seat frame F of the vehicle seat S includes a seat back frame 1 that constitutes the seatback S1 and a seat frame 2 that constitutes the seat base portion S2.

As described above, the seat frame 2 has a configuration in which the cushion pad 2a is placed on the seat frame and is covered by the skin material 2b from the upper side of the cushion pad 2a so that the occupant is supported from the lower side thereof. The seat frame 2 is supported by a leg portion (not illustrated), the leg portion is attached with an inner rail (not illustrated), and hence the seat frame is configured as a slidable type so that the position of the seat frame is adjustable in the front to back direction by the movement between the inner rail and an outer rail provided in a vehicle body floor.

Further, a rear end of the seat frame 2 is connected to the seat back frame 1 through a reclining mechanism 11.

The reclining mechanism 11 includes a reclining shaft 11a that follows a rotation shaft of at least the reclining mechanism 11, and the reclining shaft 11a is disposed to be fitted through shaft insertion holes 17c (see FIGS. 4 to 6) provided in a pair of lower frame base portions 17 (member sides) provided to extend toward the lower side of the seat back frame 1 (more specifically, a pair of side frames 15) and be projected toward the side portion of the seat frame F.

As described above, the seatback S1 has a configuration in which a cushion pad 1a is placed on the seat back frame 1 and is covered by a skin material 1b from the upper side of the cushion pad 1a so that the back of the occupant is supported from the rear side. In this embodiment, as illustrated in FIG. 2, the seat back frame 1 is substantially formed in a rectangular frame, and includes the side frames 15, an upper frame 16, a lower frame base portion 17, and a lower frame installation portion 18.

Since two (the pair of) side frames 15 form the seatback width, the side frames are disposed while being separated from each other in the right and left direction and are disposed to extend in the up to down direction. Then, the upper frame 16 that connects the upper ends of the pair of side frames 15 extends upward from the side frame 15. Furthermore, the upper frame 16 extends upward from one side frame 15, is bent, and extends to the other side frame 15.

As illustrated in FIG. 2, the upper frame 16 that is made of a member having a closed cross-sectional shape (for example, a circular cross-section, a rectangular cross-section, or the like) is substantially bent in a U-shape. Then, a side surface portion 16a of the upper frame 16 is disposed to partially overlap a side plate 15a of the side frame 15 in the up to down direction, and is fixed and bonded to the side frame 15 at the overlapping portion. Furthermore, in this embodiment, the upper frame 16 is formed as a tubular member having a circular cross-section, but may be formed as a tubular member having a rectangular cross-section.

Further, the headrest S3 is disposed above the upper frame 16. As described above, the headrest S3 has a configuration in which the pad material 3a is provided at the outer peripheral portion of the core (not illustrated) and the outer periphery of the pad material 3a is coated by the skin material 3b. A pillar support portion 19a is disposed on the upper frame 16. A headrest pillar 19 (see FIG. 1) that supports the headrest S3 is attached to the pillar support portion 19a through a guide lock (not illustrated) so that the headrest S3 is attached thereto. Furthermore, in this embodiment, an example has been described in which the seatback S1 and the headrest S3 are formed as separate members, but a bucket type may be employed in which the seatback S1 and the headrest S3 are integrated with each other.

As illustrated in FIG. 2, the side frame 15 which constitutes a part of the seat back frame 1 is an extension member that forms the side surface of the seat back frame 1, and includes a planar side plate 15a, a front edge portion 15b that is bent inward in a U-shape from the front end (the end located at the front side of the conveyance) of the side plate 15a and is turned back, and a rear edge portion 15c that is bent inward in an L-shape from the rear end.

The front edge portion 15b of this embodiment is provided with a protrusion portion 15d which protrudes toward the rear edge portion 15c, and the protrusion portion 15d is provided with a locking hole that serves as a locking portion for locking a tensile coil spring 35 as a biasing member.

Then, each movement member 30 is locked to the side frame 15 of this embodiment. The movement member 30 corresponds to an impact reducing member of the present invention, and the configuration and the operation thereof will be described below.

Configuration of Pressure Receiving Member 20

A pressure receiving member 20 that serves as a pressure receiving member supporting the cushion pad 1a from the rear side thereof is disposed in the inner region of the seat back frame 1 inside the seat back frame 1 (between both side frames 15).

The pressure receiving member 20 of this embodiment is a member that is substantially formed in a rectangular shape by a resin, and the surface contacting the cushion pad 1a is provided with a smooth concavo-convex shape. As illustrated in FIG. 2, claw portions are formed at the upper and lower portions of the rear side of the pressure receiving member 20 to lock a wire 21 as an upper connection member and a wire 22 as a lower connection member.

The pressure receiving member 20 of this embodiment is supported by a connection member. That is, two wires 21 and 22 as the connection members are installed between both side frames 15, and engage with the pressure receiving member 20 by the claw portions formed at predetermined positions at the upper and lower portions of the rear side of the pressure receiving member 20 to support the pressure receiving member 20 at the rear surface of the cushion pad 1a. The wires 21 and 22 are made of steel wires having a spring property, and are provided with a concavo-convex portion as a connection portion.

Particularly, in the two wires 21 and 22 locked to the pressure receiving member 20 of this embodiment, the wire 21 that is located at the upper side is made of a wire thinner than the wire 22 located at the lower side. Thus, the upper side of the pressure receiving member 20 may easily move rearward compared to the lower side thereof.

Further, since the wire 22 is made of a thick wire, the wire has high rigidity and is not easily deformed in the normal sitting state. Accordingly, in the normal sitting state, the upper side of the pressure receiving member 20 supported by the wire 21 made of the thin wire may easily move rearward, and the lower side of the pressure receiving member 20 supported by the wire 22 made of the thick wire does not move largely rearward. As a result, since the upper side of the pressure receiving member 20 is appropriately sunk rearward and the lower side thereof supports the human body of the occupant in the normal sitting state, the sitting feeling is not degraded.

Further, since the wires 21 and 22 are provided with the concavo-convex portions, the wires are largely deformed by a predetermined load or more (a load larger than the movable or rotation load of the movement member 30 to be described later) so that the pressure receiving member 20 moves rearward by the larger movement amount.

As illustrated in FIG. 2, in two wires 21 and 22 locked to the pressure receiving member 20 of this embodiment, both ends of the wire 21 locked to the upper side are hooked to axial support portions 21a provided in both side frames 15. Both ends of the wire 22 locked to the lower side are hooked to the movement members 30 attached to the right and left side frames 15.

As described above, the wire 22 that is made of the wire thicker than the wire 21 may not be easily deformed, and the lower portion of the pressure receiving member 20 may not easily move rearward in the normal sitting state. Accordingly, the movement member 30 is attached to the end of the wire 22 in order to ensure a sufficient sinking amount upon a rear end collision.

Configuration of Movement Member 30

When a predetermined impact load or more is applied to the pressure receiving member 20 due to the rear end collision or the like, the movement member 30 as the impact reducing member moves rearward by the impact load transmitted through the connection member (the wire 22) and moves the pressure receiving member 20 rearward to move the occupant rearward. Furthermore, the "movement" indicates a motion such as a horizontal movement and a rotational movement. In this embodiment, the movement member 30 that rotates about a shaft portion 32 as a rotation shaft will be described. By the movement of the movement member 30 toward the rear side of the conveyance, the pressure receiving member 20 may be largely moved toward the rear side of the conveyance. As a result, since the occupant is moved rearward, the load applied to the occupant may be efficiently reduced.

As illustrated in FIG. 2, the movement members 30 of this embodiment are rotatably journaled inside the side plates 15a of both side frames 15 through the shaft portions 32 as the rotation shafts to lock the wire 22 as the connection member at the lower position and are connected to the spring (the tensile coil spring 35) as the biasing member that biases the wire 22. That is, the movement member 30 is connected to the biasing member 35, and is adapted to bias the pressure receiving member 20 toward the front side of the seat back frame 1 through the wire 22 as the connection member.

Then, the movement member 30 of this embodiment is journaled to a convex portion 15e that is formed by bulging the inside of the side frame 15, more specifically, a part of the side plate 15a, toward the inside of the seat by the rotatable shaft portion 32. Furthermore, the shaft portion 32 corresponds to the rotation center of the movement member 30.

The above-described movement members 30 are respectively attached to both side frames 15, and both ends of the wire 22 are hooked to the movement members 30 respectively disposed at both sides so that the respective movement members 30 may be individually operated.

In this embodiment, the movement members 30 are attached to both side frames 15, and the movement members 30 attached to both sides move (rotate) independently. For this reason, in a case where the load is biased in the right and left direction, the movement members 30 attached to both side frames 15 respectively move (rotate) independently to match the load so that the human body of the occupant may be sunk rearward in response to the magnitude of the impact load.

Operation and Effect of Pressure Receiving Member 20 and Movement Member 30

Hereinafter, the configuration and the operation of the pressure receiving member 20 and the movement member 30 will be described.

In the normal sitting state where the occupant sits on the vehicle seat, a tension is generated which moves (rotates) the movement member 30 rearward through the cushion pad 1a, the pressure receiving member 20, and the wire 22 inside the seatback S1. The tensile coil spring 35 biases the movement member 30 so that the movement member is moved (rotated) toward the front side of the seat back frame 1. Here, since the tensile coil spring 35 connected to the movement member 30 has a load characteristic in which the tensile coil spring is not warped in the load region generated in the normal sitting state, the movement member 30 is normally restrained at the initial position. That is, a force of returning the movement member 30 to the initial state against a movement (rotation) force becomes the largest in the normal sitting state.

Then, a movement prohibiting portion 39 that is provided in the movement member 30 is a contact portion that contacts the rear edge portion 15c of the side frame 15 to prohibit the movement (rotation) thereof after the movement (rotation) of the movement member 30.

The movement prohibiting portion 39 of the movement member 30 is integrally formed by extending the movement member 30 in the outer peripheral direction, and since the contact surface thereof contacts the side frame 15 (more specifically, the rear edge portion 15c) after the movement (rotation), the movement (rotation) of the movement member 30 may be stably stopped even when a predetermined impact load or more is applied to the pressure receiving member 20 due to a rear end collision or the like.

The movement prohibiting portion 39 is formed at a position where the movement prohibiting portion does not interfere with the biasing member (the tensile coil spring 35) or the connection member (the wire 22).

Furthermore, in this embodiment, the movement prohibiting portion 39 of the movement member 30 is adapted to directly contact the side frame 15 to prohibit the movement (rotation) thereof. However, in order to remove the abnormal noise generated by the contact, a sound deadening member such as rubber element having a thickness that does not disturb the operation of stably stopping the movement (rotation) of the movement member 30 may be attached between the movement prohibiting portion 39 and the side frame 15. With such a configuration, the movement (rotation) may be stably prohibited and a sound deadening effect may be expected.

In a normal state, the movement member 30 contacts the side frame 15 (more specifically, a portion formed by notching a part of the convex portion 15e) and presses and stops the upward force generated by the tensile coil spring 35 to confine the movement (rotation) range thereof so that the movement member 30 does not move (rotate) forward too much.

Then, when the occupant is about to move rearward by the inertia upon a rear end collision, a tension is applied in a direction in which the load moves (rotates) the movement member 30 rearward through the pressure receiving member 20 and the wire 22 locked to the pressure receiving member 20. The tension generated at this time becomes a sufficient load for stretching the tensile coil spring 35 keeping the movement member 30 at the initial position so that the movement member 30 moves (rotates) rearward.

A threshold value of the force that starts the movement (rotation) of the movement member 30 is set to a value larger than a normal sitting load.

Here, as for the threshold value of the force of starting the movement (rotation) of the movement member 30, since the load applied to the seatback S1 is about 150 N in the normal sitting state (here, the load excludes the sitting impact or the small impact generated by the abrupt start-up of the conveyance), it is desirable that the threshold value be a value larger than 150 N.

Further, it is desirable that the threshold value be set to a value larger than 250 N in consideration of the sitting impact generated in the normal sitting state or the acceleration load generated by the abrupt start-up of the conveyance. With such a configuration, the movement member 30 is not operated in a state other than the rear end collision so that the movement member may be kept in a stable state.

As described above, since the movement member 30 is moved (rotated) rearward, the wire 22 hooked to the movement member 30 moves rearward, and hence the pressure receiving member 20 locked to the wire 22 and the cushion pad 1a supported by the pressure receiving member 20 move rearward. Accordingly, the occupant may be sunk into the seatback S1.

Since the movement member 30 has the above-described movement (rotation) characteristic with respect to the tension generated through the wire 22, the occupant may be reliably and efficiently sunk into the cushion pad of the seatback S1 upon a rear end collision.

At this time, the back of the occupant moves rearward to be sunk to the seatback S1, but since the position of the headrest S3 does not change relative to the seatback S1, the gap between the headrest S3 and the head of the occupant decreases, and the head may be supported by the headrest S3 so that the impact applied to a neck may be effectively reduced.

In this embodiment, an example is illustrated in which the movement members 30 are provided in both right and left side frames 15, but the movement member may be provided in only one side frame 15. In this case, the wires 21 and 22 may be directly locked to the side frame 15 without the movement member 30.

Configurations of Lower Frames 17 and 18

The lower frame of the seat back frame 1 includes the lower frame base portion 17 and the lower frame installation portion 18. The lower frame installation portion 18 (the member center) is formed to connect the pair of lower frame base portions 17 that are disposed while being separated from each other in the right and left direction, and is disposed to contact the lower frame base portion 17. The lower frame base portion 17 is connected to the lower side of the side plate 15a of the side frame 15. Then, the lower frame base portion 17 is formed to extend the lower side of the side plate 15a, and extends to a range not causing any problem by the relation with the seat frame 2.

Furthermore, in the seat back frame 1 of this embodiment, the side frame 15 and the lower frame base portion 17 are formed as separate members, but may be formed as an integral plate-shaped frame or the like. Further, an example is illustrated in which the lower frame base portion 17 and the lower frame installation portion 18 are respectively formed as separate members, but the lower frame base portion and the lower frame installation portion may be integrally formed with each other.

Configuration of Lower Frame Base Portion 17

Figure 4:
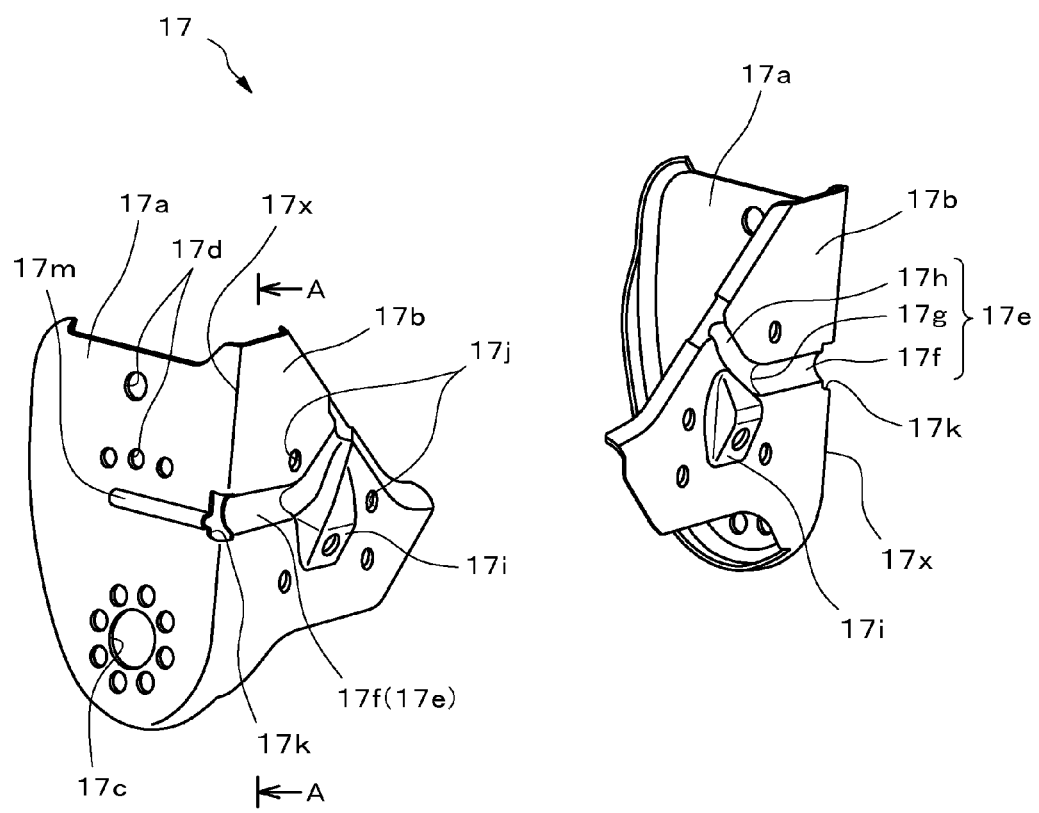
FIG. 4 is a schematic perspective view illustrating a lower frame base portion according to the first embodiment of the present invention.

As illustrated in FIG. 4, the lower frame base portion 17 includes lateral plates 17a that serve as frame side portions located at the right and left aides of the seat back frame 1 and extending in the up to down direction and an intermediate plate 17b that serves as a frame extension portion extending from each lateral plate 17a toward the inside in the right and left direction, and a connection portion 17x that connects the lateral plate 17a to the intermediate plate 17b is provided with a hole portion 17k that is deformed when the impact load is applied to the seat back frame. Furthermore, the frame side portion includes the side plate 15a of the side frame 15. In addition, the frame extension portion includes the rear edge portion 15c of the side frame 15 or the lower frame installation portion 18. However, as this embodiment, an example is illustrated in which the lower frame base portion 17 is provided with the hole portion 17k.

The lower frame base portion 17 is formed by the lateral plate 17a that is bonded to the side plate 15a of the side frame 15 and the intermediate plate 17b that is substantially perpendicularly bent toward the inside of the side frame 15 from the rear end of the lateral plate 17a. The lower side of the lateral plate 17a is provided with a shaft insertion hole 17c through which the reclining shaft 11a is inserted, and the seat frame 2 is disposed below the lateral plate 17a through the reclining mechanism 11.

Further, in the lateral plate 17a, plural attachment holes 17d are formed above the shaft insertion hole 17c to attach the lower frame base portion 17 to the side frame 15. A hole is formed at the lower side of the side frame 15 to match the attachment hole 17d when the side frame overlaps the lateral plate 17a, and a bonding member such as a bolt passes through the hole formed in the side frame 15 and the attachment hole 17d of the lower frame base portion 17 so that the side frame 15 is bonded to the lower frame base portion 17. Furthermore, only some of plural attachment holes 17d may be fixed to the side frame 15, and a member other than the side frame 15 may be attached.

Figure 5:
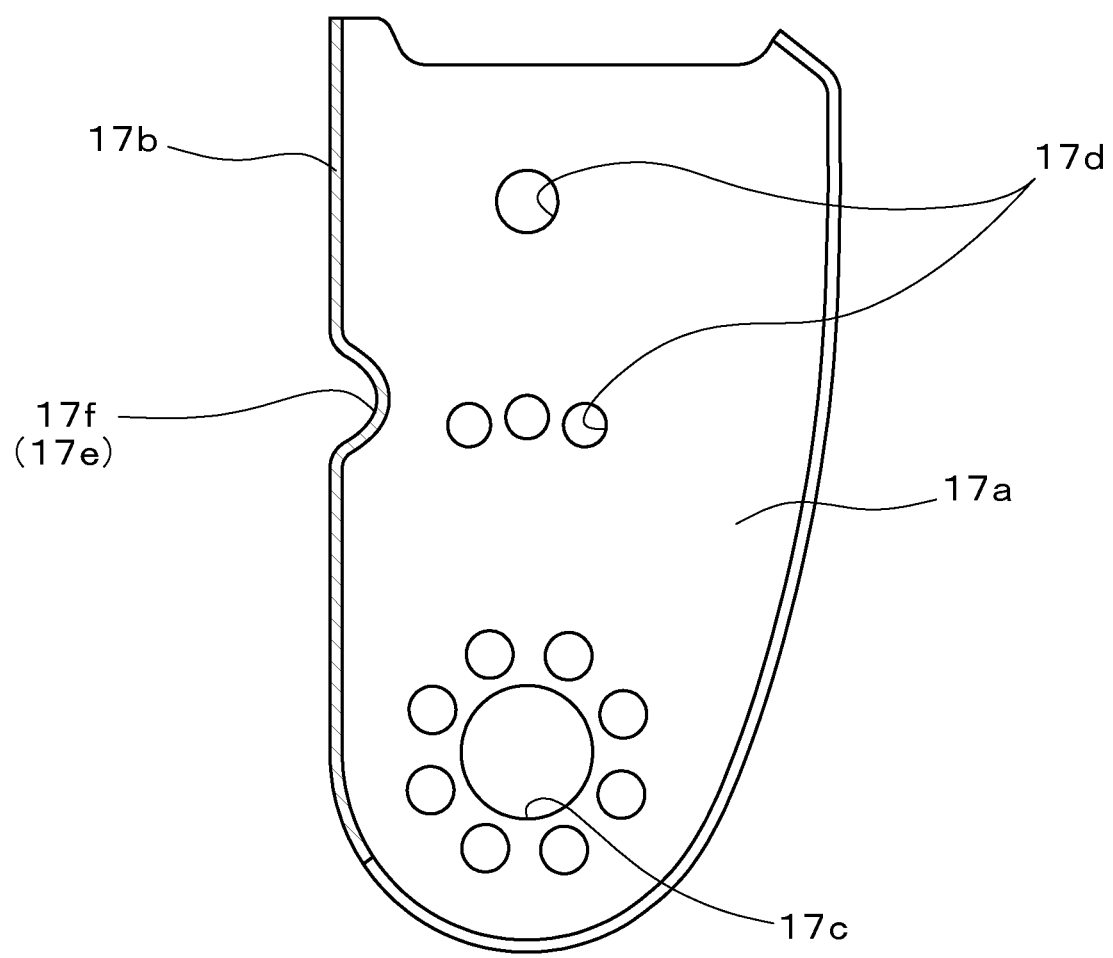
FIG. 5 is a cross-sectional view taken along the line A-A of FIG. 4.

Then, at least one of the lateral plate 17a and the intermediate plate 17b is provided with fragile portions 17e and 17m that are connected to the hole portion 17k. Here, the hole portion 17k corresponds to a deformation portion. The fragile portions 17e and 17m correspond to other deformation portions. Furthermore, in the present specification, the fragile portion indicates a weak portion that is deformed when a predetermined impact load or more is applied thereto upon a rear end collision or the like. Furthermore, in this embodiment, as illustrated in FIGS. 4 and 5 and the like, a configuration is illustrated in which both the lateral plate 17a and the intermediate plate 17b include the fragile portions (an inward fragile portion 17e and a lateral fragile portion 17m).

The intermediate plate 17b is provided with the inward fragile portion 17e that has flexibility with respect to a predetermined impact load or more in order to highly efficiently absorb the impact energy upon a rear end collision. The inward fragile portion 17e is formed by a concave portion that has a semi-circular-arc cross-sectional shape and is recessed forward, and is formed to extend toward the inside of the pair of side frames 15. In other words, the inward fragile portion 17e is a concave portion that is formed to be recessed toward the inside of the side frame 15 in the right and left direction, that is, the seat width direction. In this way, when the inward fragile portion 17e is formed as the concave portion, the configuration becomes simple, and hence the inward fragile portion 17e may be easily molded.

When the occupant abruptly moves rearward upon a rear end collision or the like, the inward fragile portion 17e receives the impact load to be crushed in the up to down direction, and hence the lower frame base portion 17 is deformed to be bent. Thus, the seat back frame 1 is inclined rearward with the deformation. Accordingly, it is desirable to form the inward fragile portion 17e in the members constituting the lower frame, and particularly, the lower frame base portion 17 provided below the side frame 15. Furthermore, in order to absorb the impact energy generated upon a rear end collision, if the lower frame base portion 17 may be sufficiently bent, the inward fragile portion 17e may be formed in a concave shape to be recessed rearward. Further, if strength capable of withstanding the normal sitting load is ensured, only the plate thickness of the portion forming the inward fragile portion 17e may be thinned to easily deform the inward fragile portion 17e.

The inward fragile portion 17e that is formed in the intermediate plate 17b of the lower frame base portion 17 includes a horizontal portion (a horizontal portion 17f) that extends in the long direction (the seat width direction) of the lower frame (more specifically, the lower frame installation portion 18), a bent portion 17g that is formed in one end of the horizontal portion 17f in the long direction, and an inclined portion 17h that extends obliquely upward from the bent portion 17g.

Then, in the horizontal portion 17f that constitutes the inward fragile portion 17e, a part of the inward fragile portion 17e (more specifically, the horizontal portion 17f) at the end facing the bent portion 17g in the long direction is notched. The notched portion is the hole portion 17k, and the hole portion 17k and the inward fragile portion 17e are formed to be adjacent to one another. That is, the inward fragile portion 17e is formed to be connected to the hole portion 17k. In this way, since the inward fragile portion 17e and the hole portion 17k are formed to be connected to each other, when the impact load generated upon a rear end collision or the like is applied to the lower frame base portion 17, the inward fragile portion 17e of the lower frame base portion 17 is deformed by using the hole portion 17k as a starting point as will be described below so that the impact energy is absorbed.

Figure 6:
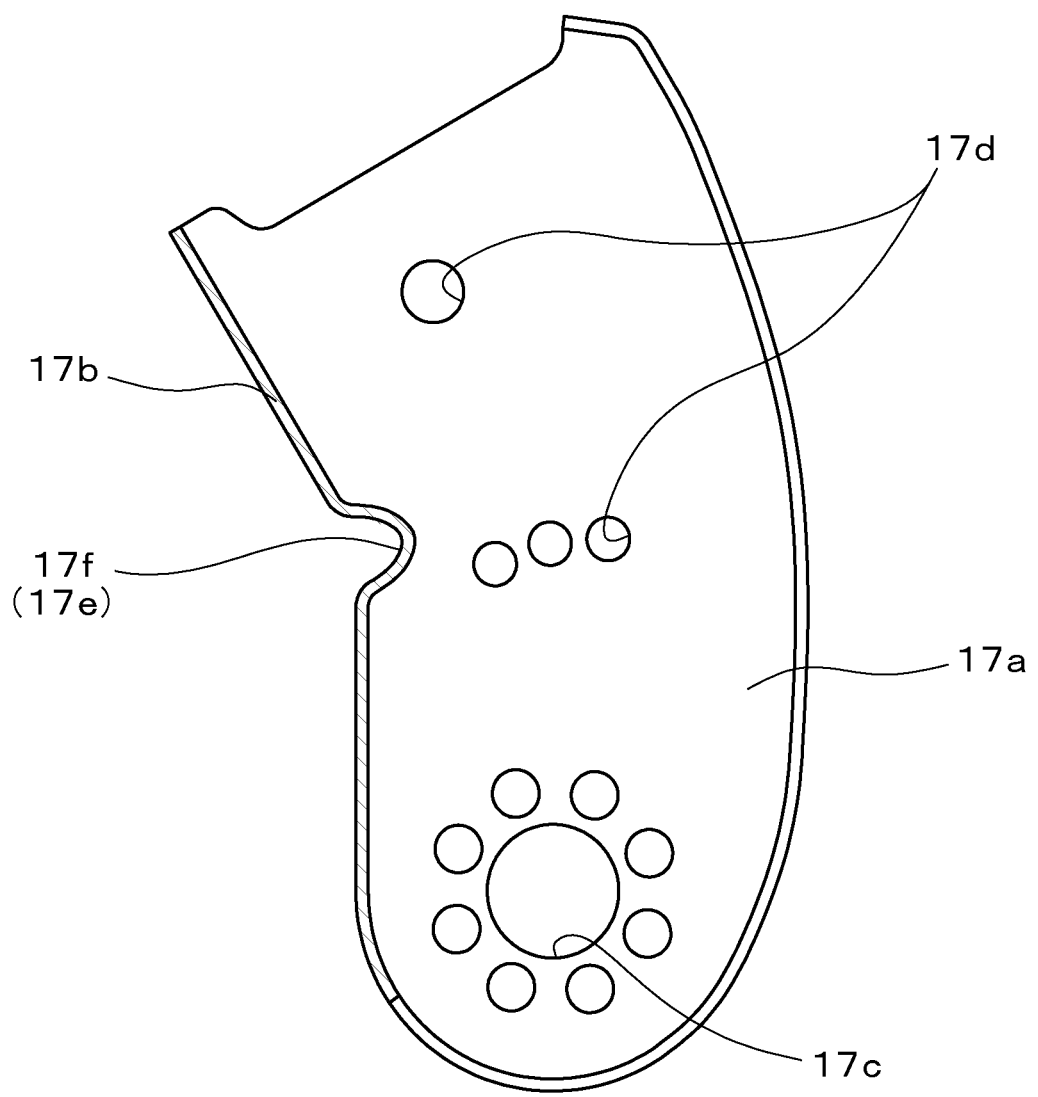
FIG. 6 is an explanatory diagram cross-sectional view illustrating a state of the lower frame base portion according to the first embodiment of the present invention shown in FIG. 5 after a rear end collision occurs.

The horizontal portion 17f is warped and deformed to be crushed in the up to down direction when a predetermined impact load (an impact load larger than a load in the normal sitting state) is applied to the seat back frame 1 like the case of the rear end collision or the like (see FIG. 6). As a result, the rearward inclining load may be stably and efficiently absorbed. Further, since the horizontal portion 17f is provided to extend in the seat width direction, that is, the long direction of the lower frame installation portion 18, even when a load generated the right and left direction is applied thereto, the load may be received by the ridge line portion thereof, and hence the rigidity with respect to the load of the lower frame base portion 17 in the seat width direction is extremely improved.

As illustrated in FIG. 4, the horizontal portion 17f is provided to extend to the boundary portion between the intermediate plate 17b and the lateral plate 17a, that is, the portion provided with the hole portion 17k. In other words, the hole portion 17k is formed at the boundary portion between the intermediate plate 17b and the lateral plate 17a, that is, the connection portion 17x. The hole portion 17k is formed to be deformed by a smaller impact load compared to the fragile portion (the inward fragile portion 17e and the lateral fragile portion 17m to be described later).

The lower frame base portion 17 is formed such that the intermediate plate 17b is bent from the rear end of the lateral plate 17a toward the inside in the seat direction, and has rigidity with respect to the load in the up to down direction by the bent portion (the connection portion 17x). Accordingly, there is a case in which the lower frame base portion 17 is not easily deformed in the up to down direction by the magnitude of the impact load and the impact energy is not easily and efficiently absorbed. However, the hole portion 17k is formed at the boundary portion (the connection portion 17x) between the intermediate plate 17b and the lateral plate 17a. Then, when the impact load generated upon a rear end collision or the like is applied to the hole portion 17k, the hole portion 17k may be first deformed to be crushed in the up to down direction since the hole portion 17k may be easily deformed compared to the fragile portion (the inward fragile portion 17e and the lateral fragile portion 17m to be described later). As a result, since the lower frame base portion 17 is deformed so that the upper side is inclined rearward, the energy of the rearward inclining load may be efficiently absorbed.

In order to easily deform the hole portion 17k compared to the fragile portion (the inward fragile portion 17e and the lateral fragile portion 17m to be described later) with respect to the impact load, for example, the width (the size in the height direction) of the hole portion 17k may be set to be equal to or slightly larger than the width of at least the horizontal portion 17f in the short direction (the up to down direction). Since the size of the hole portion 17k in the height direction is set to be equal to or larger than the width of the horizontal portion 17f in the up to down direction, the hole portion 17k is easily deformed earlier than the horizontal portion 17f when the impact load generated upon a rear end collision or the like is applied thereto, and hence the inward fragile portion 17e may be deformed by using the hole portion 17k as a starting point.

As described above, the inward fragile portion 17e includes the inclined portion 17h that extends from the horizontal portion 17f through the bent portion 17g, and the inclined portion 17h is provided to extend to the end of the portion interposed between the lateral plates 17a and 17a (the lateral plates 17a and 17a provided in the pair of lower frame base portions 17 and 17) of the intermediate plate 17b in the up to down direction. In other words, the inclined portion 17h is provided to extend to the upper end or the lower end of the intermediate plate 17b provided at the inside of the seat in the right and left direction.

In this embodiment, a configuration is illustrated in which the inclined portion 17h is bent to be inclined upward as it moves toward the inside of the seat and extends to the inclined upper end of the intermediate plate 17b.

In this way, the inward fragile portion 17e is not formed to extend in a horizontal linear shape only by the horizontal portion 17f, but also includes the bent portion 17g. Accordingly, the inward fragile portion includes a portion (the inclined portion 17h) that extends in a direction other than the substantially horizontal direction, that is, the inclination direction. Thus, the rigidity of the lower frame base portion 17 in the periphery of the bent portion 17g and the inclined portion 17h is improved. Accordingly, when a load is applied which deforms the seat back frame 1 by the rear end collision or the like so that the seat back frame is inclined rearward, particularly the horizontal portion 17f is easily deformed, and hence the impact energy may be efficiently absorbed.

Further, since the inclined portion 17h is provided to extend to the upper end of the intermediate plate 17b, the entire inward fragile portion 17e may be easily bent.

Further, the inclined portion 17h may be formed in a direction substantially perpendicular to the horizontal portion 17f, but may be formed to be inclined with respect to the horizontal portion 17f. That is, it is desirable that the inclined portion 17h form an acute angle or an obtuse angle with respect to the horizontal portion 17f. When the inclined portion 17h is formed in the horizontal portion 17f in a direction substantially perpendicular thereto, the rigidity of the intermediate plate 17b with respect to the rearward inclining load is improved by the inclined portion 17h when the rearward inclining load is applied to the seat back frame 1, and hence the horizontal portion 17f is not easily deformed by the rearward inclining load. When the inclined portion 17h is provided to form an acute angle or an obtuse angle with respect to the horizontal portion 17f, the intermediate plate 17b is appropriately deformed so that the horizontal portion 17f may be bent.

In the horizontal portion 17f, the hole portion 17k is formed at the end facing the end provided with the bent portion 17g and the inclined portion 17h. Accordingly, since the hole portion 17k is formed at a position (that is, a position where the rigidity is not comparatively high and the warpage easily occurs) farthest from the bent portion 17g and the inclined portion 17h in the horizontal portion 17f, the hole portion 17k is easily deformed when the impact load is applied thereto, and hence the horizontal portion 17f is deformed. Thus, the impact energy may be absorbed.

Further, a harness attachment portion 17i as a bulged component attachment portion is formed at the opposite side (the lower side in FIGS. 3 and 4) in the bending direction of the bent portion 17g. The harness attachment portion 17i is formed to be bulged in a direction opposite to the bulging direction of the inward fragile portion 17e. That is, the harness attachment portion 17i is formed at the lower side of the bent portion 17g to be bulged rearward. In this way, since the harness attachment portion 17i is formed at the opposite side (that is, the side of the obtuse angle formed between the horizontal portion 17f and the inclined portion 17h) in the bending direction of the bent portion 17g of the inward fragile portion 17e in the intermediate plate 17b, plural concavo-convex portions are formed on the intermediate plate 17b, and hence the rigidity (particularly, the rigidity in the vicinity of the bent portion 17g) of the lower frame base portion 17 with respect to the load is improved. As a result, when the impact load is applied upon a rear end collision or the like, the horizontal portion 17f, the bent portion 17g, and the inclined portion 17h of the inward fragile portion 17e are sequentially bent without bending a portion other than the inward fragile portion 17e so that the impact energy may be absorbed. Thus, even when a complex input load is applied upon a rear end collision or the like, the impact energy may be efficiently and stably absorbed by the inward fragile portion 17e.

In this way, the harness attachment portion 17i is formed to be bulged toward the rear side of the inward fragile portion 17e at the intermediate plate 17b, and serves as a reinforcement portion that does not bend a portion other than the inward fragile portion 17e when the impact load generated upon a rear end collision is applied thereto. Since the rigidity is improved by the concavo-convex shape, the rearward deformation of the harness attachment portion 17i is regulated, and the deformation of the seat back frame 1 from the portion other than the inward fragile portion 17e may be suppressed. Accordingly, the positional regulation and the deformation guide of the deformation portion of the seat back frame 1 may be easily performed.

Furthermore, in order to particularly easily incline the side frame 15 rearward by the impact load generated upon a rear end collision, it is desirable that the harness attachment portion 17i be provided at the lower side of the bent portion 17g instead of the upper side thereof for the purpose of improving the rigidity of the lower side of the intermediate plate 17b compared to the upper side thereof.

Moreover, the intermediate plate 17b is provided with plural attachment holes 17j. The attachment holes 17j are used so that a bonding member such as a bolt is inserted therethrough when the other components (an actuator and the like) are attached to the seat frame F.

In this way, since the harness attachment portion 17i or the attachment holes 17j are provided in the intermediate plate 17b, a space involved with the attachment of the other components may be saved, and hence the number of components may be further decreased. Further, since the harness attachment portion 17i serves as the reinforcement portion provided at the rear side of the inward fragile portion 17e, the harness attachment portion may have a function of attaching the components and a deformation guide function of regulating the position of the deformation portion of the seat back frame 1. Accordingly, the harness attachment portion may contribute to the deformation of the seat back frame 1 while decreasing the number of components.

Configuration of Lower Frame Installation Portion 18

The lower frame installation portion 18 is bonded to the lateral plates 17a or the intermediate plates 17b of the pair of lower frame base portions 17. It is desirable to attach the lower frame installation portion 18 to both the lateral plate 17a and the intermediate plate 17b in that the attachment rigidity is improved. Further, when the lateral end of the lower frame installation portion 18 is formed to contact the lateral plate 17a, the rigidity with respect to the lateral load is improved. Furthermore, in this embodiment, the lower frame installation portion 18 is disposed at the front side of the intermediate plate 17b, but may be disposed at the rear side of the intermediate plate 17b.

It is desirable to form the inward fragile portion 17e above the lower frame installation portion 18 at a position not overlapping the lower frame installation portion 18. In this way, when the inward fragile portion 17e is provided at a position not overlapping the lower frame installation portion 18, it is desirable in that the deformation of the inward fragile portion 17e is not disturbed by the lower frame installation portion 18 in a case where the rearward inclining load is applied to the seat back frame 1. In other words, the lower frame installation portion 18 is provided at a position not overlapping the inward fragile portion 17e below the inward fragile portion 17e, and serves as the reinforcement portion that improves the rigidity of the lower portion of the inward fragile portion 17e when the rearward inclining load generated upon a rear end collision is applied to the seat back frame 1. Accordingly, it is possible to suppress the lower frame base portion 17 from being bent from the portion other than the fragile portion, and hence to easily perform the positional regulation of the deformation portion and the deformation guide of the seat back frame 1.

Further, the fragile portion includes the lateral fragile portion 17m that is formed in the lateral plate 17a and is formed between the seat frame 2 (more specifically, the side frame provided in the seat frame 2) and the side frame 15. That is, the lower frame base portion 17 that is disposed between the seat frame 2 and the side frame 15 includes the lateral fragile portion 17m at the lateral plate 17a. The lateral fragile portion 17m is substantially formed at the same height position as that of the inward fragile portion 17e formed on the intermediate plate 17b, and horizontally extends forward from the hole portion 17k formed at the boundary portion between the lateral plate 17a and the intermediate plate 17b. Then, the lateral fragile portion 17m that extends from the hole portion 17k on the lateral plate 17a extends to the vicinity of the approximate center of the lateral plate 17a in the front to back direction.

The lateral fragile portion 17m is formed to be connected to the hole portion 17k, and is formed in a semi-circular-arc cross-sectional shape like the inward fragile portion 17e. That is, the lateral fragile portion is recessed from the inside toward the outside in the right and left direction (the seat width direction) of the side frame 15. Then, the lateral fragile portion 17m substantially extends in a linear shape from the rear side toward the front side. In other words, the lateral fragile portion 17m is a concave portion that extends in the front to back direction and is formed below the side frame 15. In this way, since the lateral fragile portion 17m is formed as the concave portion, the configuration becomes simple, and hence the lateral fragile portion 17m may be easily molded.

Further, it is desirable that the width (the length in the height direction) of the lateral fragile portion 17m be smaller than the width of the horizontal portion 17f constituting at least the inward fragile portion 17e in the short direction (the up to down direction). Since the length of the lateral fragile portion 17m in the height direction is smaller than the width of the horizontal portion 17f in the short direction (the up to down direction), the lateral fragile portion 17m may be easily deformed earlier than the horizontal portion 17f when the impact load is generated upon a rear end collision or the like. Accordingly, as described above, the lateral fragile portion 17m is deformed to be crushed in the up to down direction as the hole portion 17k is deformed by the impact load. In this way, when the impact load is applied to the lateral plate 17a of the lower frame base portion 17, the lateral plate is warped in the up to down direction so that the inward fragile portion 17e may be more easily deformed. Thus, the impact energy may be reliably absorbed. Further, in this embodiment, an example is illustrated in which the lateral fragile portion 17m is formed in a linear shape, but may be formed in a bent shape like the inward fragile portion 17e.

The inward fragile portion 17e and the lateral fragile portion 17m are formed by performing a press working on the lower frame base portion 17. Further, the hole portion 17k may be formed by cutting after the inward fragile portion 17e and the lateral fragile portion 17m are formed on the lower frame base portion 17 or the inward fragile portion 17e and the lateral fragile portion 17m may be formed after the hole portion 17k is formed in advance.

Operation and Effect of Lower Frame Base Portion 17

A shape in which the lower frame base portion 17 is deformed when the impact load is generated upon a rear end collision will be described below with reference to FIGS. 7 and 8.

Figure 7:
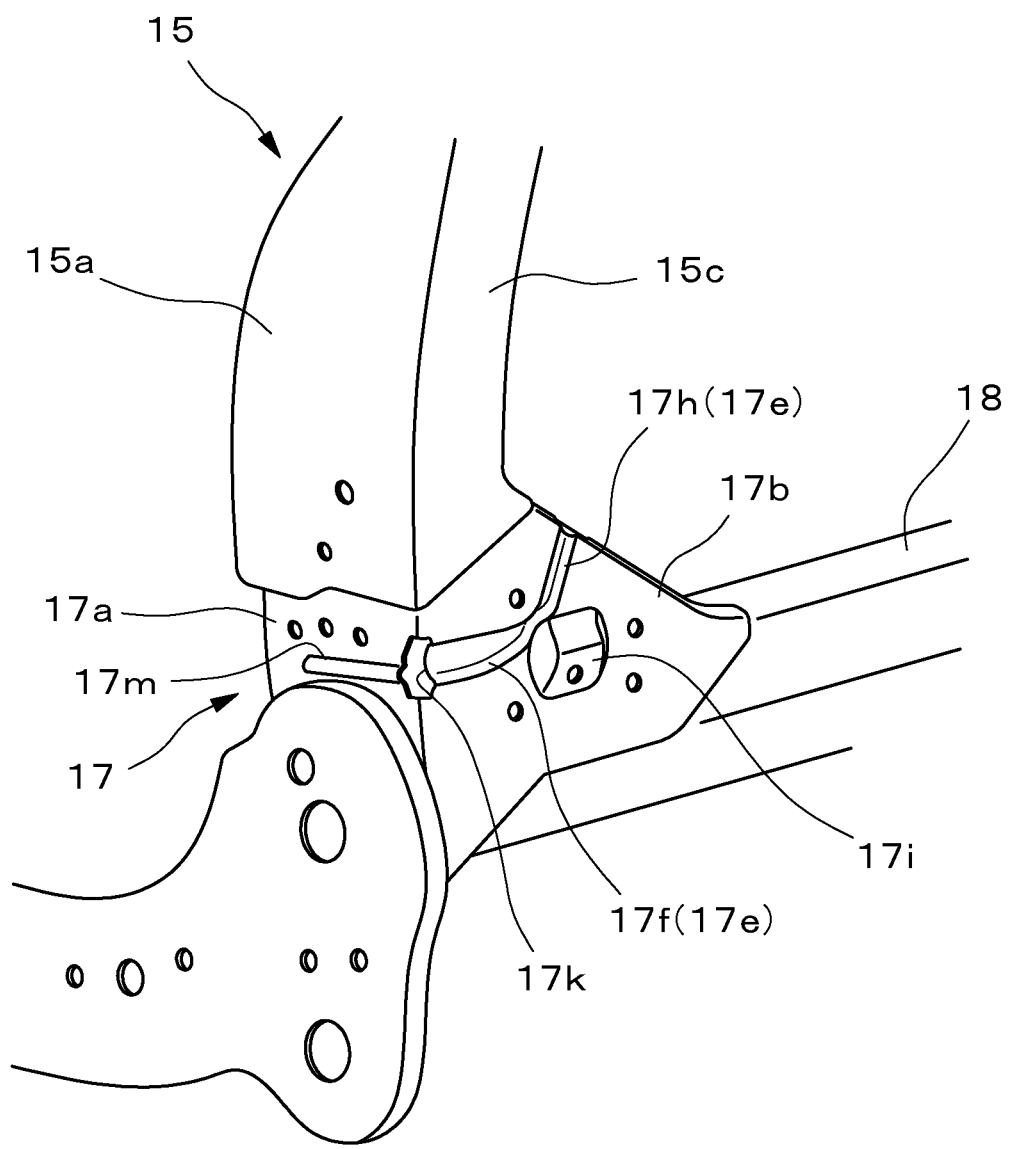
FIG. 7 is an explanatory perspective diagram illustrating a lower frame according to the first embodiment of the present invention before a rear end collision occurs.
Figure 8:
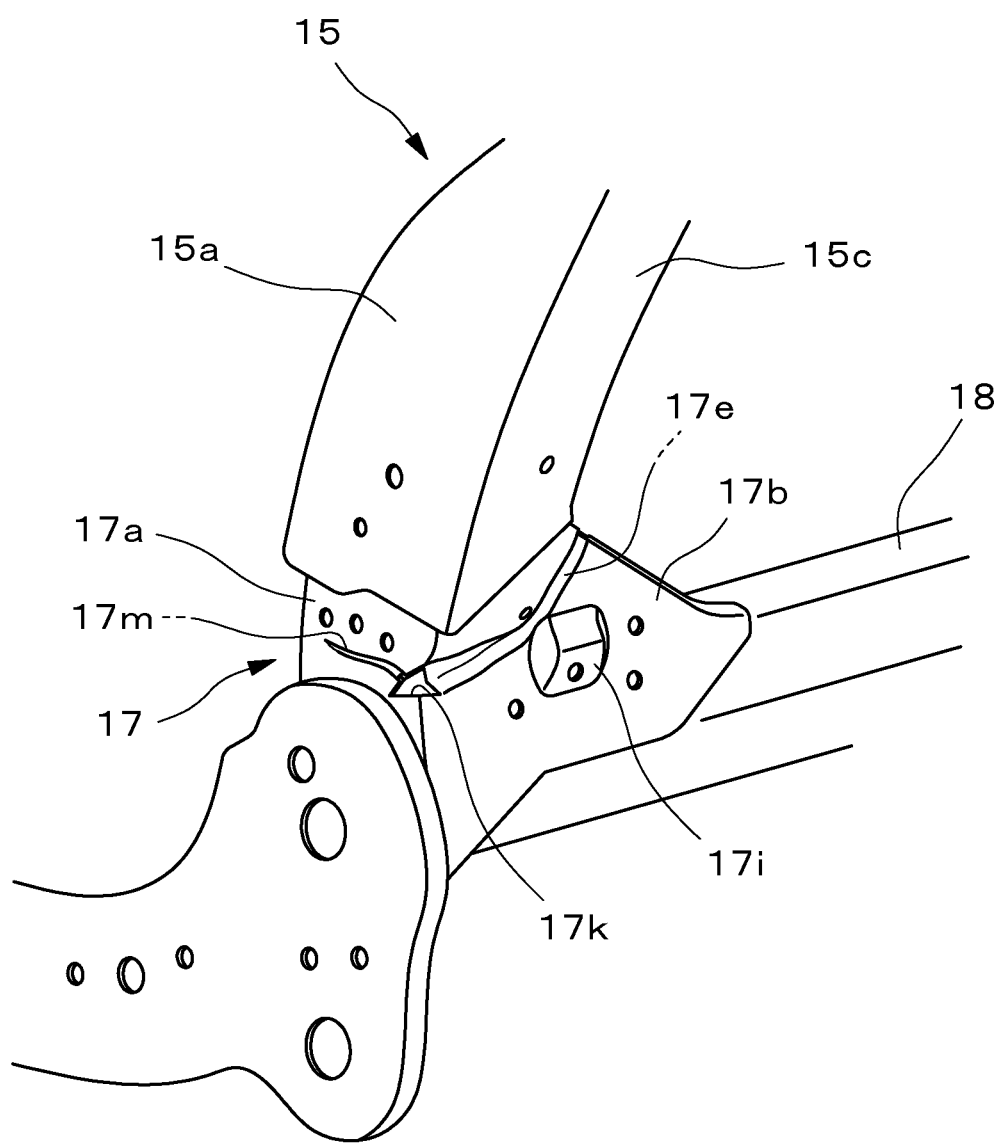
FIG. 8 is an explanatory perspective diagram illustrating the lower frame according to the first embodiment of the present invention after a rear end collision occurs.

FIG. 7 illustrates a state immediately after the impact load generated upon a rear end collision is applied to the lower frame base portion 17. At this time, the rearward inclining load is mainly applied to the seat back frame 1, but the largest load is applied to the lower side of the side frame 15, that is, the lower frame base portion 17.

Then, when a load is transmitted to the lower frame base portion 17, the lateral fragile portion 17m formed in the lateral plate 17a is deformed to be crushed in the up to down direction by using the hole portion 17k as a starting point, and hence the lateral plate 17a is deformed to be widened outward in the seat width direction. In this way, since the hole portion 17k is provided and the lateral fragile portion 17m is provided in the lateral plate 17a, the lateral plate 17a may be easily widened outward in the seat width direction compared to the case where the hole portion 17k is not provided.

As described above, after the lateral plate 17a is deformed to be widened outward in the seat width direction, the inward fragile portion 17e (more specifically, the horizontal portion 17f) formed in the intermediate plate 17b is deformed to be crushed in the up to down direction (see FIGS. 5 and 6). As a result, the side frame 15 provided above the lower frame base portion 17 is inclined rearward so that the seat back frame 1 is deformed.

In this way, since the lower frame base portion 17 is provided with not only the inward fragile portion 17e and the hole portion 17k but also the lateral fragile portion 17m, the lower frame base portion 17 may be gradually and easily deformed by using the hole portion 17k as the starting point, and hence the impact energy may be efficiently absorbed. When the rear end collision or the like occurs, a complex input load is applied to the seat back frame 1. However, since the above-described configuration is provided, a specific position (specifically, the horizontal portion 17f of the inward fragile portion 17e) may be stably deformed. As a result, the impact energy generated upon a rear end collision may be efficiently absorbed by the lower frame base portion 17.

Furthermore, in the present invention, the hole portion 17k, the inward fragile portion 17e, and the lateral fragile portion 17m (hereinafter, referred to as the hole portion 17k and the like) are formed between the reclining mechanism 11 and the side frame 15, and more specifically, between the shaft insertion hole 17c and the attachment hole 17d. That is, the hole portion 17k, the inward fragile portion 17e, and the lateral fragile portion 17m are formed above the reclining mechanism 11. With such a configuration, since the lower side of the seat back frame 1 is fixed by the reclining mechanism 11, the seat back frame 1 above the hole portion 17k and the like may be easily inclined rearward.

Further, since the hole portion 17k and the like are formed between the seat frame 2 and the side frame 15, the impact energy may be efficiently absorbed without disturbing the deformation of the hole portion 17k and the like by the seat frame 2 or the side frame 15 when the impact load is applied to the hole portion and the like.

Further, in this embodiment, since all the hole portion 17k and the like are formed at the same height, the seat back frame 1 may be inclined (deformed) rearward in a particularly stable state, and hence the impact energy may be efficiently absorbed.

Further, since the pressure receiving member 20 connected to the movement member 30 is provided, the vehicle seat S may sufficiently sink the occupant in the seatback S1 upon a rear end collision or the like. Then, since the bent portion 17g and the inclined portion 17h are formed at the inward fragile portion 17e of the lower frame (more specifically, the lower frame base portion 17), the intermediate plate 17b has an appropriate rigidity. Accordingly, since the pressure receiving member 20 may easily sink the human body of the occupant with respect to the side frame 15 and the upper frame 16, the impact energy generated by the rear end collision or the like may be efficiently transmitted and absorbed to the seat back frame 1.

As a result, the impact energy may be more efficiently absorbed by deforming the inward fragile portion 17e or the lateral fragile portion 17m formed in the lower frame base portion 17.

Configuration of Vehicle Seat S of Second Embodiment

Next, a vehicle seat according to a second embodiment of the present invention will be described with reference to FIGS. 9 to 12. FIGS. 9 to 12 are involved with the second embodiment of the present invention. Furthermore, in the second embodiment, the same reference numerals will be given to the same components and arrangements as those of the first embodiment and the detailed description thereof will not be repeated.

Figure 9:
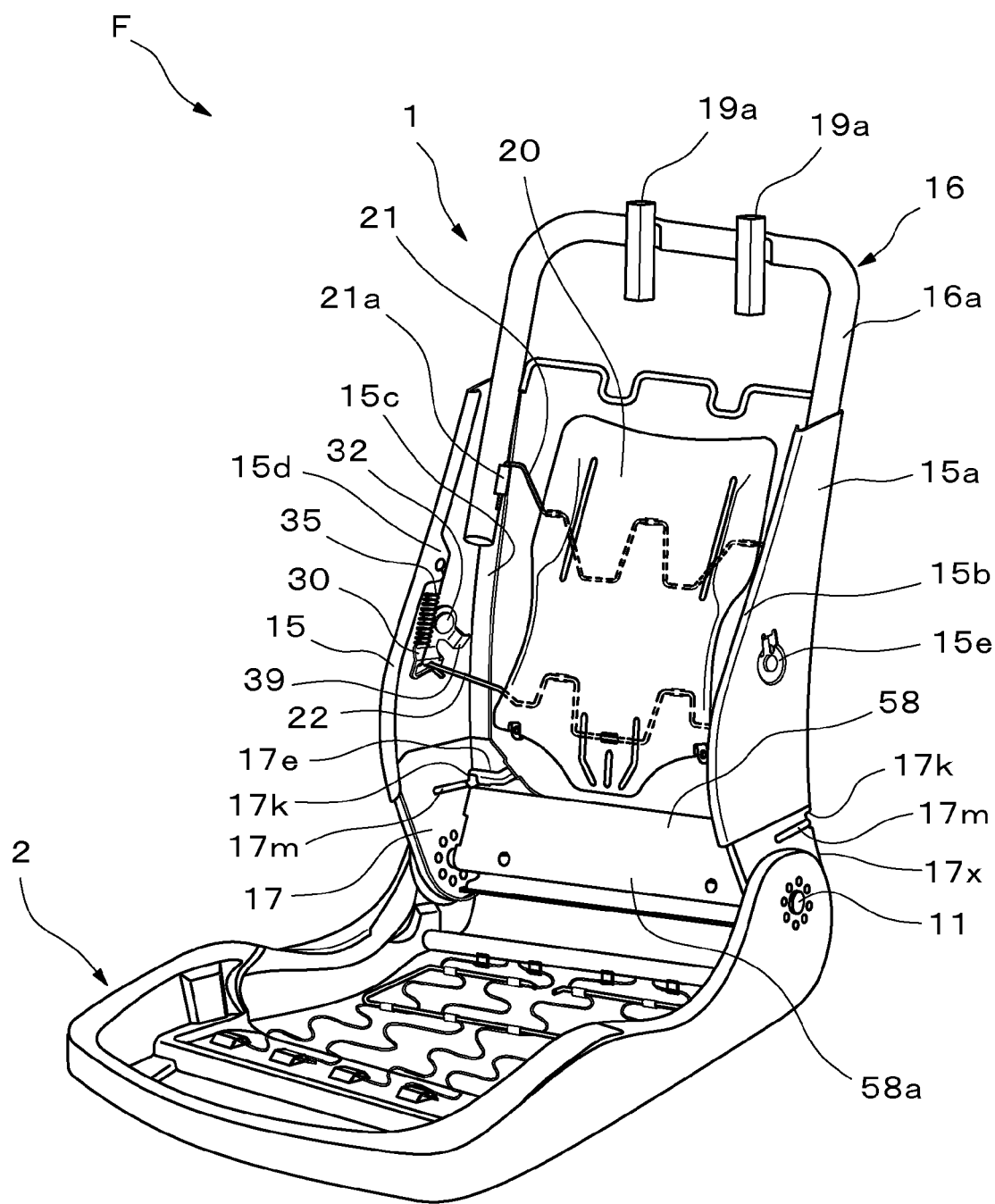
FIG. 9 is a schematic perspective view illustrating a vehicle seat according to a second embodiment of the present invention.
Figure 10:
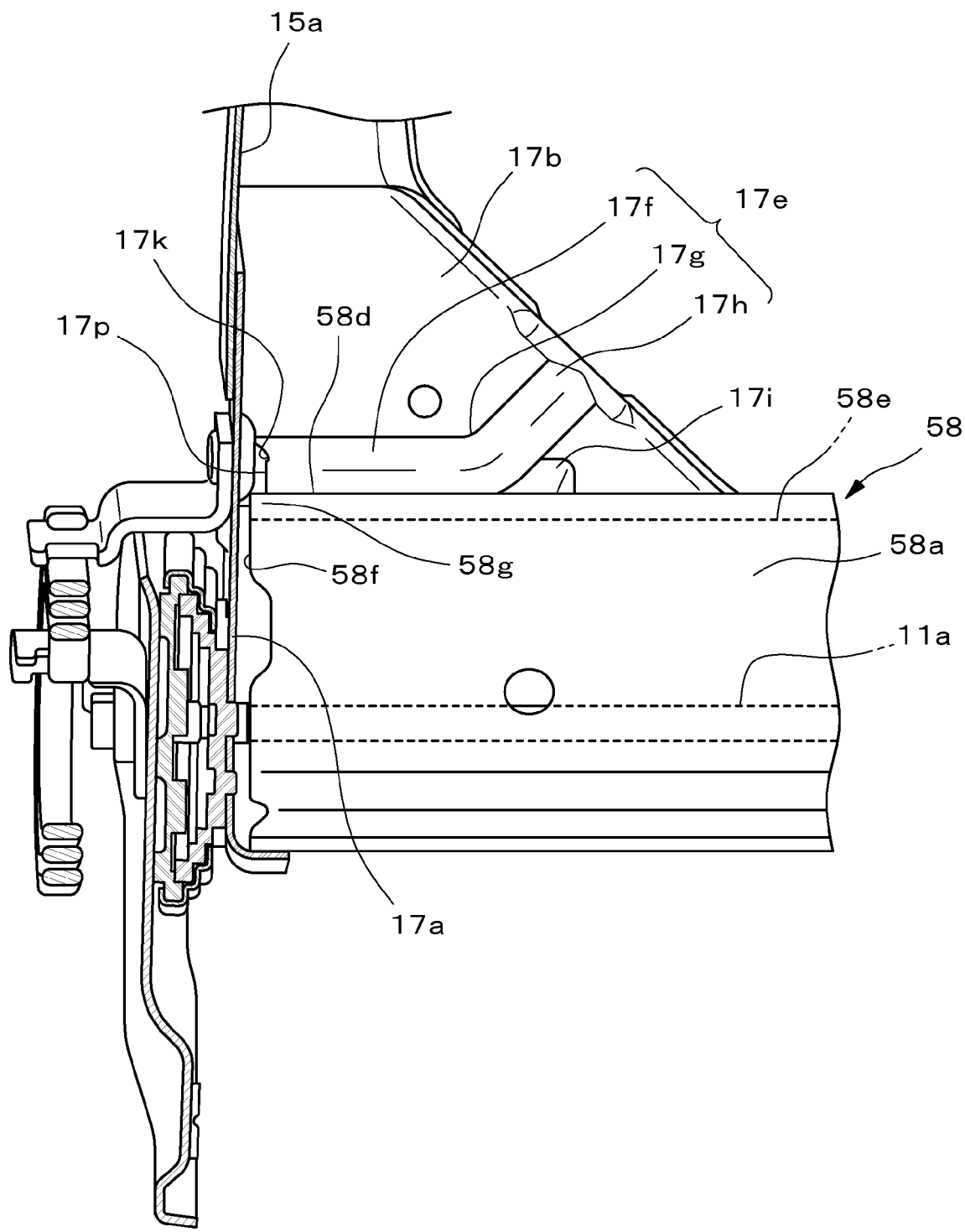
FIG. 10 is a partially enlarged explanatory diagram illustrating a frame side portion and a lower frame installation portion according to the second embodiment of the present invention.
Figure 11:
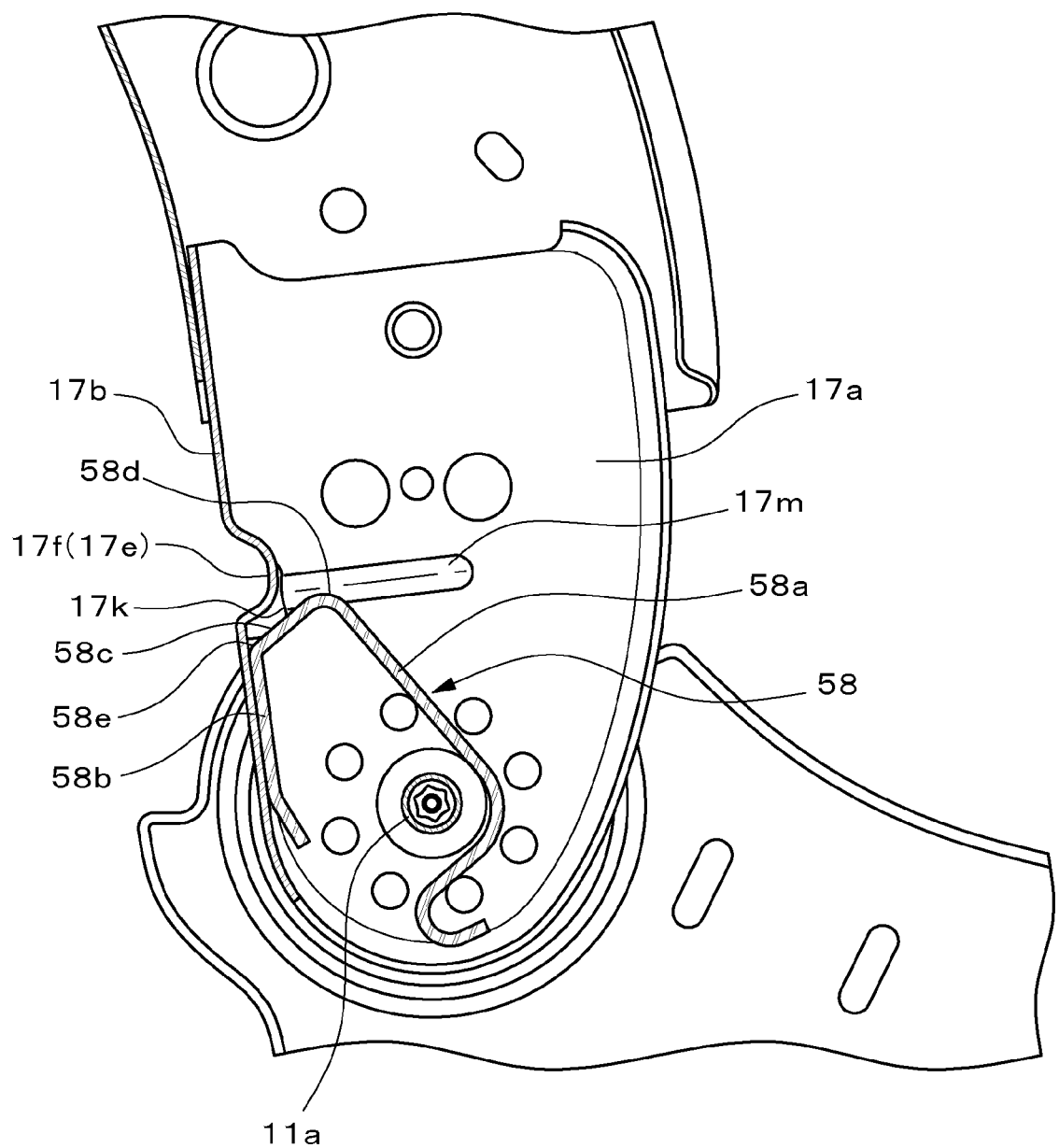
FIG. 11 is a partial cross-sectional side view illustrating a lower frame according to the second embodiment of the present invention.

As illustrated in FIGS. 9 to 11, a lower frame installation portion 58 of the vehicle seat S according to this embodiment includes at least a forward bulged portion 58a that is substantially formed in a hollow square column shape by bending one plate member and is bulged forward, a rear surface 58b that faces the forward bulged portion 58a, and a connection surface 58c that connects the forward bulged portion 58a to the rear surface 58b. The lower frame installation portion 58 of this embodiment is disposed so that the forward bulged portion 58a is bulged toward the front side of the reclining shaft 11a and covers the front side of the reclining shaft 11a.

The lower frame installation portion 58 of this embodiment is connected to the lower frame base portion 17 in a manner such that the rear surface 58b disposed at the rear side to face the forward bulged portion 58a is bonded to the intermediate plate 17b of the lower frame base portion 17. The connection between the rear surface 58b and the lower frame base portion 17 may be performed by any one of methods such as a welding method and a fixing method using a fixing member such as a screw and a nut.

The lower frame installation portion 58 is disposed at a position corresponding to the waist of the occupant when the occupant sits on the vehicle seat, and is disposed at the front side of the inward fragile portion 17e as illustrated in FIG. 11. Thus, the lower frame installation portion 58 serves as the reinforcement portion that receives the impact load applied from the waist of the occupant through the cushion pad 1a and the skin material 1b disposed on the seat back frame 1 upon a rear end collision at the front side of the intermediate plate 17b of the lower frame base portion 17 and reinforces the rigidity of the lower frame base portion 17.

In this way, when the reinforcement portion is provided at the front side of the fragile portion, the input of the forward load to the portion of the seat back frame 1 overlapping the reinforcement portion in the front to back direction is regulated, and hence the deformation generated from the portion other than the fragile portion may be suppressed. Accordingly, it is possible to suppress the deformation of the seat back frame 1 from the portion other than the fragile portion when the impact load is applied from the front side, and hence to easily perform the positional regulation of the deformation portion and the deformation guide of the seat back frame 1.

As illustrated in FIGS. 10 and 11, the lower frame installation portion 58 as the reinforcement portion is disposed so that the rear surface 58b as the bonding surface with respect to the intermediate plate 17b is attached to the lower side of the inward fragile portion 17e at a position not overlapping the inward fragile portion 17e in the front to back direction. Further, the upper end 58e of the rear surface 58b is disposed below the horizontal portion 17f to follow the extension direction of the horizontal portion 17f of the inward fragile portion 17e, that is, the long direction (the seat width direction) of the lower frame installation portion 58.

In this way, since the rear surface 58b of the lower frame installation portion 58 is disposed at a position not overlapping the inward fragile portion 17e in the front to back direction, the deformation of the inward fragile portion 17e caused when the rear impact load is applied to the seat back frame 1 is not disturbed by the lower frame installation portion 58.

Further, since the lower frame installation portion 58 is provided so that the rear surface 58b is attached to the lower portion of the inward fragile portion 17e of the intermediate plate 17b, the portion other than the inward fragile portion 17e, that is, the lower side of the inward fragile portion 17e in this embodiment is reinforced by the rear surface 58b so that the rigidity thereof is improved. Accordingly, when the rear impact load is applied to the seat back frame 1, it is possible to suppress the deformation of the seat back frame 1 from the portion other than the inward fragile portion 17e, and hence to easily regulate the position of the portion causing the deformation of the seat back frame 1.

Further, since the upper end 58e of the rear surface 58b is provided to follow the extension direction of the horizontal portion 17f of the inward fragile portion 17e, the deformation direction and the deformation shape of the seat back frame 1 may be more easily guided.

Further, a corner portion 58g that is formed by intersecting one end of the forward bulged portion 58a, that is, the upper end 58d of the forward bulged portion 58a in this embodiment and a lateral end (the left end in FIG. 10) 58f is disposed at a position overlapping a boundary portion 17p between the hole portion 17k and the horizontal portion 17f of the inward fragile portion 17e in the front to back direction.

The hole portion 17k and the inward fragile portion 17e are connected to each other through the boundary portion 17p, and when the impact load generated by the rear end collision is applied to the seat back frame, the hole portion 17k is first deformed and the impact energy is transmitted to the inward fragile portion 17e by using the hole portion as the starting point. Accordingly, in order to efficiently transmit the impact energy to the inward fragile portion 17e, the hole portion 17k needs to be deformed in a desired direction without disturbing the deformation of the hole portion 17k.

Like the forward bulged portion 58a of this embodiment, since the corner portion 58g as one end overlaps the boundary portion 17p between the hole portion 17k and the horizontal portion 17f of the inward fragile portion 17e in the front to back direction, the deformation direction of the hole portion with respect to the complex input load may be defined without disturbing the deformation of the hole portion 17k by the impact load. Furthermore, the corner portion 58g as one end may overlap at least the boundary portion 17p, and may be disposed at a position overlapping the hole portion 17k in the front to back direction in the region including the boundary portion 17p.

Both right and left lateral ends 58f of the forward bulged portion 58a of this embodiment are provided to be separated from the lateral plate 17a of the lower frame base portion 17, and are not fixed to the side portion of the seat back frame 1. Furthermore, FIG. 10 illustrates only the left lateral end 58f when the vehicle seat S is viewed from the front side, but the right lateral end also has the same configuration. In this way, when the forward bulged portion 58a is not connected to the lateral plate 17a, the rigidity of the reinforcement portion does not increase too much, and the deformation of the seat back frame 1 caused by the impact load is not influenced.

As illustrated in FIG. 11, the upper end 58d of the forward bulged portion 58a is provided at a position partially overlapping the lateral fragile portion 17m in the up to down direction at the lower side of the center (the center line) of the width (the length in the height direction) of the lateral fragile portion 17m formed in the lateral plate 17a of the lower frame base portion 17.

Since the lateral fragile portion 17m is deformed to be crushed in the up to down direction when the impact load generated upon a rear end collision or the like is applied to the seat back frame, it is desirable to provide the upper end 58d of the forward bulged portion 58a below the center of the width (the length in the height direction) of the lateral fragile portion 17m in that the upper end does not interfere with the lateral fragile portion 17m in the deformation state and does not disturb the deformation of the lateral fragile portion 17m.

Further, since the upper portion of the lower frame installation portion 58, that is, the upper end 58d of the forward bulged portion 58a is disposed at a position partially overlapping the lateral fragile portion 17m in the right and left direction, it is possible to suppress an increase in the length of a seat side portion in the up to down direction and to decrease the size of the seat back frame 1 compared to the case where the lower frame installation portion 58 is disposed so that the upper end 58d of the forward bulged portion 58a is disposed at the lower side to be separated from the lateral fragile portion 17m.

The width (the length in the height direction) of the lateral fragile portion 17m is formed to be smaller than the width of the horizontal portion 17f constituting the inward fragile portion 17e in the short direction. Further, the lateral fragile portion 17m is formed so that the center (the center line) of the width (the length in the height direction) is located at the lower side of the center (the center line) of the horizontal portion 17f of the inward fragile portion 17e in the short direction (the up to down direction) and the width falls within the width of the horizontal portion 17f in the short direction. With such an arrangement, when the impact load generated by the rear end collision is applied, the hole portion 17k is first deformed to be crushed in the up to down direction, and the lateral fragile portion 17m moves downward while being deformed to be crushed in the up to down direction earlier than the horizontal portion 17f so that the impact energy may be efficiently transmitted to the horizontal portion 17f. In this way, since the horizontal portion 17f and the lateral fragile portion 17m are formed at the appropriate positions, the impact energy may be stably absorbed.

Furthermore, in this embodiment, the reinforcement portion is provided below the inward fragile portion 17e as the portion causing the deformation (the bending) of the seat back frame 1, but the reinforcement portion may be provided above the portion causing a deformation in consideration of the positional relation between the reinforcement portion and the portion causing the deformation. In this way, even when the reinforcement portion is disposed at a position not overlapping the portion causing the deformation in the front to back direction to be disposed thereabove, the position of the portion causing the deformation may be easily regulated in the same way.

Next, the operations of the forward bulged portion 58a and the movement member 30 upon a rear end collision will be described.

The forward bulged portion 58a of this embodiment is disposed at a position corresponding to the waist of the occupant when the occupant sits on the vehicle seat, and is formed to be bulged toward the waist of the occupant. For this reason, the forward bulged portion 58a serves as a waist entry prohibiting member that presses and stops the rearward movement of the waist of the occupant upon a rear end collision.

When the occupant receives the impact upon a rear end collision, the occupant abruptly moves rearward and the waist of the occupant contacts the forward bulged portion 58a so that the rearward movement thereof may be pressed and stopped. As a result, the entire upper body of the occupant is tilted (rotates) rearward, and the upper portion of the upper body further moves rearward to sink to the seatback S1. Then, a load generated by the rearward movement of the occupant is applied to the pressure receiving member 20, and a tension is applied in a direction in which the movement member 30 is moved (rotated) rearward through the wire 22 locked to the pressure receiving member 20 so that the movement member 30 moves rearward. Since the pressure receiving member 20 largely moves rearward by the movement of the movement member 30, the sunk amount of the occupant increases, and hence the impact load is absorbed.

Since the movement member 30 is provided in the side frame 15 above the installation positions of the hole portion 17k and the fragile portion (the inward fragile portion 17e and the lateral fragile portion 17m), it is possible to absorb the impact load generated by the deformation of the seat back frame 1 when the impact load is applied to the portion above the hole portion 17k and the fragile portion.

In this way, since the impact load may be absorbed by the operation of the movement member 30 and the impact load may be absorbed by the operations of the hole portion 17k and the fragile portion, the impact load may be further highly efficiently absorbed.

In the second embodiment, an example is illustrated in which the lower frame installation portion 58 as the reinforcement portion is provided at the front side of the fragile portion, but the arrangement of the reinforcement portion is not limited thereto. For example, the reinforcement portion may be disposed at the rear side of the fragile portion or at the front and rear sides thereof.

Figure 12:
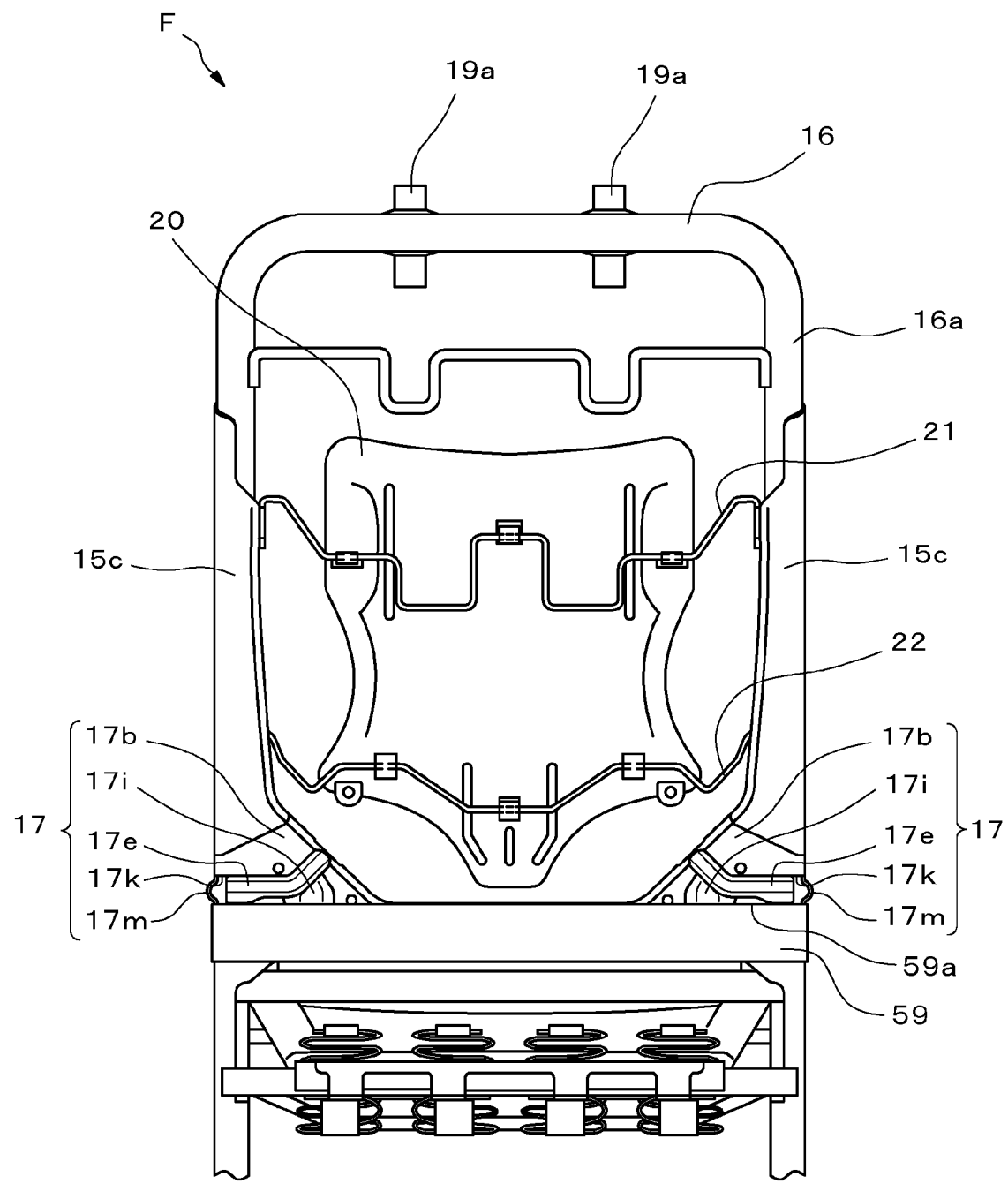
FIG. 12 is a rear view illustrating a seat frame according to the second embodiment of the present invention.

FIG. 12 is a rear view illustrating a seat frame showing another example of the reinforcement portion according to the second embodiment. As illustrated in FIG. 12, in this example, a plate-shaped reinforcement member 59 as a reinforcement portion is provided at the rear side of the lower frame (the lower frame base portion 17 and the lower frame installation portion 18 or 58). The reinforcement member 59 is provided below the inward fragile portion 17e at the position not overlapping the inward fragile portion 17e in the front to back direction, and an upper end 59a is disposed to follow the extension direction of the horizontal portion 17f, that is, the long direction (the seat width direction) of the lower frame installation portion 18 or 58.

In this way, when the reinforcement member 59 is provided at the rear side of the inward fragile portion 17e, it is possible to regulate the rearward deformation of the portion of the seat back frame 1 overlapping the reinforcement member 59 in the front to back direction when the impact load is applied to the seat back frame, and hence to suppress the deformation of the seat back frame 1 generated from the portion other than the fragile portion. Accordingly, it is possible to easily perform the positional regulation of the deformation portion of the seat back frame 1 and the deformation guide thereof.

As described above, according to the vehicle seat of the second embodiment, it is possible to stably deform the seat back frame at a specific position with respect to the complex input load generated upon a rear end collision. Also, it is possible to improve the rigidity of the portion other than the specific portion that is easily deformed and to easily perform the positional regulation of the deformation portion and the deformation guide. Accordingly, even when the complex input load is applied to the seat back frame upon a rear end collision, the impact energy may be efficiently and stably absorbed.

Configuration of Vehicle Seat of Third Embodiment

Next, a vehicle seat according to a third embodiment of the present invention will be described with reference to FIGS. 13 to 22. FIGS. 13 to 22 are involved with the third embodiment of the present invention. Further, FIGS. 19 to 22 are explanatory diagrams illustrating a lower frame base portion according to a modified example of the third embodiment. Furthermore, in the third embodiment, the same reference numerals will be given to the same components and arrangements as those of the first embodiment, and the detailed description thereof will not be repeated.

The vehicle seat S of the third embodiment includes the hole portion 17k, the inward fragile portion 17e, and the lateral fragile portion 17m which serve as the deformation portions deformed when the impact load is applied to the seat back frame, and further includes regulation portions (regulation portions 40 to be described later) that are disposed at positions sandwiching a part of the deformation portions and regulate the deformation amount of the deformation portions. In the description below, a configuration will be described in which the regulation portions 40 are provided to regulate the deformation amount of the inward fragile portion 17e and the inward fragile portion 17e in the lower frame base portion 17 constituting the lower frame.

Figure 13:
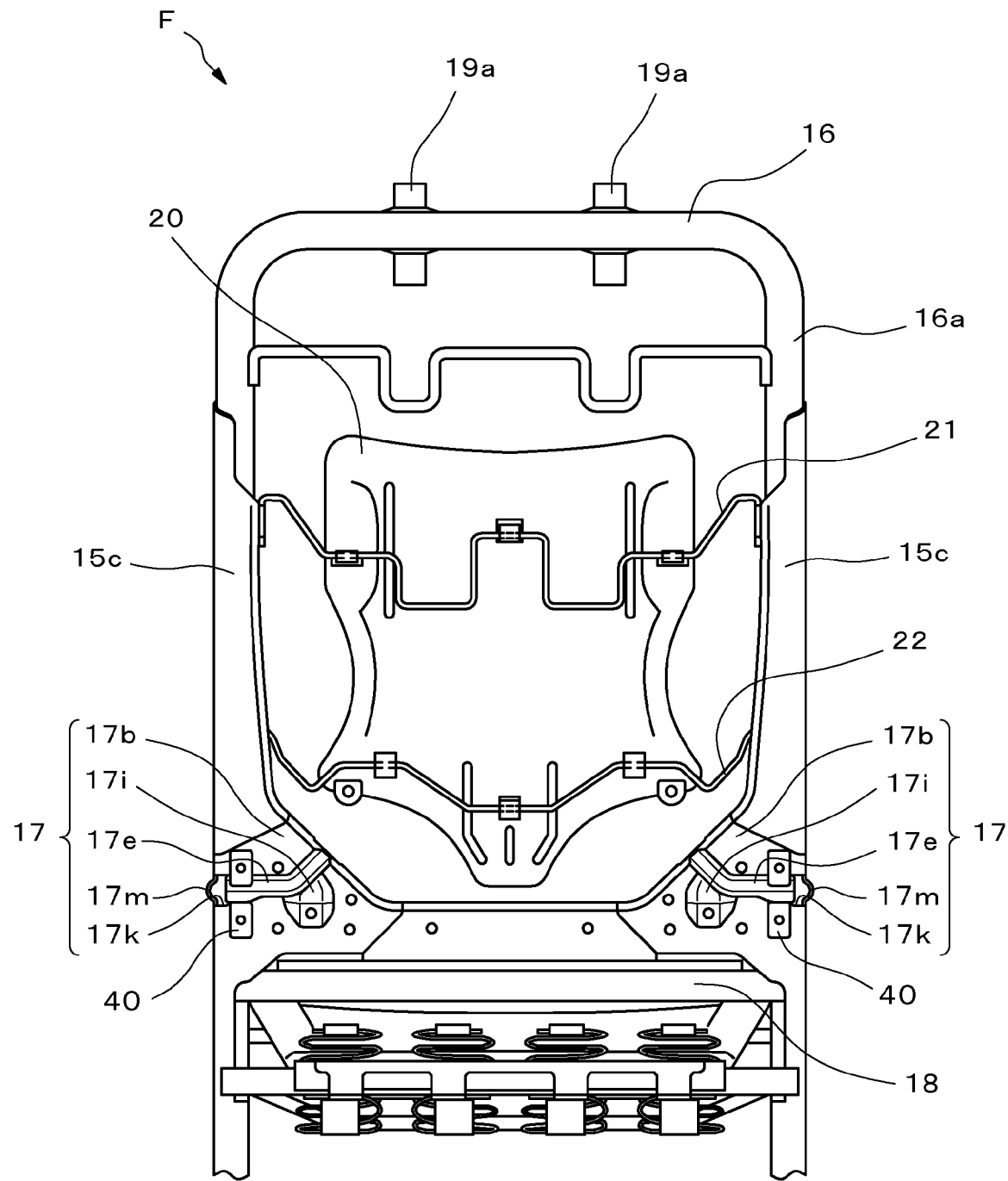
FIG. 13 is a rear view illustrating a seat frame according to a third embodiment of the present invention.
Figure 14:
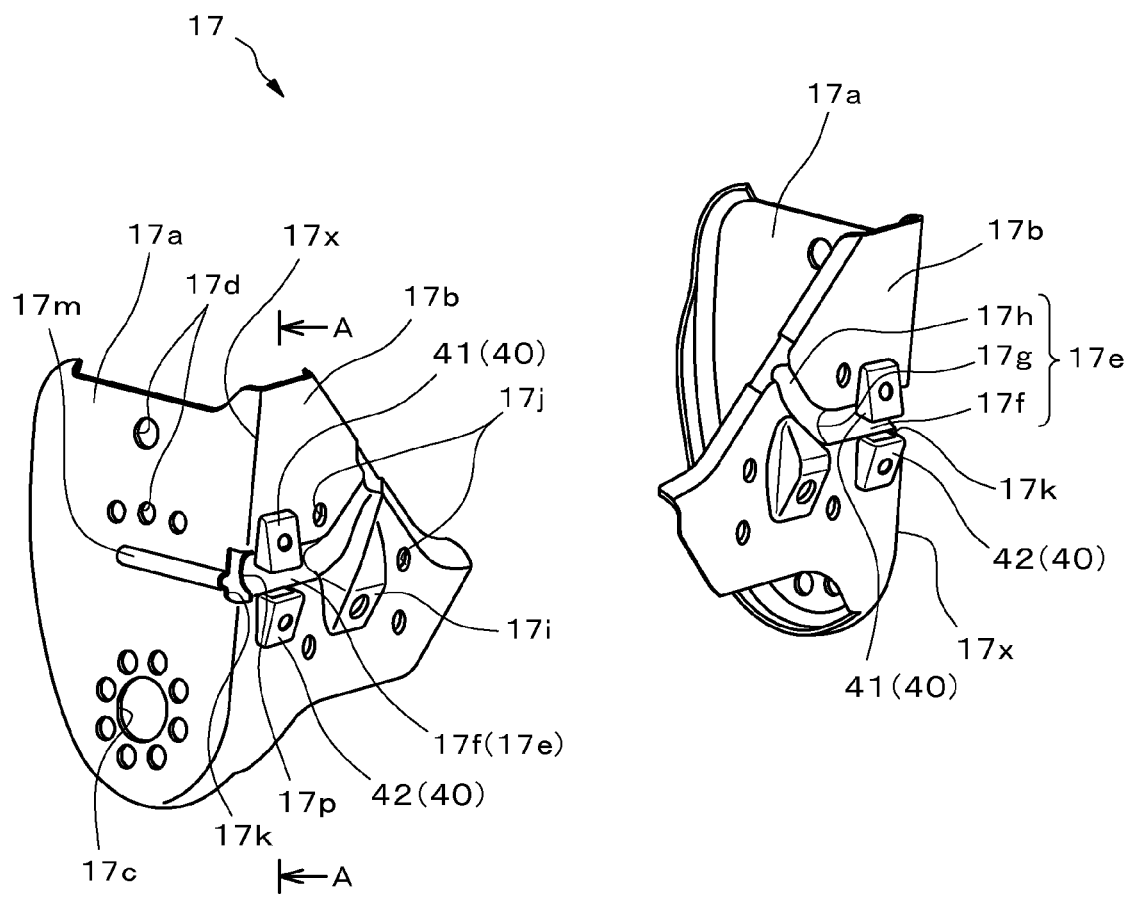
FIG. 14 is a schematic perspective view illustrating a lower frame base portion according to the third embodiment of the present invention.

As illustrated in FIGS. 13 and 14, the lower frame base portion 17 constituting the lower frame includes the hole portion 17k that is formed on the connection portion 17x connecting the lateral plate 17a to the intermediate plate 17b and the inward fragile portion 17e that is connected to the hole portion 17k and is formed on the intermediate plate 17b. Further, the lower frame base portion 17 is provided with the lateral fragile portion 17m that is connected to the hole portion 17k and is formed on the lateral plate 17a. Then, the rear surface of the intermediate plate 17b provided with the inward fragile portion 17e is provided with the regulation portions 40 (a first regulation portion 41 and a second regulation portion 42) facing each other with the inward fragile portion 17e interposed therebetween. The regulation portions 40 (the first regulation portion 41 and the second regulation portion 42) face each other with the inward fragile portion 17e interposed therebetween, and are attached onto the intermediate plate 17b by a method such as welding to be respectively provided at the upper and lower sides of the inward fragile portion 17e.

Figure 16:
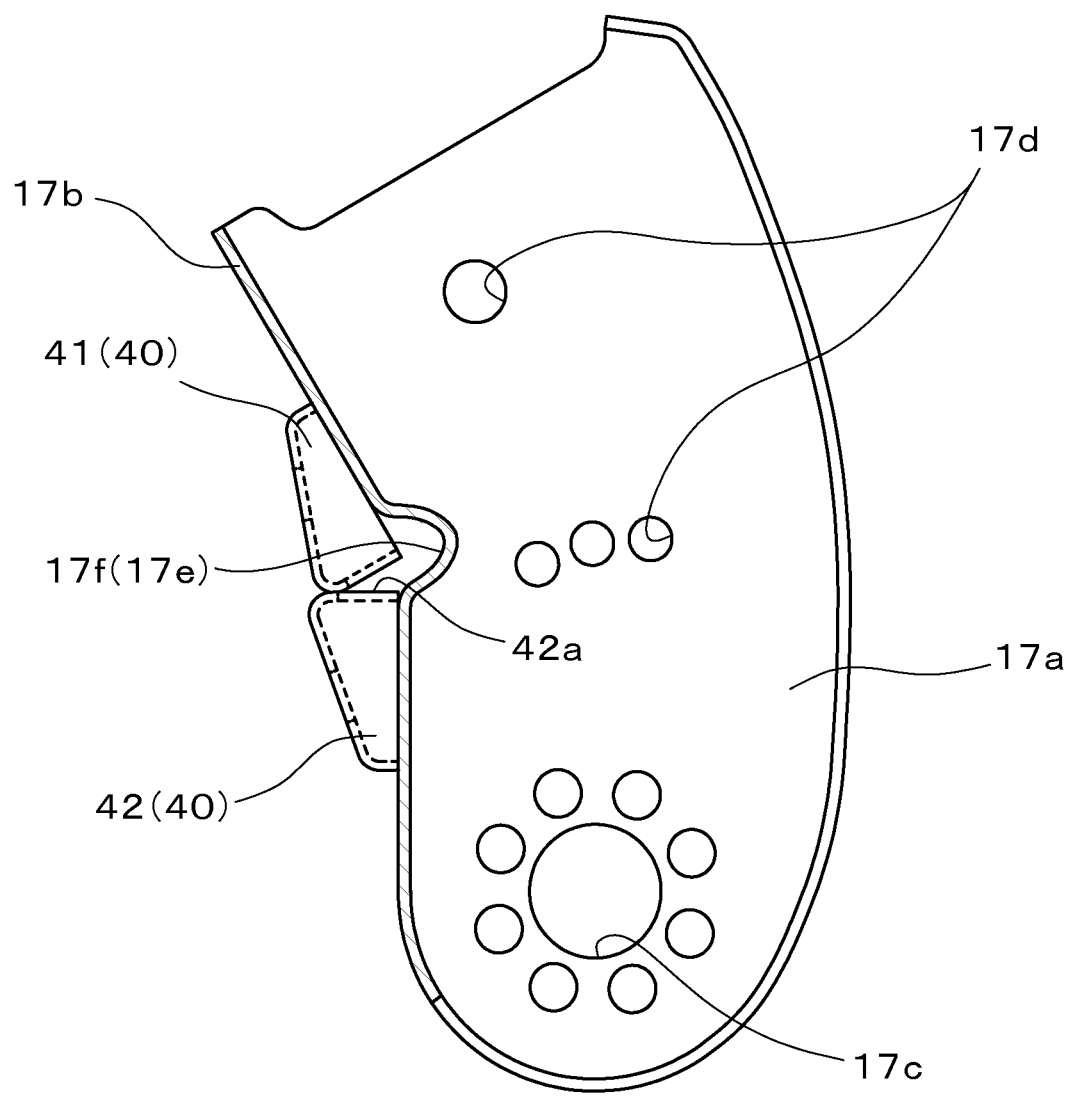
FIG. 16 is an explanatory cross-sectional view diagram illustrating a state of the lower frame base portion according to the third embodiment of the present invention shown in FIG. 15 after a rear end collision occurs.
Figure 17:
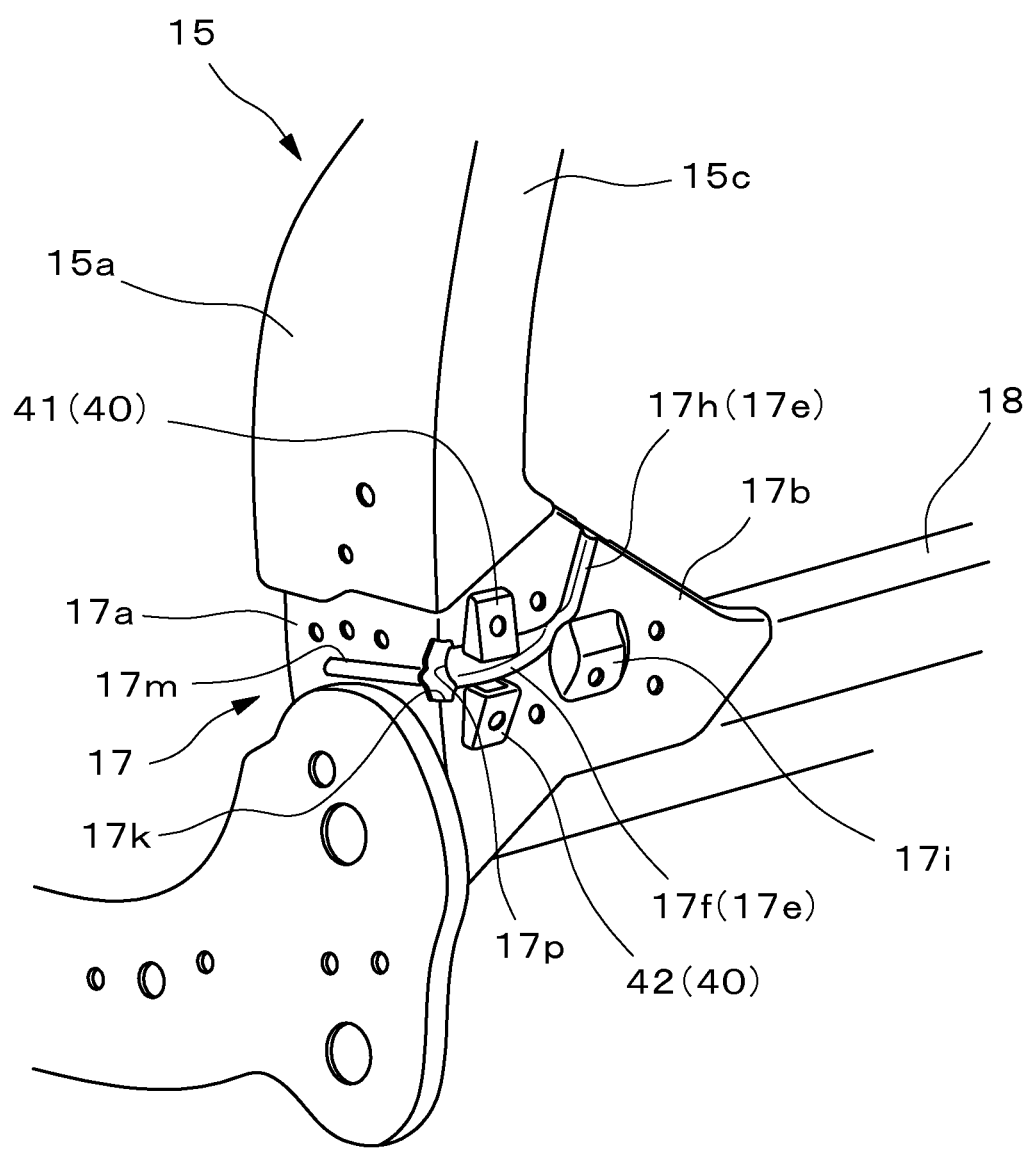
FIG. 17 is an explanatory perspective diagram illustrating a state of the lower frame according to the third embodiment of the present invention before a rear end collision occurs.

When the impact load generated upon a rear end collision or the like is applied to the seat back frame 1, the intermediate plate 17b is bent rearward so that the inward fragile portion 17e is crushed in the up to down direction. However, as illustrated in FIG. 16, the regulation portions 40 may be provided so that the crushed amount (that is, the rearward inclined angle of the intermediate plate 17b or the seat back frame 1) of the inward fragile portion 17e does not become larger than a predetermined value or more.

That is, the pair of regulation portions 40 facing each other with the inward fragile portion 17e interposed therebetween is disposed so that the regulation portions 40 (the first regulation portion 41 and the second regulation portion 42) contact each other and the second regulation portion 42 provided at the lower side presses and stops the first regulation portion 41 provided at the upper side when the bent amount of the inward fragile portion 17e provided in the intermediate plate 17b increases.

Figure 15:
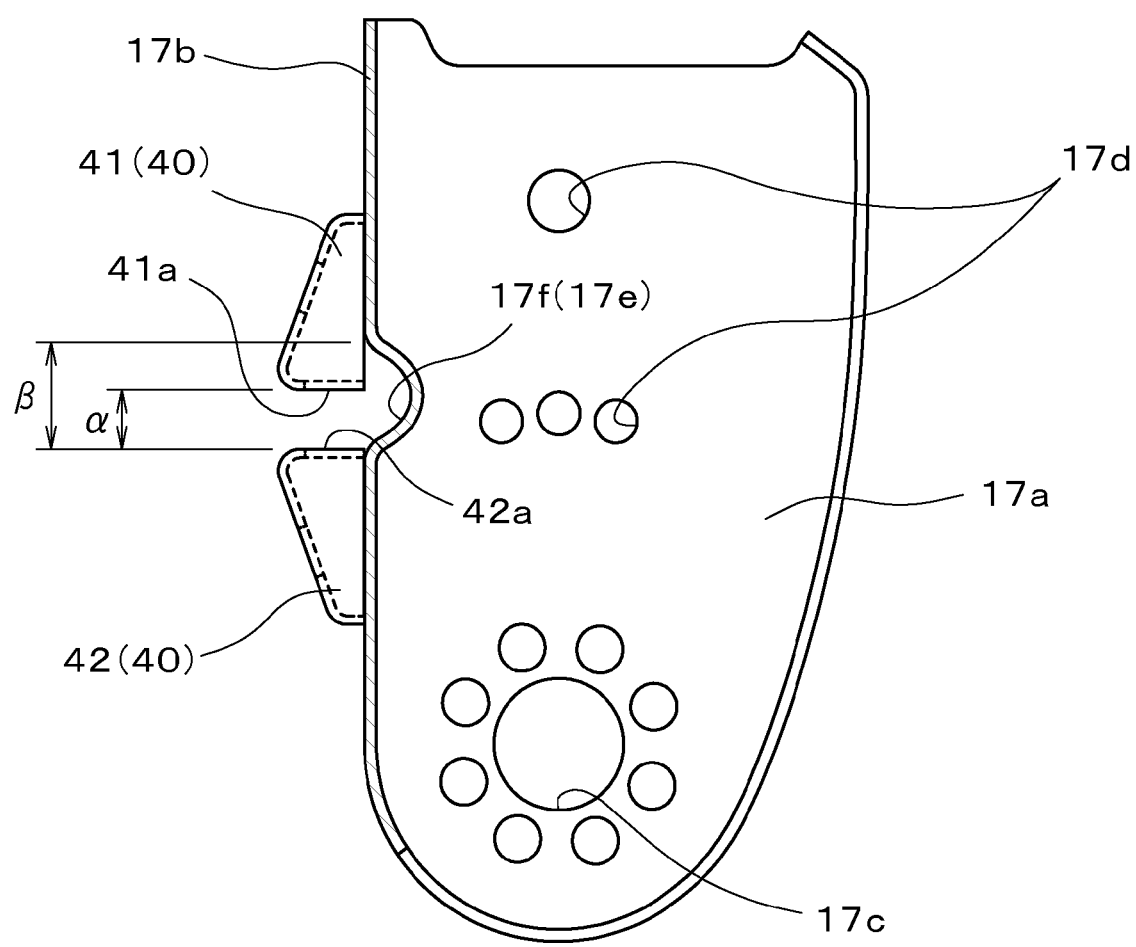
FIG. 15 is a cross-sectional view taken along the line A-A of FIG. 14.

The regulation portions 40 include the first regulation portion 41 and the second regulation portion 42 that respectively include regulation surfaces 41a and 42a disposed at positions facing each other with the inward fragile portion 17e interposed therebetween. That is, the first regulation portion 41 and the second regulation portion 42 are respectively provided with the regulation surfaces 41a and 42a that contact the regulation portions 40 (the first regulation portion 41 and the second regulation portion 42) respectively disposed to face each other to regulate a predetermined amount or more of bending when the inward fragile portion 17e is bent. Accordingly, for example, as illustrated in FIG. 15, each of the first regulation portion 41 and the second regulation portion 42 may be formed as a member that has a substantially trapezoid cross-sectional shape. Since the regulation portions 40 (the first regulation portion 41 and the second regulation portion 42) may easily contact each other when the inward fragile portion 17e is bent as the areas of the regulation surfaces 41a and 42a increase, the deformation amount (the rearward inclined amount) of the seat back frame 1 may be regulated.

In this way, the regulation portions 40 that include the first regulation portion 41 and the second regulation portion 42 disposed to face each other in the up to down direction respectively include the regulation surfaces 41a and 42a as two facing portions formed at positions sandwiching the inward fragile portion 17e. Then, the distance between these two regulation surfaces 41a and 42a is smaller than the width of the inward fragile portion 17e in the height direction, that is, the width sandwiched by the first regulation portion 41 and the second regulation portion 42.

Specifically, the lower end (that is, the regulation surface 41a) of the first regulation portion 41 provided at the upper side is disposed below the upper end of the inward fragile portion 17e (more specifically, the horizontal portion 170. The upper end (that is, the regulation surface 42a) of each regulation portion 40 provided at the lower side is disposed at a height substantially equal to or higher than the lower end of the inward fragile portion 17e (more specifically, the horizontal portion 170. Furthermore, FIG. 15 illustrates a state where the regulation surface 42a of the regulation portion 40 provided at the lower side is substantially disposed at the same height as that of the lower end of the inward fragile portion 17e.

That is, the distance between the pair of regulation portions 40 (the first regulation portion 41 and the second regulation portion 42) facing each other is smaller than the width in a direction in which the pair of regulation portions 40 of the inward fragile portion 17e is provided in parallel. In other words, in FIG. 15, the distance α between the facing regulation surfaces 41a and 42a and the width β of the inward fragile portion 17e in the up to down direction are set to satisfy the equation of α<β.

With such a configuration, when the inward fragile portion 17e is bent in the up to down direction, the regulation portions 40 (the first regulation portion 41 and the second regulation portion 42) disposed in the up to down direction of the inward fragile portion 17e easily contact each other as illustrated in FIG. 16, and hence the deformation of the inward fragile portion 17e may be pressed and stopped at a predetermined position.

In the third embodiment, an example is illustrated in which the planar regulation surfaces 41a and 42a are formed in the first regulation portion 41 and the second regulation portion 42, but the regulation surface 41a (or the regulation surface 42a) may be formed in a planar shape in at least one of them. That is, the regulation surface 41a (or the regulation surface 42a) provided in at least one of the first regulation portion 41 and the second regulation portion 42 may be formed in a planar shape.

In this way, since at least one regulation surface 41a (or the regulation surface 42a) of the first regulation portion 41 and the second regulation portion 42 is formed in a planar shape, the regulation portions 40 (the first regulation portion 41 and the second regulation portion 42) easily contact each other when the inward fragile portion 17e are bent. As a result, the bent amount of the inward fragile portion 17e is restricted so that the deformation amount of the seat back frame 1 does not become larger than the specific value. Furthermore, as the areas of the regulation surfaces 41a and 42a increase, the regulation portions 40 may easily contact each other when the inward fragile portion 17e is bent, and hence the deformation amount (the rearward inclined amount) of the seat back frame 1 may be appropriately regulated.

Further, as illustrated in FIG. 16, when the impact load is applied to the regulation portions 40 that include the planar regulation surfaces 41a and 42a, the inward fragile portion 17e is deformed. Then, when the first regulation portion 41 contacts the second regulation portion 42, the first regulation portion 41 contacts the planar regulation surface 42a. That is, the regulation surface 42a of the second regulation portion 42 contacting the first regulation portion 41 when the inward fragile portion 17e is deformed extends toward the rear side (the opposite side to the inward fragile portion 17e) of the rear edge of the rear side (that is, the opposite side to the inward fragile portion 17e) of at least the first regulation portion 41. With such a configuration, since the first regulation portion 41 strongly contacts the planar regulation surface 42a, it is possible to suppress the first regulation portion 41 from sliding off from the second regulation portion 42 and hence further stably press and stop the deformation of the inward fragile portion 17e.

In order to realize the above-described configuration, for example, the rear edge (the opposite side to the inward fragile portion 17e) of the regulation surface 42a of the second regulation portion 42 may be located at the rear side (the opposite side to the inward fragile portion 17e) of the rear edge (the opposite side to the inward fragile portion 17e) of the regulation surface 41a of the first regulation portion 41 in a state (a normal state) before the impact energy is applied to the seat back frame.

Furthermore, as illustrated in FIGS. 15 and 16, it is desirable to form each regulation portion 40 in a hollow shape in that the vehicle seat S may be decreased in weight. However, the regulation portion may be formed in a solid shape in order to sufficiently ensure the strength of the regulation portion 40. Further, in order to decrease the weight, each of the regulation surfaces 41a and 42a may be provided with a hole as illustrated in FIG. 14.

Further, an example is illustrated in which the regulation portion 40 is provided only in the vicinity of the inward fragile portion 17e, but may be provided in the vicinity of the hole portion 17k or the lateral fragile portion 17m. At this time, at least one of the hole portion 17k and the like may be disposed at a position sandwiched between the regulation portions 40.

The lower frame installation portion 18 is bonded to the lateral plate 17a or the intermediate plate 17b of the pair of lower frame base portions 17. It is desirable to bond the lower frame installation portion 18 to both the lateral plate 17a and the intermediate plate 17b in that the attachment rigidity is improved. Further, when the lateral end of the lower frame installation portion 18 is formed to contact the lateral plate 17a, the rigidity with respect to the lateral load is improved. Furthermore, in this embodiment, the lower frame installation portion 18 is disposed at the front side of the intermediate plate 17b, but may be disposed at the rear side of the intermediate plate 17b.

Figure 18:
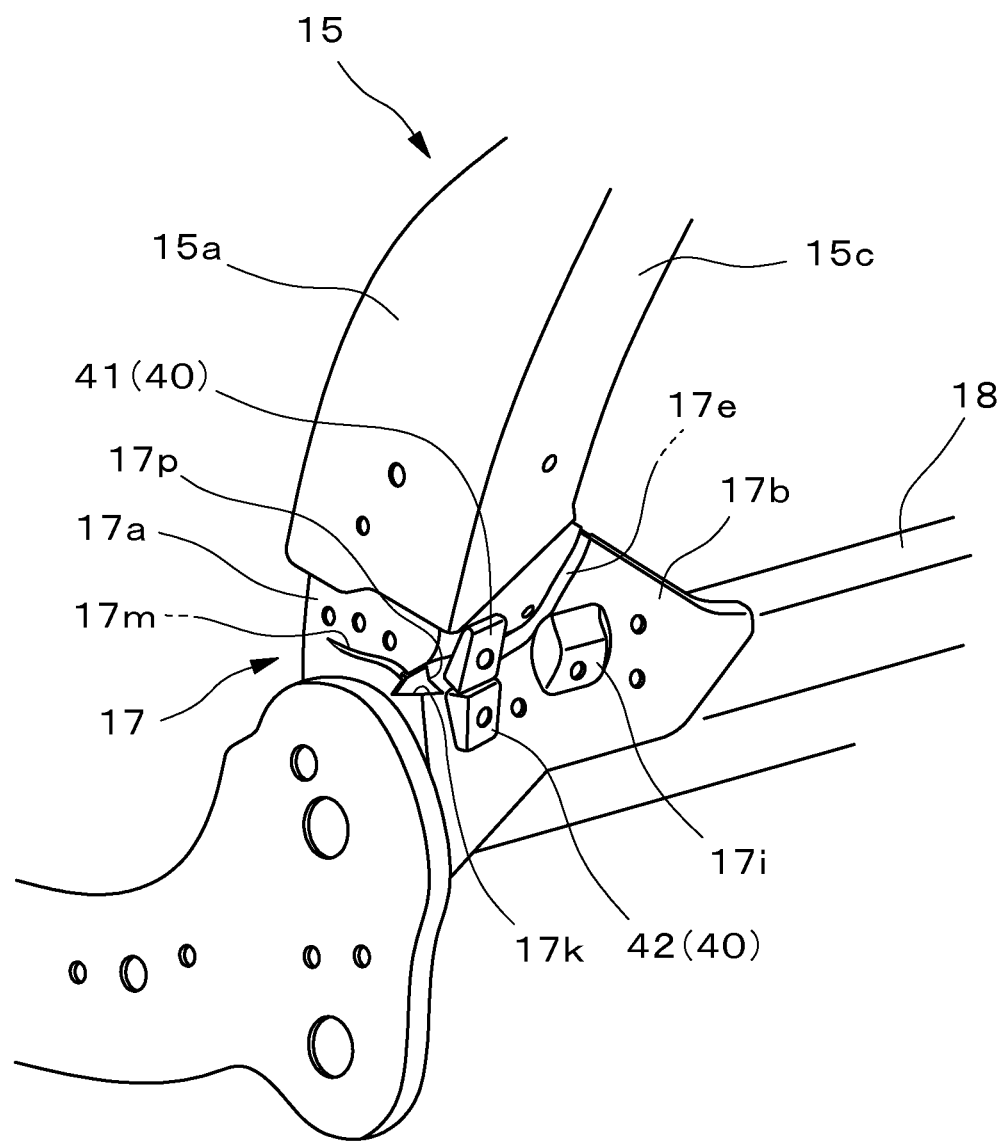
FIG. 18 is an explanatory perspective diagram illustrating the lower frame according to the third embodiment of the present invention after a rear end collision occurs.

As described above, in the third embodiment, when the inward fragile portion 17e is bent, it is possible to regulate the bent amount of the inward fragile portion 17e so that the bent amount does not increase too much by the regulation portions 40 provided in the intermediate plate 17b. That is, when the impact load generated upon a rear end collision is applied to the seat back frame in the state illustrated in FIG. 17, the side frame 15 (further, the seat back frame 1) is inclined rearward so that the inward fragile portion 17e is bent to be crushed in the up to down direction. Here, as illustrated in FIG. 18, when the inward fragile portion 17e is bent to a predetermined range, the pair of regulation portions 40 contacts each other so that the bent amount of the inward fragile portion 17e is regulated. Accordingly, since the regulation portions 40 are provided, the rearward inclined amount may be set to an appropriate size without increasing the rearward inclined amount of the seat back frame 1 too much.

Figure 19:
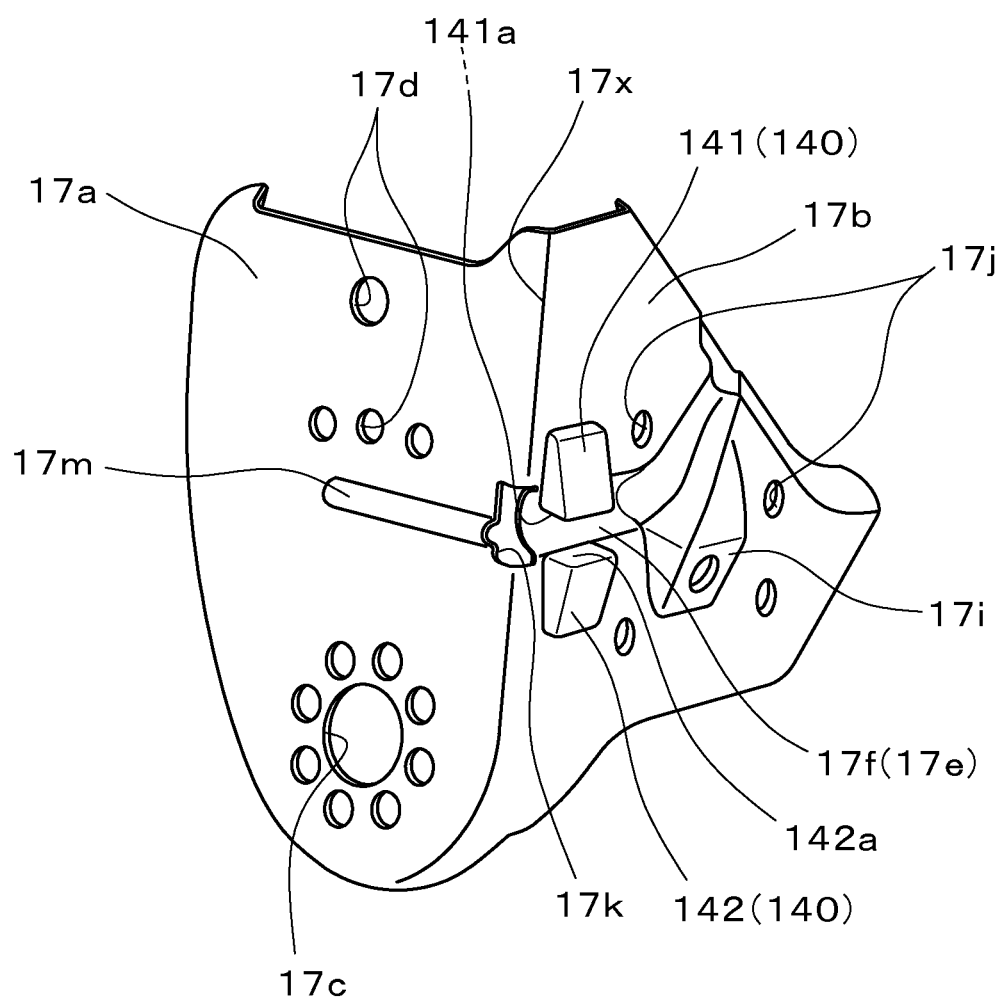
FIG. 19 is an explanatory perspective diagram illustrating a lower frame base portion according to a modified example of the third embodiment.

Further, the configuration of the regulation portions 40 is not limited to the above-described embodiment, but may be modified to different configurations. For example, in the above-described embodiment, the regulation portions 40 that are formed separately from the lower frame base portion 17 have been described. However, as illustrated in FIG. 19, regulation portions 140 integrally formed with the lower frame base portion 17 may be employed. As in the regulation portions 40, the regulation portions 140 illustrated in FIG. 19 are formed by a first regulation portion 141 and a second regulation portion 142 that respective include facing portions, that is, regulation surfaces 141a and 142a.

In this way, since the regulation portions 140 are integrally formed with the lower frame base portion 17, the number of components may be decreased. Further, since welding or the like does not need to be performed, the working process time may be shortened. Furthermore, since the operation and the effect of the regulation portions 140 are the same as those of the regulation portions 40, the description thereof will not be repeated.

Figure 20:
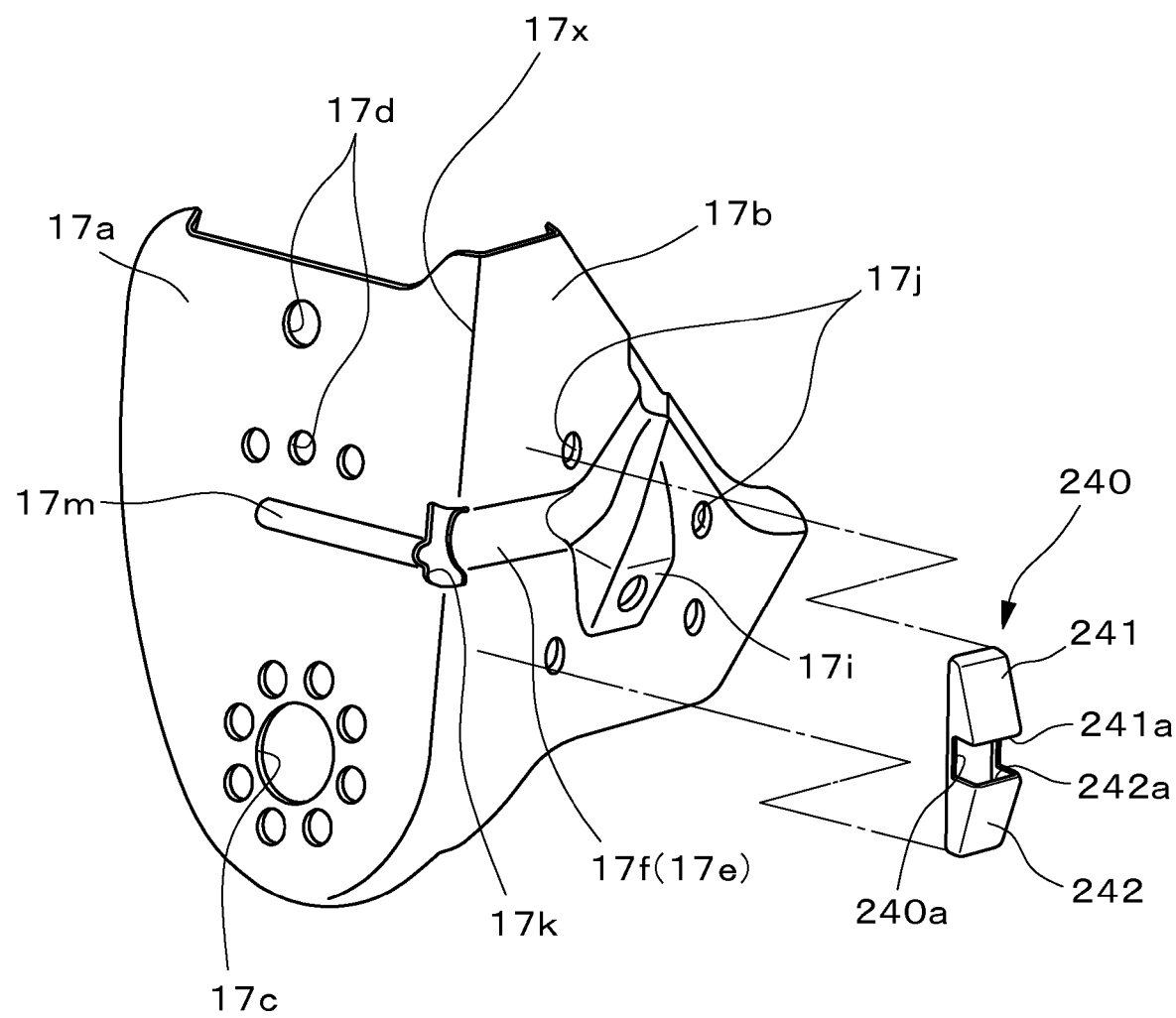
FIG. 20 is an explanatory perspective diagram illustrating a lower frame base portion according to a modified example of the third embodiment.

Further, in the above-described embodiment, the first regulation portion 41 and the second regulation portion 42 are separated from each other, but as illustrated in FIG. 20, a first regulation portion 241 and a second regulation portion 242 may be integrally formed with each other. In a regulation portion 240 illustrated in FIG. 20, the first regulation portion 241 and the second regulation portion 242 are formed to be continuous in the up to down direction, and an opening portion 240a such as a concave portion or a hole substantially having the same shape as that of the horizontal portion 17f is formed at a position corresponding to (overlapping) the horizontal portion 17f of the inward fragile portion 17e. Accordingly, since the regulation portion 240 is provided with the opening portion 240a, the deformation of the inward fragile portion 17e is not disturbed by the regulation portion 240 when the impact load is applied to the seat back frame 1.

Further, since the first regulation portion 241 and the second regulation portion 242 arranged in parallel in the up to down direction are integrally formed with each other, the dimension of the opening portion 240a, that is, the distance between the regulation surfaces 241a and 242a may be set with high precision. Further, since the number of the fastening (bonding) positions may be decreased when attaching the regulation portion 240 to the intermediate plate 17b of the lower frame base portion 17, the cost involved with the manufacturing process may be reduced.

Figure 21:
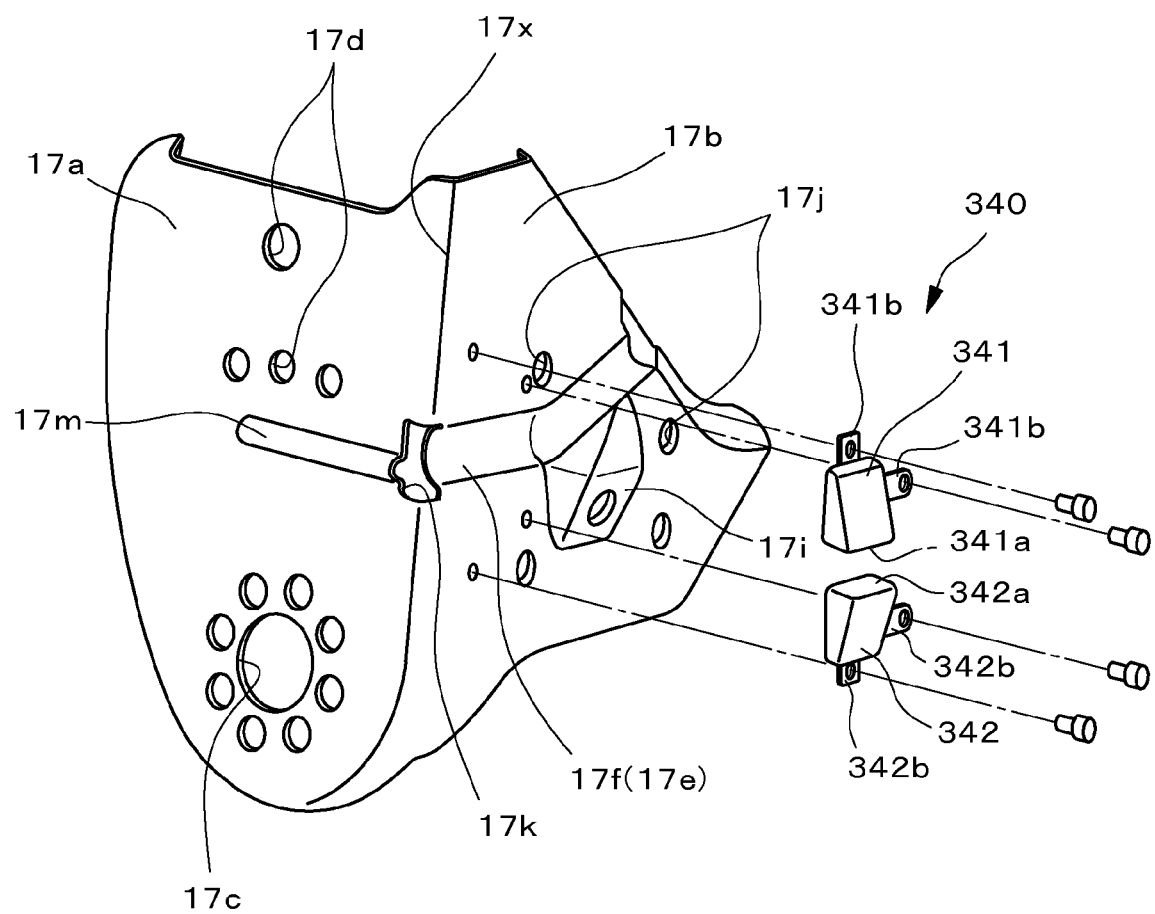
FIG. 21 is an explanatory perspective diagram illustrating a lower frame base portion according to a modified example of the third embodiment.

Further, as in regulation portions 340 illustrated in FIG. 21, fastening portions 341b and 342b may be formed in a first regulation portion 341 and a second regulation portion 342 so that the respective fastening members are inserted therethrough. In such a configuration, the fastening portions 341b and 342b are formed to extend from the portion without the regulation surfaces 341a and 342a toward the inside and the upside of the seat, and are formed in a planar shape to follow the intermediate plate 17b of the lower frame base portion 17. Then, the fastening portions 341b and 342b are provided with holes through which the fastening members are inserted. When the hole is formed as an elongated hole, the positioning operation may be easily performed when attaching the first regulation portion 341 and the second regulation portion 342. In this way, since the first regulation portion 341 and the second regulation portion 342 are respectively provided with the fastening portions 341b and 342b, the regulation portions 340 may be easily attached by using a fastening member such as a bolt and a nut when attaching the regulation portions to the intermediate plate 17b of the lower frame base portion 17.

Further, since the fastening members are inserted through the fastening portions 341b and 342b by a fastening method to attach the regulation portions 340 to the lower frame base portion 17 instead of attaching the regulation portions 340 using a method such as welding, the regulation portions 340 may be arbitrarily detached in accordance with the design of the vehicle seat S. Further, since the fastening portions 341b and 342b are respectively formed in the first regulation portion 341 and the second regulation portion 342, the rigidity of each of the first regulation portion 341 and the second regulation portion 342 may be improved. Furthermore, the configuration in which the fastening portion is formed in the regulation portion will be described again in the later section (specifically, the section of the vehicle seat of the ninth embodiment).

Figure 22:
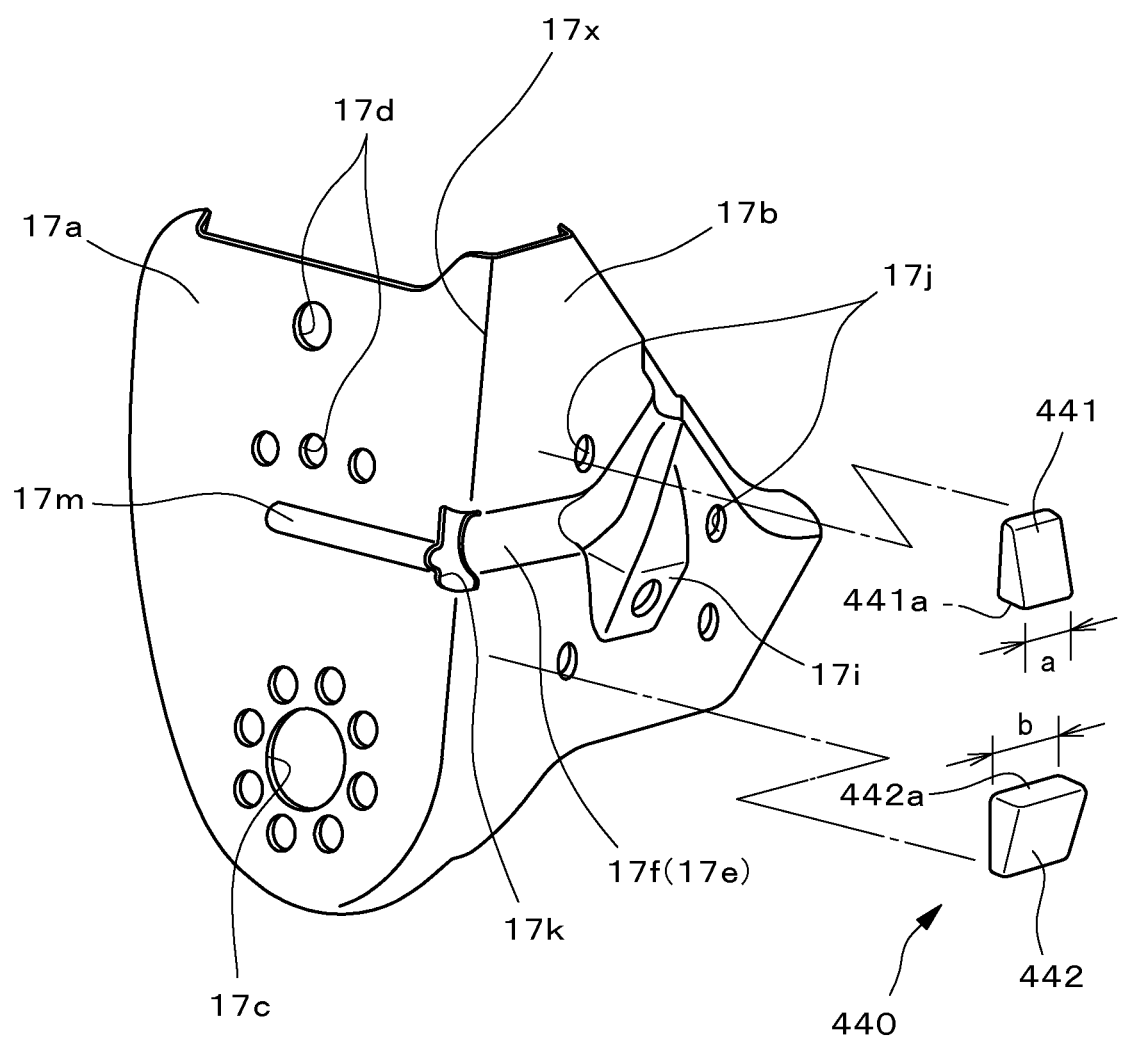
FIG. 22 is an explanatory perspective diagram illustrating a lower frame base portion according to a modified example of the third embodiment.

Further, in the above-described respective embodiments, a configuration is illustrated in which the widths of the first regulation portion and the second regulation portion provided at the upper and lower sides in the right and left direction are equal to each other, but as illustrated in FIG. 22, the width of the regulation surface at one side (particularly, the regulation portion disposed at the lower side) in the right and left direction may be larger than the other width. In regulation portions 440 illustrated in FIG. 22, the width (the length indicated by "a" in FIG. 22) of a regulation surface 441a of a first regulation portion 441 in the right and left direction is set to be different from the width (the length indicated by "b" in FIG. 22) of a regulation surface 442a of a second regulation portion 442 in the right and left direction. Specifically, the width of the regulation surface 442a of the second regulation portion 442 disposed at the lower side is large. That is, a relation of a<b is established.

In this way, since the width of one of the first regulation portion 441 and the second regulation portion 442 constituting the regulation portions 440 is set to be larger than that of the other, even when the impact load is applied to the seat back frame, for example, the seat back frame 1 is twisted, the first regulation portion 441 and the second regulation portion 442 may easily contact each other. That is, since the width of one regulation portion is set to be large, even when the seat back frame 1 is twisted to be tilted rearward due to the complex input load, the first regulation portion 441 and the second regulation portion 442 contact each other, and hence the deformation amount, that is, the rearward inclined amount of the seat back frame 1 may be controlled.

Further, there is no need to precisely set the attachment position of the regulation portion due to the large width of one regulation portion when attaching the regulation portions 440 to the intermediate plate 17b of the lower frame 17 by welding or the like. For example, even when the attachment position of the second regulation portion 442 is slightly deviated with respect to the first regulation portion 441 in the right and left direction, the first regulation portion 441 may contact the second regulation portion 442 when the seat back frame 1 is inclined rearward due to the large width of the second regulation portion 442. As a result, since there is no need to precisely define the accurate position for the operation of attaching the regulation portions 440, the workability is improved.

Incidentally, the regulation portions 40, 140, 240, 340, and 440 of the above-described respective embodiments have a function of regulating the deformation transmission direction in addition to the function of regulating the deformation portion like the hole portion 17k and the like, that is, the deformation amount of the inward fragile portion 17e. That is, the regulation portions 40, 140, 240, 340, and 440 also serve as the direction regulation portions that regulate the deformation transmission direction of the hole portion 17k so that the deformation transmission direction is not deviated from the direction from the hole portion 17k toward the inward fragile portion 17e.

The functions of the direction regulation portions of the regulation portions 40, 140, 240, 330, and 440 will be described with reference to FIGS. 23 to 26. Furthermore, in the description below, the regulation portion 40 illustrated in FIGS. 13 to 18 among the regulation portions 40, 140, 240, 340, and 440 will be exemplified, but the operation and the effect described below are, of course, obtained in the regulation portions 140, 240, 340, and 440 illustrated in FIGS. 19 to 22.

The regulation portions 40 are provided in the rear surface of the intermediate plate 17b provided with the inward fragile portion 17e, and include the first regulation portion 41 as the first facing portion and the second regulation portion 42 as the second facing portion. The first regulation portion 41 and the second regulation portion 42 face each other with the inward fragile portion 17e interposed therebetween. That is, the first regulation portion 41 and the second regulation portion 42 are respectively attached onto the intermediate plate 17b with the inward fragile portion 17e interposed therebetween, and are respectively located at the upper and lower sides of the inward fragile portion 17e.

That is, the first regulation portion 41 and the second regulation portion 42 are located at positions where the center line of the inward fragile portion 17e is interposed therebetween. Here, the center line of the inward fragile portion 17e is an imaginary line (the line C in FIG. 24) that passes through the center in the width direction (the up to down direction) when the inward fragile portion 17e is viewed from the front side (that is, when viewed from the direction illustrated in FIG. 24).

As for the structure of the seat back frame 1, when the impact load generated upon a rear end collision or the like is applied to the seat back frame, the hole portion 17k as the deformation portion is first deformed as a starting point. Then, when the deformation is transmitted to the inward fragile portion 17e as other deformation portions, the inward fragile portion 17e is deformed to be bent. With such a structure, the seat back frame 1 is deformed to be inclined rearward when the impact load is applied to the seat back frame, and hence the impact energy may be absorbed by the deformation.

Here, in order to smoothly deform the seat back frame 1 at the time point in which the impact load is applied to the seat back frame and to promptly absorb the impact energy, the deformation needs to be transmitted from the hole portion 17k that becomes a starting point when the seat back frame 1 is deformed to the inward fragile portion 17e. For this reason, the hole portion 17k and the inward fragile portion 17e are formed to be lined up on a predetermined portion (specifically, the intermediate plate 17b) of the seat back frame 1. Particularly, in this embodiment, the hole portion and the inward fragile portion are formed to be adjacent to each other. With such a configuration, since the deformation of the hole portion 17k is easily transmitted to the inward fragile portion 17e compared to the configuration in which the hole portion 17k is separated from the inward fragile portion 17e, the impact energy may be more smoothly absorbed.

Figure 23:
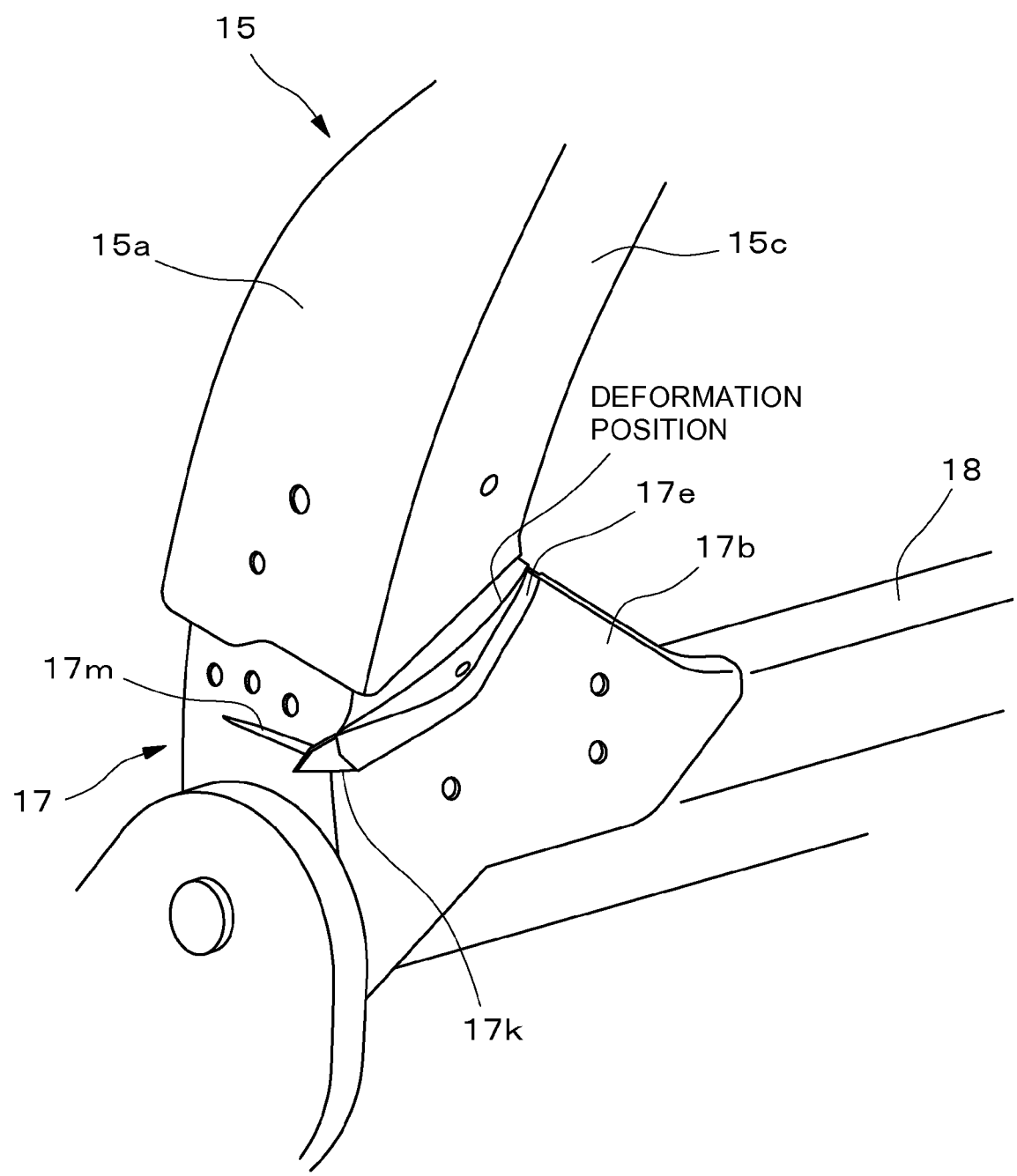
FIG. 23 is a perspective diagram illustrating a state where a deformation of a deformation portion is not appropriately transmitted.

However, since the complex input load is added to the seat back frame 1 upon a rear end collision or the like, as illustrated in FIG. 23, there is a concern that the deformation of the hole portion 17k is not transmitted to the inward fragile portion 17e and the portion other than the inward fragile portion 17e is deformed. In this way, when the portion other than the inward fragile portion 17e is deformed, it is not possible to obtain the effect in which the impact energy may not be efficiently absorbed by the configuration in which the inward fragile portion 17e is provided, that is, the deformation position of the seat back frame 1 is confined.

Therefore, the regulation portions 40 are used for the function of the direction regulation portion that regulates the deformation transmission direction of the hole portion 17k so that the deformation of the hole portion 17k is transmitted to the inward fragile portion 17e. That is, in this embodiment, the regulation portions 40 (more specifically, the first regulation portion 41 and the second regulation portion 42) as the members that regulate the deformation amount of the seat back frame 1 serve as the direction regulation portions that regulate the deformation transmission direction of the hole portion 17k. That is, since the regulation portions 40 exhibit a function of regulating the deformation transmission direction of the hole portion 17k, the entire seat back frame 1 is smoothly deformed (inclined rearward) so that the impact energy may be smoothly absorbed. Further, since there is no need to separately provide the member that regulates the deformation amount of the seat back frame 1 and the member that regulates the deformation transmission direction of the hole portion 17k, the number of components of the vehicle seat S may be reduced.

The function as the direction regulation portions in the regulation portions 40 is effectively exhibited by the attachment positions of the regulation portions 40 in the seat back frame 1. More specifically, the first regulation portion 41 and the second regulation portion 42 are attached to a position deviated from the horizontal line connecting the hole portion 17k to the inward fragile portion 17e in the seat back frame 1 (see FIG. 24). Here, the horizontal line connecting the hole portion 17k to the inward fragile portion 17e is an imaginary line that passes through both the hole portion 17k and the inward fragile portion 17e when the inward fragile portion 17e is viewed from the front side (that is, when viewed from the direction illustrated in FIG. 24), and the first regulation portion 41 and the second regulation portion 42 are respectively attached to the positions that are not present on the imaginary line, and particularly, the peripheral positions of the hole portion 17k.

Here, in the seat back frame 1, the rigidity of the attachment portions of the regulation portions 40 (specifically, the first regulation portion 41 and the second regulation portion 42) is higher than the rigidity of the hole portion 17k or the inward fragile portion 17e. In other words, the rigidity of the hole portion 17k or the inward fragile portion 17e is relatively low, and hence the hole portion or the inward fragile portion is easily deformed when the impact load is applied thereto. That is, the direction regulation portions according to this embodiment improve the rigidity of the portion that is not present on the imaginary line connecting the hole portion 17k to the inward fragile portion 17e, and particularly, the peripheral portion of the hole portion 17k so that the portion is not easily deformed, and cause the hole portion 17k and the inward fragile portion 17e to be easily deformed. Accordingly, the deformation is easily transmitted from the hole portion 17k to the inward fragile portion 17e. As a result, the deformation transmission direction of the hole portion 17k is regulated so that the deformation transmission direction is not deviated from the direction from the hole portion 17k toward the inward fragile portion 17e.

It is particularly desirable that the attachment positions of the first regulation portion 41 and the second regulation portion 42 are positions (precisely, the positions sandwiching the center line of the inward fragile portion 17e) sandwiching the inward fragile portion 17e in the seat back frame 1. That is, when the first regulation portion 41 is located at the upper side of the inward fragile portion 17e and the second regulation portion 42 is located at the lower side thereof, the deformation transmission direction from the hole portion 17k at both upper and lower sides of the inward fragile portion 17e is regulated so that the deformation transmission direction is not deviated from the specific direction (the direction from the hole portion 17k toward the inward fragile portion 17e). As a result, the impact energy may be more smoothly absorbed.

Figure 24:
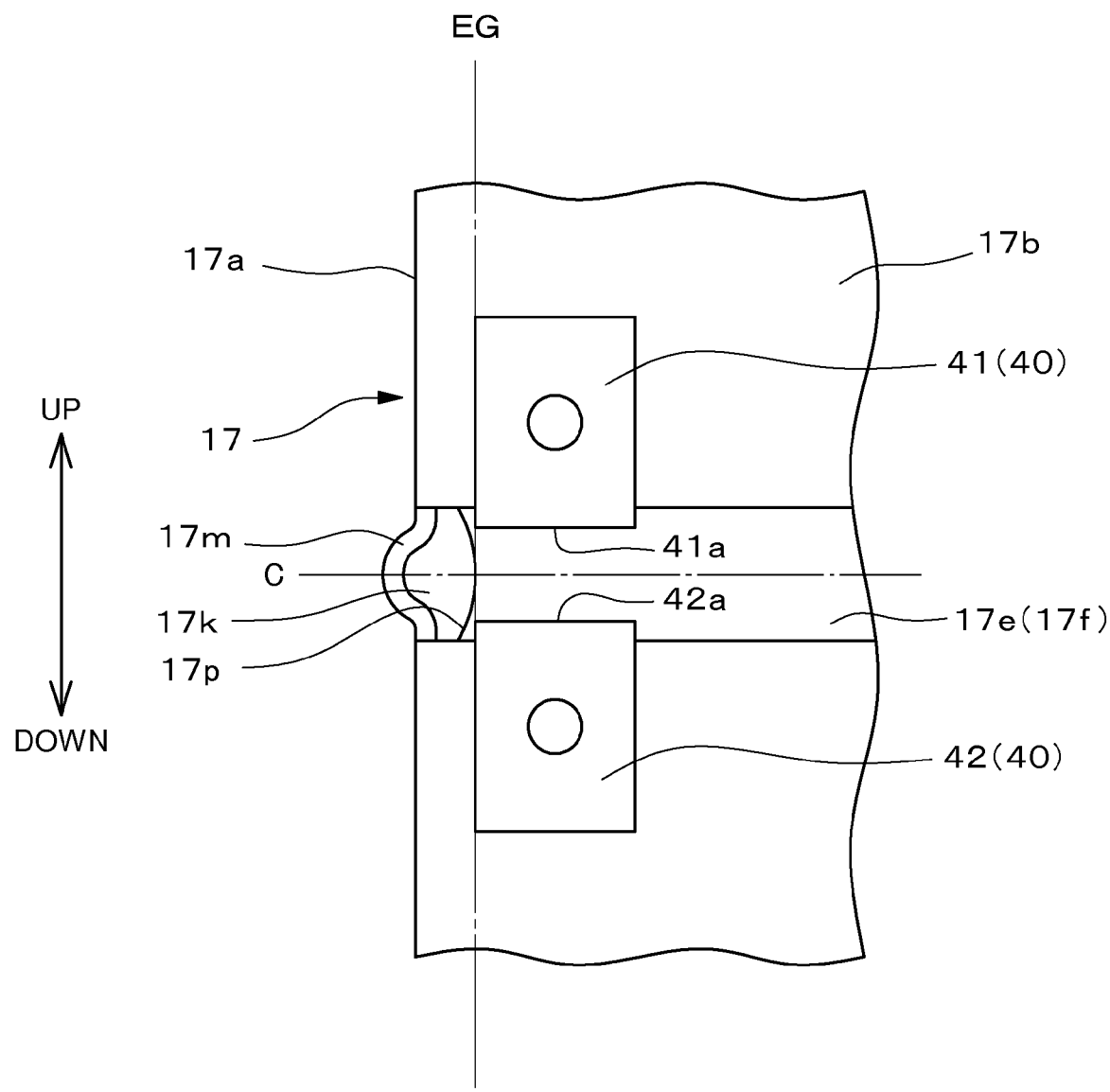
FIG. 24 is an explanatory rear view diagram illustrating attachment positions of regulation portions.

The attachment positions of the regulation portions 40 will be described further. When the first regulation portion 41 and the second regulation portion 42 are attached to the portions near the boundary portion 17p located between the hole portion 17k and the inward fragile portion 17e in the seat back frame 1, it is possible to further effectively exhibit the effect in which the deformation of the hole portion 17k is reliably transmitted to the inward fragile portion 17e. Here, the regulation portions located near the boundary portion 17p indicate a state where the regulation portions are disposed in parallel to the boundary portion 17p in the right and left direction and are disposed in parallel with the boundary portion 17p interposed therebetween in the up to down direction (including a state where a part of the portion reaches the boundary portion 17p as illustrated in FIG. 24).

In this way, since the regulation portions 40 are located near the boundary portion 17p, the function as the direction regulation portion is effectively exhibited, and hence the impact energy may be smoothly absorbed. That is, since there is a tendency that the deformation transmission direction from the hole portion 17k is easily deviated from the specific direction in the portion located near the boundary portion 17p located between the hole portion 17k and the inward fragile portion 17e in the seat back frame 1, when the regulation portions 40 are provided at the portion located near the boundary portion 17p, the regulation portions 40 more effectively exhibit the function as the direction regulation portion. As a result, the seat back frame 1 is more smoothly deformed, and the impact energy is smoothly absorbed.

Particularly, it is more desirable to dispose the portion located near the hole portion 17k in the outer edge of each of the first regulation portion 41 and the second regulation portion 42 at the same position (the position indicated by the symbol EG in FIG. 24) as that of the boundary portion 17p, that is, the inner end of the hole portion 17k (the end near the inward fragile portion 17e). With such a positional relation, it is possible to obtain the effect in which the regulation portions 40 serve as the direction regulation portions without disturbing the deformation of the hole portion 17k. Further, since the regulation portions 40 are disposed in the periphery of the edge of the hole portion 17k, it is possible to suppress degradation in rigidity in the periphery of the hole portion 17k.

Furthermore, as described above, since the connection portion 17x between the lateral plate 17a and the intermediate plate 17b has high rigidity with respect to the load applied in the extension direction (the up to down direction), in general, the connection portion 17x is not easily bent when the impact load of the rear end collision is applied thereto. Since the connection portion 17x is provided with the hole portion 17k, the seat back frame 1 starts to be deformed by using the hole portion 17k as a starting point when the impact load generated upon a rear end collision or the like is applied thereto. Even in this case, since the regulation portions 40 as the direction regulation portions are provided, the deformation of the hole portion 17k may be smoothly transmitted to the inward fragile portion 17e.

Furthermore, in the description above, a configuration has been described in which the regulation portions 40 as the direction regulation portions include the pair of regulation portions, that is, the first regulation portion 41 and the second regulation portion 42, but the present invention is not limited thereto. Any one of the first regulation portion 41 and the second regulation portion 42 may be provided. Here, the configuration in which the first regulation portion 41 and the second regulation portion 42 are disposed at positions sandwiching the inward fragile portion 17e is more desirable in that the deformation transmission direction from the hole portion 17k at both upper and lower sides of the inward fragile portion 17e is not deviated from the specific direction. Furthermore, in the configuration in which only one of the first regulation portion 41 and the second regulation portion 42 is provided, only one regulation portion contacts a predetermined portion (for example, the intermediate plate 17b) of the seat back frame 1 or the member provided in the vehicle body (the portion other than the vehicle seat S in the vehicle) when regulating the deformation amount (the rearward inclined amount) of the seat back frame 1.

Figure 25:
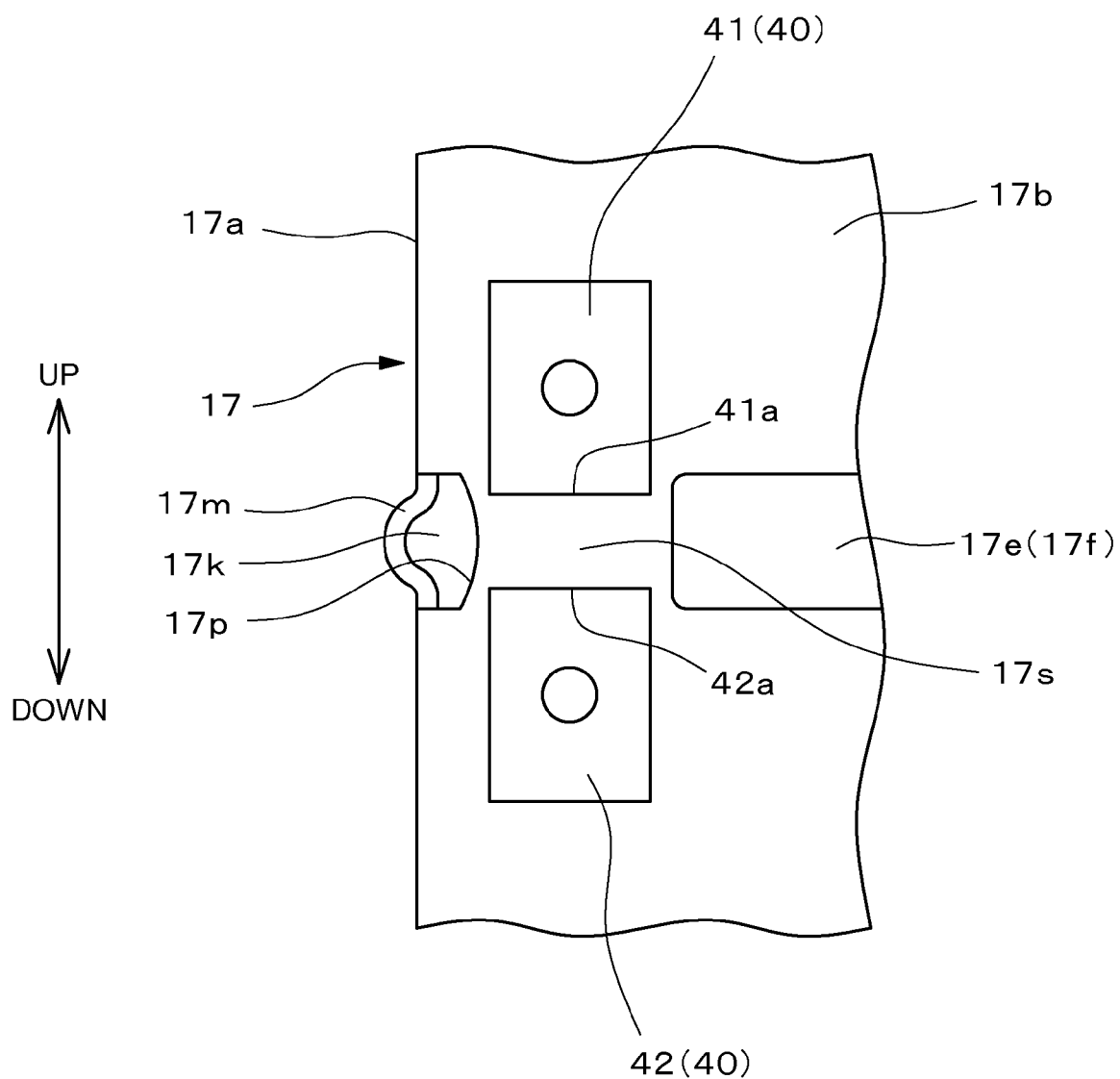
FIG. 25 is a rear view diagram illustrating another example of the attachment positions of the regulation portions.

Further, in the description above, a configuration has been described in which the hole portion 17k as the deformation portion and the inward fragile portion 17e as other deformation portions formed at the adjacent positions, but as illustrated in FIG. 25, the hole portion 17k and the inward fragile portion 17e may be arranged in parallel with a gap 17s therebetween. In such a configuration, since the regulation portions 40 are attached to the upper and lower sides of the gap 17s or the positions having the gap 17s interposed therebetween, the deformation transmission direction of the hole portion 17k may be regulated so that the deformation transmission direction is not deviated from the specific direction. Here, the configuration in which the hole portion 17k and the inward fragile portion 17e are adjacent to each other may more smoothly transmit the deformation from the hole portion 17k to the inward fragile portion 17e.

Figure 26:
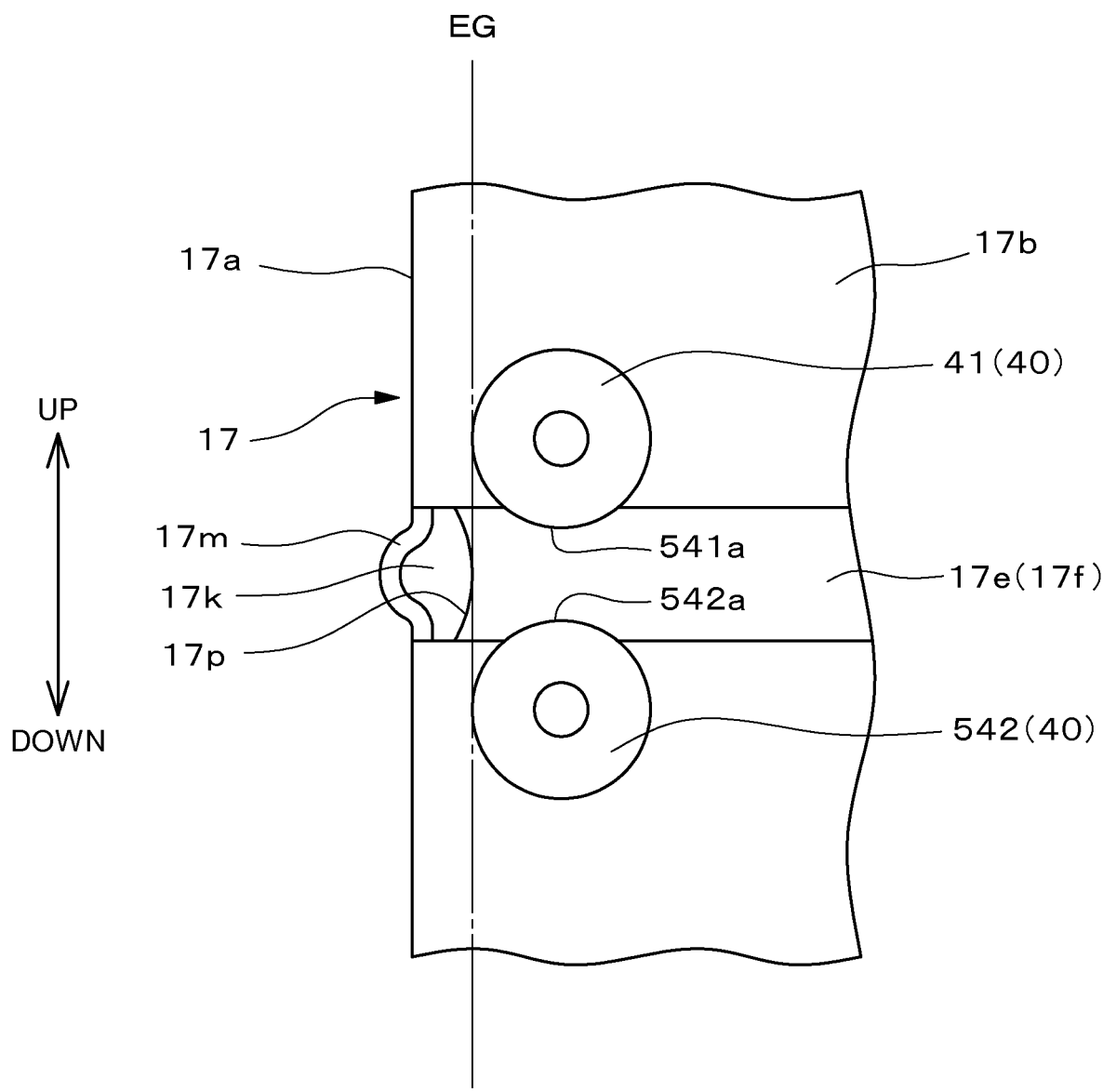
FIG. 26 is a rear view diagram illustrating a modified example of a shape of the regulation portions.

Further, in the description above, a configuration has been described in which the outer shapes of the first regulation portion 41 and the second regulation portion 42 are formed in a rectangular shape in the front view and a substantially trapezoid shape in the side view, but may be formed in a circular shape in the front view as illustrated in FIG. 26. Here, as described above, in the regulation of the deformation amount of the seat back frame 1, it is more desirable that the regulation surfaces 41a and 42a of the first regulation portion 41 and the second regulation portion 42 be formed in a planar shape. Further, when the regulation surfaces 41a and 42a are formed as circular-arc surfaces as illustrated in FIG. 26, the contact area between the regulation portions 40 is small. Accordingly, the first regulation portion 41 may slide on the regulation surface 42a of the second regulation portion 42 to be deviated from the specific contact position. For this reason, the rectangular shape in the front view and the substantially trapezoid shape in the side view are more desirable.

Configuration of Vehicle Seat of Fourth Embodiment

Next, a vehicle seat according to a fourth embodiment of the present invention will be described with reference to FIGS. 27 to 36. FIGS. 27 to 36 are involved with the fourth embodiment of the present invention. Further, FIGS. 31 to 36 are involved with a modified example of the fourth embodiment. Furthermore, in the fourth embodiment, the same reference numerals will be given to the same components and arrangements as those of the first and second embodiments and the detailed description thereof will not be repeated.

In the fourth embodiment, the regulation portions 40 include a contact portion that is provided in the lower frame base portion 17 of the seat back frame 1 and a contacted portion that contacts the contact portion when the inward fragile portion 17e is deformed. Then, the lower frame base portion 17 is provided with an impact absorbing portion that absorbs an impact load generated when the contact portion contacts the contacted portion. Here, the contact portion and the contacted portion are provided in any portion of the seat back frame 1, and contact each other when the inward fragile portion 17e is deformed by the impact load. Specifically, the contact portion and the contacted portion are the first regulation portion 41 and the second regulation portion 42. Further, as the impact absorbing portion, impact absorbing members 43 and 44 provided in the first regulation portion 41 and the second regulation portion 42 are exemplified, but the impact absorbing portion may be provided in any position of the seat back frame 1.

Figure 27:
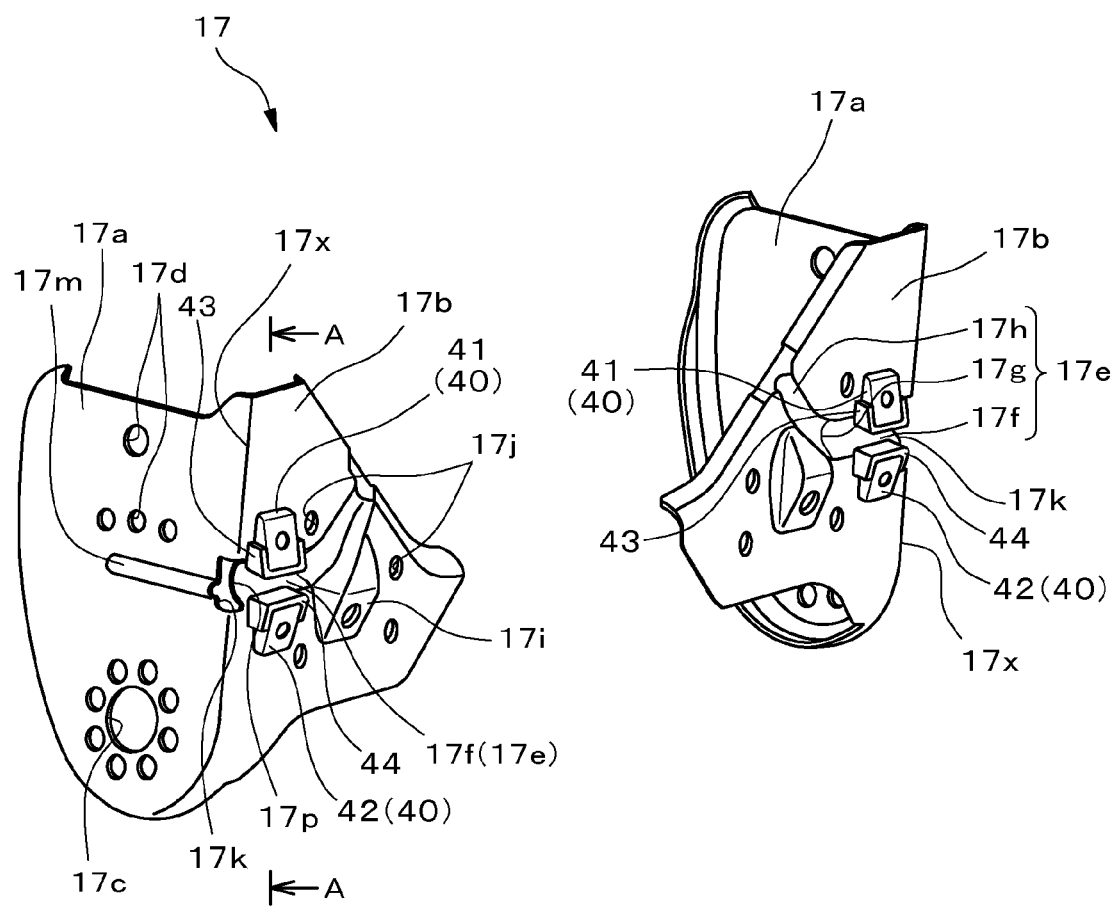
FIG. 27 is a schematic perspective view illustrating a lower frame base portion according to a fourth embodiment of the present invention.
Figure 28:
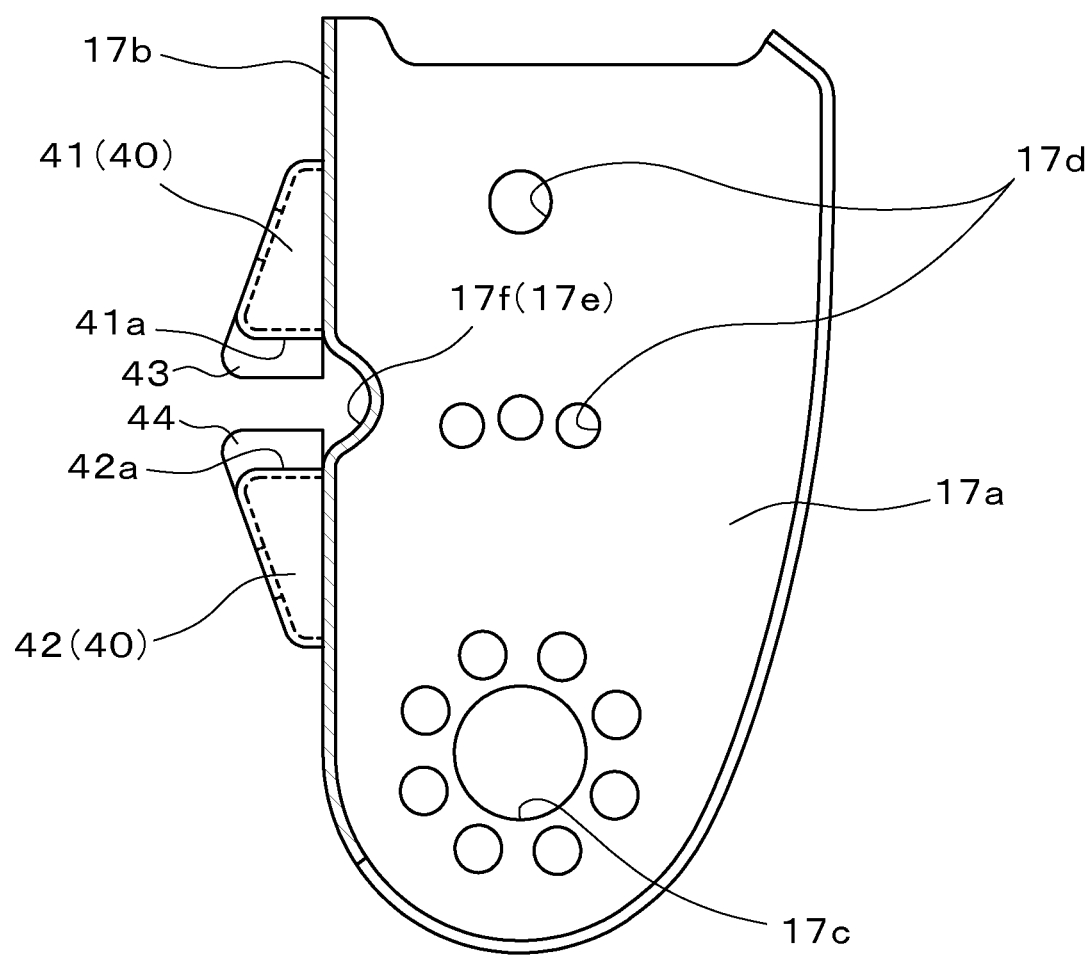
FIG. 28 is a cross-sectional view taken along the line A-A of FIG. 27.

The impact absorbing members 43 and 44 are used to absorb the impact load generated when the first regulation portion 41 and the second regulation portion 42 contact each other, and are provided in the regulation surfaces 41a and 42a as illustrated in FIGS. 27 and 28. Furthermore, FIGS. 27 and 28 illustrate a configuration in which the impact absorbing members 43 and 44 are attached to both the regulation surfaces 41a and 42a. However, the impact absorbing members 43 and 44 may be provided in at least one of the regulation surfaces 41a and 42a of the first regulation portion 41 and the second regulation portion 42.

Figure 29:
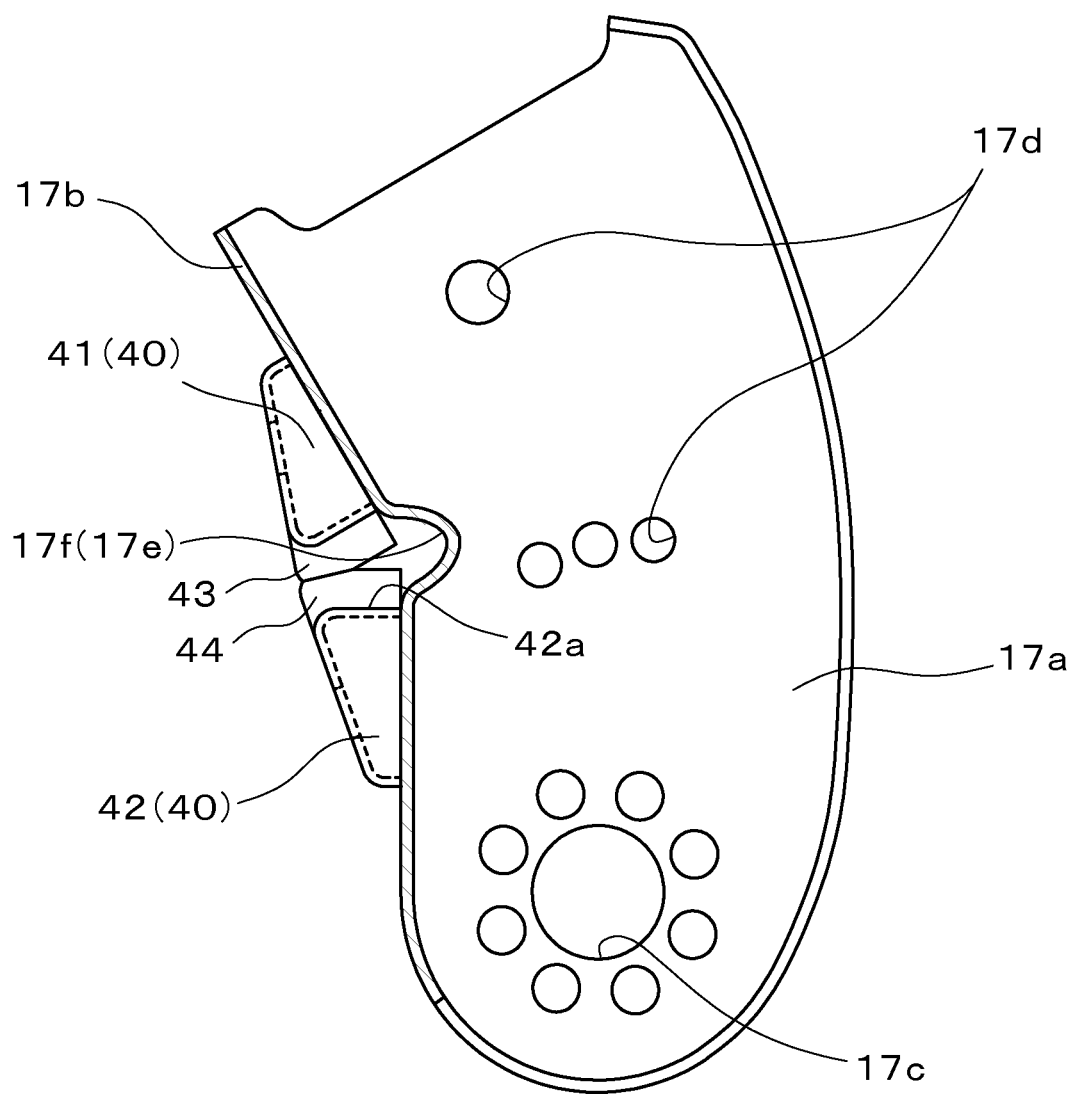
FIG. 29 is an explanatory cross-sectional diagram illustrating a state of the lower frame base portion according to the fourth embodiment of the present invention shown in FIG. 28 after a rear end collision occurs.

Then, when the impact load of the rear end collision or the like is applied to the seat back frame 1 so that the inward fragile portion 17e is deformed and the deformation amount reaches a predetermined amount so that the first regulation portion 41 and the second regulation portion 42 contact each other, as illustrated in FIG. 29, the impact absorbing members 43 and 44 respectively provided in the first regulation portion 41 and the second regulation portion 42 become cushioning materials so that the impact load may be absorbed. As a result, it is possible to reduce the uncomfortable feeling of the occupant when regulating the deformation amount (the deformation angle) of the seat back frame 1.

Furthermore, the material forming the impact absorbing members 43 and 44 may be a resin material or an elastic member (rubber element, a spring, or the like) that exhibits elasticity (flexibility) by a predetermined load or more. When the impact absorbing members 43 and 44 are formed of such a material, the operation of attaching the impact absorbing members 43 and 44 is simplified without complicating the configurations of the impact absorbing members 43 and 44. Further, as a method of attaching the impact absorbing members 43 and 44 to the first regulation portion 41 and the second regulation portion 42, for example, a fixing method using an adhesive may be used or an attaching method using a locking member may be used.

Figure 30:
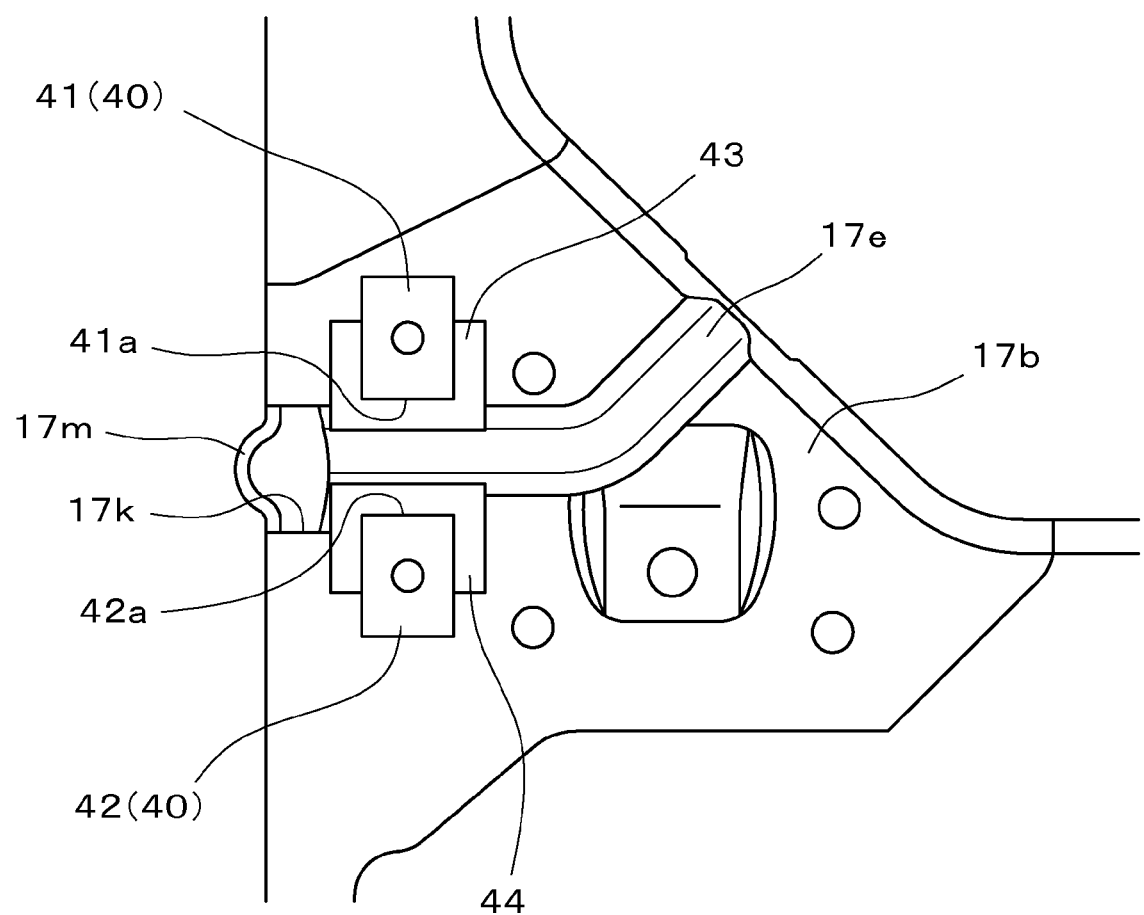
FIG. 30 is a rear view illustrating the lower frame base portion according to the fourth embodiment of the present invention.

As illustrated in FIG. 30, the impact absorbing members 43 and 44 are substantially formed in a U-shape in the rear view, and are fixed to cover the ends (more specifically, the ends in the right and left direction) of the regulation surfaces 41a and 42a. Further, the impact absorbing members may be disposed to cover the ends of the regulation surfaces 41a and 42a in the front to back direction. In this way, since the ends of the regulation surfaces 41a and 42a are covered by the impact absorbing members 43 and 44, the first regulation portion 41 and the second regulation portion 42 contact each other at the portions covered by the impact absorbing members 43 and 44 even when the inward fragile portion 17e is deformed to be twisted by the complex impact load.

Further, as illustrated in FIG. 30, the impact absorbing members 43 and 44 are provided in the portions deviated from the portions overlapping the hole portion 17k in the rear view. With this configuration, even when the hole portion 17k and the inward fragile portion 17e are deformed by the impact load, the impact absorbing members 43 and 44 interfere with the hole portion 17k so that the damage thereof may be prevented.

The distance between the lower surface of the impact absorbing member 43 and the upper surface of the impact absorbing member 44 is set to be smaller than the width of the inward fragile portion 17e in the height direction, that is, the width between the first regulation portion 41 and the second regulation portion 42. Specifically, the lower end of the impact absorbing member 43 provided in the first regulation portion 41 provided at the upper side is disposed below the upper end of the inward fragile portion 17e (more specifically, the horizontal portion 17f). The upper end of the impact absorbing member 44 of the second regulation portion 42 provided at the lower side is disposed at the height equal to or substantially higher than the lower end of the inward fragile portion 17e (more specifically, the horizontal portion 17f). With such a configuration, when the inward fragile portion 17e is bent in the up to down direction, the first regulation portion 41 and the second regulation portion 42 disposed in the up to down direction of the inward fragile portion 17e may easily contact each other as illustrated in FIG. 30 so that the deformation of the inward fragile portion 17e may be pressed and stopped at a predetermined position.

Hereinafter, modified examples of the configuration and the attachment method of the impact absorbing portion will be described.

Figure 31:
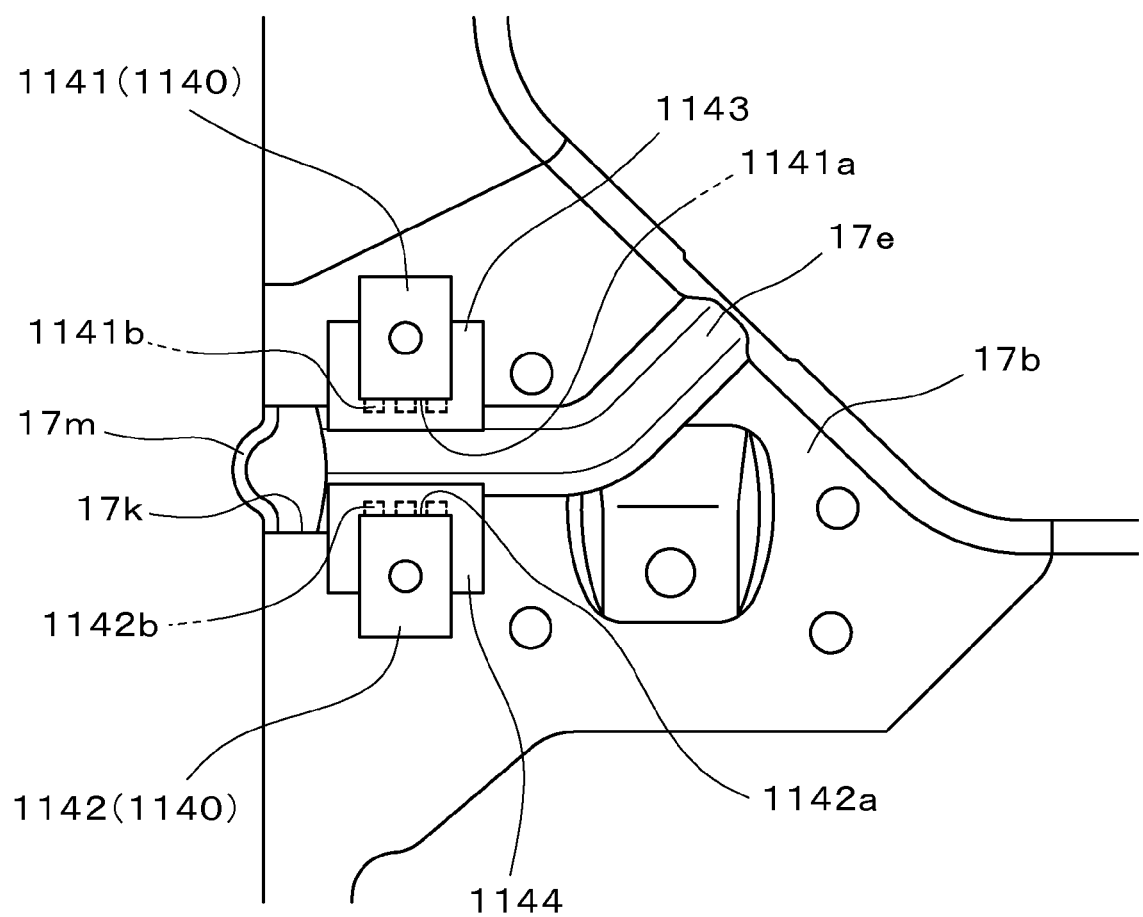
FIG. 31 is a rear view illustrating a lower frame base portion according to a first modified example of the fourth embodiment of the present invention.

As illustrated in FIG. 31, a first modified example has a configuration in which concavo-convex portions 1141b and 1142b are formed in regulation surfaces 1141a and 1142a of a first regulation portion 1141 and a second regulation portion 1142. The concavo-convex portions 1141b and 1142b serve as positioning portions that define the relative positions of absorbing members 1143 and 1144 with respect to the regulation surfaces 1141a and 1142a. Thus, in the first modified example, the attachment positions of the impact absorbing members 1143 and 1144 with respect to the first regulation portion 1141 and the second regulation portion 1142 may be easily defined. Accordingly, the impact absorbing members 1143 and 1144 may be easily attached to regulation portions 140 including the first regulation portion 1141 and the second regulation portion 1142. Furthermore, the impact absorbing members 1143 and 1144 that are attached to the concavo-convex portions 1141b and 1142b are formed by, for example, an elastic member such as a rubber element so that the impact absorbing members may be attached to the regulation surfaces 1141a and 1142a and the concavo-convex portions 1141b and 1142b.

Figure 32:
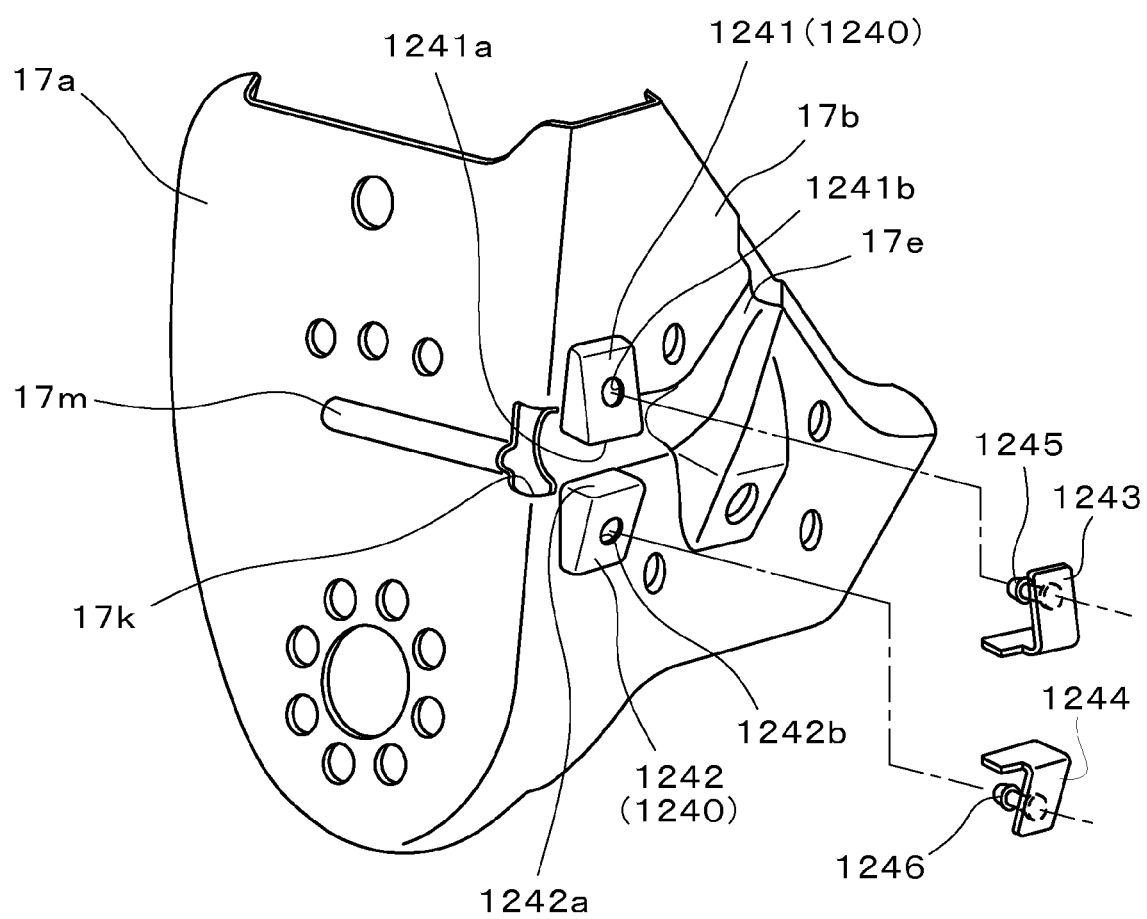
FIG. 32 is a partially assembled perspective diagram illustrating a lower frame base portion according to a second modified example of the fourth embodiment of the present invention.

As illustrated in FIG. 32, a second modified example is a configuration in which protrusion-shaped locking portions 1245 and 1246 provided in impact absorbing members 1243 and 1244 engage with locking holes 1241b and 1242b respectively provided in a first regulation portion 1241 and a second regulation portion 1242. As the configurations of the locking holes 1241b and 1242b and the locking portions 1245 and 1246, an existing method may be used for the configurations. For example, a configuration may be employed in which the locking portions 1245 and 1246 are formed of a flexible material, the diameters thereof are set to be slightly larger than the diameters of the locking holes 1241b and 1242b, and the locking portions 1245 and 1246 are fitted to the locking holes 1241b and 1242b.

Furthermore, the respective impact absorbing members 1243 and 1244 are substantially formed in an L-shape in the side view, and the impact absorbing members 1243 and 1244 are attached to cover at least the regulation surfaces 1241a and 1242a of the first regulation portions 1241 and 1242. At this time, as illustrated in FIG. 32, the portions of the impact absorbing members 1243 and 1244 disposed at positions covering the regulation surfaces 1241a and 1242a may be slightly larger than the regulation surfaces 1241a and 1242a.

Figure 33:
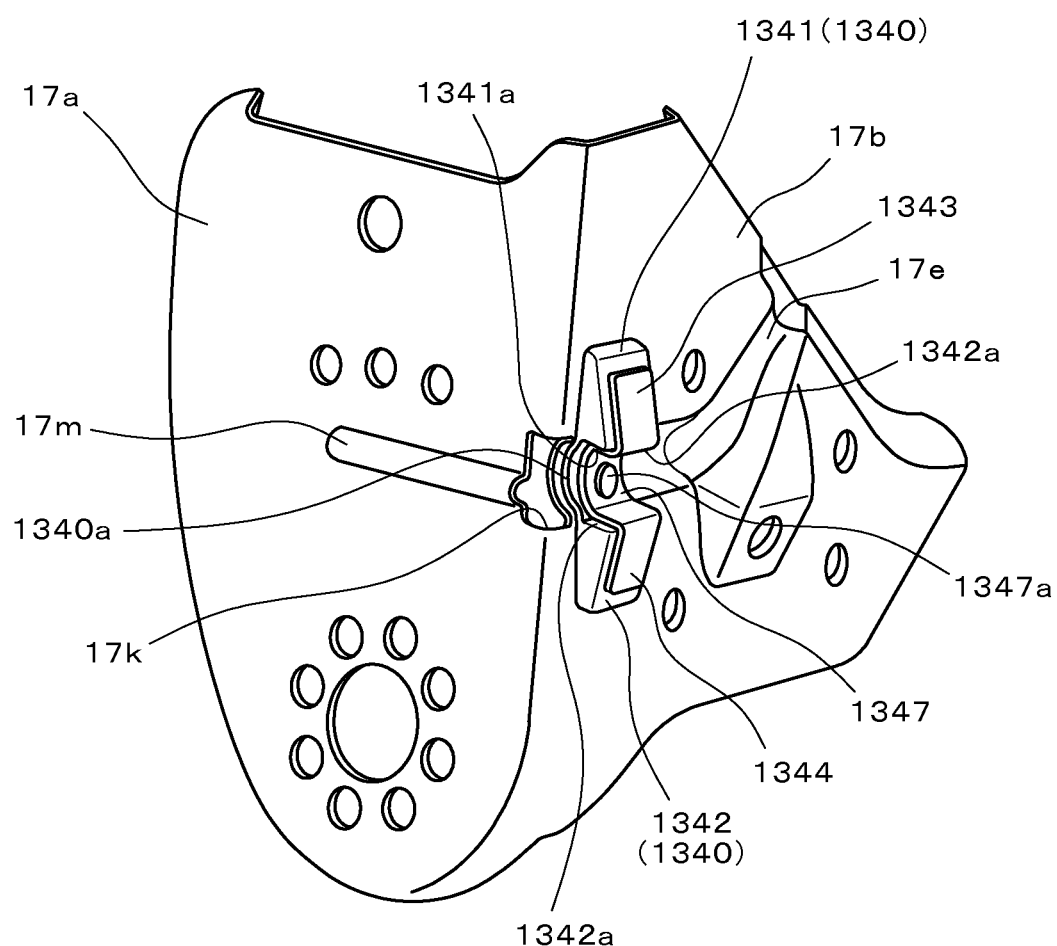
FIG. 33 is a perspective view illustrating a lower frame base portion according to a third modified example of the fourth embodiment of the present invention.

As illustrated in FIG. 33, a third modified example is a configuration in which a regulation portion connecting portion 1340a is formed between a first regulation portion 1341 and a second regulation portion 1342 to connect the first regulation portion 1341 to the second regulation portion 1342. In this modified example, there are provided a first impact absorbing member 1343 that is provided in a regulation surface 1341a of the first regulation portion 1341, a second impact absorbing member 1344 that is provided in a regulation surface 1342a of the second regulation portion 1342, and an impact absorbing member connecting portion 1347 that connects the first impact absorbing member 1343 and the second impact absorbing member 1344 to each other. The impact absorbing member connecting portion 1347 is locked to the regulation portion connecting portion 1340a by a locking member 1347a so that the impact absorbing member is attached to the regulation portion 1340.

Here, the regulation portion connecting portion 1340a is formed to follow the concave shape of the inward fragile portion 17e. On the other hand the impact absorbing member connecting portion 1347 is formed to follow the regulation portion connecting portion 1340a. That is, the impact absorbing member connecting portion is formed to follow the concave shape of the inward fragile portion 17e. Then, the locking member 1347a for fixing the impact absorbing member connecting portion 1347 to the regulation portion connecting portion 1340a is substantially disposed at the center portion of each of the regulation portion connecting portion 1340a and the impact absorbing member connecting portion 1347. In this way, since the impact absorbing member connecting portion 1347 is attached to the regulation portion connecting portion 1340a by the locking member 1347a, there is no need to have a particular configuration for attaching the impact absorbing member to the other portion, and hence the space (that is, the portion corresponding to the inward fragile portion 17e) between the first regulation portion 1341 and the second regulation portion 1342 may be effectively used. Further, not only the impact absorbing member but also the regulation portion 1340 may be attached to the intermediate plate 17b of the lower frame base portion 17 by the locking member 1347a.

Figure 34:
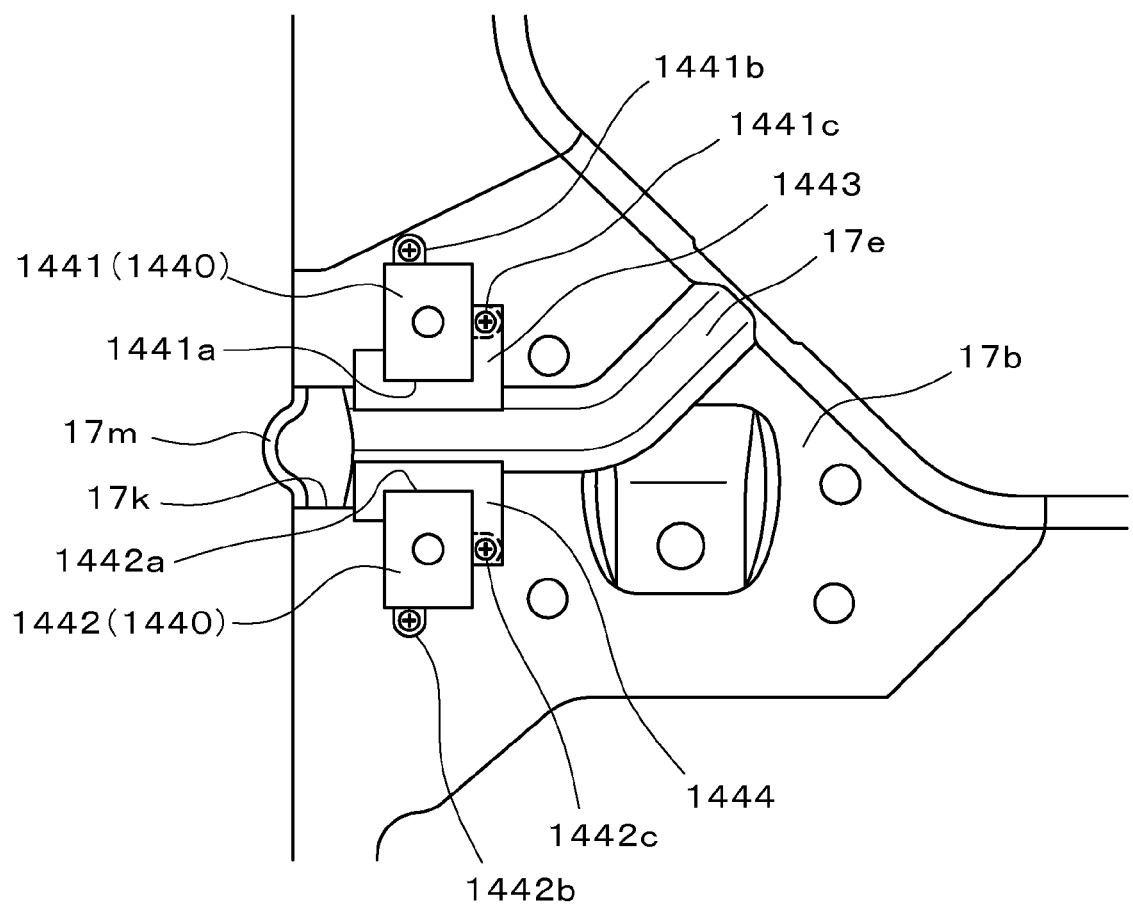
FIG. 34 is a rear view illustrating a lower frame base portion according to a fourth modified example of the fourth embodiment of the present invention.

As illustrated in FIG. 34, a fourth modified example is a configuration in which fastening portions 1441b and 1442b for attaching regulation portions 1440 to the intermediate plate 17b is provided. The fastening portions 1441b and 1442b are respectively provided in a first regulation portion 1441 and a second regulation portion 1442, and are fixed to the intermediate plate 17b by fastening members 1441c and 1442c. Then, the fastening members 1441c and 1442c that are fastened to the fastening portions 1441b and 1442b also fasten impact absorbing members 1443 and 1444. That is, in this modified example, the impact absorbing members 1443 and 1444 are respectively fixed to the fastening portions 1441b and 1442b provided in the first regulation portion 1441 and the second regulation portion 1442. In this way, since the impact absorbing members 1443 and 1444 are fastened by the fastening members 1441c and 1442c (that is, the first regulation portion 1441 and the second regulation portion 1442 are respectively fixed to the impact absorbing members 1443 and 1444) at the fastening portions 1441b and 1442b, the first regulation portion 1441, the second regulation portion 1442, and the impact absorbing members 1443 and 1444 may be easily attached to the intermediate plate 17b of the lower frame base portion 17.

Figure 35:
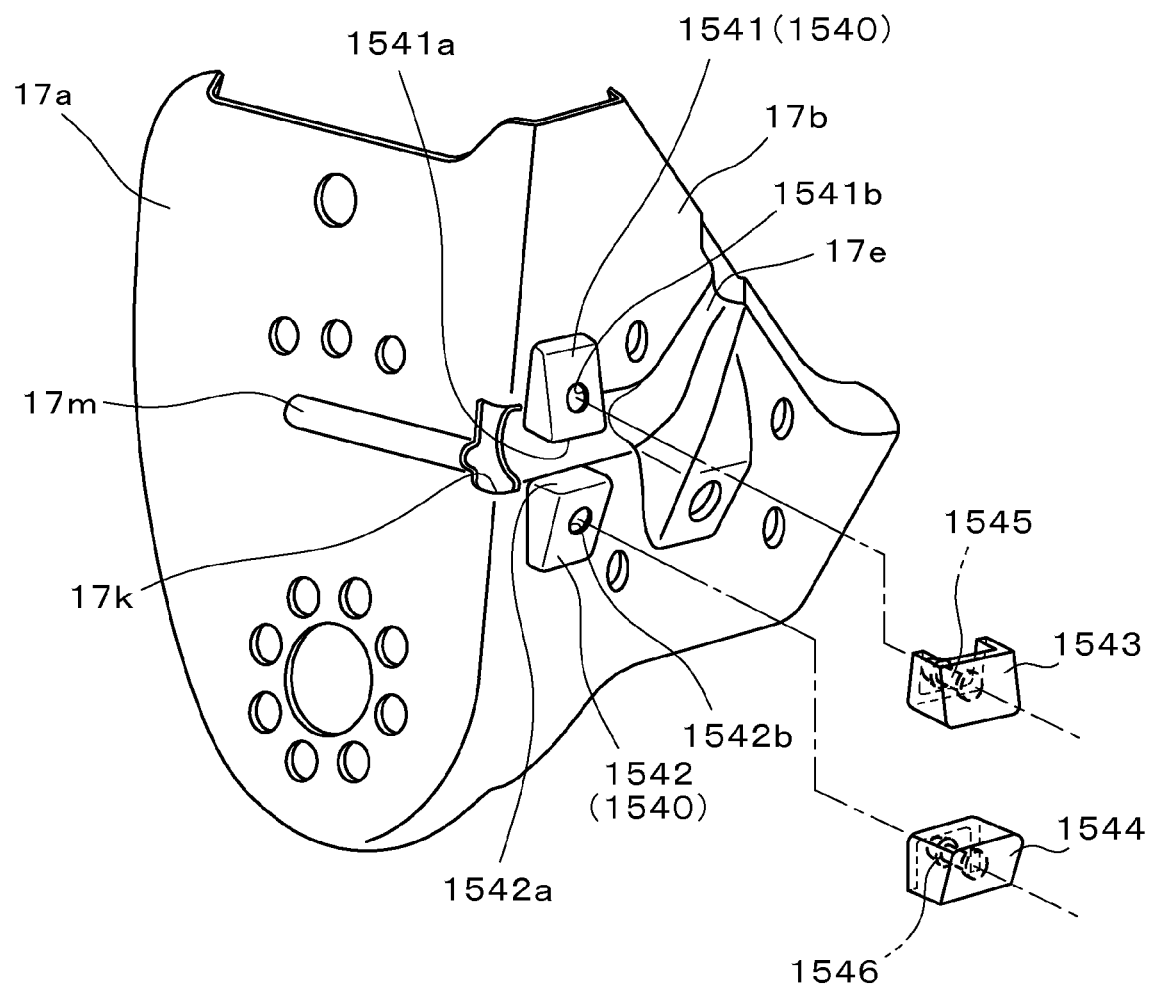
FIG. 35 is a partially assembled perspective diagram illustrating a lower frame base portion according to a fifth modified example of the fourth embodiment of the present invention.

As illustrated in FIG. 35, a fifth modified example is a configuration in which impact absorbing members 1543 and 1544 are substantially formed in a U-shape in the top view. In this modified example, the impact absorbing members 1543 and 1544 are formed to cover not only regulation surfaces 1541a and 1542a but also the upper side of a rear surface of a first regulation portion 1541 and the upper side of a rear surface of a second regulation portion 1542. Further, the impact absorbing members 1543 and 1544 are formed to cover the side surfaces of the first regulation portion 1541 and the second regulation portion 1542. Furthermore, the attachment of the impact absorbing members 1543 and 1544 is performed by providing locking holes 1541b and 1542b and locking portions 1545 and 1546 as in the second modified example.

Figure 36:
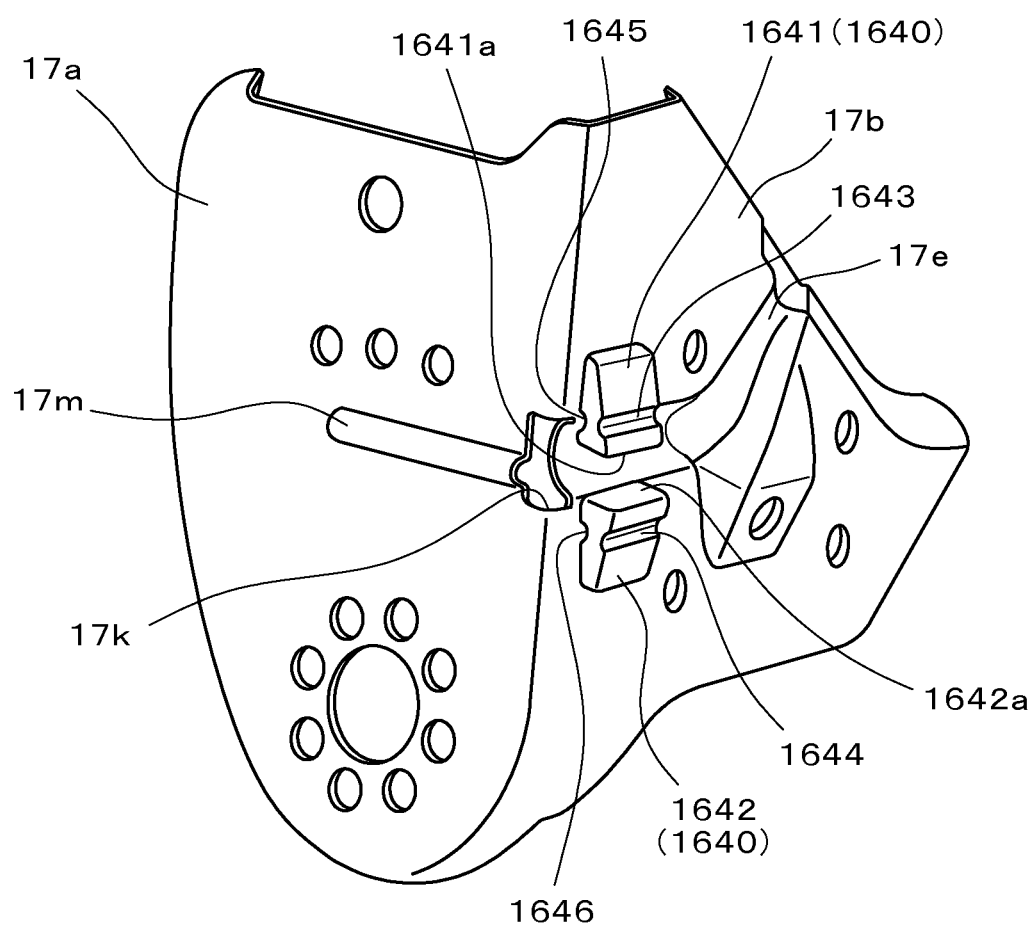
FIG. 36 is a perspective view illustrating a lower frame base portion according to a sixth modified example of the fourth embodiment of the present invention.

As illustrated in FIG. 36, a sixth modified example is a configuration in which a first regulation portion 1641 and a second regulation portion 1642 are respectively provided with rear impact absorbing portions 1643 and 1644 and front impact absorbing portions 1645 and 1646. The rear impact absorbing portions 1643 and 1644 are concave portions that are formed in the rear surfaces of the first regulation portion 1641 and the second regulation portion 1642 and are formed in the extension direction of the inward fragile portion 17e. The front impact absorbing portions 1645 and 1646 are formed in the side surfaces of the first regulation portion 1641 and the second regulation portion 1642 to have a notched shape. Furthermore, it is desirable to form each of the front impact absorbing portions 1645 and 1646 at the same height as that of each of the rear impact absorbing portions 1643 and 1644. The rear impact absorbing portions 1643 and 1644 and the front impact absorbing portions 1645 and 1646 are bent in the up to down direction to absorb the impact load. More specifically, when the impact load is applied to the lower frame base portion 17 and the inward fragile portion 17e is deformed so that a regulation surface 1641a of the first regulation portion 1641 contacts a regulation surface 1642a of the second regulation portion 1642, the rear impact absorbing portions 1643 and 1644 and the front impact absorbing portions 1645 and 1646 are deformed to be bent so that the impact load is absorbed. That is, the rear impact absorbing portions 1643 and 1644 absorb the impact load generated when the upper and lower bulged portions thereof contact each other. Similarly, the front impact absorbing portions 1645 and 1646 absorb the impact load generated when the upper and lower bulged portions thereof contact each other.

Configuration of Vehicle Seat of Fifth Embodiment

Next, a vehicle seat according to a fifth embodiment of the present invention will be described with reference to FIGS. 37 to 42. FIGS. 37 to 42 are involved with the fifth embodiment of the present invention. Furthermore, in the fifth embodiment, the same reference numerals will be given to the same components and arrangements as those of the first to fourth embodiments and the detailed description thereof will not be repeated.

Figure 37:
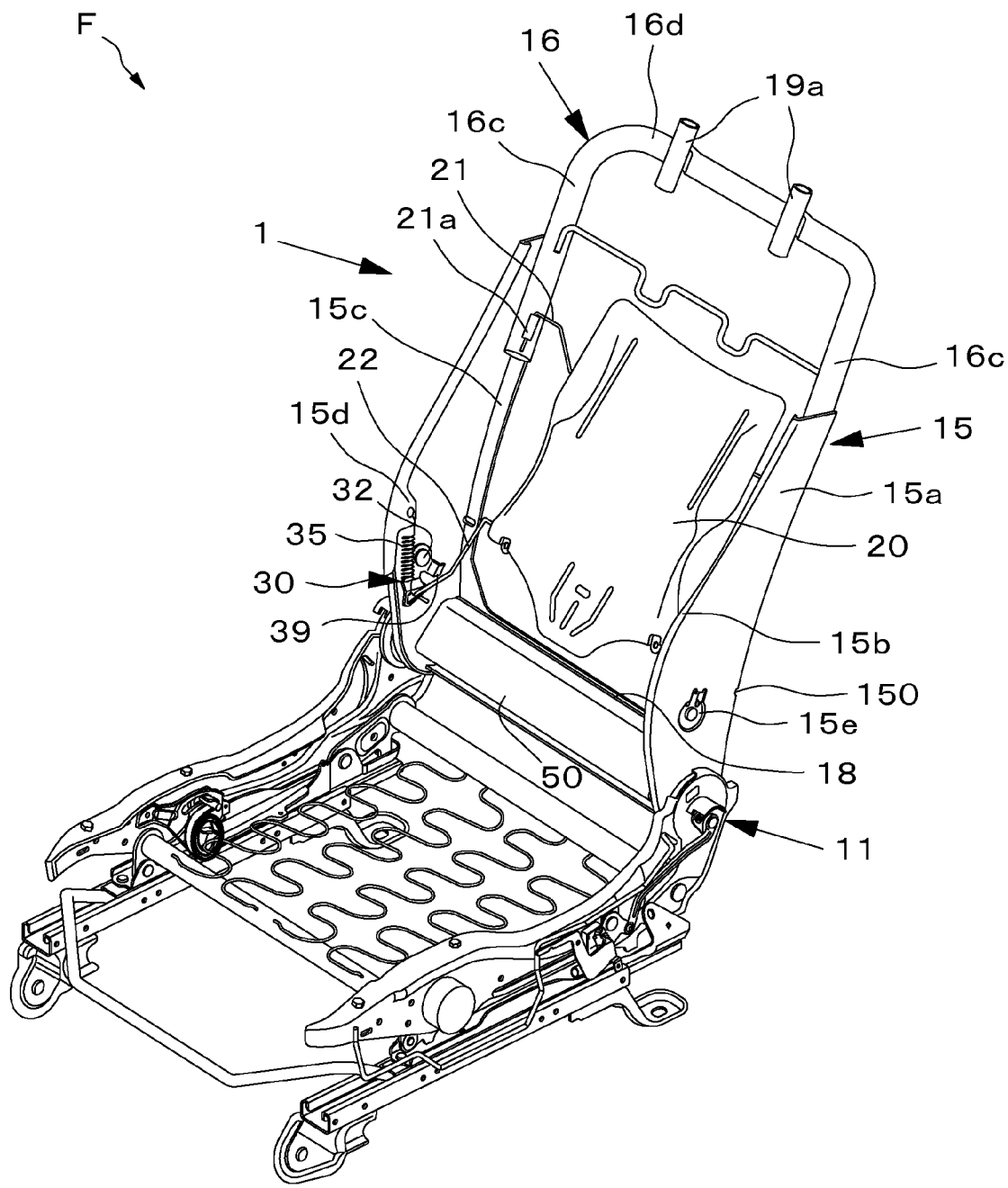
FIG. 37 is a schematic perspective view illustrating a front surface of a seat frame according to a fifth embodiment of the present invention.

In the fifth embodiment, as illustrated in FIG. 37, the seat back frame 1 includes the side frame 15, the upper frame 16, and the lower frame installation portion 18. More specifically, the fifth embodiment is different from the first to fourth embodiments in that the side portion of the seat back frame 1 is not divided into the side frame 15 and the lower frame base portion 17 connected to the lower end of the side frame 15 and the side frame and the lower frame base portion are integrally formed with each other. In this way, since the side frame and the lower frame base portion are integrally formed with each other, the number of components may be decreased and the cost may be reduced.

The upper frame 16 is substantially formed in a U-shape by upper frame upright portions 16c that are disposed separated from each other in the right and left direction to extend from the side frame 15 of the upper frame 16 and a pillar attachment portion 16d that extends in a bent state to bridge the upper ends of the upper frame upright portions 16c. The upper frame upright portions 16c are disposed so that the lower ends overlap the side plates 15a of the side frames 15 in the up to down direction, and are fixed and bonded to the side frames 15 at the overlapping portion. Furthermore, the upper frame 16 is formed by a tubular member having a circular cross-section, but may be formed by a tubular member having a rectangular cross-section.

In the fifth embodiment, in the side plates 15a of the side frames 15 and the upper frame upright portions 16c and 16c of the upper frame 16, the portions facing the outside in the width direction correspond to the frame side portions. On the other hand in the rear edge portions 15c of the side frames 15 and the upper frame upright portions 16c and 16c of the upper frame 16, the portions facing the rear side correspond to the frame extension portions.

Further, the reclining shaft 11a of the reclining mechanism 11 is disposed to protrude toward the side portion of the seat back frame 1 from the shaft penetration holes (not illustrated) formed in the respective side frames 15 and the shaft insertion holes (not illustrated) formed in the rear ends of the seat frames 2 while being fitted to the holes. Furthermore, the lower end of the side frame 15 may be integrally formed with the lower frame installation portion 18.

Figure 39:
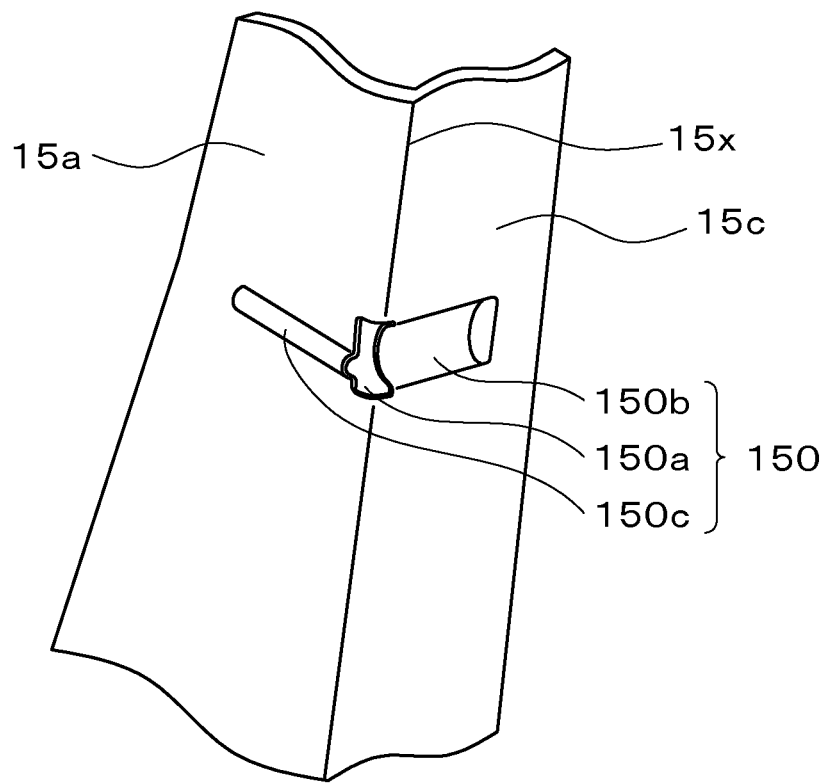
FIG. 39 is an explanatory perspective view diagram illustrating a deformation portion according to the fifth embodiment of the present invention.

The lower ends of the pair of side frames 15 are provided with deformation starting points 150. As illustrated in FIG. 39, each deformation starting point 150 includes a hole portion 150a that serves as a deformation portion formed in a connection portion 15x between the side plate 15a and the rear edge portion 15c of the side frame, a groove portion 150b that serves as other deformation portions formed in the rear edge portion 15c, and a protruding edge portion 150c that is formed in the side plate 15a. The groove portion 150b is formed so that one end thereof is continuous to the hole portion 150a. With such a configuration, the deformation starting point 150 is easily crushed when receiving the collision energy so that the impact energy may be more efficiently absorbed. At this time, the side plate 15a may be provided with the protruding edge portion 150c. Further, the protruding edge portion 150c is formed so that one end thereof is continuous to the hole portion 150a. In this way, when the protruding edge portion 150c is further provided, the deformation starting point 150 may be more easily crushed when receiving the collision energy so that the impact energy may be more efficiently absorbed.

Furthermore, the formation position of the deformation starting point 150 is not limited to the lower end of the side frame 15, but may be any position as long as the formation position is located above the arrangement position of the shaft portion 32 constituting the movement member 30 to be described later. For example, the deformation starting point may be formed in the upper frame 16. In this case, the deformation portion may be formed at the portions that are separated from each other in the right and left direction to extend from the side frame 15 of the upper frame 16. Specifically, the deformation portion may be formed in an upper frame upright portion 16c to be described later.

Further, in the fifth embodiment, both deformation starting points 150 that are respectively formed in both side frames 15 are formed at the same height position based on the horizontal plane. In other words, the deformation starting points 150 are formed at the symmetrical positions with respect to the center line extending in the up to down direction of the seat back frame 1. With such a configuration, it is possible to easily control the deformation position of the side frame 15 when the impact load is applied thereto. Here, the relation between both heights in the horizontal direction is not limited thereto. For example, the deformation starting points may be formed at any position without departing from the spirit of the present invention as long as the deformation starting points are formed on the side frame 15 or the upper frame upright portion 16c above the shaft portion 32.

Further, the lower sides of the side plates 15a of the side frames 15 are bridged by the lower frame installation portion 18. The lower frame installation portion 18 (the member center portion) is formed to bridge the lower sides (the lower sides of the side plates 15a) of the pair of side frames 15 disposed separated from each other in the right and left direction. Furthermore, the present invention is not limited to the configuration in which the side frame 15 and the lower frame installation portion 18 respectively formed as separate members, but the side frame and the lower frame installation portion may be integrally formed with each other.

Figure 38:
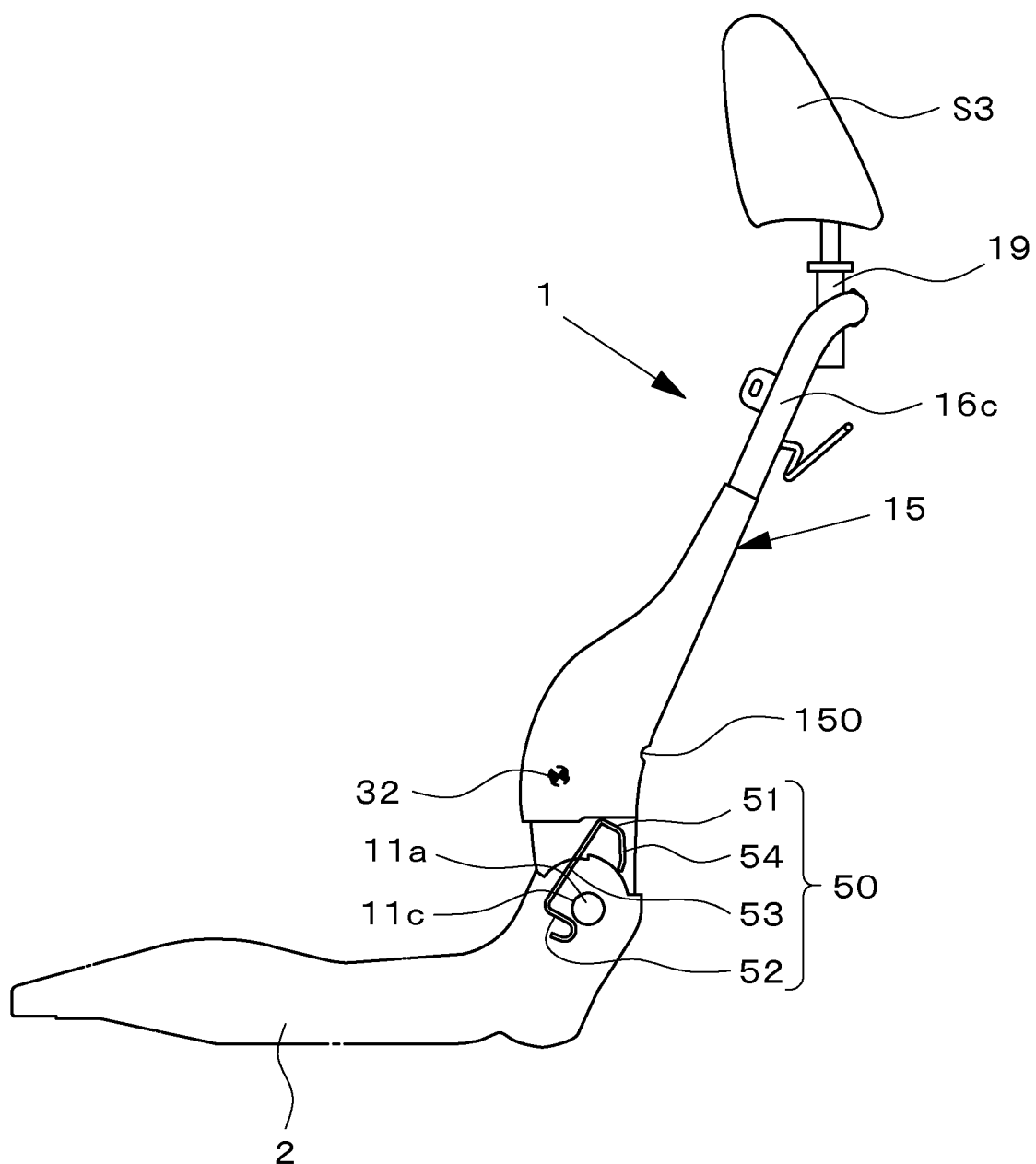
FIG. 38 is an explanatory side view diagram illustrating a side surface of the seat frame according to the fifth embodiment of the present invention.

Then, in the fifth embodiment, the waist entry prohibiting member 50 is disposed in the lower frame installation portion 18. The waist entry prohibiting member 50 is formed by bending a metallic plate member having a predetermined thickness, and the strength and the hardness thereof are designed to withstand the load generated upon a rear end collision. The waist entry prohibiting member 50 is substantially formed in a hollow rectangular column shape, and a part of the side surface is notched. That is, as illustrated in FIG. 38, the waist entry prohibiting member 50 includes an upper surface 51 that is provided at the upper side, a lower surface 52 that is provided at the lower side, a front surface 53 that is provided at the front side (the occupant sitting side) of the seat back frame 1, and a rear surface 54 that is provided at the rear side of the seat back frame 1.

More specifically, the upper surface 51 is a substantially rectangular flat portion that is substantially disposed in the horizontal direction with respect to the vehicle floor, and the rear surface 54 extends from the edge of the upper surface 51 at the rear side of the vehicle and is bent to be drooped downward. Further, the front surface 53 extends from the edge of the upper surface 51 at the front side of the vehicle and is bent to be drooped downward. Moreover, the lower surface 52 extends from the lower edge of the front surface 53 and is bent toward the rear side of the vehicle to be substantially parallel to the upper surface 51. Further, the free end side edge of the lower surface 52 is bent toward the front side of the vehicle, and is formed in a hook shape.

As illustrated in FIG. 37, the waist entry prohibiting member 50 is attached to the surface of the lower frame installation portion 18 facing the front side of the vehicle. At this time, the waist entry prohibiting member 50 is attached in a manner such that the rear surface 54 is welded to the surface of the lower frame installation portion 18 facing the front side of the vehicle. Further, the waist entry prohibiting member 50 is attached to the lower frame installation portion 18 to protrude toward the front side of the seat back frame 1, that is, the occupant sitting side. At this time, the reclining shaft 11a is disposed to pass through the waist entry prohibiting member 50, and is disposed at a position where the reclining shaft does not contact the waist entry prohibiting member 50. For this reason, when the reclining shaft 11a rotates, the movement thereof is not disturbed by the waist entry prohibiting member 50, and the reclining mechanism is not spoiled.

Next, the above-described deformation starting points 150 will be described. Furthermore, the deformation starting points 150 are respectively formed at the pair of side frames 15, but only one of the deformation starting points will be exemplified since the right and left deformation starting points have the same configuration.

The deformation starting point 150 according to the fifth embodiment is formed above the arrangement position of the shaft portion 32 constituting the movement member 30. With such a configuration, even when the deformation starting point 150 is deformed upon a rear end collision so that the seat back frame 1 is inclined rearward, the shaft portion 32 of the movement member 30 does not move rearward, and the operation efficiency of the movement member 30 is not degraded. Further, since the deformation starting point 150 is formed in the side frame 15, the deformation of the deformation starting point 150 is not disturbed by the seat frame 2 when the impact load is applied thereto, and hence the impact energy may be efficiently absorbed.

Further, in order to regulate the deformation amount of the deformation starting point 150, any one of the regulation portions 40, 140, 240, 340, and 440 having the configurations described in the second embodiment and the like is disposed at positions sandwiching a part of the deformation starting point 150. Furthermore, in the description below, a configuration including the pair of regulation portions 40 (specifically, the first regulation portion 41 and the second regulation portion) will be exemplified.

Figure 40:
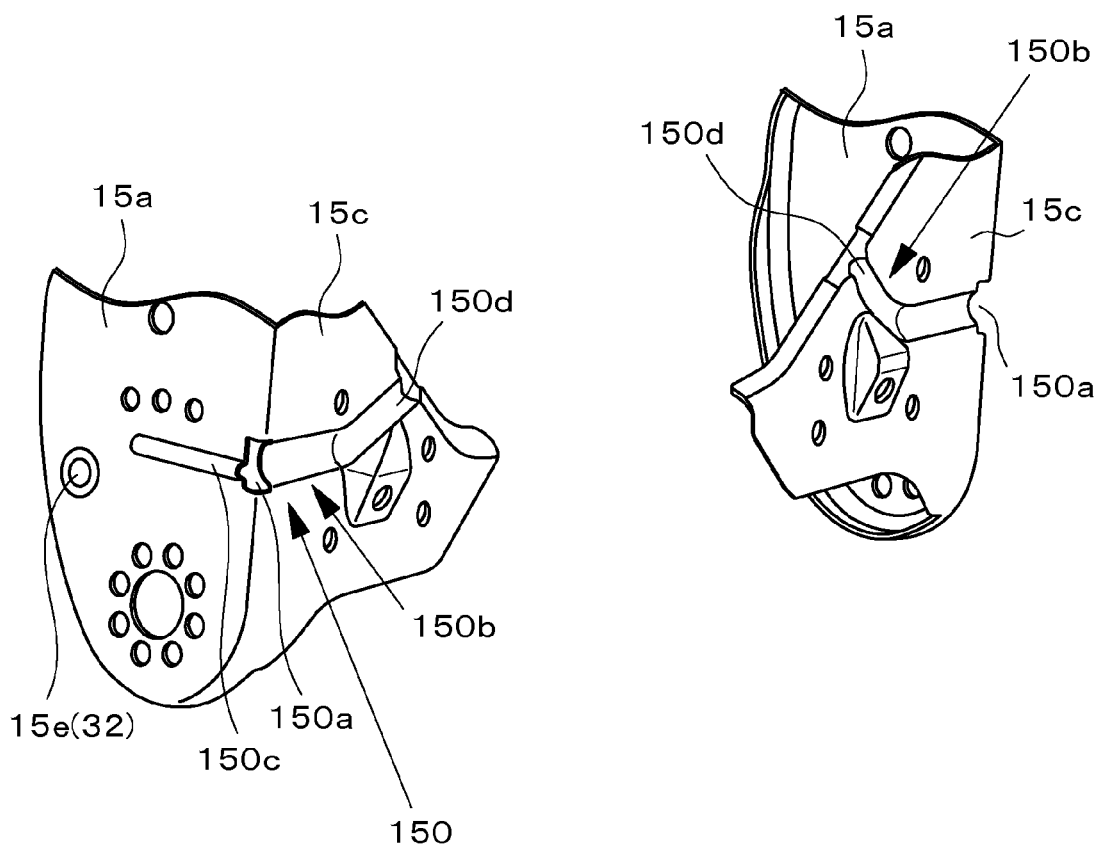
FIG. 40 is an explanatory perspective view diagram illustrating another example of the deformation portion according to the fifth embodiment of the present invention.

Further, as illustrated in FIG. 40, the deformation starting point 150 may be formed at the base end of the side frame 15. In this case, the deformation starting point 150 may include an inclined portion 150*d* in addition to the hole portion 150*a*, the groove portion 150*b*, and the protruding edge portion 150*c*. The inclined portion 150*d* is an inclined portion that extends to be bent inward and upward from the horizontal portion extending in the horizontal direction with respect to the vehicle body floor, is bent to be inclined upward as it goes toward the inside of the seat, and extends to the inclined upper end of the bridged portion of the lower end of each of both side frames 15.

In this way, if the base end of the side frame 15 is provided with the deformation starting point 150, when the occupant abruptly moves rearward upon a rear end collision or the like, the groove portion 150*b* is crushed in the up to down direction by receiving the impact load, and then the base end of the side frame 15 is deformed to be bent. Then, the seat back frame 1 is inclined rearward with the deformation. Accordingly, it is particularly desirable to form the groove portion 150*b* at the lower side of the side frame 15.

Further, the present invention is not limited to the configuration in which the groove portion 150*b* extends as the horizontal linear shape. That is, the groove portion may be provided with the inclined portion 150*d* that is bent to substantially extend in the direction other than the horizontal direction, that is, the inclined direction so that the rigidity of each of the bent portion and the periphery of the inclined portion 150*d* is improved. Accordingly, when the load of causing the seat back frame 1 to be inclined rearward is applied by the rear end collision or the like, the horizontal portion of the groove portion 150*b* is particularly easily deformed so that the impact energy may be efficiently absorbed. Further, when the inclined portion 150*d* is provided to extend to the upper ends of the bridged portions near the lower ends of both side frames 15, the entire groove portion 150*b* may be easily bent.

Furthermore, the inclined portion 150*d* may be formed to be substantially perpendicular to the horizontal portion, but may be formed to be inclined with respect to the horizontal portion. That is, it is desirable that the inclined portion 150*d* form an acute angle or an obtuse angle with respect to the horizontal portion. That is, if the inclined portion 150*d* is formed to be substantially perpendicular to the horizontal portion, the rigidity with respect to the rearward inclining load may be improved by the inclined portion 150*d* when the rearward inclining load is applied to the seat back frame 1 so that the horizontal portion is not easily deformed. When the inclined portion 150*d* forms an acute angle or an obtuse angle with respect to the horizontal portion, the inclined portion may bend the horizontal portion while being appropriately deformed by the rearward inclining load.

Further, in the horizontal portion of the groove portion 150*b*, the end of the horizontal portion facing the end provided with the inclined portion 150*d* is continuous to the hole portion 150*a*. Accordingly, in the horizontal portion of the groove portion 150*b*, the hole portion 150*a* is formed at a position farthest from the inclined portion 150*d*, that is, a position that is most easily deformed due to the comparatively low rigidity. For this reason, the hole portion 150*a* is easily deformed when the impact load is applied thereto so that the horizontal portion of the groove portion 150*b* is deformed. Accordingly, the impact energy may be highly efficiently absorbed.

Mutual Effect in Rear End Collision

Based on the above-described configuration, the positional relations, the operations, and the effects of the waist entry prohibiting member 50, the movement member 30 (the pressure receiving member 20), the deformation starting point 150, and the regulation portions 40 will be described with reference to FIGS. 41 and 42.

Figure 41:
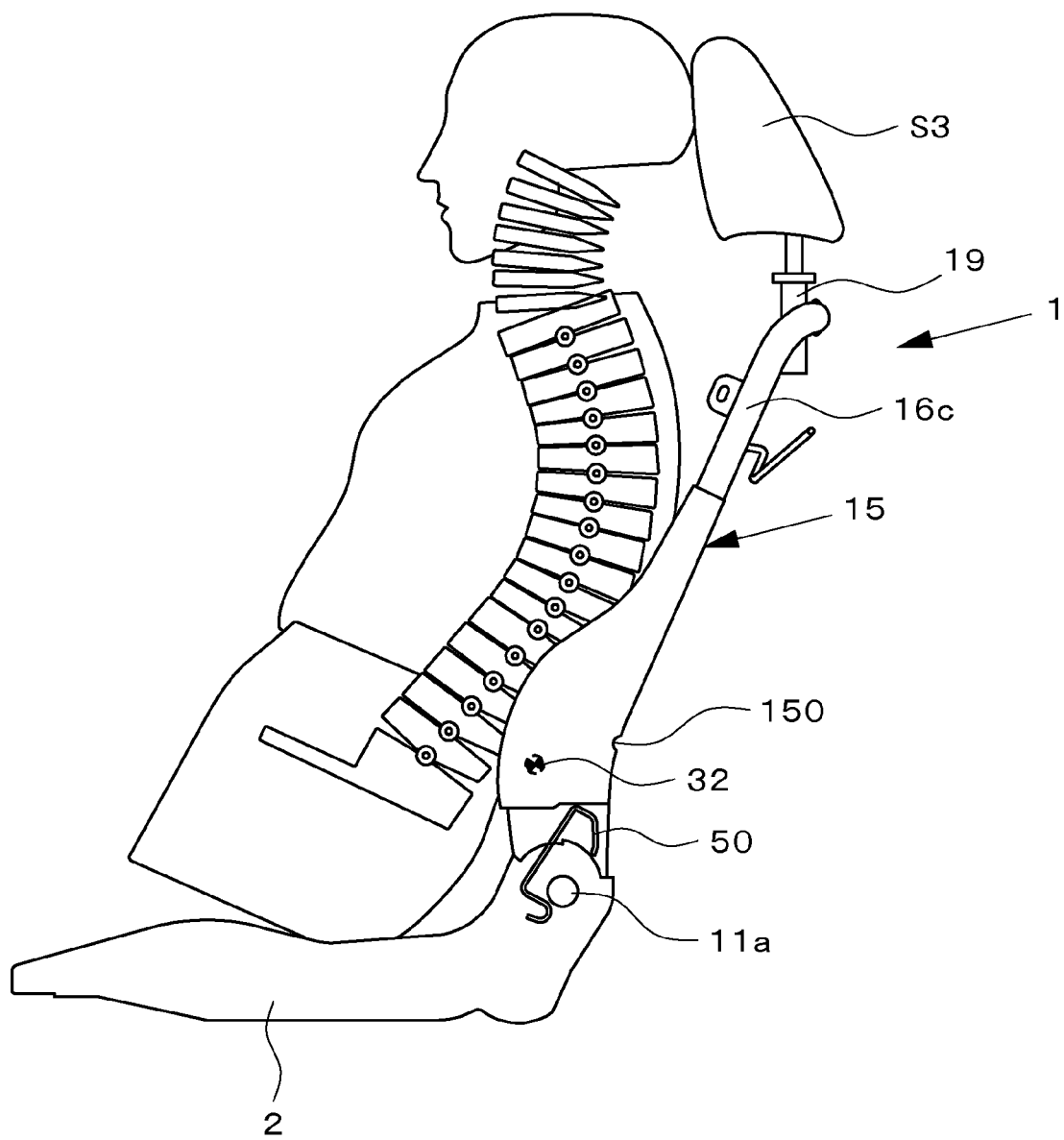
FIG. 41 is an explanatory side view diagram illustrating a side surface when an occupant sits on a vehicle seat according to the fifth embodiment of the present invention.

As illustrated in FIG. 41, the waist entry prohibiting member 50 is attached to the surface of the lower frame installation portion 18 facing the front side of the vehicle. Then, the position of the shaft portion 32 of the movement member 30 connected to the pressure receiving member 20 is disposed at the upper portion of the waist entry prohibiting member 50, and the deformation starting point 150 is disposed at the upper portion of the shaft portion 32.

Figure 42A:
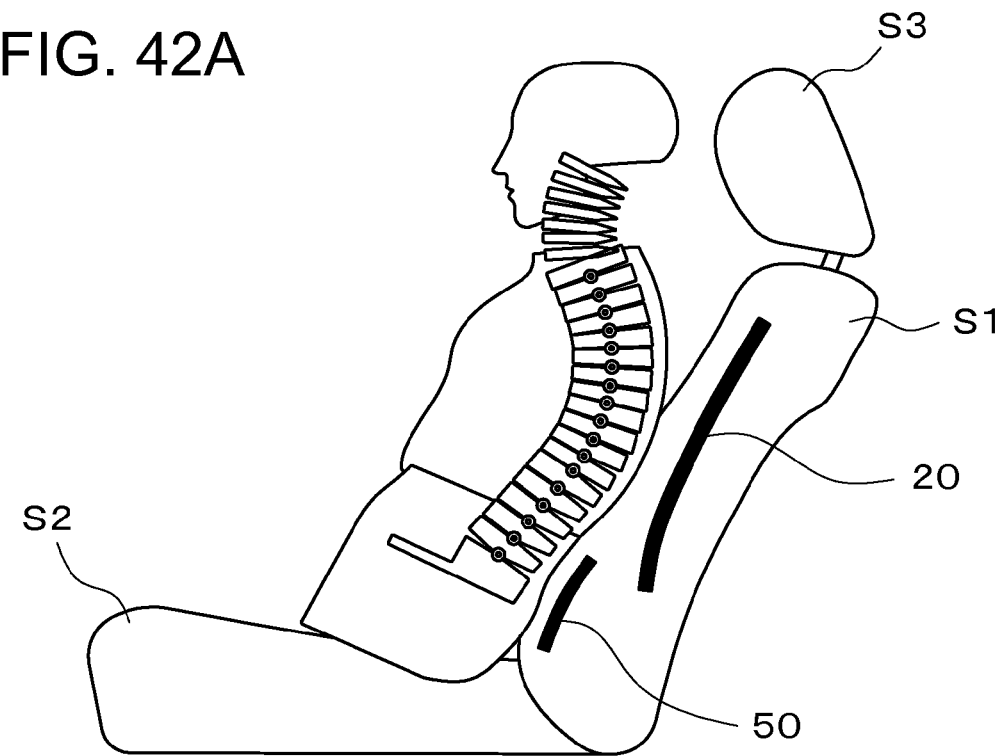
FIGS. 42A, B are explanatory side view diagrams illustrating the movement of the occupant in the vehicle seat according to the fifth embodiment of the present invention.

Generally, the occupant sits on the vehicle seat while the upper body takes the posture illustrated in FIG. 42A. In this way, the occupant generally sits on the vehicle seat while the back surface including the waist contacts the seatback S1, and the load is applied to the rearward portion of the seatback S1. Then, when a large impact is applied to the occupant from the rear side of the vehicle upon a rear end collision, the upper body of the occupant is pressed forward by the impact load larger than that of the normal sitting state.

Subsequently, the head of the occupant is abruptly tilted rearward at a speed faster than the speed at which the upper torso below the shoulder sinks in the seatback S1. As a result, the neck is tilted rearward about the neck joint connecting the neck to the torso so that a large load is applied to the neck by this movement.

Figure 42B:
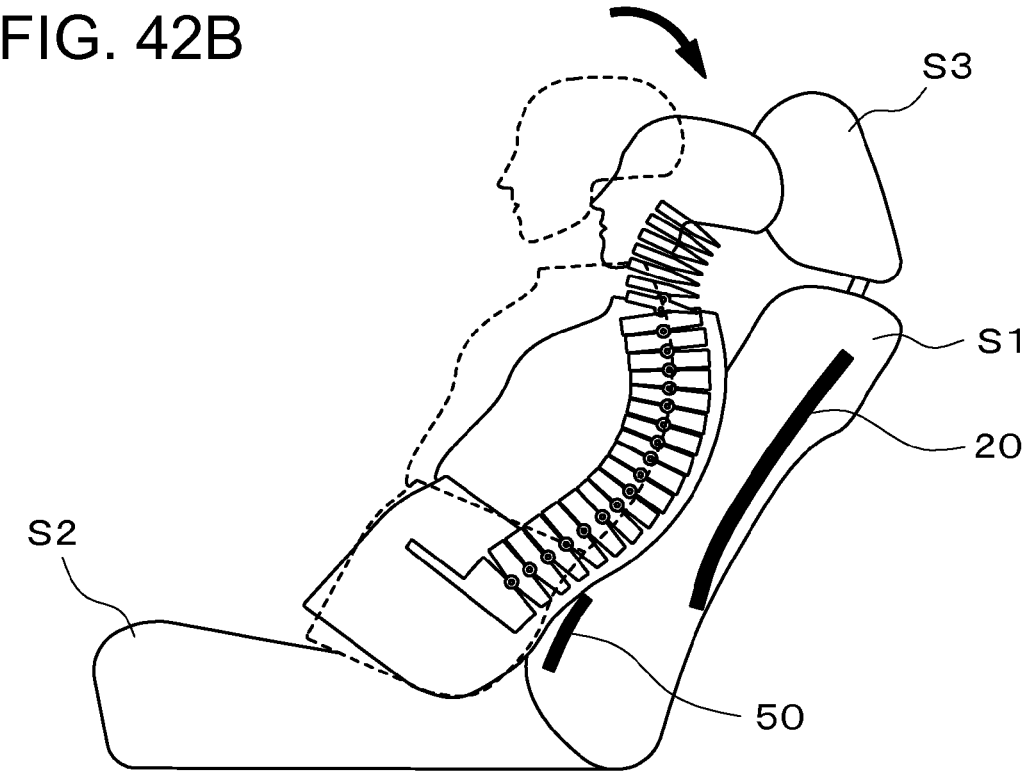

In contrast, if the waist entry prohibiting member 50 is provided, when the occupant is likely to move rearward by the inertia upon a rear end collision as illustrated in FIG. 42B, the rearward movement of the waist of the occupant may be pressed and stopped by the waist entry prohibiting member 50. That is, when the upper body of the occupant is likely to sink rearward, the waist is pressed back forward by the waist entry prohibiting member 50.

As a result, upon a rear end collision, the sunk amount in the vicinity of the chest in the upper torso of the occupant relatively increases so that the upper body is inclined rearward and rotates rearward about the vicinity of the hip. Then, the neck and the head move rearward along with the upper body. As a result, the upper torso of the occupant may be effectively and appropriately sunk rearward to be held by the headrest S3.

Further, if the movement member 30 and the pressure receiving member 20 are provided, when the impact load is applied to the vehicle seat, a force is applied which moves (rotates) the movement member 30 rearward through the pressure receiving member 20 and the wire 22. Then, when the movement member 30 is moved (rotated) rearward, the wire 22 hooked to the movement member 30 moves rearward, and hence the pressure receiving member 20 locked the wire 22 and the cushion pad 1*a* supported by the pressure receiving member 20 move rearward so that the occupant may be sunk into the seatback S1. In this way, since the occupant is sunk into the seatback S1, the head of the occupant may be caused to effectively contact the headrest S3, and hence the rearward movement of the head is suppressed. At this time, the operation efficiency of the movement member 30 becomes remarkably satisfactory compared to the case without the waist entry prohibiting member 50 due to the rotational force of the upper body efficiently generated by the waist entry prohibiting member 50.

Furthermore, since the deformation starting point 150 is provided, the deformation starting point 150 receives the impact load generated when the occupant abruptly moves rearward so that the deformation starting point 150 is crushed in the up to down direction. In this way, when the deformation starting point 150 is crushed, the side frame 15 is deformed so that the upward portion thereof (specifically, the upward portion above the deformation starting point 150) is bent toward the rear side of the vehicle, and the side frame 15 is inclined rearward with the deformation so that the rearward inclining load may be stably and efficiently absorbed.

Further, the bent amount of the deformation starting point 150 is regulated by the regulation portions 40 so that the bent amount does not increase too much. Accordingly, since the regulation portions 40 are provided, the rearward inclined amount may be set to an appropriate value so that the rearward inclined amount of the seat back frame 1 does not increase too much. Then, the deformation starting point 150 and the regulation portions 40 are formed to be disposed above the arrangement position of the shaft portion 32 of the movement member 30. With such a configuration, even when the deformation starting point 150 is crushed so that the side frame 15 is tilted rearward from this portion, the shaft portion 32 as the rotation shaft of the movement member 30 does not move rearward so that the operation efficiency of the movement member 30 is hardly degraded.

Configuration of Vehicle Seat of Sixth Embodiment

Next, a vehicle seat according to a sixth embodiment of the present invention will be described with reference to FIGS. 43 to 46. FIGS. 43 to 46 are involved with the sixth embodiment of the present invention. Furthermore, in the sixth embodiment, the same reference numerals will be given to the same components and arrangements as those of the first to fifth embodiments and the detailed description thereof will not be repeated.

Figure 43:
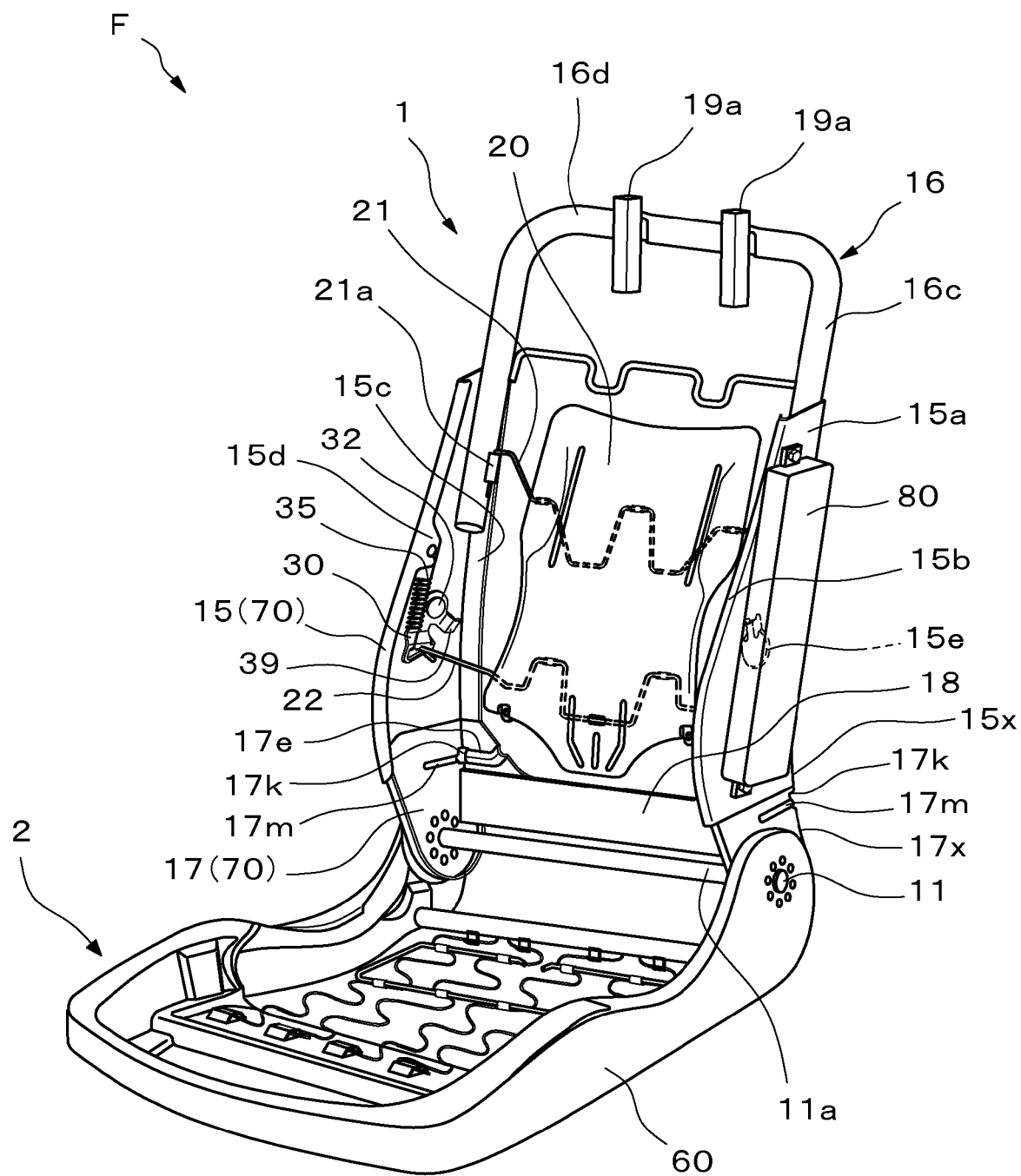
FIG. 43 is a schematic perspective view illustrating a seat frame according to a sixth embodiment of the present invention.

In the sixth embodiment, as illustrated in FIG. 43, the reclining mechanism 11 is attached to a seat base side frame 60 as a frame side portion. Further, the seat back frame 1 includes the side frame 15, the upper frame 16, the lower frame base portion 17, and the lower frame installation portion 18. Furthermore, in the description below, the side plate 15a of the side frame 15, the side surface portion 16a of the upper frame 16, the lateral plate 17a of the lower frame base portion 17, and the seat base side frame 60 of the seat frame 2 correspond to the frame side portion of the sixth embodiment. Further, in the seat back frame 1, a side frame member 70 is formed by the side frame 15 and the lower frame base portion 17.

Further, a side airbag unit 80 that accommodates a side airbag is attached to the side plate 15a of the side frame 15. The side airbag unit 80 includes a main body portion 81 that accommodates a side airbag operated when a large lateral impact load is applied thereto and an attachment portion 82 that is used to attach the main body portion 81 to the side frame 15. Then, the attachment portion 82 is fixed onto the side plate 15a of the side frame 15 by a fastening member 83.

Further, in the sixth embodiment, as in the first to fifth embodiments, the movement members 30 are attached to the inside of the side plates 15a of both side frames 15, and both ends of the wire 22 are hooked to the respective movement members 30 so that the respective movement members 30 are individually operated. Here, the present invention is not limited thereto, and the movement member 30 may be provided in only one side frame 15. In this case, the wires 21 and 22 may be directly locked to the side frame 15 without the movement member 30.

Further, in the sixth embodiment, as in the first embodiment or the second embodiment, the hole portion 17k is formed on the connection portion 17x connecting the lateral plate 17a to the intermediate plate 17b in the frame base portion 17, the lateral fragile portion 17m connected to the hole portion 17k is formed on the lateral plate 17a, and the inward fragile portion 17e connected to the hole portion 17k is formed on the intermediate plate 17b.

Then, particularly, in the sixth embodiment, the hole portion 17k, the lateral fragile portion 17m, and the inward fragile portion 17e (hereinafter, referred to as the hole portion 17k and the like) are formed between the reclining mechanism 11 and the side frame 15 (more specifically, between the shaft insertion hole 17c and the attachment hole 17d). That is, the hole portion 17k and the like are formed above the reclining mechanism 11. With such a configuration, since the lower side of the seat back frame 1 is fixed by the reclining mechanism 11, the seat back frame 1 above the hole portion 17k and the like may be easily inclined rearward. Further, since the hole portion 17k and the like are formed between the seat frame 2 and the side frame 15, when the impact load is applied to the seat back frame, the deformation of the hole portion 17k and the like is not disturbed by the seat frame 2 or the side frame 15, and hence the impact energy may be efficiently absorbed.

Further, the hole portion 17k and the lateral fragile portion 17m that are formed in the lateral plate 17a as the frame side portion are formed in a portion of the lateral plate 17a deviated from the overlapping range of the side airbag unit 80 when viewed in the right and left direction. Furthermore, in the description below, as illustrated in FIGS. 45 and 46, a configuration will be described in which the hole portion 17k and the lateral fragile portion 17m are formed below the side airbag unit 80.

Figure 45:
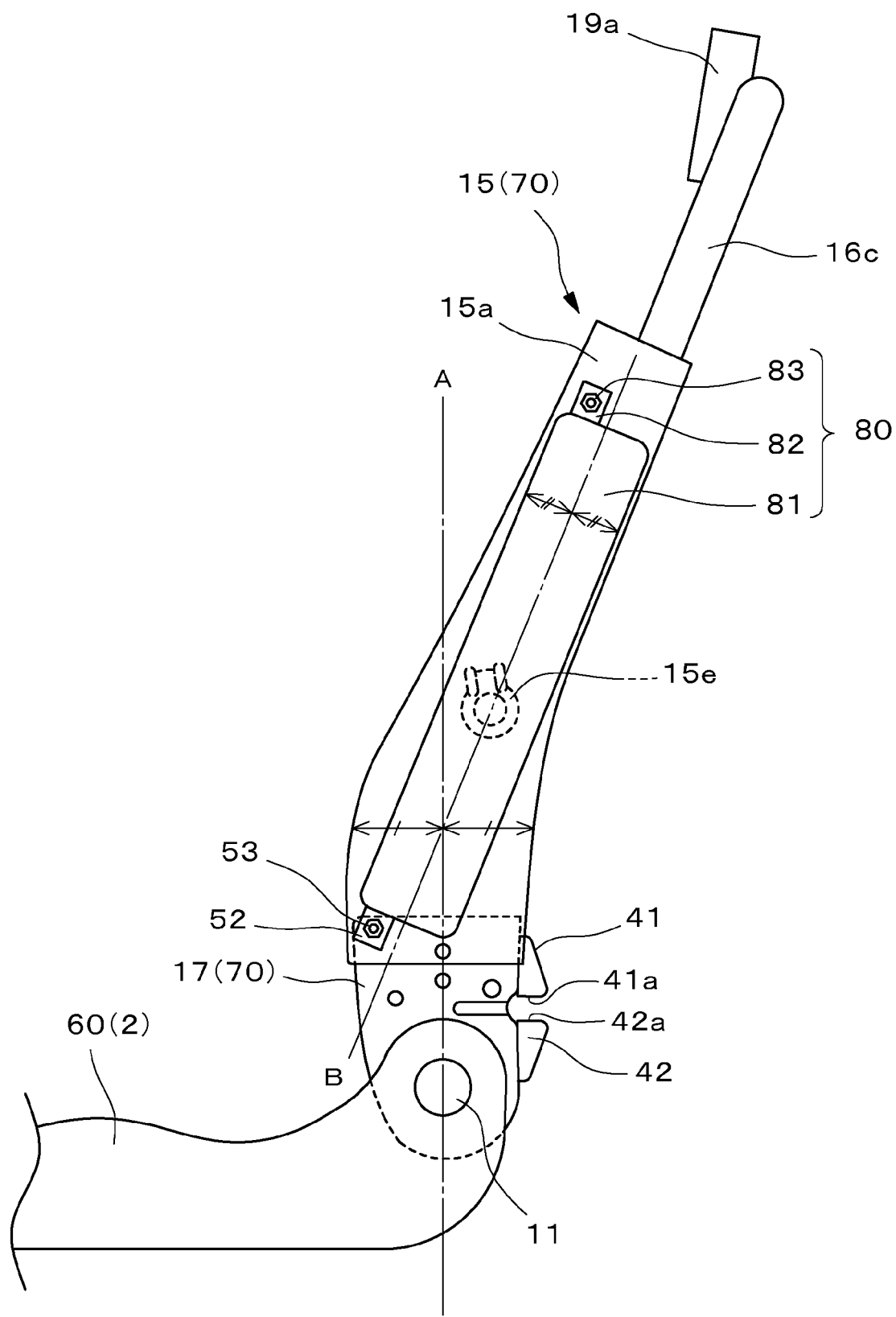
FIG. 45 is an explanatory side view diagram illustrating a side frame of the seat frame according to the sixth embodiment of the present invention.
Figure 46:
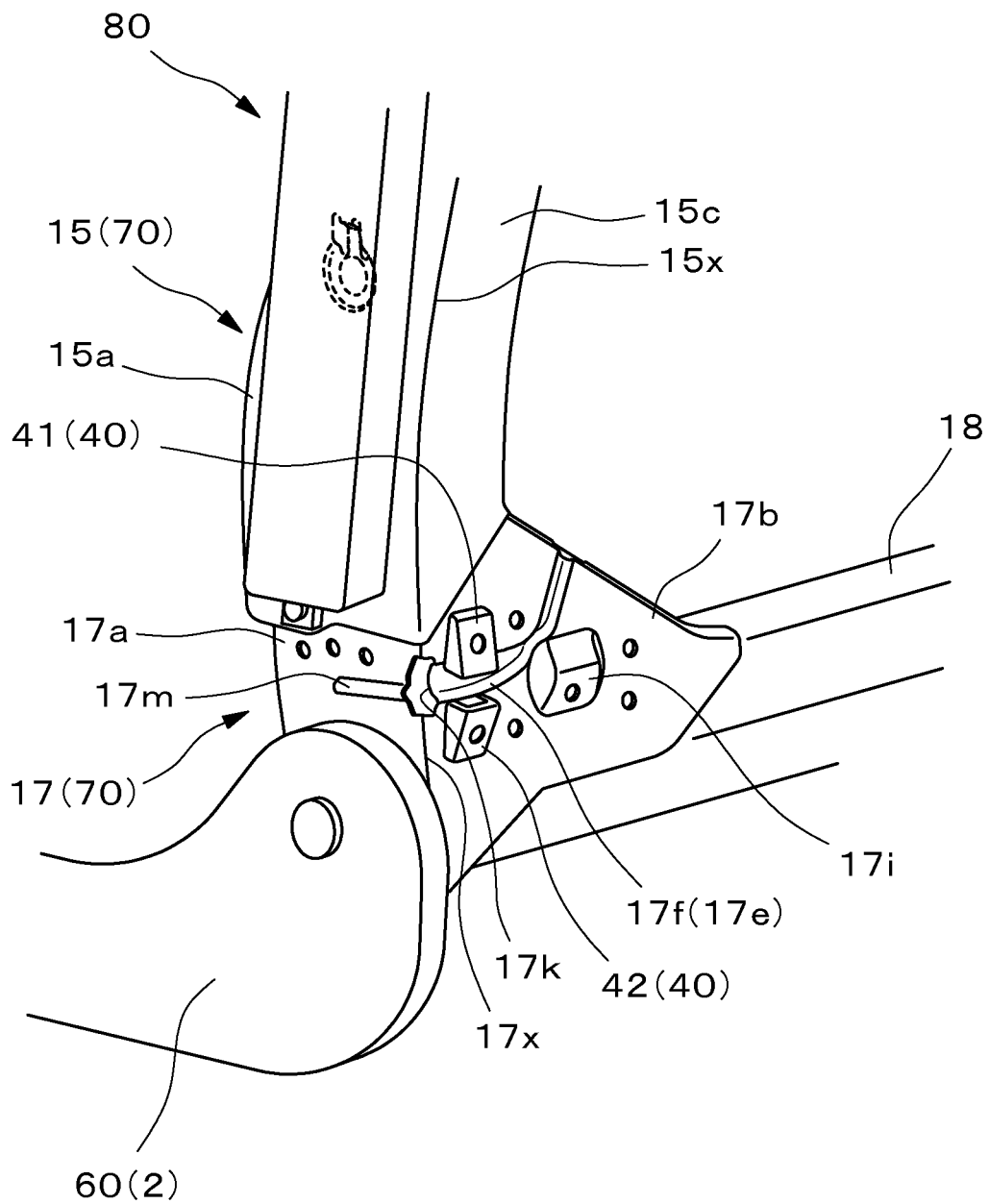
FIG. 46 is an explanatory perspective view diagram illustrating a state of a frame according to the sixth embodiment of the present invention before a rear end collision occurs.

In the configuration illustrated in FIGS. 45 and 46, the attachment portion 82 as a part of the side airbag unit 80 is disposed at a position not overlapping the hole portion 17k or the lateral fragile portion 17m when the side frame 15 and the frame base portion 17 are viewed from the lateral side in the right and left direction. That is, the hole portion 17k and the lateral fragile portion 17m are disposed below the attachment portion 82 of the side airbag unit 80. Furthermore, in the configuration illustrated in FIGS. 45 and 46, the attachment portions 82 are disposed at two positions, but the number of the attachment portions is not limited thereto. For example, it is desirable to dispose the fragile portion below the attachment portion 82 disposed at the lowest position among the plural attachment portion 82.

In this way, since the hole portion 17k and the like are provided below the attachment portion 82 of the side airbag units 80, both the side frame 15 and the side airbag unit 80 may easily inclined rearward in the range located above the hole portion 17k and the like upon a rear end collision. As a result, the impact energy may be efficiently absorbed. Further, since the hole portion 17k and the like are disposed at a position not overlapping the attachment portion 82 of the side airbag unit 80, the side airbag unit 80 may be strongly fixed to the side plate 15a, and degradation in the attachment rigidity of the side airbag unit 80 may be suppressed. As a result, when the side airbag is operated, the side airbag is not easily influenced by the fragile portion, and hence the side airbag may be effectively operated with respect to the impact load.

As described above, the side airbag unit 80 includes the attachment portion 82 attached to the side frame 15 and the main body portion 81 accommodating the side airbag. Here, the attachment portion 82 is disposed above and before the lateral fragile portion 17m. Further, the hole portion 17k and the lateral fragile portion 17m are disposed at the rear side of the center (the line A of FIG. 45) of the lateral plate 17a of the frame base portion 17 in the front to back direction. Further, the attachment portion 82 of the side airbag unit 80 is formed at the front side of the center line (the line B of FIG. 45) extending in the up to down direction while passing through the center of the main body portion 81 in the front to back direction. Furthermore, the main body portion 81 is substantially formed in a rectangular shape in the side view, and the line B of FIG. 45 is a line that extends in the long direction of the main body portion 81 while passing through the center of the main body portion 81 in the short direction. Further, the line A of FIG. 45 is a line that extends in the vertical direction while passing through the center in the front to back direction of the portion having the largest width in the front to back direction of the side plate 15a of the side frame 15.

Since the relative position between the hole portion 17k or the lateral fragile portion 17m and the side airbag unit 80 is set as described above, the attachment portions 82 of the side airbag unit 80 and the hole portion 17k or the lateral fragile portion 17m are not disposed to be adjacent to each other so that the side airbag unit 80 may be stably attached to the side plate 15a of the side frame 15.

Figure 44:
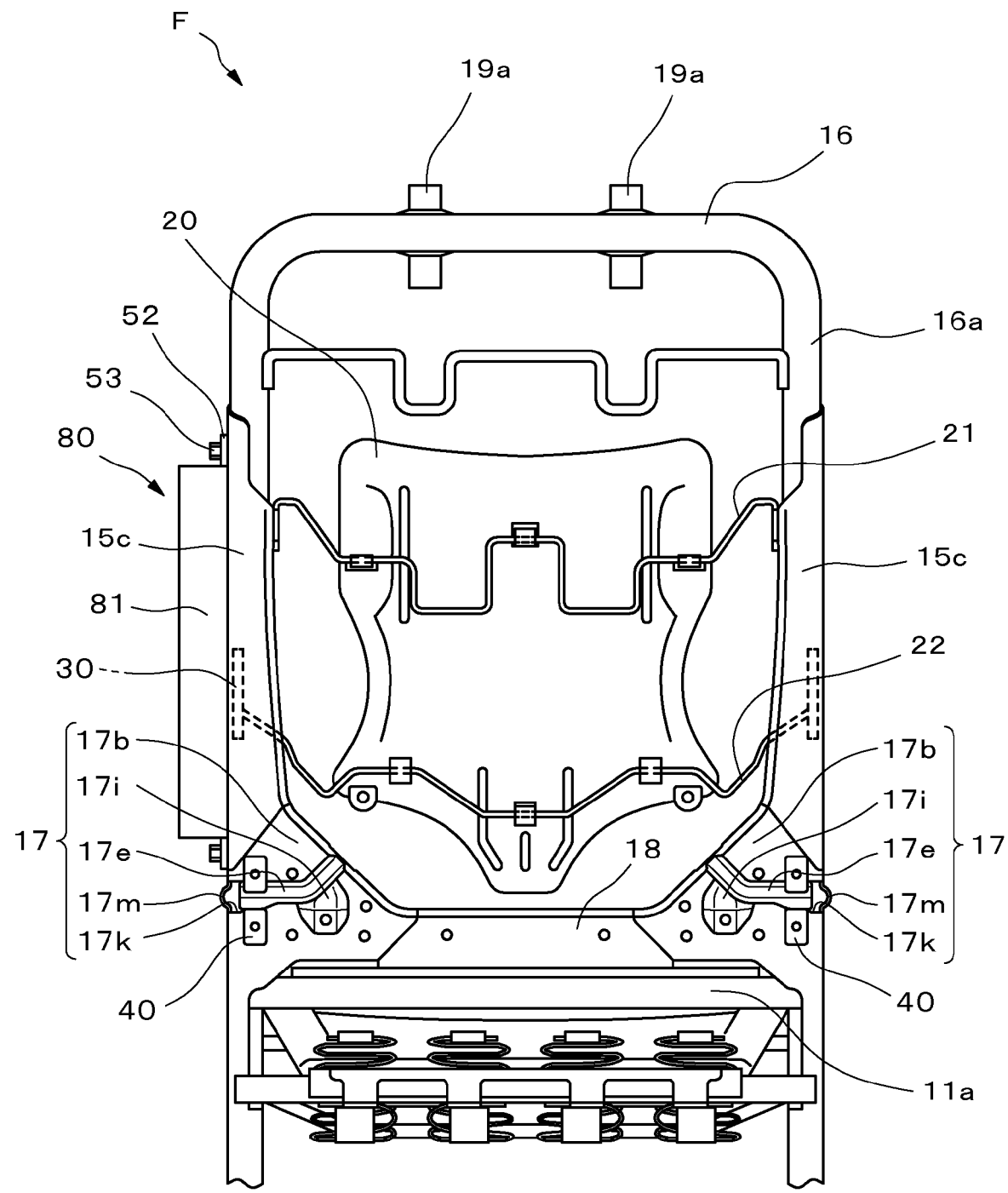
FIG. 44 is a rear view illustrating the seat frame according to the sixth embodiment of the present invention.

Further, as illustrated in FIG. 44, the hole portion 17k and the lateral fragile portion 17m that are formed on the lateral plate 17a are formed below the impact reducing member 30. In this way, since the hole portion 17k or the lateral fragile portion 17m is formed at a position not overlapping the impact reducing member 30 when the side frame 15 is viewed from the lateral side in the right and left direction, the impact reducing member 30 may be stably locked to the side frame 15. As a result, when the impact reducing member 30 is operated, the behavior thereof may be stabilized, and hence the impact energy may be efficiently absorbed.

Configuration of Vehicle Seat of Seventh Embodiment

Next, a vehicle seat according to a seventh embodiment of the present invention will be described with reference to FIGS. 47 to 51. FIGS. 47 to 51 are involved with the seventh embodiment of the present invention. Furthermore, in the seventh embodiment, the same reference numerals will be given to the same components and arrangements as those of the first to sixth embodiments and the detailed description thereof will not be repeated.

In the seventh embodiment, the seat back frame 1 includes the side frame 15 and the upper frame 16, and further includes the lower frame base portion 17 and the lower frame installation portion 18 constituting the lower frame. Further, in the seventh embodiment, the side plate 15a of the side frame 15, the lateral plate 17a of the lower frame base portion 17, and the seat base side frame 60 of the seat frame 2 correspond to the frame side portion. Then, in the seventh embodiment, the lower end of the frame side portion forms a part of the lower frame.

Figure 48:
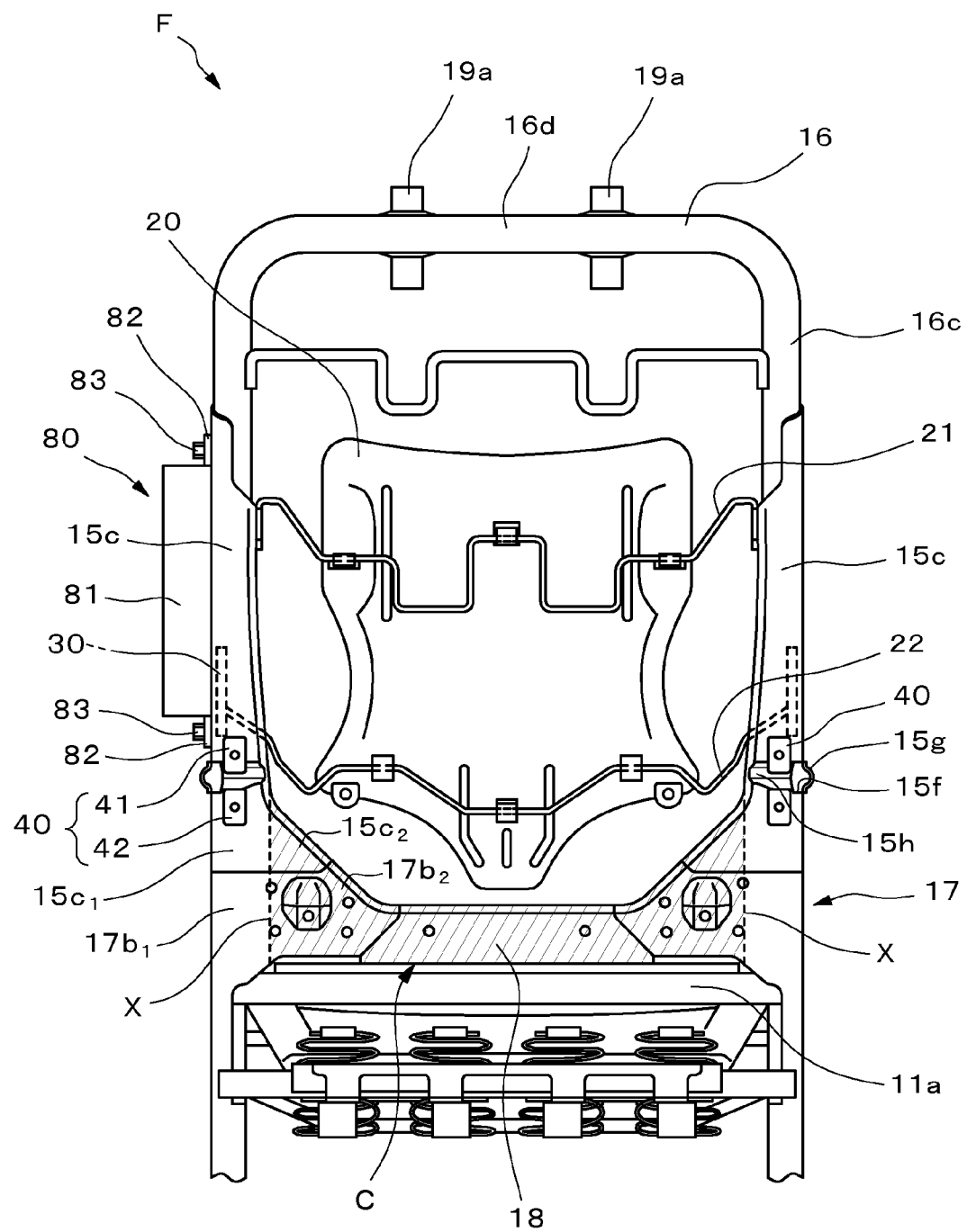
FIG. 48 is a rear view illustrating a seat frame according to the seventh embodiment of the present invention.

A rear edge outer portion $15c_1$ that is located at the outside in the right and left direction in relation to each boundary line X indicated by the dotted line of FIG. 48 in the rear edge portion 15c of the side frame 15 and an intermediate plate outer portion $17b_1$ that is located at the outside in the right and left direction in relation to the boundary line X in the intermediate plate 17b of the frame base portion corresponds to the frame extension portion. Here, the boundary lines X indicate lines that are obtained by extending the inner ends of the right and left direction downward in the vertical direction of the rear edge portions 15c of the side frames 15.

Further, in FIG. 48, a portion that is disposed at the inside in the right and left direction in relation to the boundary line X indicated by the dotted line and is indicated by the hatching in the same drawing corresponds to the frame installation portion. The frame installation portion is disposed between the lower ends of the frame side portions, and includes a rear edge inner portion $15c_2$, an intermediate plate inner portion $17b_2$, and the lower frame installation portion 18. The lower frame installation portion 18 is formed to connect the pair of lower frame base portions 17 disposed separated from each other in the right and left direction, and is disposed to contact the lower frame base portion 17. At this time, it is desirable to bond the lower frame installation portion to both the lateral plate 17a and the intermediate plate 17b in that the attachment rigidity is improved. Further, when the lateral end of the lower frame installation portion 18 is formed to contact the lateral plate 17a, the rigidity with respect to the lateral load is improved. Furthermore, in FIG. 48, the lower frame installation portion 18 is disposed at the front side of the intermediate plate 17b, but may be disposed at the rear side of the intermediate plate 17b.

Then, in the seventh embodiment, the side frame 15 is provided a hole portion 15f, a lateral fragile portion 15g, and an inward fragile portion 15h (hereinafter, referred to as a hole portion 15f and the like), and is also provided with the regulation portions 40 that are disposed at positions sandwiching a part of the hole portion 15f and the like to regulate the deformation amounts of the hole portion 15f and the like when the impact load is applied thereto.

Figure 47:
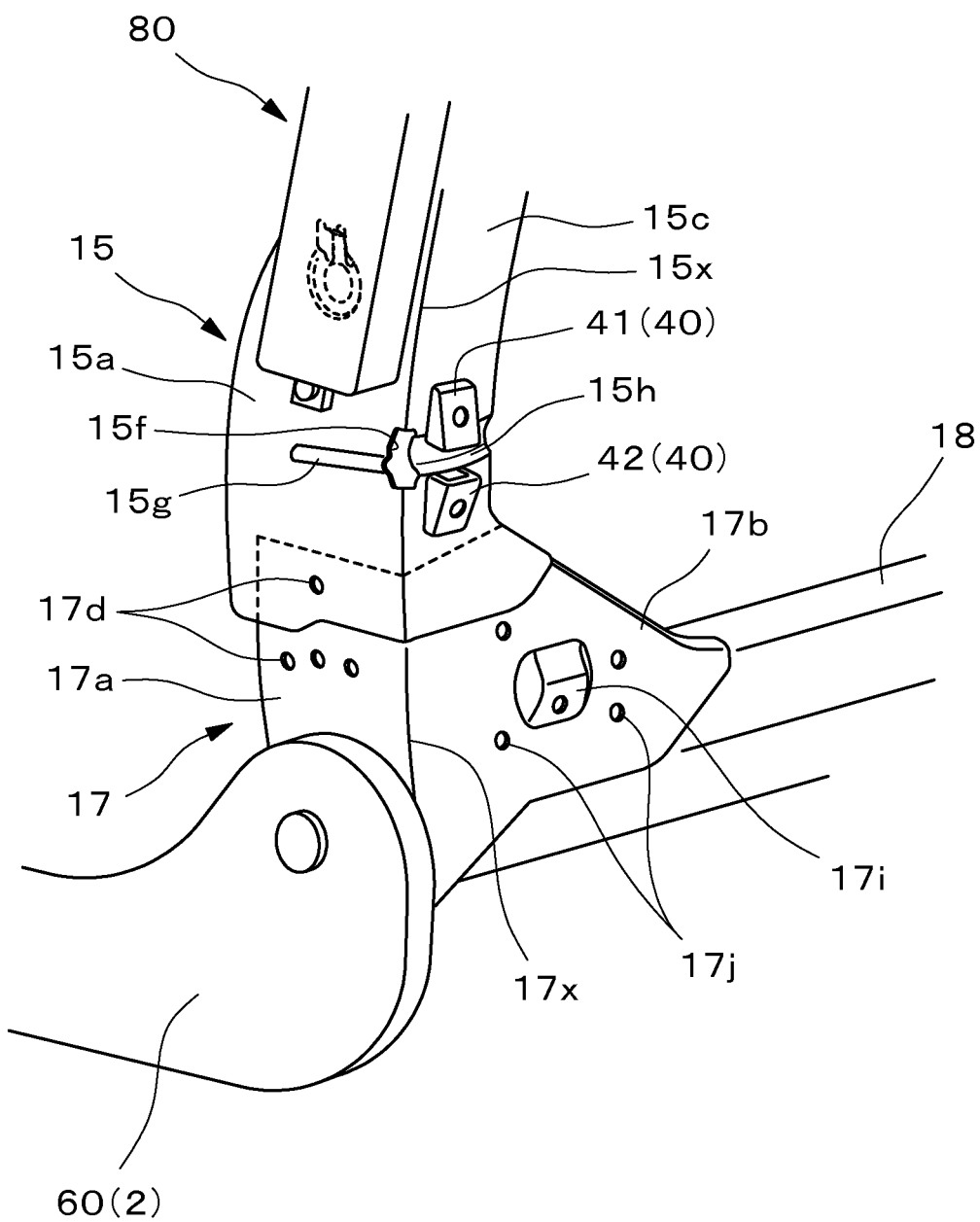
FIG. 47 is an explanatory perspective view diagram illustrating a state of the vicinity of a side frame according to a seventh embodiment of the present invention before a rear end collision occurs.
Figure 49:
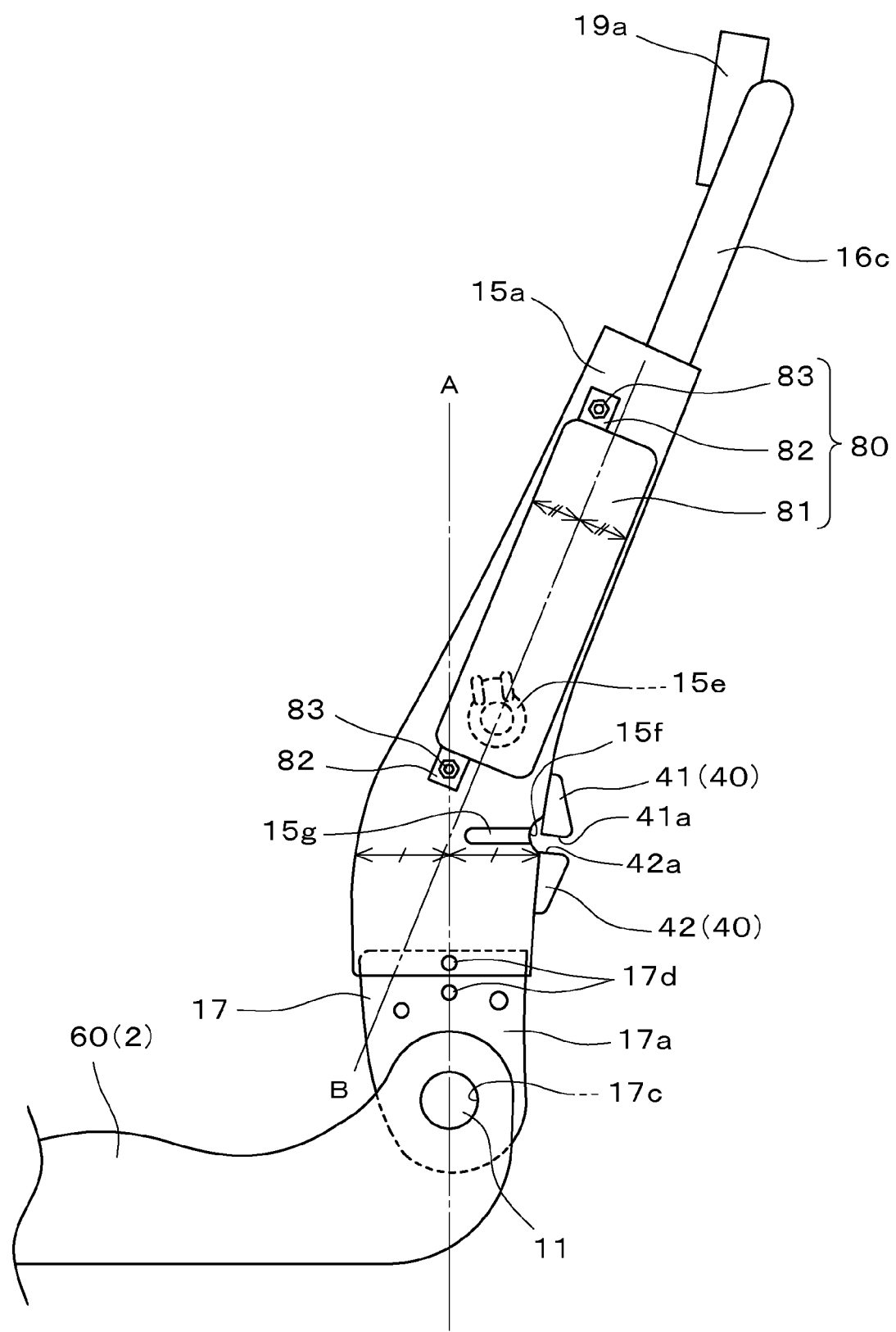
FIG. 49 is an explanatory side view diagram illustrating a state of the seat frame according to the seventh embodiment of the present invention before a rear end collision occurs.

More specifically, as illustrated in FIGS. 47 and 49, the side frame 15 is provided with the hole portion 15f that serves as a deformation portion on the connection portion 15x connecting the side plate 15a as a frame side portion to the rear edge portion 15c as a frame extension portion. Further, the side plate 15a is provided with the lateral fragile portion 15g as other deformation portions connected to the hole portion 15f. Here, the hole portion 15f corresponds to the hole portion 17k of the first to sixth embodiments, and substantially has the same shape and function as those of the hole portion 17k. Further, the lateral fragile portion 15g corresponds to the lateral fragile portion 17m of the first to sixth embodiments, and substantially has the same shape and function as those of the lateral fragile portion 17m. Further, the rear edge portion 15c of the side frame 15 is provided with the inward fragile portion 15h as another fragile portion connected to the hole portion 15f at the opposite side to the lateral fragile portion 15g. Here, the inward fragile portion 15h substantially has the same shape and function as those of the inward fragile portion 17e of the first to sixth embodiments.

As described above, since the lateral fragile portion 15g or the inward fragile portion 15h is connected to the hole portion 15f, the lateral fragile portion 15g and the inward fragile portion 15h are deformed by using the hole portion 15f as a starting point when the impact load of the rear end collision or the like is applied to the side frame 15. At this time, since the lateral fragile portion 15g and the inward fragile portion 15h are deformed to be crushed in the up to down direction, the impact energy is absorbed.

Then, as described above, as illustrated in FIG. 48, the hole portion 15f corresponds to the connection portion connecting the frame side portion to the frame extension portion in the configuration including the frame side portions (specifically the side plate 15a and the lateral plate 17a) located at the right and left sides and the frame extension portions (specifically the rear edge portion 15c and the intermediate plate 17b) extending toward the inside in the right and left direction at the frame side portion. Further, the hole portion 15f is formed in a portion deviated from the same position as that of the frame installation portion (the hatching portion in FIG. 48) in the up to down direction of the connection portion in the rear view. More specifically, the hole portion 15f and the lateral fragile portion 15g are formed at positions not overlapping the rear edge inner portion 15$c_2$, the intermediate plate inner portion 17$b_2$, and the lower frame installation portion 18 in the up to down direction.

Here, a portion located at the same position as that of the frame installation portion in the connection portion between the frame side portion and the frame extension portion is a portion having high rigidity in the seat back frame 1. Accordingly, since the hole portion 15f is formed in the portion deviated from the portion located at the same position as that of the frame installation portion, the hole portion 15f may be easily deformed when the impact load is applied thereto.

Further, as illustrated in FIG. 48, the hole portion 15f and the like are formed at the portion deviated from the portion overlapping the intermediate plate 17b of the lower frame base portion 17 in the side plate 15a of the side frame 15. More specifically, the hole portion 15f and the like are formed at a position that is present on the side plate 15a when the seat back frame 1 is viewed from the right and left direction and that does not overlap the intermediate plate 17b of the lower frame base portion 17. That is, the hole portion 15f and the like are formed above the upper end (the position indicated by the dotted line in FIG. 49) of the lower frame base portion 17.

The overlapping portion between the side plate 15a of the side frame 15 and the lower frame base portion 17 particularly has high rigidity, and when the portion is provided with the hole portion 15f and the like, there is a case in which the hole portion 15f and the like are not easily sufficiently deformed even when the impact load is applied thereto. In contrast, as described above, since the hole portion 15f and the like are formed at the position that is present on the side plate 15a and does not overlap the intermediate plate 17b of the lower frame base portion 17, the hole portion 15f and the like are easily deformed when the impact load is applied thereto. As a result, the side frame 15 may be more easily deformed, and hence the impact energy may be effectively absorbed.

Furthermore, in the seventh embodiment, the hole portion 15f and the like are formed at the portion deviated from the overlapping portion of the side airbag unit 80 when viewed in the right and left direction in the side plate 15a of the side frame 15. That is, as illustrated in FIG. 49, the hole portion 15f and the like are formed below the side airbag unit 80. Then, more specifically, the attachment portion 82 provided with the side airbag unit 80 is disposed at the position not overlapping the hole portion 15f and the like when the side frame 15 is viewed from the lateral side in the right and left direction. In this way, since the hole portion 15f and the like are provided below the attachment portion 82 of the side airbag unit 80, the side frame 15 and the side airbag unit 80 are easily inclined rearward at the upper side of the fragile portion upon a rear end collision so that the impact energy may be efficiently absorbed.

Figure 50:
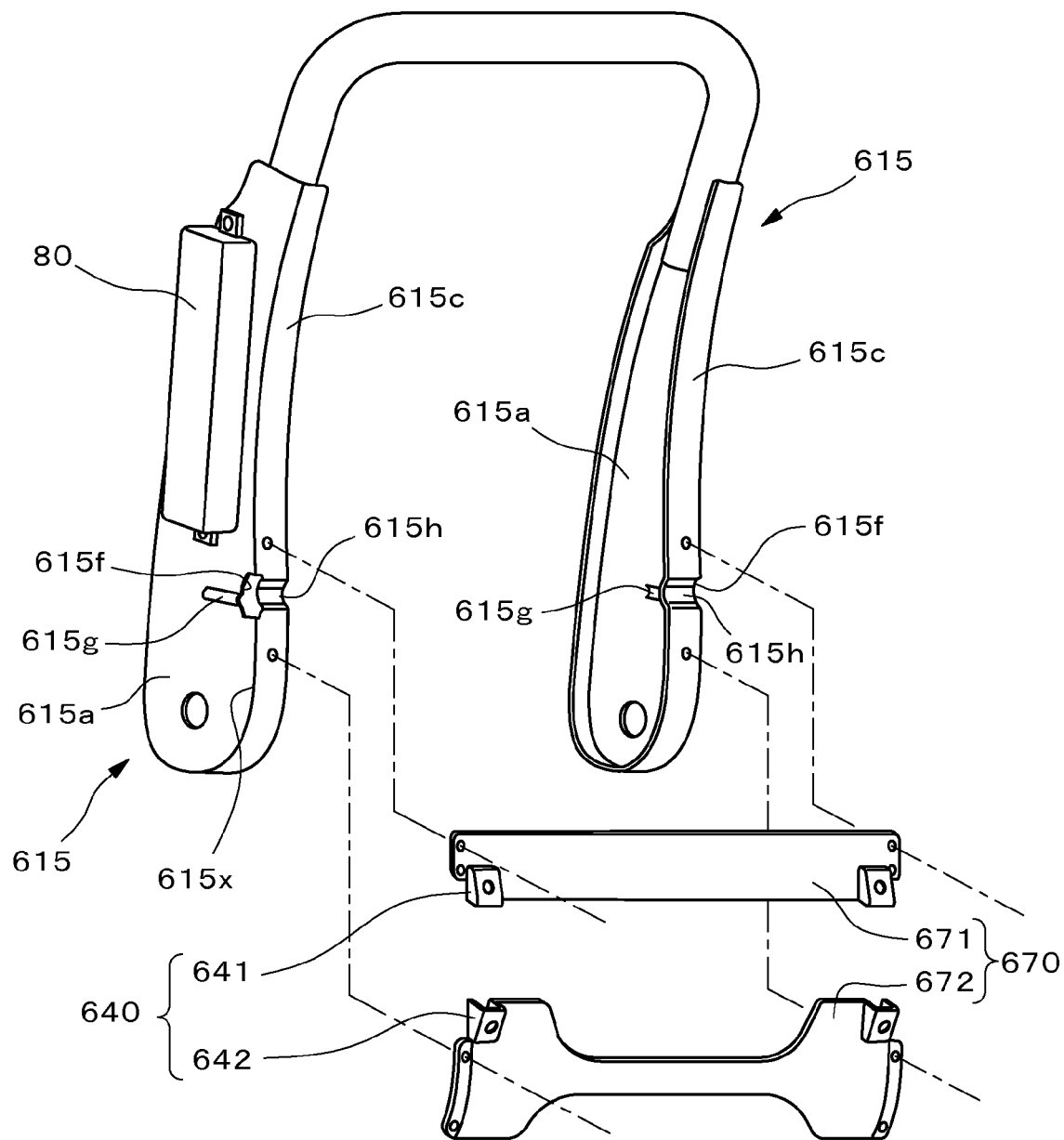
FIG. 50 is a partially assembled perspective view diagram illustrating a seat back frame according to a modified example of the seventh embodiment of the present invention.

Incidentally, as the configuration according to the seventh embodiment, in the configuration illustrated in FIGS. 47 to 49, the regulation portions 40 are provided in the side frame 15. However, as illustrated in FIG. 50, a side frame 615 may be provided with a separate frame (an installation frame 670) having regulation portions 640. In such a modified example, the side frame 615 includes a side plate 615a and a rear edge portion 615c, and a lateral fragile portion 615g and an inward fragile portion 615h are respectively formed on the side plate 615a and the rear edge portion 615c. Furthermore, in the modified example, the lower end of the side frame 615 and the installation frame 670 constitute the lower frame, the side plate 615a of the side frame 615 corresponds to the frame side portion, and the rear edge portion 615c of the side frame 615 corresponds to the frame extension portion. Further, a connection portion 615x between the side plate 615a and the rear edge portion 615c is provided with a hole portion 615f.

Then, the regulation portions 640 are formed at positions sandwiching the inward fragile portion 615h formed in the rear edge portion 615c in the up to down direction. More specifically, an upper installation frame 671 provided with a first regulation portion 641 and a lower installation frame 672 provided with a second regulation portion 642 are locked to the rear edge portion 615c of the side frame 615 so that the inward fragile portion 615h is sandwiched between the regulation portions 640. The installation frame 670 that includes the upper installation frame 671 and the lower installation frame 672 corresponds to the frame installation portion described herein. Then, the upper installation frame 671 and the lower installation frame 672 are disposed at positions sandwiching the hole portion 615f, the lateral fragile portion 615g, and the inward fragile portion 615h, and are formed at the portions deviated from the portion located at the same position as that of the hole portion 615f in the up to down direction when at least the side frame 615 is viewed from the right and left direction.

As described above, since the pair of side frames 615 disposed separated from each other in the right and left direction is connected by the installation frame 670, even when the impact load is applied to the side frames 615 in the complex direction, the respective side frames 615 are not independently deformed, but the pair of side frames 615 is easily deformed together. Accordingly, the deformation behavior of the side frames 615 with respect to the impact load may be easily controlled.

Figure 51:
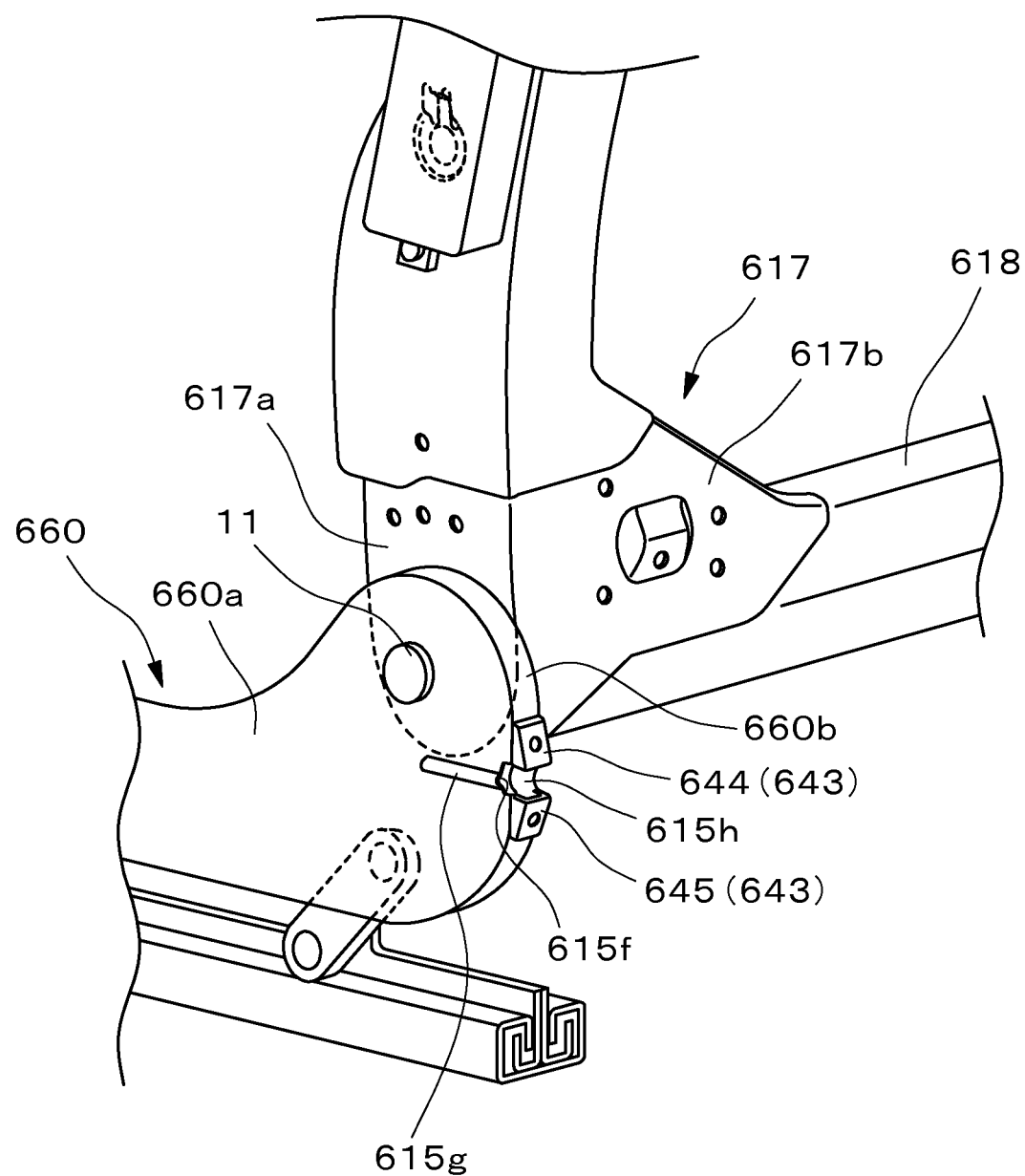
FIG. 51 is an explanatory perspective view diagram illustrating the vicinity of a seat frame according to another modified example of the seventh embodiment of the present invention.

Further, in the configuration illustrated in FIGS. 47 to 50, the side frames 15 and 615 are respectively provided with the deformation portions such as the hole portions 15f and 615f, the lateral fragile portions 15g and 615g, and the inward fragile portions 15h and 615h, but as illustrated in FIG. 51, the deformation portion may be formed in a seat base side frame 660 constituting the seat frame 2.

More specifically, the seat base side frame 660 includes at least a side plate 660a that extends in the front to back direction and a rear edge portion 660b that is bent toward the inside in the right and left direction from the rear end of the side plate 660a. A connection portion between the side plate 660a and the rear edge portion 660b is provided with the hole portion 615f, and the side plate 660a is provided with the lateral fragile portion 615g that extends from the hole portion 615f. Further, the rear edge portion 660b is provided with the inward fragile portion 615h that extends from the hole portion 615f.

The hole portion 615f, the lateral fragile portion 615g, and the inward fragile portion 615h (hereinafter, referred to as the hole portion 615f and the like) are formed below the height range in which the lower frame installation portion 618 is installed in the lower frame base portion 617. Further, at this time, the hole portion 615f and the like may be formed below the reclining mechanism 11 provided in the side plate 660a. In this way, since the hole portion 615f and the like are provided below the lower frame base portion 617, the lower frame installation portion 618, and the reclining mechanism 11, a portion having high rigidity is disposed above the hole portion 15f and the like. As a result, since the seat back frame 1 may be easily and integrally inclined rearward when the impact load is applied to the seat frame F, the impact energy may be efficiently absorbed.

Configuration of Vehicle Seat of Eighth Embodiment

Next, a vehicle seat according to an eighth embodiment of the present invention will be described with reference to FIGS. 52 to 56. FIGS. 52 to 56 are involved with the eighth embodiment of the present invention. Furthermore, in the eighth embodiment, the same reference numerals will be given to the same components and arrangements as those of the first to seventh embodiments and the detailed description thereof will not be repeated.

Figure 52:
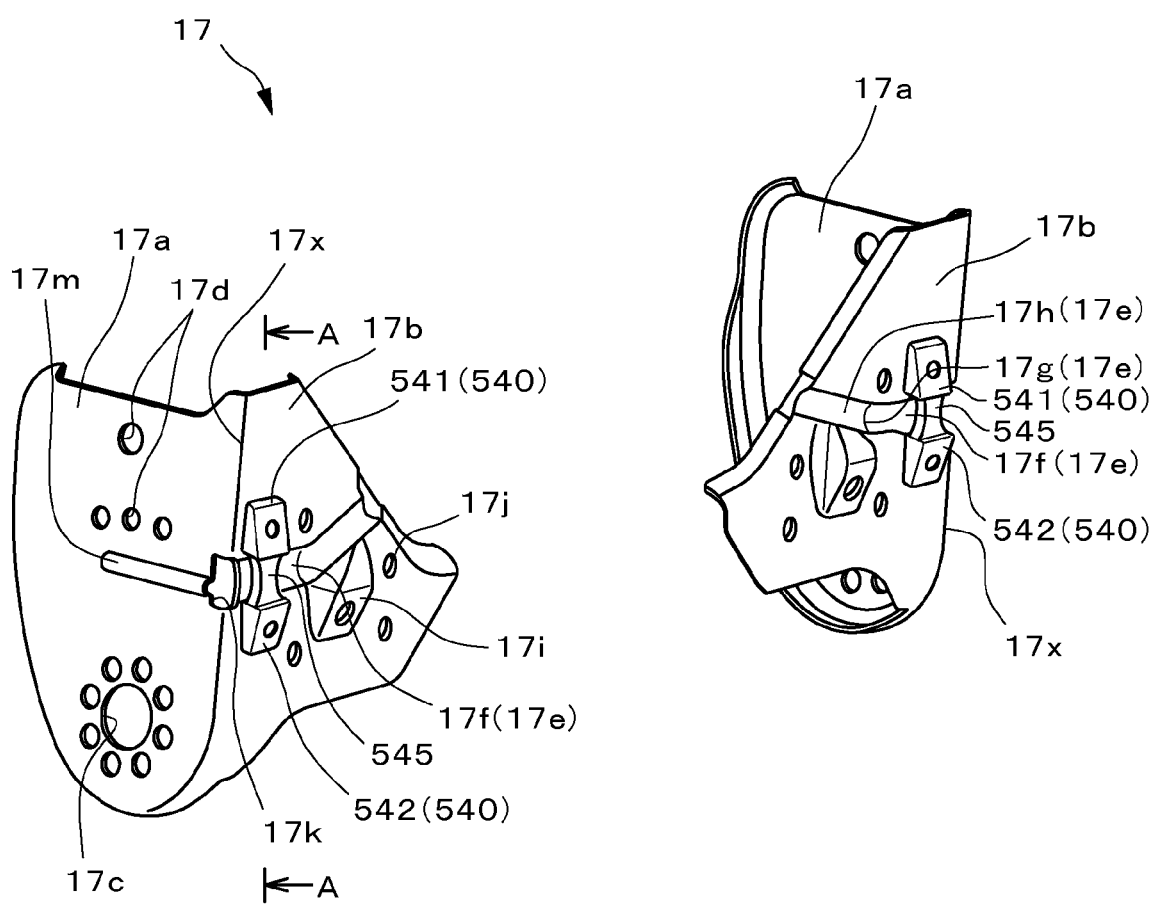
FIG. 52 is a schematic perspective view illustrating a lower frame base portion according to an eighth embodiment of the present invention.
Figure 53:
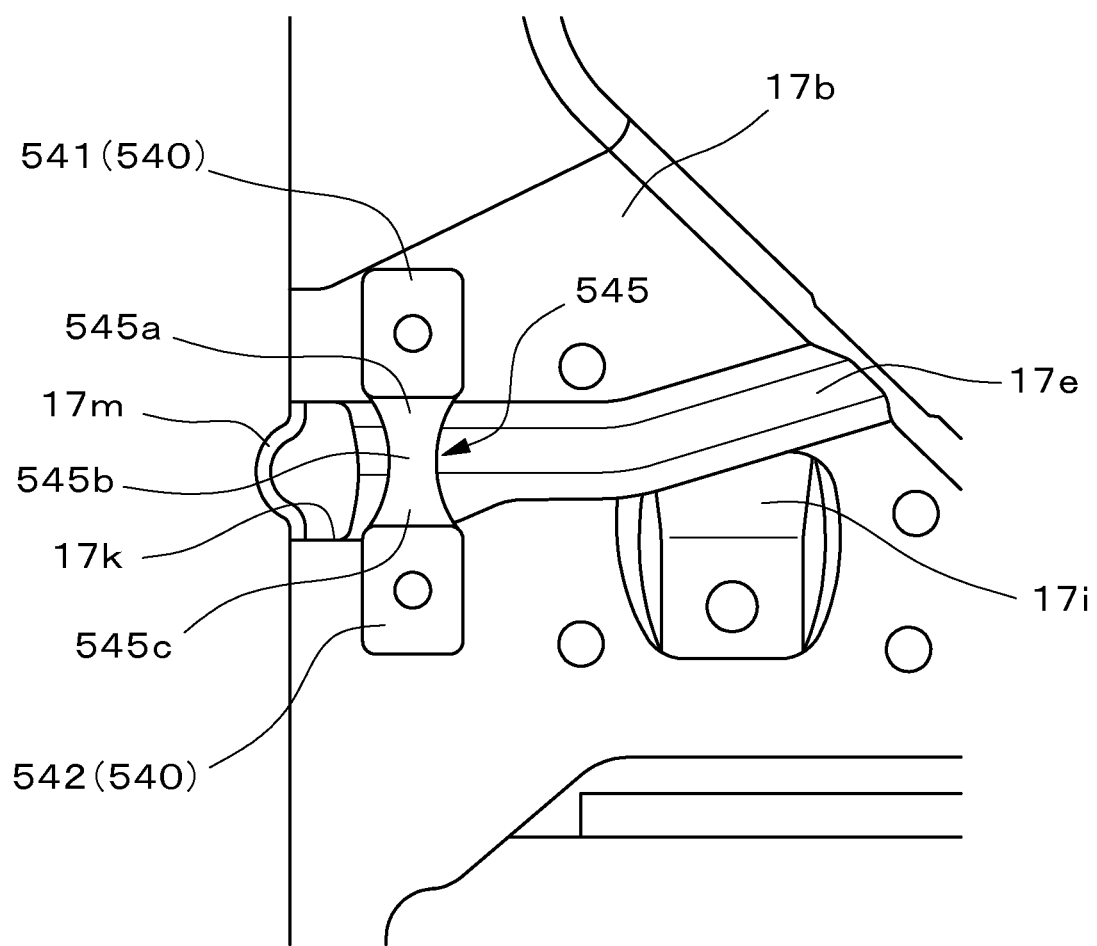
FIG. 53 is a schematic front view illustrating regulation portions according to the eighth embodiment of the present invention.

In the eighth embodiment, a first regulation portion 541 and a second regulation portion 542 are connected by a regulation portion connecting portion 545. More specifically, as illustrated in FIGS. 52 and 53, the rear surface of the intermediate plate 17b of the lower frame base portion 17 is provided with regulation portions 540 (more specifically, a first regulation portion 541 and a second regulation portion 542) that are disposed at positions sandwiching a part of the inward fragile portion 17e. As in the regulation portions 40 according to the second to seventh embodiments, the regulation portions 540 are provided to regulate the deformation amount when the inward fragile portion 17e is crushed in the up to down direction so that the seat back frame 1 is deformed to be inclined rearward.

The regulation portions 540 according to the eighth embodiment include a first regulation portion 541 and a second regulation portion 542 that respectively include a regulation surface 541a and 542a disposed at positions sandwiching the inward fragile portion 17e to face each other. Then, the regulation portions 540 that include the first regulation portion 541 and the second regulation portion 542 disposed to face each other in the up to down direction include the regulation surfaces 541a and 542a which are respectively provided at the positions sandwiching the inward fragile portion 17e. The distance between the two regulation surfaces 541a and 542a is set to be larger than the width of the inward fragile portion 17e in the height direction, that is, the width sandwiched between the first regulation portion 541 and the second regulation portion 542.

Then, in the eighth embodiment, the first regulation portion 541 and the second regulation portion 542 are connected to each other at the regulation portion connecting portion 545. The regulation portion connecting portion 545 is a flexible plate-shaped member that is disposed between the regulation surface 541a of the first regulation portion 541 and the regulation surface 542a of the second regulation portion 542. That is, the regulation portion connecting portion 545 is used to define a positional relation of the regulation portions 540, and when the first regulation portion 541 and the second regulation portion 542 are disposed at positions sandwiching a part of the inward fragile portion 17e, the regulation portion connecting portion 545 is disposed in an astride state over the inward fragile portion 17e as illustrated in FIG. 53.

As described above, when the first regulation portion 541 and the second regulation portion 542 are connected to each other by the regulation portion connecting portion 545, a positional relation of the regulation portions 540 is set in advance when attaching the first regulation portion 541 and the second regulation portion 542 to the positions sandwiching a part of the inward fragile portion 17e. Accordingly, as not in the case where the first regulation portion 541 and the second regulation portion 542 are individually attached, that is, one regulation portion 540 is attached and then the other regulation portion 540 is attached, there is no need to attach the regulation portions 540 while adjusting a positional relation between the regulation portions 540, and hence the first regulation portion 541 and the second regulation portion 542 may be easily attached. Furthermore, the assembling workability is also improved.

Here, when the first regulation portion 541 and the second regulation portion 542 are integrally molded with the regulation portion connecting portion 545, these components are handled as a single component. Accordingly, compared to the case where the regulation portion connecting portion 545 is provided separately from the first regulation portion 541 and the second regulation portion 542, the component obtained by the combination of the first regulation portion 541, the second regulation portion 542, and the regulation portion connecting portion 545 may be provided as a compact size. Further, when the first regulation portion 541 and the second regulation portion 542 are integrally molded with the regulation portion connecting portion 545, the regulation portion connecting portion 545 corresponds to the portion obtained by extending a part of the regulation portions 540, and hence the rigidity of the regulation portions 540 is also improved.

Furthermore, the regulation portion connecting portion 545 is not limited to the configuration in which the regulation portion connecting portion is integrally molded with the first regulation portion 541 or the second regulation portion 542, but may be formed separately from the first regulation portion 541 or the second regulation portion 542. Also, the regulation portion connecting portion may be formed of a material different from that of the first regulation portion 541 or the second regulation portion 542. Further, the regulation portion connecting portion is not limited to the plate-shaped member as long as the regulation portion connecting portion may connect the first regulation portion 541 to the second regulation portion 542. For example, a wire member such as a wire or a bar-shaped member may be also used. Further, in order to decrease the weight, a hole may be formed in the regulation portion connecting portion 545.

Regarding the outer shape of the regulation portion connecting portion 545, as illustrated in FIGS. 52 and 53, the regulation portion connecting portion is formed in a rectangular shape in the side view and is formed in a constricted shape in the front view. That is, the regulation portion connecting portion 545 includes one end 545a that is located near the first regulation portion 541, the other end 545c that is located near the second regulation portion 542, and a center portion 545b that is located between one end 545a and the other end 545c, and the center portion 545b is constricted and has a width narrower than the width of each of one end 545a and the other end 545c in the right and left direction.

Figure 54:
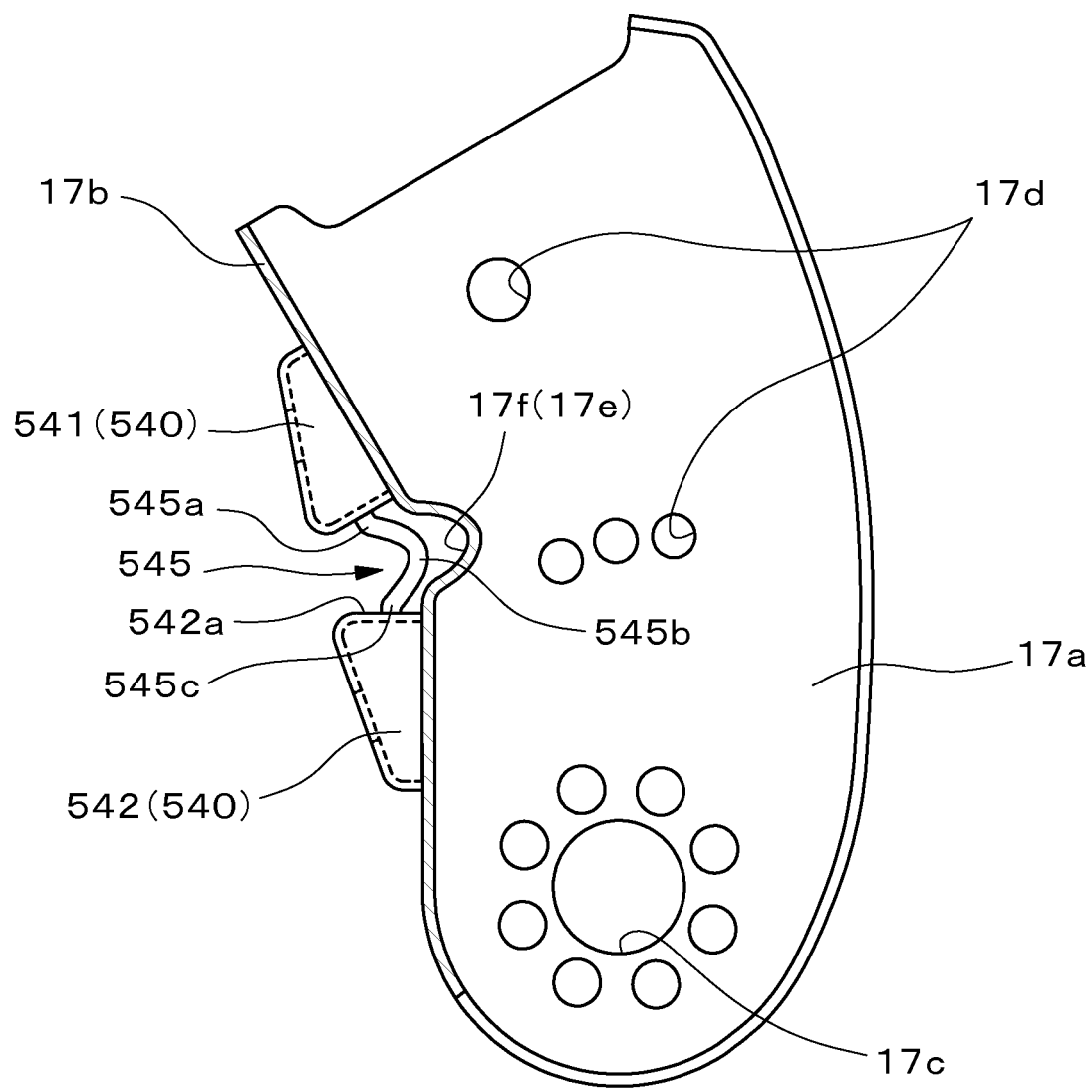
FIG. 54 is an explanatory side view diagram illustrating a state of a lower frame base portion according to the eighth embodiment of the present invention after a rear end collision occurs.

Then, when the first regulation portion 541 and the second regulation portion 542 are disposed at positions sandwiching a part of the inward fragile portion 17e, a part of the inward fragile portion 17e faces the center portion 545b. Here, since the center portion 545b is narrower than the other portion, the rigidity is lower than that of the other portion. Since the center portion 545b faces the inward fragile portion 17e, when the inward fragile portion 17e is deformed as illustrated in FIG. 54, the center portion 545b is also bent. In this way, when the inward fragile portion 17e is deformed, the center portion 545b of the regulation portion connecting portion 545 is also deformed, and the influence of the regulation portion connecting portion 545 on the deformation of the inward fragile portion 17e is reduced so that the inward fragile portion 17e may be smoothly deformed.

Furthermore, in order to form the fragile portion near the regulation portion connecting portion 545, the width of the center portion 545b is set to be narrower than the width of one end 545a or the other end 545c, and also there is a method of forming the connection portion lateral fragile portion. For example, the thickness of the portion as the connection portion lateral fragile portion may be smaller than that of the other portion. Further, as the shape in which the width of the center portion 545b in the right and left direction is narrower than the width of one end 545a or the other end 545c, a configuration may be employed in which a hole may be formed in the center portion 545b other than the shape in which the center portion 545b is constricted.

Further, the regulation portion connecting portion 545 is disposed at the position deviated from the position facing the hole portion 17k connected to the inward fragile portion 17e in the right and left direction, that is, the position not facing the hole portion 17k. In the configuration in which the inward fragile portion 17e and the hole portion 17k are arranged in parallel, when the impact load is applied to the seat back frame, the hole portion 17k is first deformed as a deformation starting point, and then the deformation is transmitted to the inward fragile portion 17e. In such a configuration, when the regulation portion connecting portion 545 is disposed at the position not facing the hole portion 17k, the influence of the regulation portion connecting portion 545 on the deformation of the hole portion 17k is reduced so that the hole portion 17k may be smoothly deformed.

Further, in a state where the regulation portion connecting portion 545 is disposed at the above-described position, the portion located near the hole portion 17k, that is, the outer ridge line in the right and left direction in the outer edge of the regulation portion connecting portion 545 and the portion located near the regulation portion connecting portion 545, that is, the boundary line with the inward fragile portion 17e in the outer edge of the hole portion 17k are formed in a circular-arc shape substantially having the same curvature. In this way, when the portion located near the hole portion 17k in the outer edge of the regulation portion connecting portion 545 and the portion located near the regulation portion connecting portion 545 in the outer edge of the hole portion 17k are formed to follow each other, it is possible to more effectively prevent the regulation portion connecting portion 545 from facing the hole portion 17k, and hence to further reduce the influence of the regulation portion connecting portion 545 on the deformation of the hole portion 17k.

Figure 55:
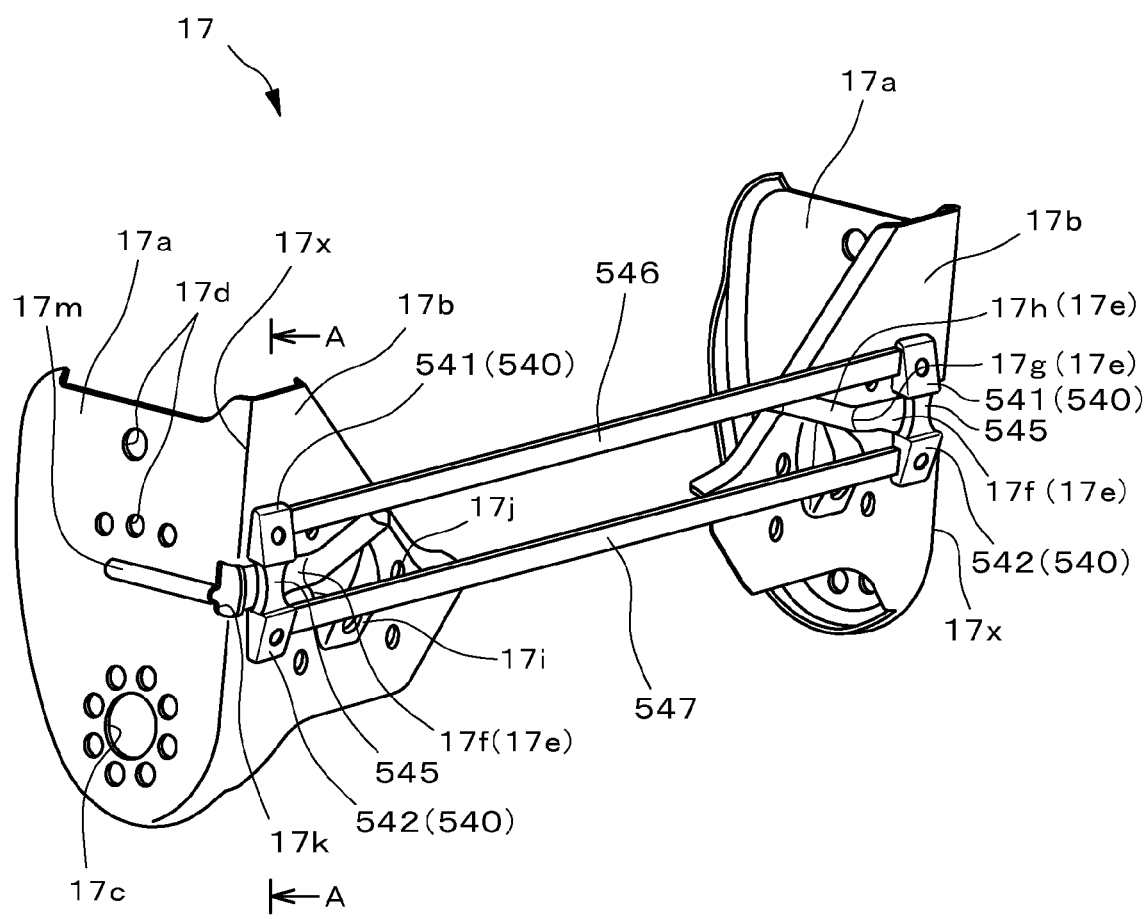
FIG. 55 is a schematic perspective view illustrating a lower frame base portion according to a modified example of the eighth embodiment of the present invention.
Figure 56:
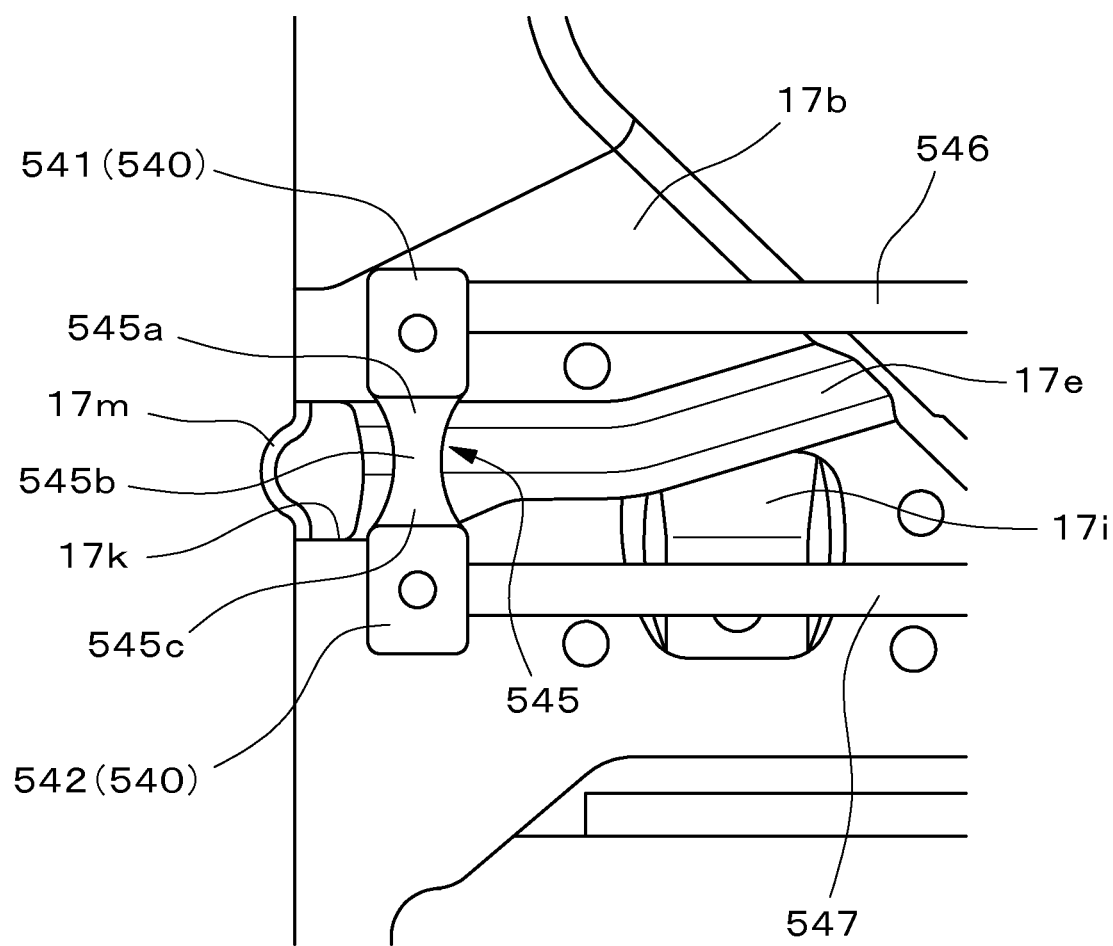
FIG. 56 is a schematic front view illustrating a regulation portion according to a modified example of the eighth embodiment of the present invention.

Incidentally, in the configuration illustrated in FIGS. 52 and 53, the right and left lower frame base portions 17 are respectively provided with the deformation portion such as the hole portion 17k and the regulation portions 540 (specifically, the first regulation portion 541 and the second regulation portion 542), and two regulation portions 540 are formed to be separated from each other in the right and left direction. However, as illustrated in FIGS. 55 and 56, the right and left regulation portions 540 may be connected to each other. That is, in the configuration illustrated in FIGS. 55 and 56, another regulation portion connecting portions 546 and 547 connecting the first regulation portions 541 or the second regulation portions 542 to each other are further provided other than the regulation portion connecting portion 545 connecting the first regulation portion 541 and the second regulation portion 542 to each other in the up to down direction. The another regulation portion connecting portions 546 and 547 are plate-shaped members that connect the regulation portions 540 to each other in the right and left direction, and are bonded to the respective regulation portions 540 at the end surfaces in the right and left direction.

As described above, when the regulation portions 540 that are separated into the right and left portions are connected by another regulation portion connecting portions 546 and 547, there is no need to adjust a positional relation between the regulation portions 540, and hence the regulation portions 540 may be easily attached. Thus, the assembling workability is further improved. Furthermore, another regulation portion connecting portions 546 and 547 are disposed at the position deviated from the position facing the hole portion 17k and the inward fragile portion 17e in the up to down direction. Thus, it is possible to reduce the influence of another regulation portion connecting portions 546 and 547 on the deformation of the hole portion 17k or the inward fragile portion 17e, and hence to smoothly deform the hole portion 17k and the inward fragile portion 17e.

Furthermore, another regulation portion connecting portions 546 and 547 may be integrally molded with the first regulation portion 541 or the second regulation portion 542 or may be provided as separate members. Further, another regulation portion connecting portions 546 and 547 may be formed of a material different from that of the first regulation portion 541 or the second regulation portion 542. Further, another regulation portion connecting portion is not limited to the plate-shaped member as long as the regulation portions 540 are connected to each other by the another regulation portion connecting portions. For example, a wire member such as a wire or a bar-shaped member may be also used. Further, in order to decrease the weight, a hole may be formed in another regulation portion connecting portions 546 and 547.

Configuration of Vehicle Seat of Ninth Embodiment

Figure 57:
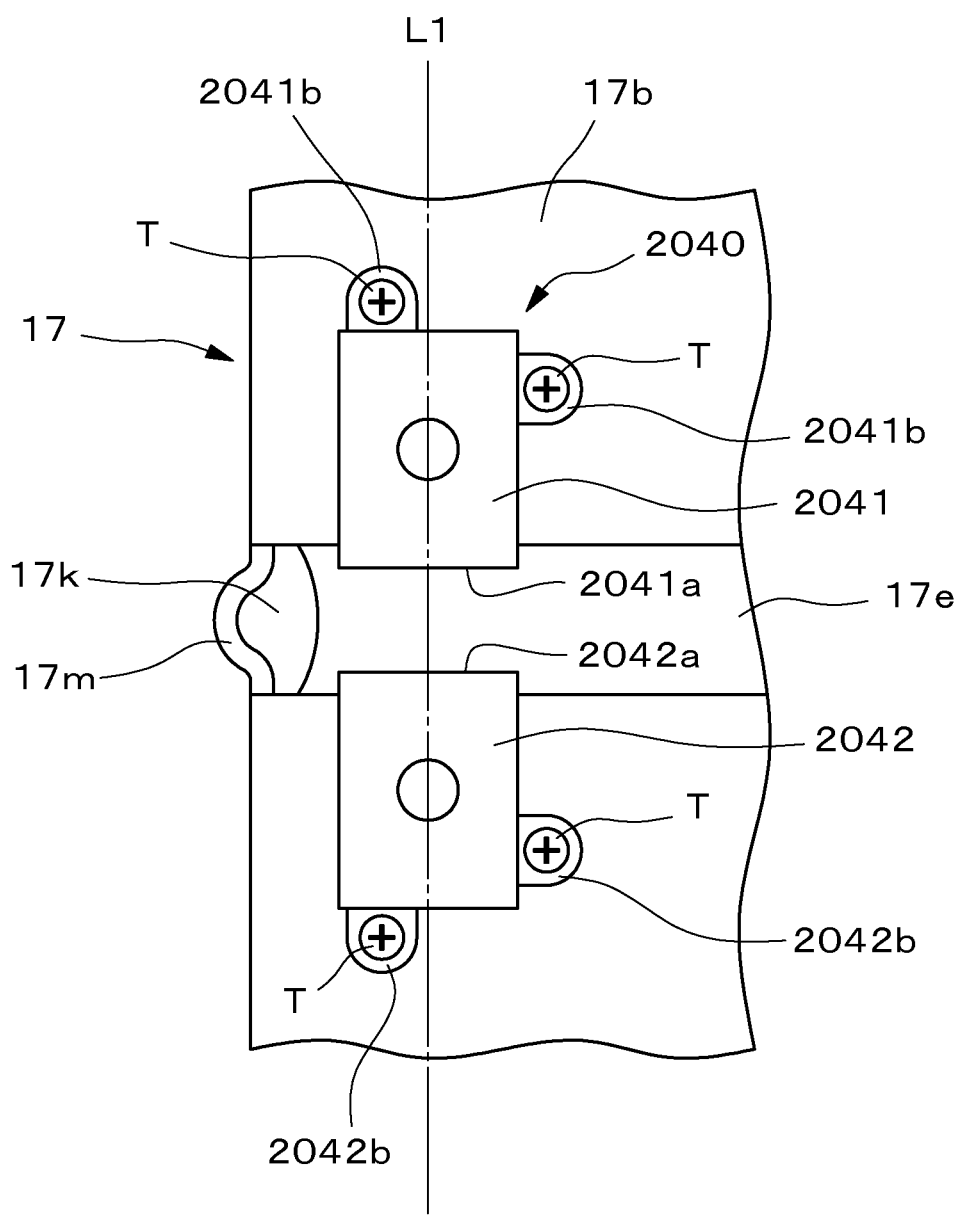
FIG. 57 is a schematic front view diagram illustrating regulation portions according to a ninth embodiment of the present invention and the vicinity thereof.

Next, a vehicle seat according to a ninth embodiment of the present invention will be described with reference to FIGS. 57 to 62. FIGS. 57 to 62 are involved with the ninth embodiment of the present invention, where FIG. 57 is a schematic diagram illustrating the regulation portion and the periphery thereof. Further, FIGS. 58 to 62 are explanatory diagrams of a regulation portion according to a modified example of the ninth embodiment. Furthermore, in the ninth embodiment, the same reference numerals will be given to the same components and arrangements as those of the first to eighth embodiments and the detailed description thereof will not be repeated.

As described in the section of the third embodiment, the regulation portions 340 may be attached to the lower frame base portion 17 by the fastening member such a screw or a bolt. In the ninth embodiment, regulation portions 2040 having the same functions as those of the regulation portions 340 according to the third embodiment are detachably attached to the lower frame base portion 17 by using fastening members T.

More specifically, in the ninth embodiment, a first regulation portion 2041 and a second regulation portion 2042 are attachable to or detachable from the intermediate plate 17b of the lower frame base portion 17, and are attached to a predetermined position of the intermediate plate 17b by the fastening members T such as nuts, screws, and bolts as illustrated in FIG. 57. In this way, when the regulation portions 2040 are attachable to or detachable from the seat back frame 1, the regulation portions 2040 may be arbitrarily detached in accordance with a change in the design of the vehicle seat S. Further, when the regulation portions is attached to the seat back frame 1, the regulation portions may be comparatively easily attached thereto by the fastening members T. Furthermore, the present invention is not limited to the configuration in which the fastening members T are used to attach the regulation portions 2040, and a member other than the fastening members T may be used as long as the member is used to attach or detach the regulation portions 2040 to or from the seat back frame 1. For example, a snap-fitting mechanism may be used.

Further, in the configuration of using the fastening members T in order to attach the first regulation portion 2041 and the second regulation portion 2042, the first regulation portion 2041 and the second regulation portion 2042 are provided with holding portions 2041b and 2042b that are used to hold (set) the fastening members T. Since the holding portions 2041b and 2042b are formed, the rigidity of each of the first regulation portion 2041 and the second regulation portion 2042 may be improved.

Incidentally, in the ninth embodiment, the attachment positions of the regulation portions 2040 in the seat back frame 1 are set to appropriate positions to not influence on the deformation of the hole portion 17k and the inward fragile portion 17e. Specifically, as illustrated in FIG. 57, the first regulation portion 2041 and the second regulation portion 2042 respectively include two holding portions 2041b and 2042b that are provided at the opposite side of the regulation surfaces 2041a and 2042a. The first regulation portion 2041 and the second regulation portion 2042 are attached to the intermediate plate 17b of the lower frame base portion 17 while sandwiching a part of the inward fragile portion 17e. At this time, the first regulation portion 2041 and the second regulation portion 2042 are respectively attached to the positions deviated from the positions where the holding portions 2041b and 2042b overlap the inward fragile portion 17e. Thus, the inward fragile portion 17e may be smoothly deformed without the influence of the fastening members T when the impact load generated upon a rear end collision or the like is applied to the seat back frame.

More specifically, in the two holding portions 2041b and the two holding portions 2042b respectively provided in the first regulation portion 2041 and the second regulation portion 2042, one-side holding portions 2041b and 2042b are located at the opposite side to the inward fragile portion 17e in the up to down direction. Thus, it is possible to further reduce the influence of the regulation portions 2040 attached to the seat back frame 1 with respect to the deformation of the inward fragile portion 17e.

Further, in the holding portions 2041b and 2042b, the other-side holding portions 2041b and 2042b are located at the opposite side to the hole portion 17k (the hole portion 17k at the closer side) in the right and left direction. That is, the fastening members T that are held by the other-side holding portions 2041b and 2042b fasten the portion located at the opposite side to the hole portion 17k in the respective regulation portions 2040 to the seat back frame 1. The portion located at the opposite side to the hole portion 17k indicates the portion located at the opposite side to the hole portion 17k when viewed from the center line (the imaginary line indicated by the symbol L1 in FIG. 57) in the right and left direction of the respective regulation portions 2040. In this way, when the portion located at the opposite side to the hole portion 17k in the respective regulation portions 2040 is fastened to the seat back frame 1 by the fastening members T, it is possible to smoothly deform the seat back frame 1 by using the hole portion 17k as a deformation starting point, and hence to immediately absorb the impact energy.

Furthermore, when the fastening members T that fasten the portion opposite to the hole portion 17k in the regulation portions 2040 fasten the portion opposite to the inward fragile portion 17e to the seat back frame 1, it is possible to further reduce the influence on the deformation of the inward fragile portion 17e.

Figure 58:
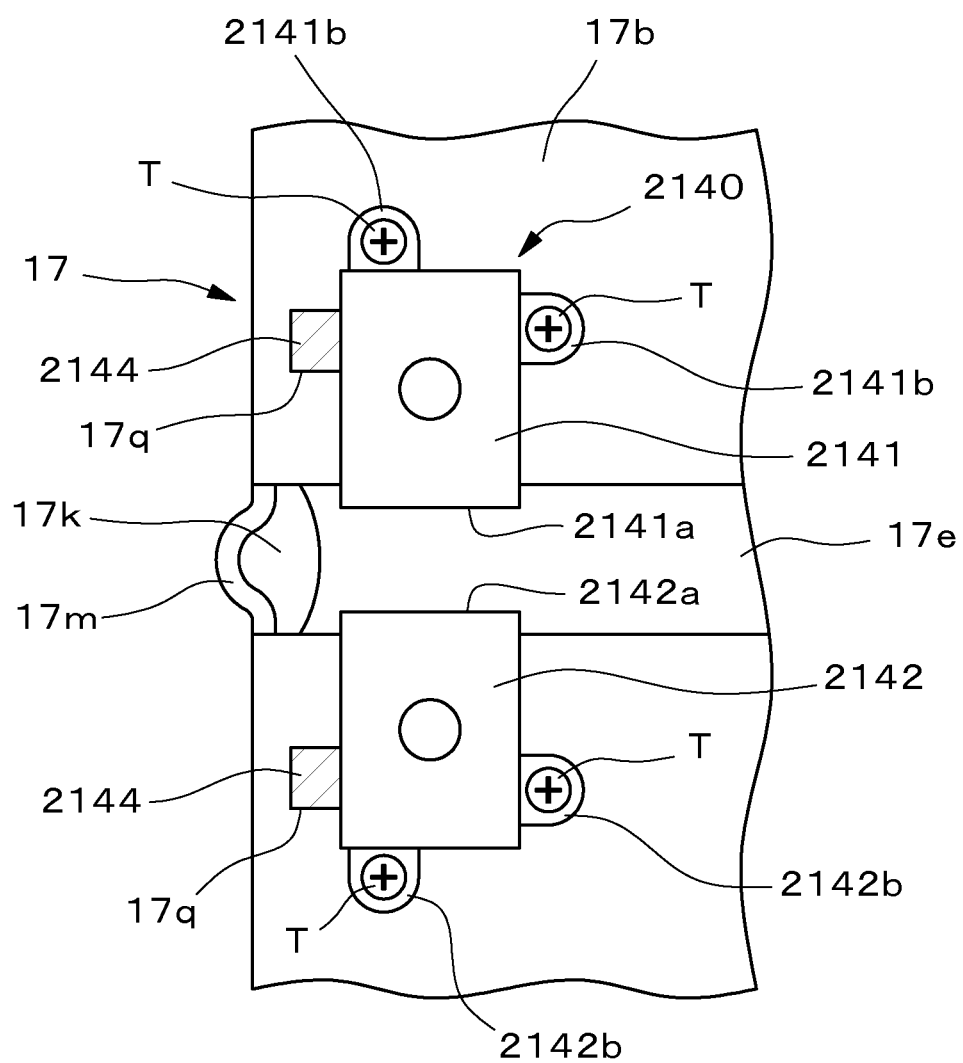
FIG. 58 is an explanatory front view diagram illustrating regulation portions according to a modified example of the ninth embodiment of the present invention.

Incidentally, in the configuration illustrated in FIG. 57, the operation of positioning and attaching the regulation portions 2040 to the seat back frame 1 is performed only by the fastening members T, but the present invention is not limited thereto. For example, as illustrated in FIG. 58, the positioning portions for the respective regulation portions 2140 may be formed separately from the fastening members T. Specifically, the intermediate plate 17b of the lower frame base portion 17 is provided with a positioning concave portion 17q as a positioning portion that is used to position the regulation portions 2140 to the seat back frame 1. Each regulation portion 2140 is provided with an engagement convex portion 2144 that engages with the positioning concave portion 17q when the regulation portion 2140 is positioned with respect to the seat back frame 1. The engagement convex portion 2144 is provided at the side portion of each regulation portion 2140, and slightly protrudes in relation to the bottom surface of each regulation portion 2140 facing the intermediate plate 17b of the lower frame base portion 17.

In the above-described configuration, when attaching the regulation portion 2140 to the seat back frame 1, the engagement convex portion 2144 of the regulation portion 2140 first engages with the positioning concave portion 17q of the seat back frame 1. Thus, the regulation portion 2140 is positioned with respect to the seat back frame 1, and then the regulation portion 2140 is fastened to a predetermined position of the seat back frame 1 by the fastening members T. In this way, since the portion for positioning the regulation portion 2140 is provided separately from the fastening members T, the regulation portion 2140 may be reliably and easily attached to the accurate attachment position.

Furthermore, the formation positions and the number of the engagement convex portions 2144 are not limited to the configuration illustrated in FIG. 58, and may be arbitrarily set as long as the engagement convex portion is deviated from the formation position of the hole portion 17k or the inward fragile portion 17e when attaching the regulation portion 2140 to the seat back frame 1. Further, in the above-described configuration, the regulation portion 2140 is provided with the engagement convex portion 2144 and the seat back frame 1 is provided with the positioning concave portion 17q. However, a configuration opposite to such a configuration, that is, a configuration in which the seat back frame 1 is provided with the convex portion and the regulation portion 2140 is provided with a concave portion may be employed.

Figure 59:
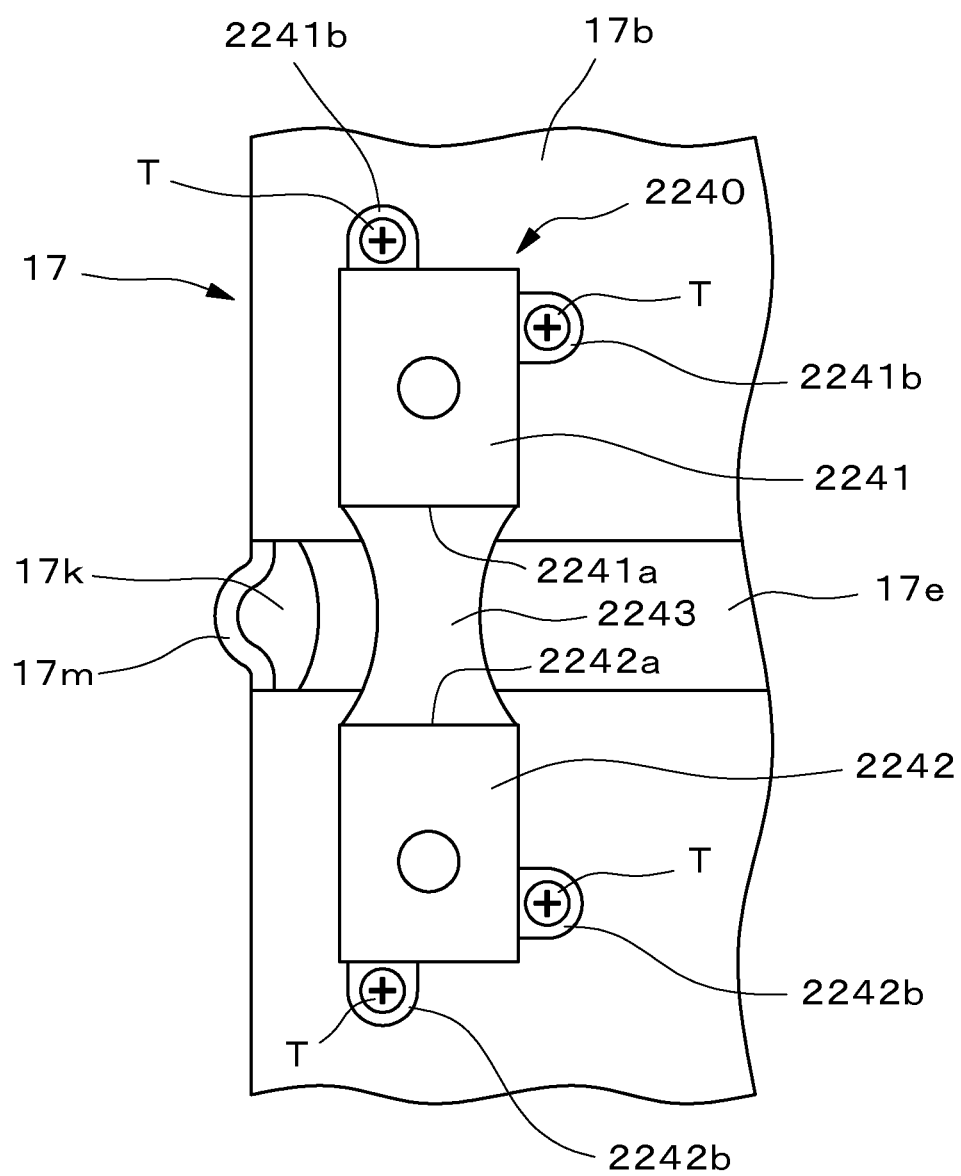
FIG. 59 is an explanatory front view diagram illustrating regulation portions according to a modified example of the ninth embodiment of the present invention.

Further, in the configuration illustrated in FIG. 57, the first regulation portion 2041 and the second regulation portion 2042 are separated from each other. However, as illustrated in FIG. 59, the regulation portions may be disposed while being connected to each other by the regulation portion connecting portion 2243. Here, the regulation portion connecting portion 2243 is a flexible plate-shaped member that is disposed between a regulation surface 2241a of a first regulation portion 2241 and a regulation surface 2242a of a second regulation portion 2242. That is, the regulation portion connecting portion 2243 is used to define a positional relation between the facing portions, and faces the inward fragile portion 17e as illustrated in FIG. 59 while the regulation portions 2240 are attached to the seat back frame 1. In this way, when the first regulation portion 2241 is connected to the second regulation portion 2242 by the regulation portion connecting portion 2243, a positional relation between the regulation portions 2240 is set in advance. For this reason, the regulation portions 2240 may be easily attached, and hence the assembling workability is also improved.

Furthermore, the regulation portion connecting portion 2243 is deformed to be bent along with the inward fragile portion 17e during the deformation of the inward fragile portion 17e. If the regulation portion connecting portion 2243 is provided in consideration of this point, the portion deviated from the regulation portion connecting portion 2243 may be fastened to the seat back frame 1 by the fastening members T when attaching the regulation portions 2240 to the seat back frame 1 by the fastening members T. In this way, when the portion deviated from the regulation portion connecting portion 2243 in the regulation portions 2240 is fastened to the seat back frame 1, the influence on the bent deformation of the inward fragile portion 17e and the regulation portion connecting portion 2243 is reduced, and hence the regulation portions 2240 may be attached without disturbing the deformation of the inward fragile portion 17e.

Further, in the configuration illustrated in FIG. 57, the first regulation portion 2041 and the second regulation portion 2042 directly contact each other at the regulation surfaces 2041a and 2042a, but the present invention is not limited thereto. For example, as illustrated in FIG. 60, a configuration may be employed in which impact absorbing cushioning portions 2345 and 2346 are disposed between the regulation surfaces 2341a and 2342a and a first regulation portion 2341 and a second regulation portion 2342 respectively contact each other through the cushioning portions 2345 and 2346.

Figure 60:
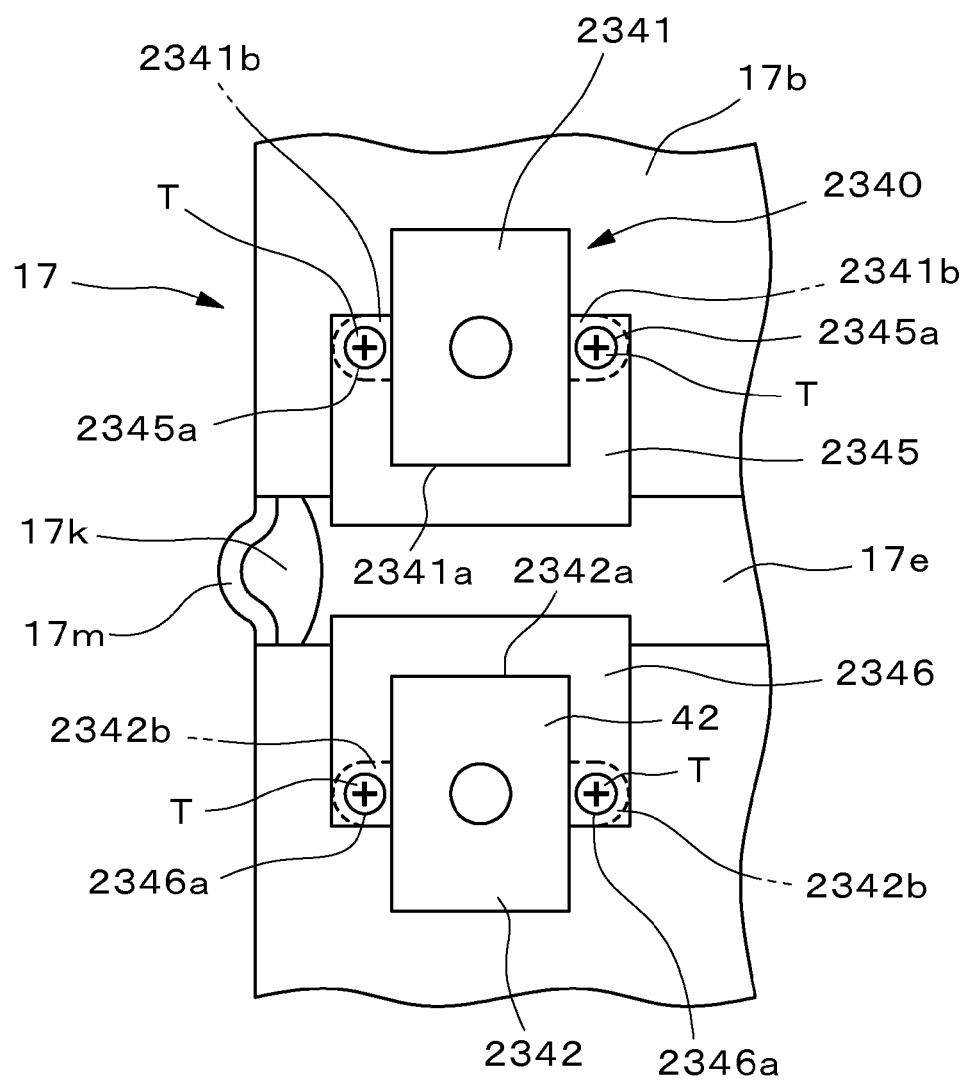
FIG. 60 is an explanatory front view diagram illustrating regulation portions according to a modified example of the ninth embodiment of the present invention.

Specifically, the regulation portion 2340 illustrated in FIG. 60 includes a substantially box-shaped cushioning portion 2345 that is assembled while being fitted to the lower portion of the first regulation portion 2341. Since the cushioning portion 2345 is attached to the first regulation portion 2341 to regulate the deformation amount of the hole portion 17k or the inward fragile portion 17e, the contact load generated when the first regulation portion 2341 contacts the second regulation portion 2342 is absorbed. A cushioning portion 2346 having the same configuration and function is attached to the upper portion of the second regulation portion 2342.

Furthermore, the first regulation portion 2341 and the second regulation portion 2342 respectively include the above-described holding portions 2341b and 2342b, and the respective holding portions 2341b and 2342b are provided with setting holes (not illustrated) used to set the fastening members T. The respective cushioning portions 2345 and 2346 are provided with penetration holes 2345a and 2346a. Then, when the corresponding cushioning portions 2345 and 2346 are assembled to the regulation portions 2340, the setting holes near the holding portions 2341b and 2342b overlap the penetration holes 2345a and 2346a near the cushioning portions 2345 and 2346 as illustrated in FIG. 60. When the fastening members T are set in such a state, the cushioning portions 2345 and 2346 corresponding to the respective regulation portions 2340 are simultaneously fixed by the common fastening member T. Thus, compared to the case where the respective regulation portions 2340 and the cushioning portions 2345 and 2346 are individually attached, the operation of attaching the respective regulation portions 2340 may be more easily performed, and hence the number of the fastening members may be reduced.

Figure 61:
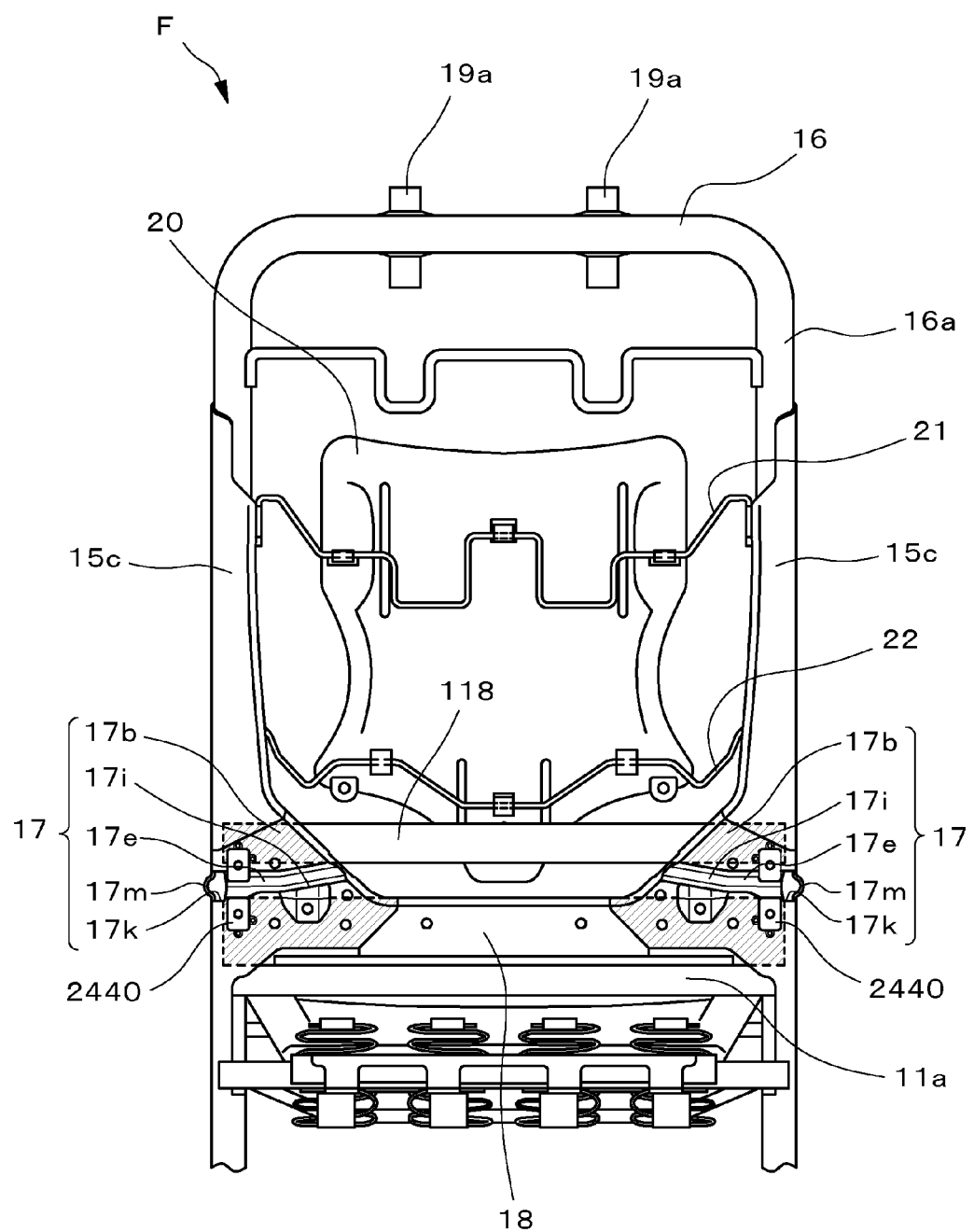
FIG. 61 is an explanatory rear view diagram illustrating regulation portions according to a modified example of the ninth embodiment of the present invention.

Incidentally, it is desirable to attach the fastening member T to the portion having comparatively high rigidity in the seat back frame 1. In the seat back frame 1, a portion exists in which the intermediate plate 17b of the lower frame base portion 17 overlaps the lower frame installation portion 18, and the rigidity of the portion is slightly higher than the rigidity of the other portion. Then, when the fastening member T is attached to the overlapping portion of the intermediate plate 17b and the lower frame installation portion 18 in the seat back frame 1, the regulation portions 2040, 2140, 2240, and 2340 may be appropriately attached to the seat back frame 1. In order to more effectively obtain such an effect, as illustrated in FIG. 61, it is more desirable to employ an arrangement in which another lower frame installation portion 118 is disposed at the upper side of the lower frame installation portion 18 and the fastening members T for the respective regulation portions 2440 are provided in the overlapping portion (the hatching portion in FIG. 61) of the intermediate plate 17b and the respective lower frame installation portions 18 and 118.

Figure 62:
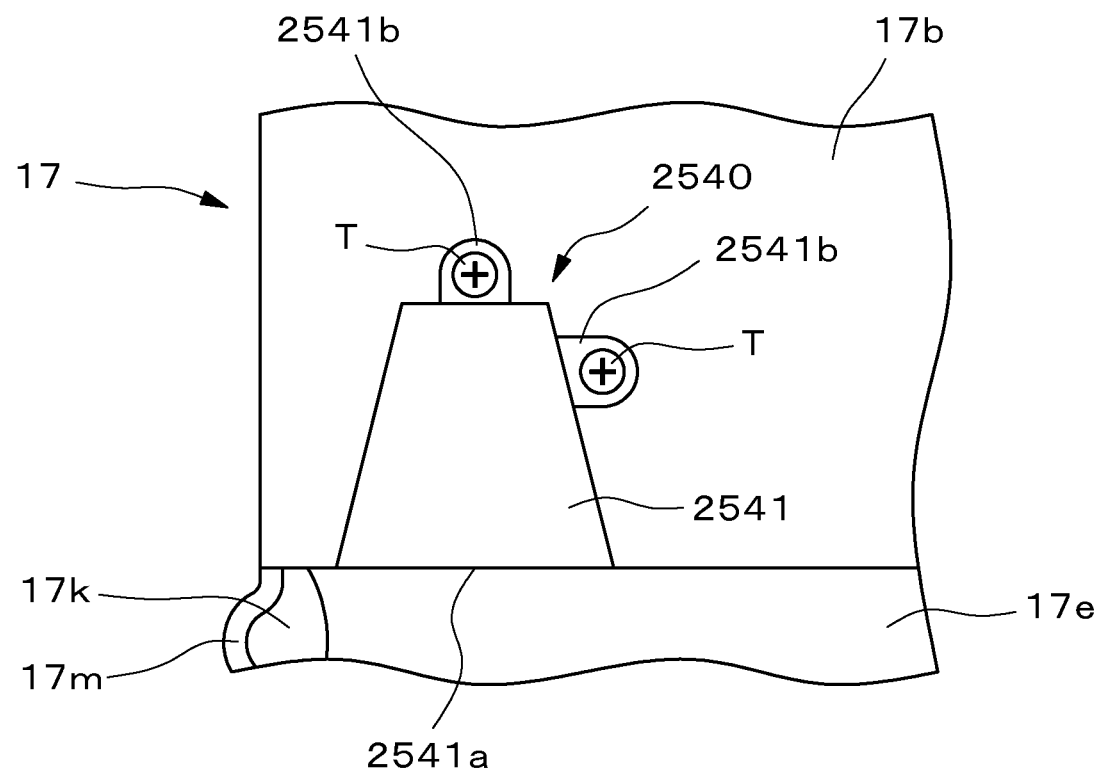
FIG. 62 is an explanatory diagram illustrating regulation portions according to a modified example of the ninth embodiment of the present invention.

Further, in the configuration illustrated in FIG. 57, the respective outer shapes of the first regulation portion 2041 and the second regulation portion 2042 are formed in a rectangular shape in the front view, but may be formed in the other shape. For example, as illustrated in FIG. 62, the outer shape may be a substantially isosceles trapezoid shape in the front view. In the configuration illustrated in FIG. 62, it is desirable that the width of the end near the inward fragile portion 17e of each regulation portion 2540 become the largest so that the regulation portions 2540 may easily contact each other. Further, in the configuration illustrated in FIG. 62, it is desirable that the holding portions 2541b and 2542b of the fastening member T be close to the opposite side to the end having the maximum width, that is, the end having the minimum width in each regulation portion 2540.

Configuration of Vehicle Seat of Tenth Embodiment

Next, a vehicle seat according to a tenth embodiment of the present invention will be described with reference to FIG. 63. Furthermore, in the tenth embodiment, the same reference numerals will be given to the same components and arrangements as those of the first embodiment to ninth embodiments and the detailed description thereof will not be repeated.

In the tenth embodiment, the lower frame base portion 17 is provided with the hole portion 17k as the deformation portion and the inward fragile portion 17e and the lateral fragile portion 17m as other deformation portions, and also the upper frame upright portion 16c disposed in the right and left direction is provided with a fragile portion 16e as a third deformation portion. Further, regulation portions 740 that regulate the deformation amount of the fragile portion 16e are disposed at positions sandwiching a part of the fragile portion 16e. Here, the upper frame upright portions 16c indicate the portions which are disposed separated from each other in the right and left direction to extend from the side frames 15 of the upper frame 16, and the upper end sides (the opposite sides to the seat frame 2) thereof are bridged by the pillar attachment portion 16d.

Figure 63:
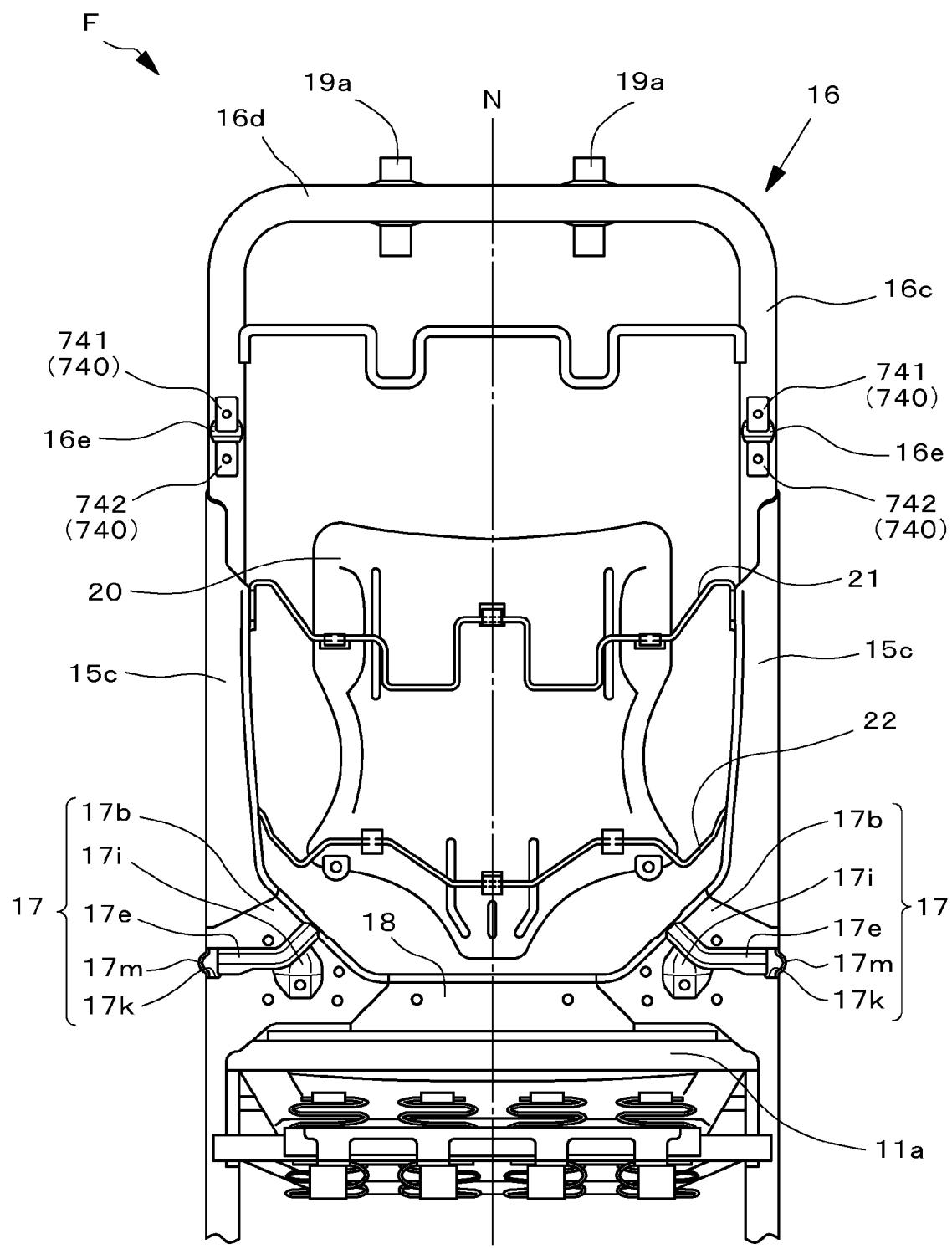
FIG. 63 is a rear view illustrating a seat frame according to a tenth embodiment of the present invention.

The fragile portion 16e is formed by a hole portion, a concave portion, or the like, and is formed by a concave portion having a semi-circular-arc cross-sectional shape that is recessed forward in the configuration illustrated in FIG. 63. Further, the fragile portion 16e is formed to extend toward the inside in the width direction from the position exposed to the upside from the upper end of the side frame 15 in the upper frame upright portion 16c. The fragile portions 16e that are formed in the respective upper frame upright portions 16c are disposed at the same height position based on the horizontal plane in the up to down direction. In other words, in the tenth embodiment, the fragile portions 16e are respectively formed at the symmetrical positions about the center line extending in the up to down direction of the seat back frame 1. With such a configuration, the deformation positions of the upper frame upright portions 16c may be easily controlled when the impact load is applied to the seat back frame. Here, the formation positions of the fragile portions 16e are not limited to the above-described positions, and may be set as any position without departing from the spirit of the present invention as long as the fragile portions are formed in the upper frame upright portions 16c.

The fragile portions 16e may be warped when a predetermined impact load is applied to the seat back frame 1 upon a rear end collision or the like, and are deformed to be crushed in the up to down direction. As a result, the rearward inclining load may be stably and efficiently absorbed. Further, since each fragile portion 16e extends in the right and left direction, even when the load is applied in the right and left direction, the fragile portion may receive the load at the ridge line portion, and may improve the rigidity with respect to the load in the right and left direction. Then, when the fragile portion 16e is crushed, the upper frame upright portion 16c is deformed so that the portion above the formation position of the fragile portion 16e is bent toward the rear side of the vehicle, and the upper frame 16 is inclined rearward with the deformation. Furthermore, when the strength capable of withstanding the normal sitting load is provided, the fragile portion 16e may be easily deformed. For this reason, only the thickness of the pipe constituting the fragile portion 16e may be thinned.

Furthermore, when the fragile portion 16e is formed above the side frame 15, the lower side of the upper frame 16 is fixed to the upper side of the side frame 15, and hence the portion above the fragile portion 16e may be easily inclined rearward. Further, since the fragile portion 16e is formed in the upper frame 16, when the impact load is applied to the seat back frame, the deformation of the fragile portion 16e is not disturbed by the seat frame 2 or the side frame 15, and hence the impact energy may be efficiently absorbed.

As described above, the rear surface of the upper frame upright portion 16c provided with the fragile portion 16e is further provided with the regulation portions 40 (the first regulation portion 41 and the second regulation portion 42. The regulation portions 40 (the first regulation portion 41 and the second regulation portion 42) are attached onto the upper frame upright portion 16c by a method such as welding while facing each other with the fragile portion 16e interposed therebetween, and are respectively provided at the upper and lower sides of the fragile portion 16e.

Figure 64:
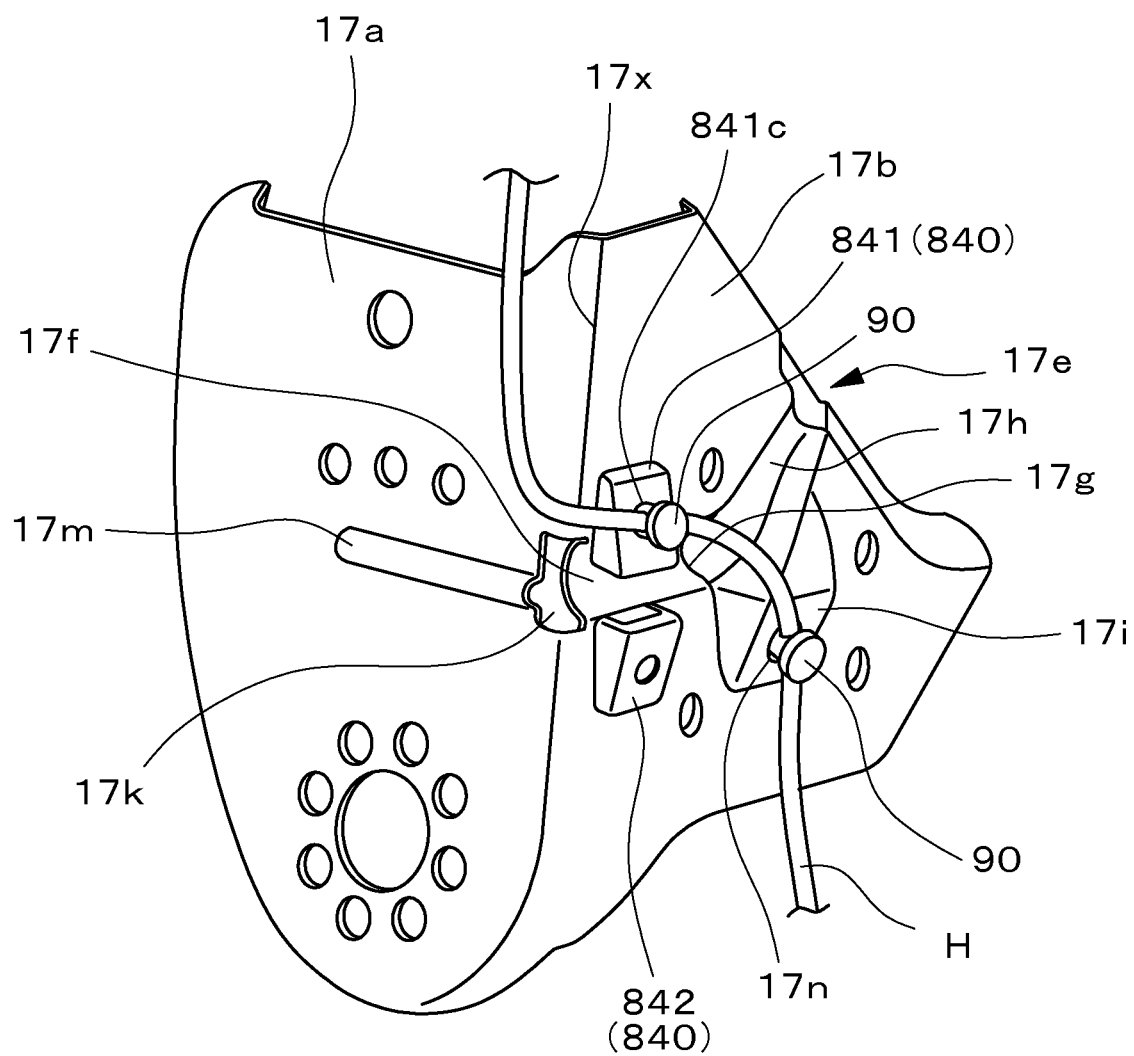
FIG. 64 is a perspective view diagram illustrating a positional relation among a deformation portion, regulation portions, and a wire member according to an eleventh embodiment of the present invention.
Figure 65:
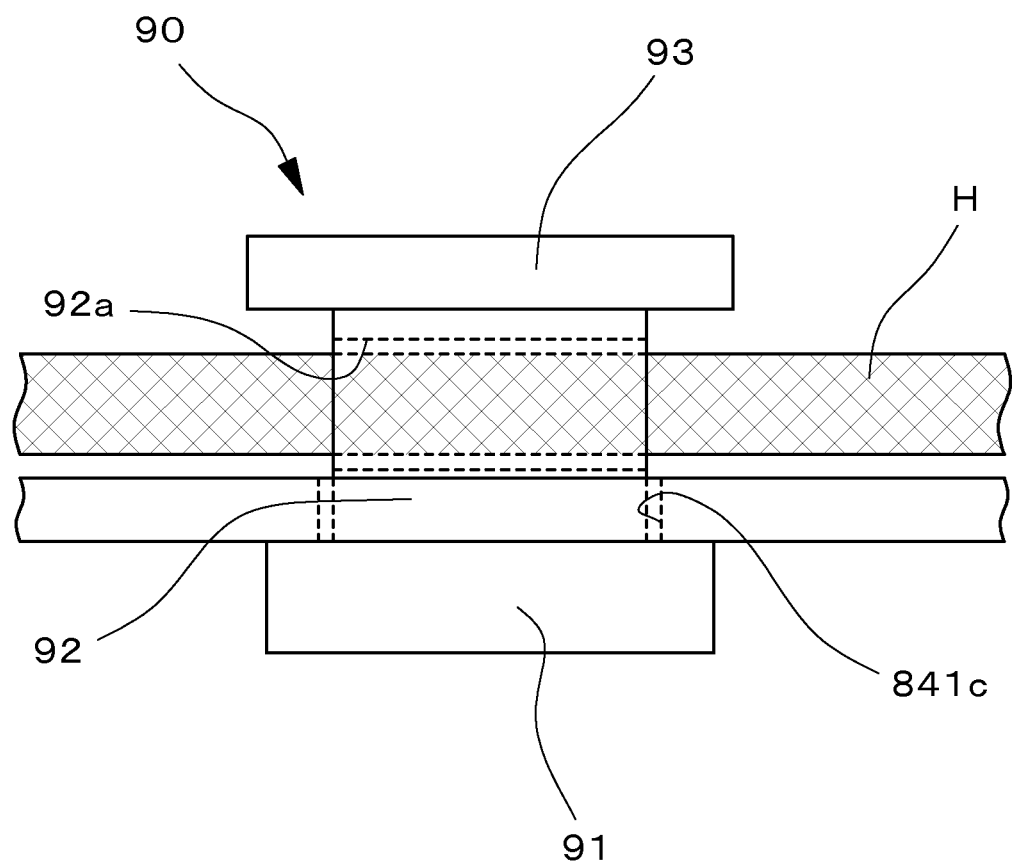
FIG. 65 is a diagram illustrating a fixing member for the wire member according to the eleventh embodiment of the present invention.

Further, the regulation portions 740 that regulate the deformation amount of the fragile portion 16e are provided at positions sandwiching a part of the fragile portion 16e. As in the regulation portions 40 described in the above-described embodiments, the regulation portions 740 include a first regulation portion 741 and a second regulation portion 742 that face each other with the fragile portion 16e interposed therebetween. Since the configurations or functions of the respective regulation portions 740 are the same as those of the regulation portions 40 described in the above-described embodiments, the description thereof will not be repeated.
Configuration of Vehicle Seat of Eleventh Embodiment Next, a vehicle seat according to an eleventh embodiment of the present invention will be described with reference to FIGS. 64 and 65. FIGS. 64 and 65 are involved with the eleventh embodiment of the present invention. Furthermore, in the eleventh embodiment, the same reference numerals will be given to the same components and arrangements as those of the first to tenth embodiments and the detailed description thereof will not be repeated.

In the vehicle seat S according to the eleventh embodiment, a harness H as a wire member is wired in a predetermined wiring path as illustrated in FIG. 64 in order to operate the other portion along with the movement of a predetermined portion in the vehicle seat S. By the harness H, power may be transmitted from the portion fastened to one end of the harness H in the vehicle seat S to the portion fastened to the other end thereof. For example, in the vehicle seat S that is adapted to be folded and to slide in the front to back direction, in the configuration in which one end of the harness H is fastened to the seat back frame 1 and the other end is fastened to a slide mechanism (not illustrated), when the seatback S1 is inclined forward during the seat folding operation, the operation of the seatback S1 is transmitted to the slide mechanism through the harness H, and hence the slide mechanism is also operated.

Furthermore, in the configuration illustrated in FIG. 64, the harness H is wired along the up to down direction of the seat back frame 1. More specifically, the harness H is wired to face the rear surface of the intermediate plate 17b of the lower frame base portion 17 in a manner such that one end of the harness extends along the side plate 15a of the side frame 15 and the harness is warped around the rear surface of the seat back frame 1 at the halfway position thereof. That is, in the eleventh embodiment, at least a part of the harness H is wired to face the rear surface of the seat back frame 1.

The intermediate plate 17b is provided with the harness attachment portion 17i that is used to fix the harness H to the seat back frame 1. The harness attachment portion 17i is bulged rearward, and the lower portion thereof is provided with a fixing hole 17n for fixing the harness H. As illustrated in FIG. 64, a part of the harness H is fixed to the seat back frame 1 by a clip 90 engaging with the fixing hole 17n. In this way, in this embodiment, since the harness attachment portion 17i is provided in the intermediate plate 17b, the space involved with the attachment of the harness H may be saved, and hence the number of components may be decreased.

Then, in the eleventh embodiment, as illustrated in FIG. 64, the facing portion that faces the rear surface of the seat back frame 1 in the harness H gets astride of the inward fragile portion 17e. Here, there is a concern that the facing portion of the harness H reaches the inward fragile portion 17e to disturb the deformation of the inward fragile portion 17e when the inward fragile portion 17e is deformed due to the rear impact load applied thereto. Further, when a pair of regulation portions 840 is provided to regulate the deformation amount of the inward fragile portion 17e, there is a concern that the facing portion of the harness H may be sandwiched between the regulation portions 840. Particularly, in the configuration in which the facing portion of the harness H gets astride of the inward fragile portion 17e, the harness H may be easily sandwiched between the regulation portions 840.

As described above, when the harness H interferes with the inward fragile portion 17e, the deformation of the inward fragile portion 17e may be disturbed or the load applied to the inward fragile portion 17e may change. In such a state, the inward fragile portion 17e may not be appropriately deformed, and the seat back frame 1 may not appropriately absorb the impact energy due to the deformation thereof. Further, there is a concern that the harness H may be damaged while being sandwiched between the regulation portions 840.

On the contrary, in the eleventh embodiment, in order to prevent the harness H from being sandwiched between the regulation portions 840, the facing portion of the harness H is disposed to be slightly separated from the formation position of the inward fragile portion 17e. Particularly, the facing portion is disposed to be disposed at a position avoiding the gap between the regulation portions 840. Specifically, as illustrated in FIG. 64, the harness H is dropped from the upper end of the seat back frame 1 in the height direction along the side plate 15a of the side frame 15, is bent inward at a position slightly above the formation position of the inward fragile portion 17e, and is warped around the rear side of the seat back frame 1. In the harness H, the portion from the bent portion to the portion warped around the rear side of the seat back frame 1 extends in the horizontal direction. At this time, the harness H is wired to be slightly separated rearward from the location of the inward fragile portion 17e in the rear surface of the seat back frame 1. Then, the harness H extends in the horizontal direction to jump over a first regulation portion 841, and is bent again in the vicinity of the formation position of the bent portion 17g of the inward fragile portion 17e to be dropped downward.

As described above, when the facing portion of the harness H is slightly separated from the formation position of the inward fragile portion 17e, it is possible to prevent the facing portion of the harness H from interfering with the deformation of the inward fragile portion 17e. Further, when the harness H is not drawn between the regulation portions 840, it is possible to prevent the harness H from being sandwiched between the regulation portions 840. As a result, it is possible to suppress degradation in the deformation of the inward fragile portion 17e or a change in the load applied to the inward fragile portion 17e. Further, the damage of the harness H may be also suppressed.

Further, in the configuration illustrated in FIG. 64, since the first regulation portion 841 and the second regulation portion 842 are provided as the regulation portions 840 and protrude rearward from the rear surface of the seat back frame 1, when the harness H is sandwiched between the regulation portions, the harness H is easily sandwiched between the regulation portions 840. That is, when the first regulation portion 841 and the second regulation portion 842 are provided, the degradation in the deformation of the inward fragile portion 17e or the damage the harness H further noticeably occurs due to the harness H sandwiched between the regulation portions 840. For this reason, it is more effective to use the configuration in which the harness H is prevented from being sandwiched between the regulation portions 840 in a manner such that the harness H is not drawn between the regulation portions 840.

Further, the harness H is easily sandwiched between the regulation portions 840 when the harness H is wired so that the facing portion gets astride of the inward fragile portion 17e. In this case, it is more desirable to use the configuration in which the harness H is separated from the formation position of the inward fragile portion 17e to prevent the interference of the harness H with respect to the deformation of the inward fragile portion 17e.

Here, in the configuration illustrated in FIG. 64, the harness H is wired so that the harness is bent from the state where the harness is drooped along the side plate 15a of the side frame 15, is warped around the rear side of the seat back frame 1, and passes by the space on the rear surface of the first regulation portion 841. Then, the harness H is fixed to the rear surface of the first regulation portion 841. Specifically, the center portion of the rear surface of the first regulation portion 841 is provided with a penetration hole 841c, and a harness fixing clip 90 (hereinafter, simply referred to as the clip 90) illustrated in FIG. 65 engages with the penetration hole 841c. The lower end portion of the clip 90 is provided with an engagement portion 91 that is elastically deformable in the radial direction, a cylindrical portion 92 having an insertion hole 92a through which the harness H is inserted is provided at a position above the engagement portion 91, and the upper end of the clip 90 is provided with a substantially disk-shaped cap portion 93.

In a normal state, the engagement portion 91 has an outer diameter slightly larger than the diameter of the penetration hole 841c, the outer diameter of the cylindrical portion 92 is substantially equal to the diameter of the penetration hole 841c, and the diameter of the cap portion 93 is slightly larger than the diameter of the penetration hole 841c. The clip 90 with such a configuration is inserted from the engagement portion 91 into the penetration hole 841c while elastically deforming the engagement portion 91 to decrease the diameter of the outer diameter. Then, when the clip 90 is inserted until the cylindrical portion 92 reaches the penetration hole 841c, the engagement portion 91 increases in diameter, and then the clip serves as a retainer.

When the clip 90 engages with the penetration hole 841c according to the above-described order, the harness H is inserted through the insertion hole 92a of the cylindrical portion 92. In such a state, the harness H is fixed onto the rear surface of the first regulation portion 841 by the clip 90. As described above, when the clip 90 with the above-described configuration is used, the harness H may be fixed to the first regulation portion 841 by a comparatively simple configuration. Furthermore, any configuration may be employed as the configuration of the clip 90 as long as the clip engages with the penetration hole 841c of the first regulation portion 841 to fix the harness H.

As described above, when the harness H is fixed onto the rear surface of the first regulation portion 841, the harness H may be separated from the formation position of the inward fragile portion 17e. Thus, it is possible to effectively prevent the harness H from being inserted between the regulation portions 840 due to the flapping. Furthermore, the fixing position of the harness H is not limited to the rear surface of the first regulation portion 841, but may be fixed to the rear surface of the second regulation portion 842. Here, since it is possible to effectively prevent the harness H from being sandwiched between the regulation portions 840, it is desirable to fix the harness H to the regulation portion 840, that is, the first regulation portion 841 close to the portion that is bent to be warped around the rear side of the seat back frame 1 from the side plate 15a of the side frame 15.

Further, in the configuration illustrated in FIG. 64, the harness H is bent again at the formation position of the bent portion 17g of the inward fragile portion 17e to be drooped downward. The harness attachment portion 17i is formed at the opposite side of the bent portion 17g in the bent direction. The harness attachment portion 17i is provided with the fixing hole 17n that is used to fix the harness H, and the clip 90 engages with the fixing hole 17n. Then, a part of the harness H is fixed to the harness attachment portion 17i by the clip 90 engaging with the fixing hole 17n.

Here, since the harness attachment portion 17i exists at the lateral side of the arrangement position of the regulation portion 840 in the rear surface of the intermediate plate 17b of the lower frame base portion 17, a part of the harness H is fixed to the lateral position of the arrangement position of the regulation portion 840. Thus, since a part of the harness H is fixed to a position deviated from the arrangement position of the regulation portion 840, it is possible to more effectively prevent the harness H from being sandwiched between the regulation portions 840. Further, since the harness attachment portion 17i is a portion that is bulged rearward from the rear surface of the intermediate plate 17b of the lower frame base portion 17, when the harness H is fixed to the harness attachment portion 17i, the harness H may be effectively separated from the formation position of the inward fragile portion 17e.

Furthermore, when the harness attachment portion 17i is formed at the opposite side of the cured direction of the bent portion 17g of the inward fragile portion 17e in the intermediate plate 17b, plural concavo-convex portions are formed on the intermediate plate 17b, and hence the rigidity of the lower frame base portion 17 with respect to the load, that is, the rigidity in the vicinity of the bent portion 17g is improved. As a result, only the horizontal portion 17f, the bent portion 17g, and the inclined portion 17h of the inward fragile portion 17e may be selectively bent without bending the position other than the inward fragile portion 17e when the impact load of the rear end collision or the like is applied to the seat back frame. Further, in order to easily incline the side frame 15 rearward, the rigidity of the lower side of the intermediate plate 17b needs to be improved compared to the rigidity of the upper side thereof. For this reason, it is desirable to form the harness attachment portion 17i below the bent portion 17g.

Configuration of Vehicle Seat of Twelfth Embodiment

Figure 66:
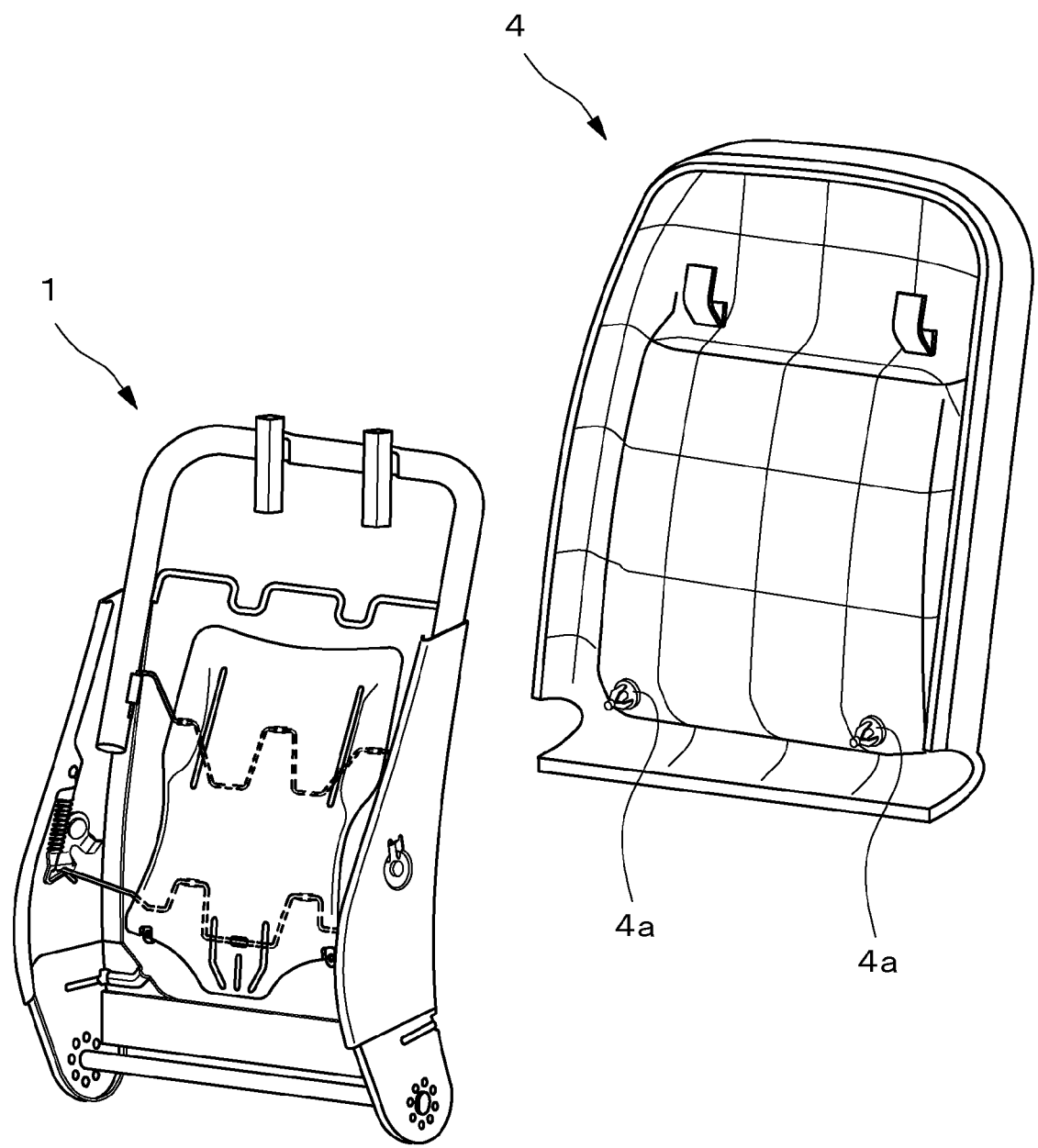
FIG. 66 is a schematic perspective view illustrating a seat back frame and a back cover according to a twelfth embodiment of the present invention.
Figure 67:
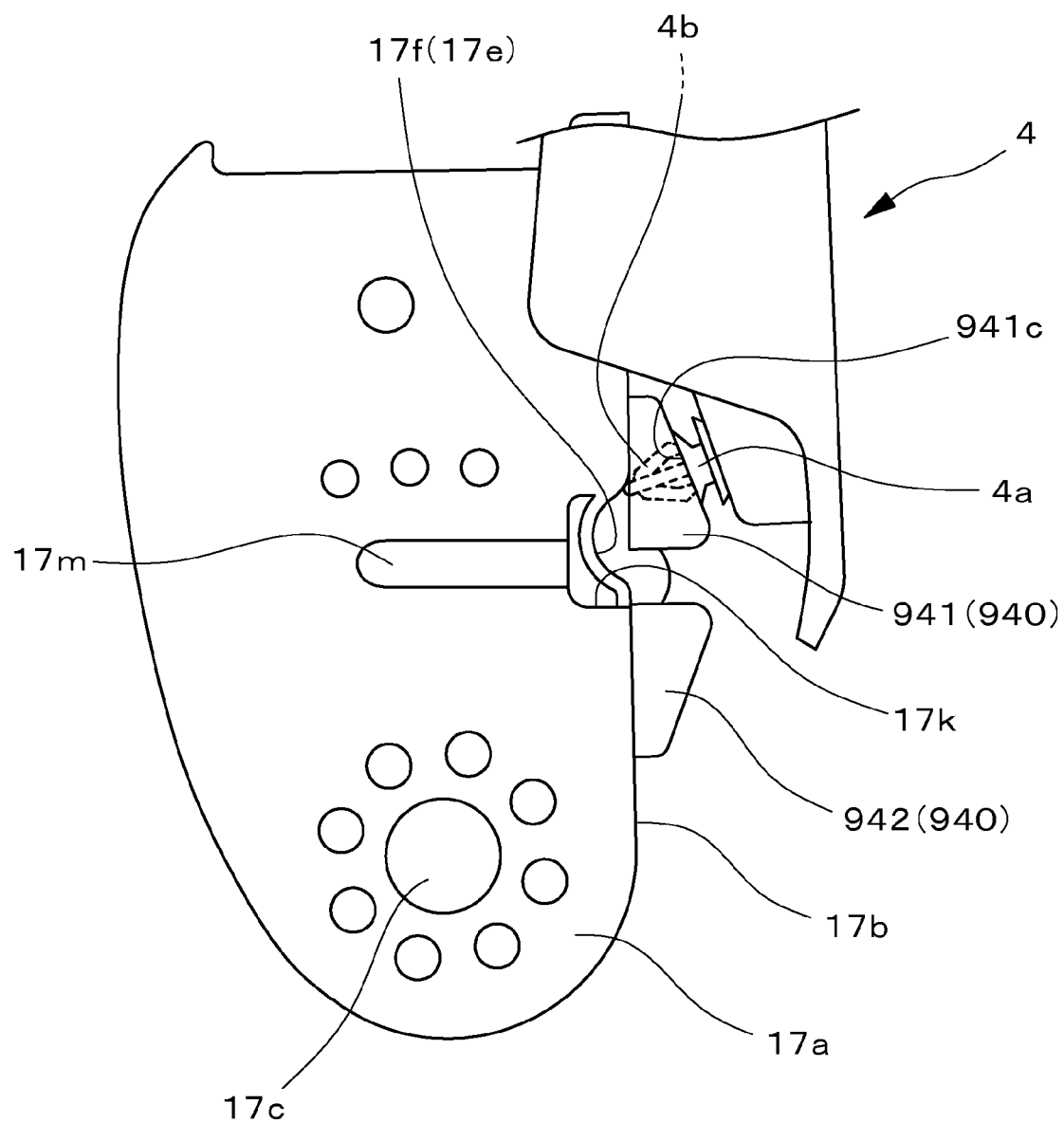
FIG. 67 is a side view diagram illustrating a positional relation among a deformation portion, regulation portions, and a back cover according to the twelfth embodiment of the present invention.
Figure 68:
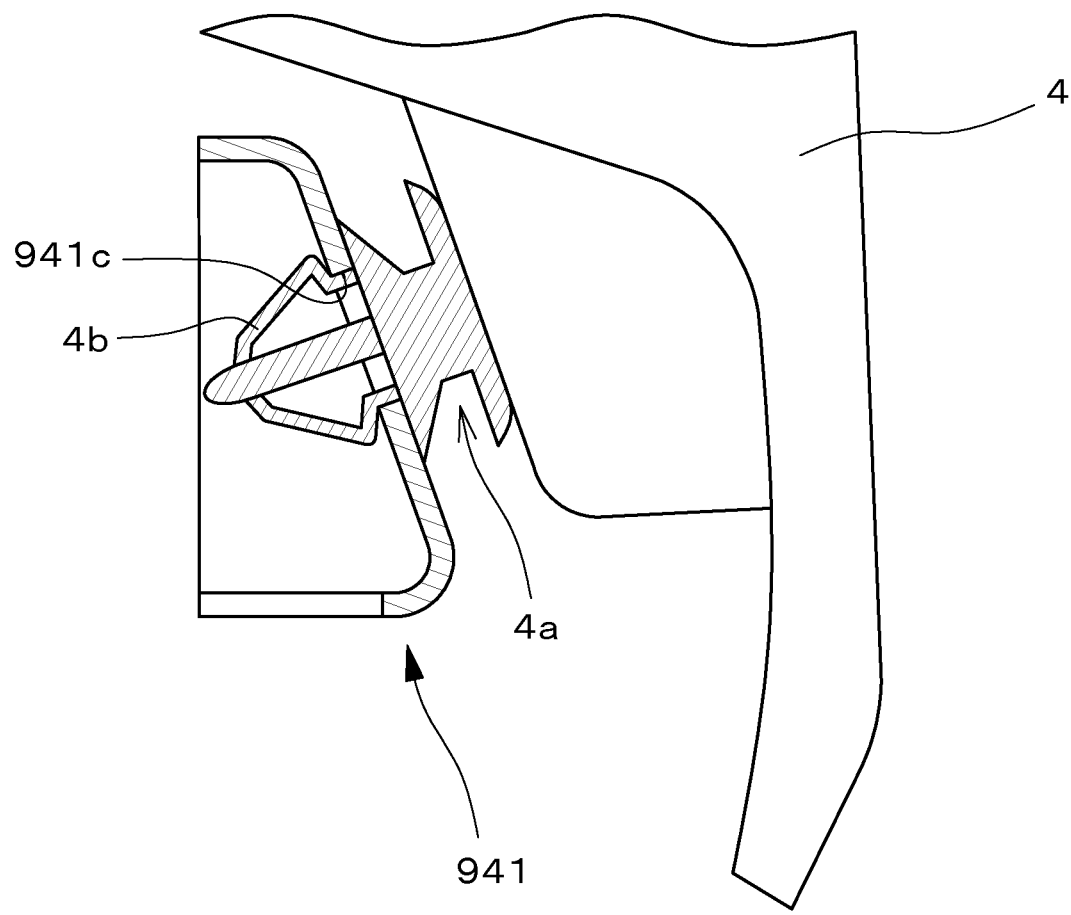
FIG. 68 is a diagram illustrating a fixing member for the back cover according to the twelfth embodiment of the present invention.

Next, a vehicle seat according to a twelfth embodiment of the present invention will be described with reference to FIGS. 66 to 68. FIGS. 66 to 68 are involved with the twelfth embodiment of the present invention. Furthermore, in the twelfth embodiment, the same reference numerals will be given to the same components and arrangements as those of the first to eleventh embodiments, and the detailed description thereof will not be repeated.

In the twelfth embodiment, the seatback S1 includes the seat back frame 1, the cushion pad 1a, the skin material 1b, and a back cover 4 as a cover member. The back cover 4 is a resinous molded product, and is attached to the rear side of the seat back frame 1 while being press-attached to the rear side of the seat back frame 1 having the cushion pad 1a placed thereon as illustrated in FIG. 66. Here, the back cover 4 is attached to the seat back frame 1 to extend in the height direction, that is, the up to down direction of the seat back frame 1. The assembly of the back cover 4 with respect to the seat back frame 1 is performed by using an assembling mechanism (not illustrated) at the upper end side of the back cover 4 and a protrusion 4a to be described later at the lower end side thereof.

Further, the length of the back cover 4 in the height direction of the seat back frame 1 is slightly shorter than the length of the seat back frame 1 in the up to down direction. In a state where the back cover 4 is attached to the attachment position, the upper end of the back cover 4 is located at the same position as that of the headrest S3 in the height direction of the seat back frame 1 and the lower end of the back cover 4 is located slightly above the lower end of the lower frame base portion 17. As described above, the length of the back cover 4 is slightly shorter than the length of the seat back frame 1, but the length is sufficient to cover the rear side of the seat back frame 1. Accordingly, the back cover 4 faces the seat back frame 1 at the rear surface of the intermediate plate 17b.

Then, in the twelfth embodiment, the hole portion 17k or the inward fragile portion 17e is formed at the same position as that of the first embodiment or the second embodiment, that is, the lower frame base portion 17, and the back cover 4 is attached to the rear side of the seat back frame 1 while extending in a direction intersecting the formation direction of the inward fragile portion 17e. Further, as illustrated in FIG. 67, the lower end of the back cover 4 is located at the position reaching the inward fragile portion 17e in the height direction of the seat back frame 1.

As described above, the lower end side of the back cover 4 is fixed to the seat back frame 1 by the protrusion 4a. The protrusion 4a is a fixing portion that is used to fix the back cover 4 to the seat back frame 1, is provided between the upper end and the lower end of the back cover 4, and is provided at the lower end of the front surface of the back cover 4. Then, as illustrated in FIG. 68, a circular engagement hole 941c is substantially formed at the center portion of the rear surface of the first regulation portion 941. When attaching the back cover 4 to the seat back frame 1, the protrusion 4a engages with the engagement hole 941c in a manner such that an end portion 4b of the protrusion 4a is inserted through the engagement hole 941c while being elastically deformed to be decreased in diameter. When the protrusion 4a engages with the engagement hole 941c, the contracted end portion 4b of the protrusion 4a increases in diameter to return to the original state, and hence serves as a retainer that prevents the protrusion 4a from being separated from the engagement hole 941c.

Here, when the back cover 4 is attached to the rear side of the seat back frame 1, there is a possibility that the back cover 4 may interfere with the deformation of the inward fragile portion 17e when the impact load generated upon a rear end collision is applied to the seat back frame. Specifically, when the lower end of the back cover 4 is fixed to the lower position of the inward fragile portion 17e upon attaching the back cover 4 to the seat back frame 1, the back cover 4 gets astride of the inward fragile portion 17e. That is, the inward fragile portion 17e is disposed in the range from the upper end of the back cover 4 to the formation position of the protrusion 4a. In this way, when the inward fragile portion 17e exists between the upper end of the back cover 4 in the extension direction and the formation position of the protrusion 4a, the interference of the back cover 4 occurs when the inward fragile portion 17e is deformed due to the impact load applied thereto. Accordingly, the impact energy generated upon a rear end collision or the like is not appropriately absorbed by the deformation of the inward fragile portion 17e, and the back cover 4 may be damaged.

Therefore, in the twelfth embodiment, the arrangement position of the back cover 4 to be attached to the rear side of the seat back frame 1 is set as the position where the back cover does not get astride of the inward fragile portion 17e. Specifically, the back cover 4 is attached to the seat back frame 1 so that both the upper end and the lower end of the inward fragile portion 17e are not simultaneously located within the range from the upper end of the back cover 4 to the formation position of the protrusion 4a. Here, the state where both the upper end and the lower end of the inward fragile portion 17e are not simultaneously located indicates a state where both the upper end and the lower end of the inward fragile portion 17e are not located within the range from the upper end of the back cover 4 to the formation position of the protrusion 4a and a state where only the upper end of the inward fragile portion 17e is located within the range. In such a positional relation, the interference of the back cover 4 with respect to the deformation of the inward fragile portion 17e is suppressed, and degradation in the deformation of the inward fragile portion 17e or a change in the load applied to the inward fragile portion 17e may be suppressed. Further, the back cover 4 is not involved with the deformation of the inward fragile portion 17e so that the damage of the back cover 4 may be suppressed.

Further, the above-described effect becomes particularly meaningful in the configuration in which two regulation portions 940 are disposed at positions sandwiching a part of the inward fragile portion 17e. That is, when two regulation portions 940 are provided at positions sandwiching a part of the inward fragile portion 17e, a part of the back cover 4 is easily fitted into the gap between the regulation portions 940, and hence there is an increasing possibility that the back cover 4 interferes with the deformation of the inward fragile portion 17e. For this reason, it is possible to further exhibit the effect in which the interference between the back cover 4 and the deformation of the inward fragile portion 17e is suppressed. Further, when the upper end of the back cover 4 and the formation position of the protrusion 4a of the back cover 4 are all located above the lower end of the inward fragile portion 17e, the range from the upper end of the back cover 4 to the formation position of the protrusion 4a does not get astride of the inward fragile portion 17e. As a result, it is possible to more appropriately suppress degradation in the deformation of the inward fragile portion 17e, a change in the load applied to the inward fragile portion 17e, and a damage of the back cover 4.

Further, when the formation position of the protrusion 4a of the back cover 4 is located above the upper end of the inward fragile portion 17e, the range from the upper end of the back cover 4 to the formation position of the protrusion 4a does not reach the inward fragile portion 17e, and hence it is possible to more appropriately suppress the interference of the back cover 4 with respect to the deformation of the inward fragile portion 17e. In order to realize the above-described positional relation, in the twelfth embodiment, as described above, the engagement hole 941c is provided on the rear surface of the first regulation portion 941, and the protrusion 4a engages with the engagement hole 941c so that the lower end of the back cover 4 is fixed onto the rear surface of the first regulation portion 941. Furthermore, the method of fixing the back cover 4 to the seat back frame 1 is not limited to the configuration in which the protrusion 4a engages with the engagement hole 941c. For example, the protrusion may be fixed to the rear surface of the intermediate plate 17b. Further, the formation position of the protrusion 4a is not limited to the configuration in which the formation position is located above the upper end of the inward fragile portion 17e, and may be located above the lower end of at least the inward fragile portion 17e.

Other Embodiments

Figure 69:
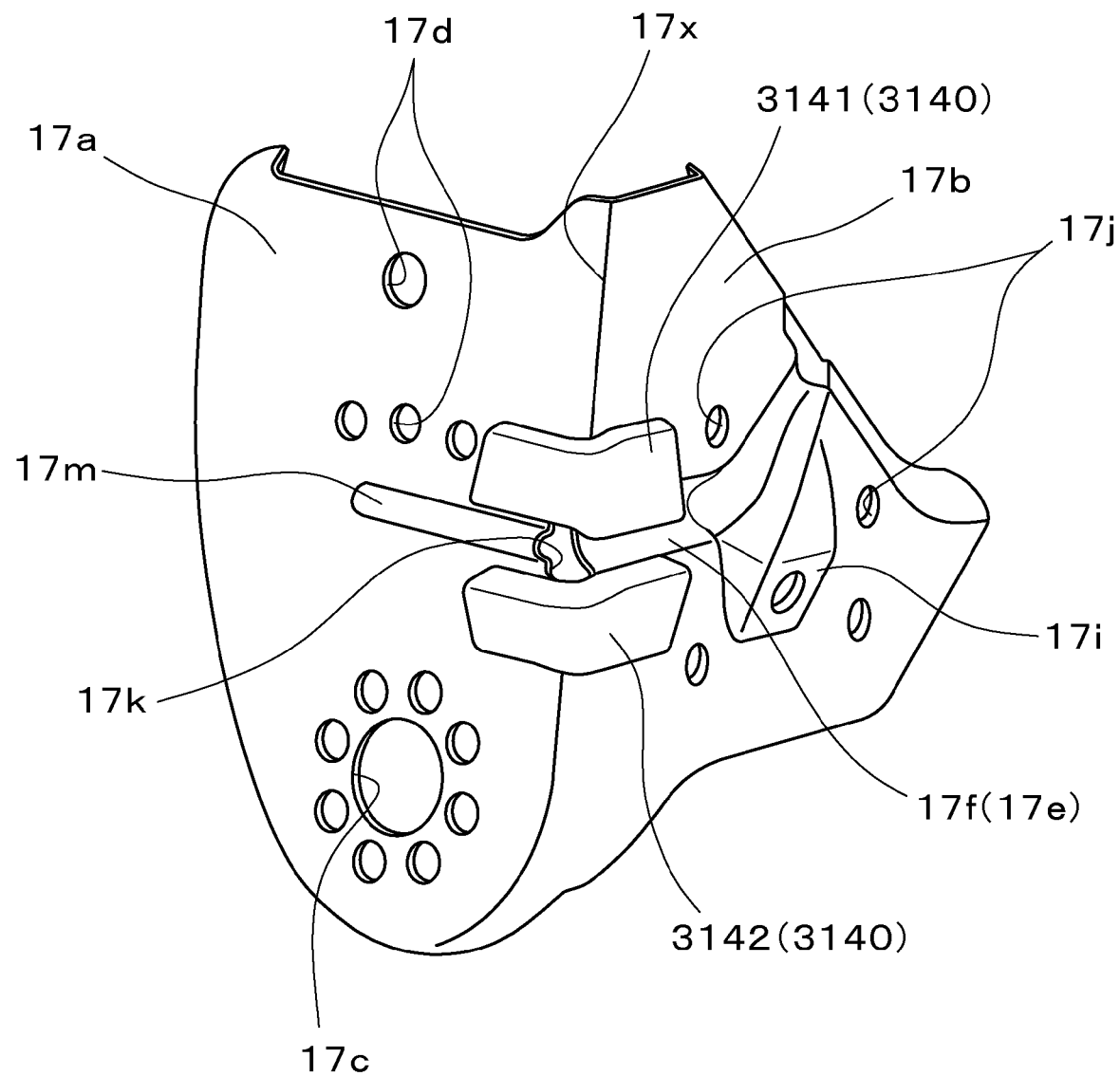
FIG. 69 is a schematic perspective view illustrating a modified example of regulation portions.
Figure 70:
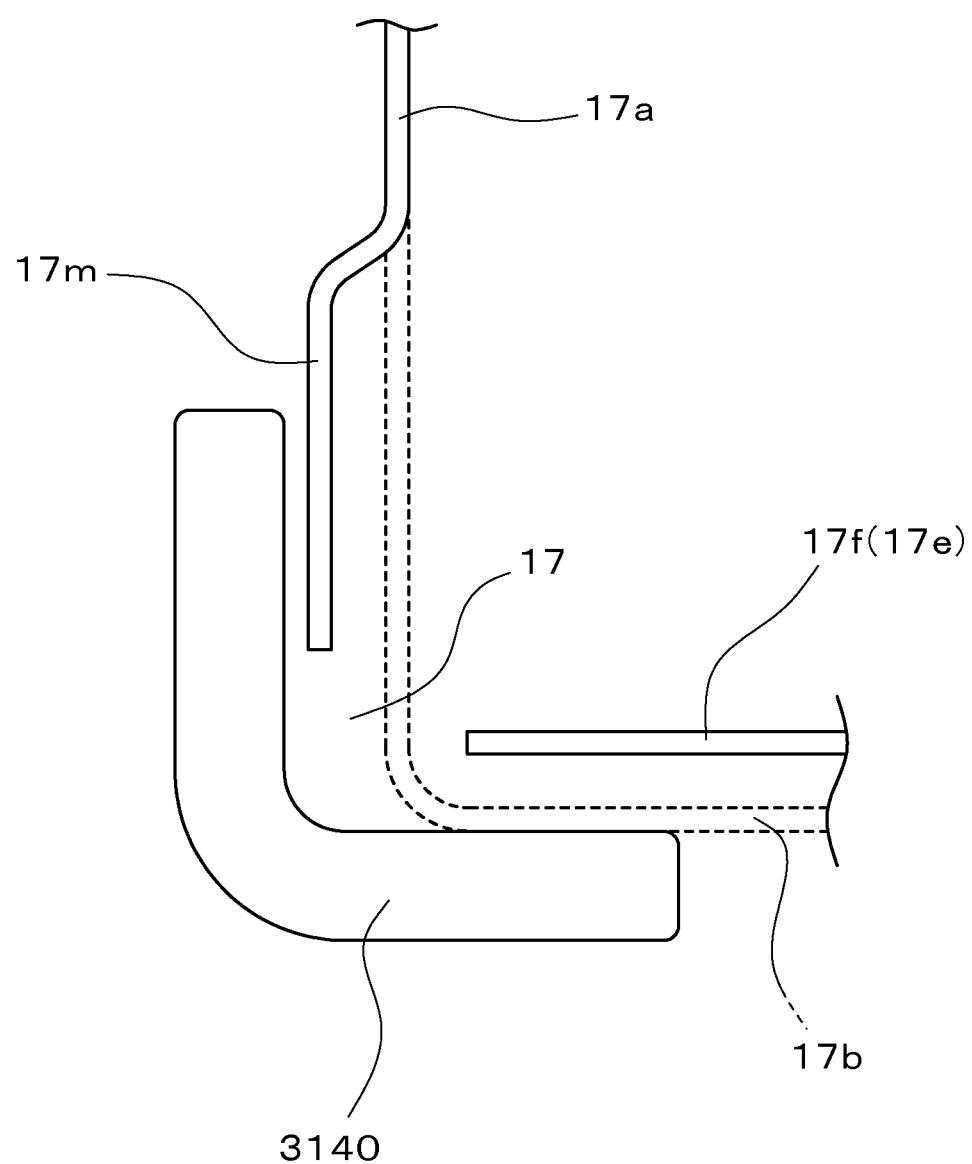
FIG. 70 is a schematic top view illustrating the modified example of the regulation portions.

In the above-described respective embodiments, in the configurations (specifically, the second to twelfth embodiments) in which the regulation portions are provided to regulate the deformation amount of the deformation portion or other deformation portions, the regulation portions are disposed at positions sandwiching only one deformation portion among plural deformation portions. For example, in the second embodiment, a configuration has been described in which the regulation portions 40 sandwich a part of the inward fragile portion 17e. Here, the present invention is not limited thereto. For example, as illustrated in FIGS. 69 and 70, regulation portions 3140 may be provided to sandwich the hole portion 17k as the deformation portion and the inward fragile portion 17e and the lateral fragile portion 17m as other deformation portions. FIGS. 69 and 70 are diagrams illustrating a modified example of the regulation portion.

The regulation portions 3140 according to a modified example include a first regulation portion 3141 and a second regulation portion 3142, and any one of the regulation portions 3141 and 3142 is substantially formed in an L-shape in the top view as illustrated in FIG. 70. Then, the first regulation portion 3141 and the second regulation portion 3142 sandwich a part of the lateral fragile portion 17m and a portion facing the outside in the width direction of the hole portion 17k between the portions forming one-side edges of the L-shaped portions, and sandwich a part of the inward fragile portion 17e and a portion facing the rear side of the hole portion 17k between the portions forming the other-side edges of the L-shaped portions.

Furthermore, the present invention is not limited to the configuration illustrated in FIGS. 69 and 70. For example, the regulation portions may be disposed at positions sandwiching at least one deformation portion of the deformation portion and other deformation portions, the regulation portions may be disposed while sandwiching the hole portion 17k and the inward fragile portion 17e, or the regulation portions may be disposed while sandwiching the hole portion 17k and the lateral fragile portion 17m.

Figure 71:
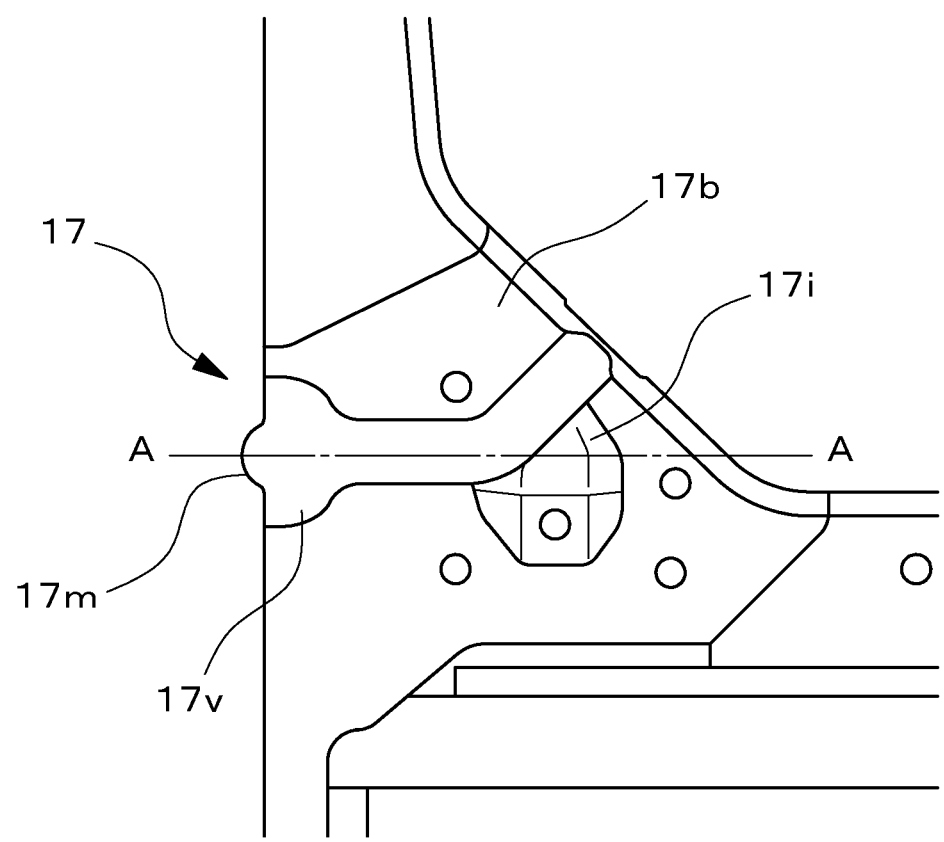
FIG. 71 is a schematic front view illustrating a first modified example of deformation portions.
Figure 72:
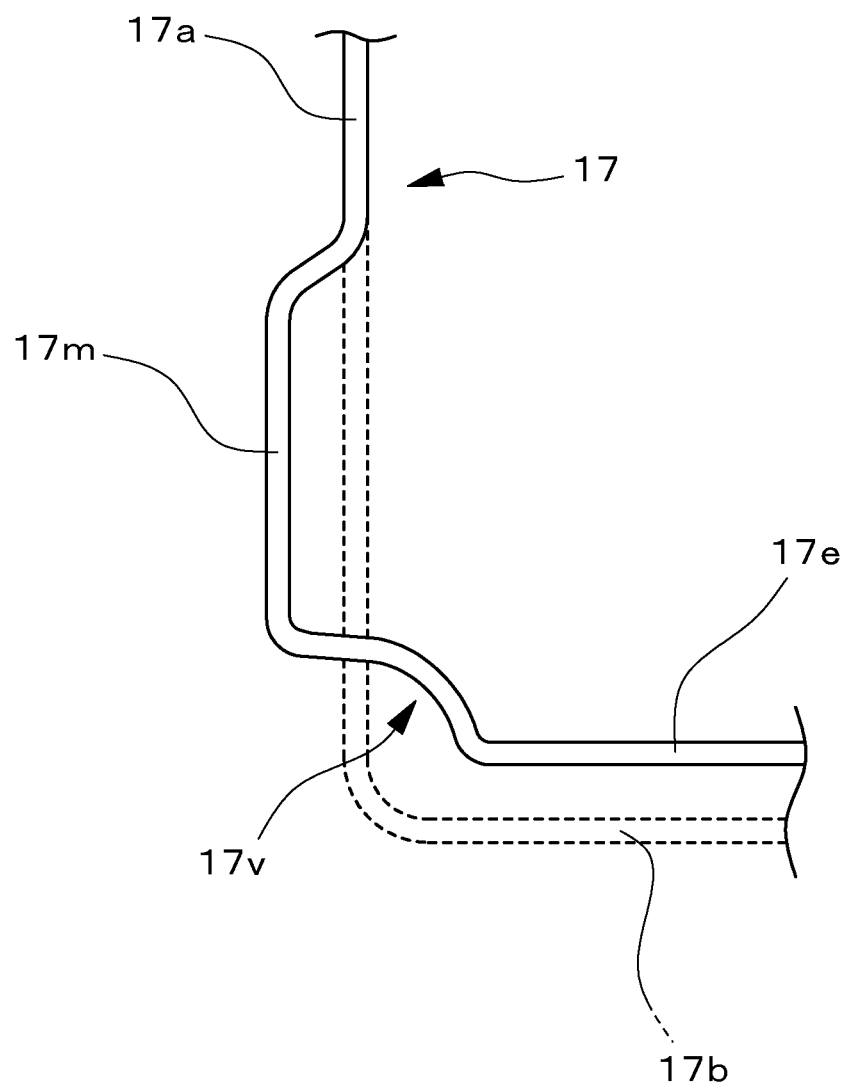
FIG. 72 is a cross-sectional view taken along the line A-A of FIG. 71.
Figure 73:
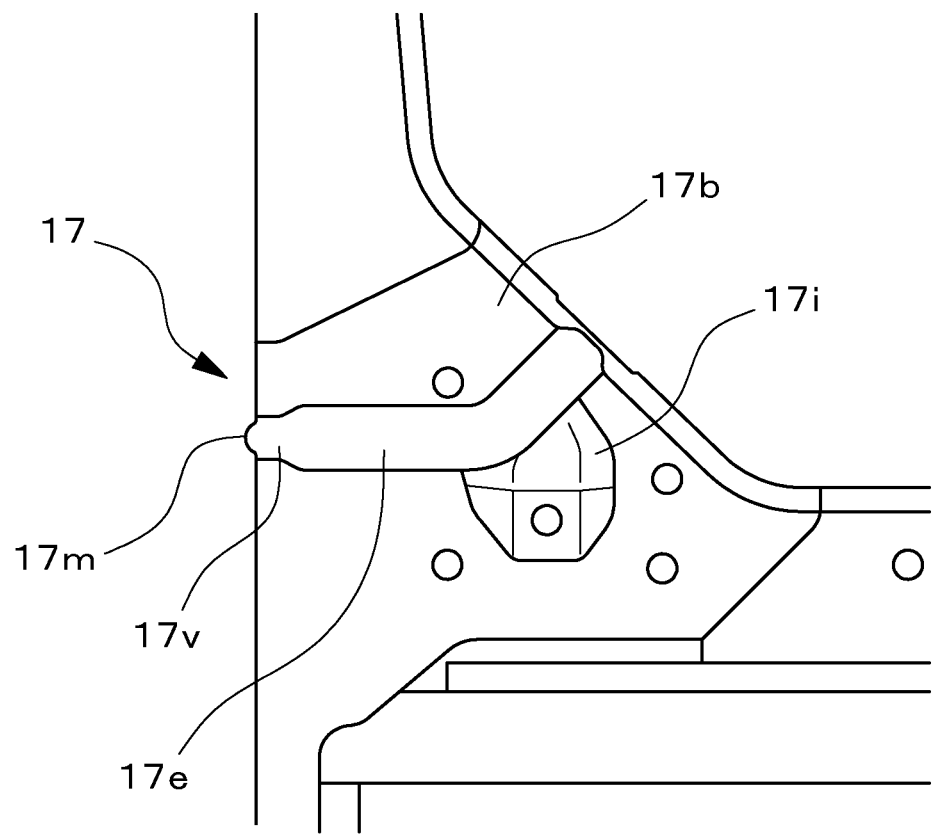
FIG. 73 is a rear view diagram illustrating a second modified example of the deformation portion.

Further, in the above-described respective embodiments, an example has been described in which the deformation portion formed in the connection portion connecting the frame side portion to the frame extension portion is the hole portion. For example, in the first embodiment, a configuration has been described in which the hole portion 17k as the deformation portion is formed in the connection portion 17x between the lateral plate 17a as the frame side portion and the intermediate plate 17b as the frame extension portion in the lower frame base portion 17. Here, the deformation portion is not limited to the hole portion. For example, as illustrated in FIGS. 71 to 73, the deformation portion may be a fragile portion formed by a concave portion or a groove. FIGS. 71 and 72 are diagrams illustrating a first modified example of the deformation portion. Furthermore, in FIG. 72, the lower frame base portion 17 without the deformation portion or other deformation portions is indicated by the dashed line.

The deformation portion according to the first modified example is a concave fragile portion (hereinafter, referred to as a connection portion lateral fragile portion) 17v that sandwiches a part of the connection portion 17x between the intermediate plate 17b and the lateral plate 17a of the lower frame base portion 17. Here, the rigidity of each of the connection portion lateral fragile portion 17v, the inward fragile portion 17e, and the lateral fragile portion 17m changes in response to the width (the length in the up to down direction), the shape, the depth, or the like. In the first modified example, as illustrated in FIGS. 71 and 72, the width and the depth of the connection portion lateral fragile portion 17v are larger than those of the other fragile portions 17e and 17m. Thus, even in the first modified example, when the impact load is applied to the seat back frame, the connection portion lateral fragile portion 17v as the deformation portion is first deformed, and then the deformation is transmitted to the other fragile portions 17e and 17m by using the connection portion lateral fragile portion 17v as a starting point.

Furthermore, the configuration illustrated in FIGS. 71 and 72 is merely an example. For example, as illustrated in FIG. 73, the width of the inward fragile portion 17e may be larger than the connection portion lateral fragile portion 17v or the lateral fragile portion 17m. With such a configuration, the inward fragile portion 17e is first deformed when the impact load is applied to the seat back frame, and then the deformation is transmitted to the other fragile portions 17v and 17m by using the inward fragile portion 17e as a starting point.

Figure 74:
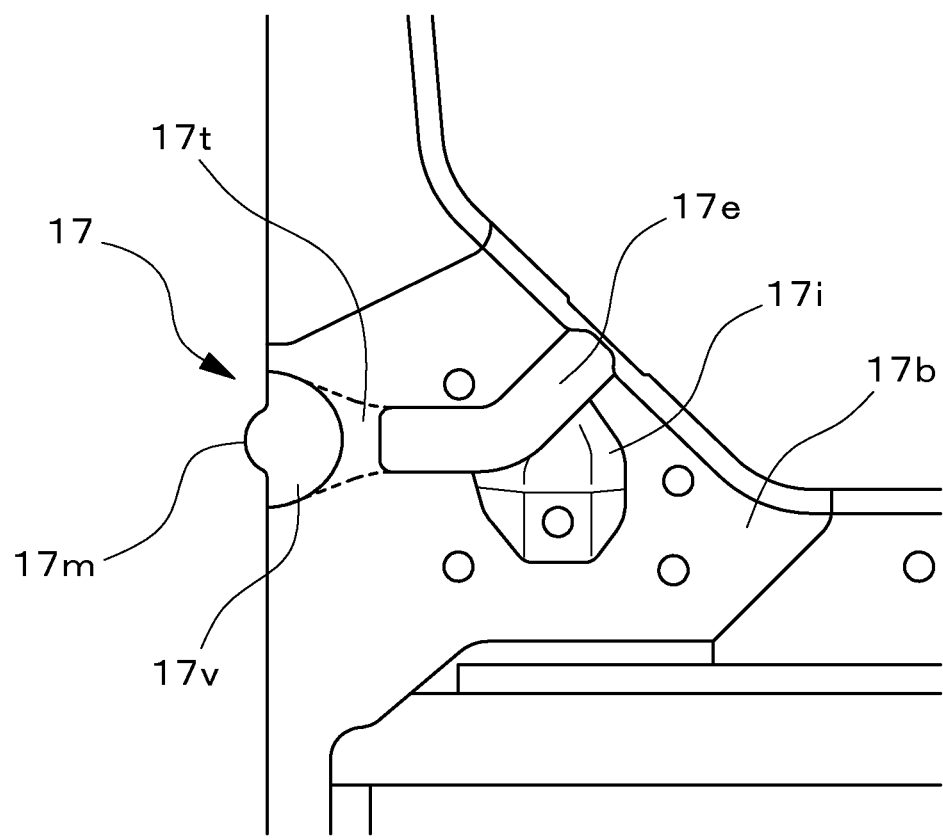
FIG. 74 is a rear view diagram illustrating a third modified example of the deformation portion.

Further, in the above-described respective embodiments, the deformation portion is adjacent to other deformation portions. More specifically, the end of the hole portion 17k as an example of the deformation portion and the ends of the fragile portions 17e and 17m as examples of other deformation portions overlap one another so that the hole portion 17k is adjacent to the fragile portions 17e and 17m. Here, the state where the deformation portion is adjacent to other deformation portions indicates a state where the deformation portion is adjacent to other deformation portions with a minute gap 17t interposed therebetween as illustrated in FIG. 74. FIG. 74 is a diagram illustrating a modified example of a positional relation among the deformation portion and other deformation portions. Furthermore, in the configuration illustrated in FIG. 74, the connection portion lateral fragile portion 17v is formed as the deformation portion, and the fragile portions 17e and 17m are formed as other deformation portions.

Figure 75:
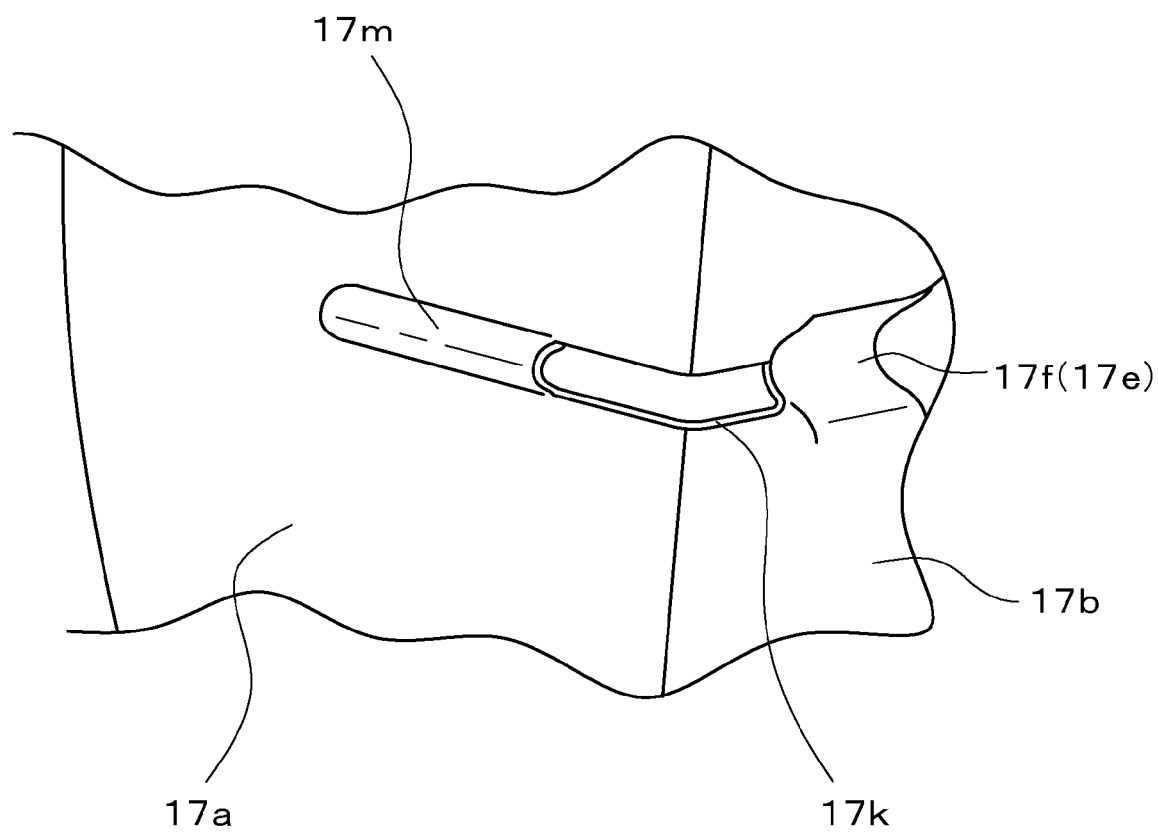
FIG. 75 is a perspective view diagram illustrating a fourth modified example of the deformation portion.
Figure 76:
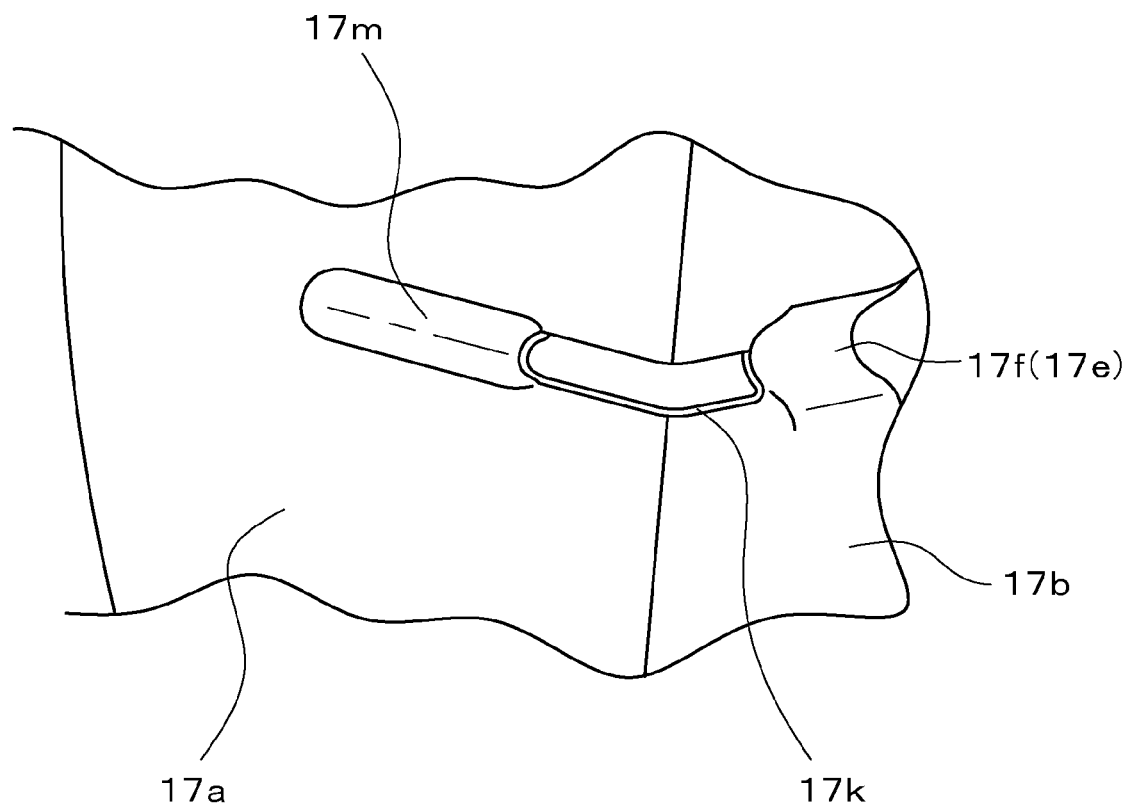
FIG. 76 is a perspective view diagram illustrating a fifth modified example of the deformation portion.
Figure 77:
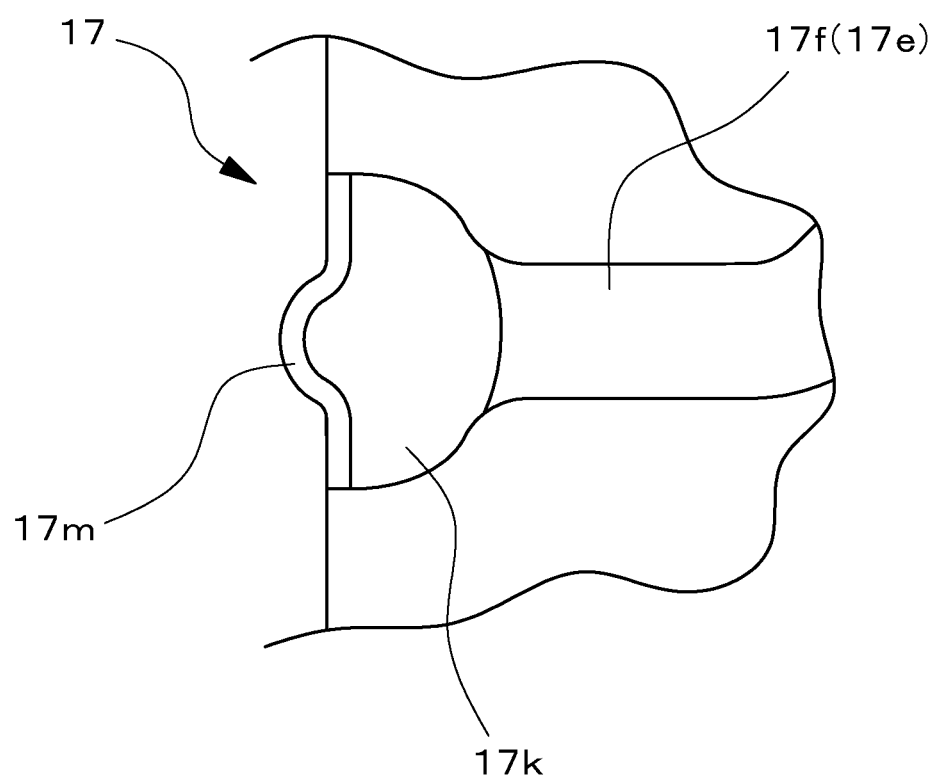
FIG. 77 is a rear view diagram illustrating a sixth modified example of the deformation portion.
Figure 78:
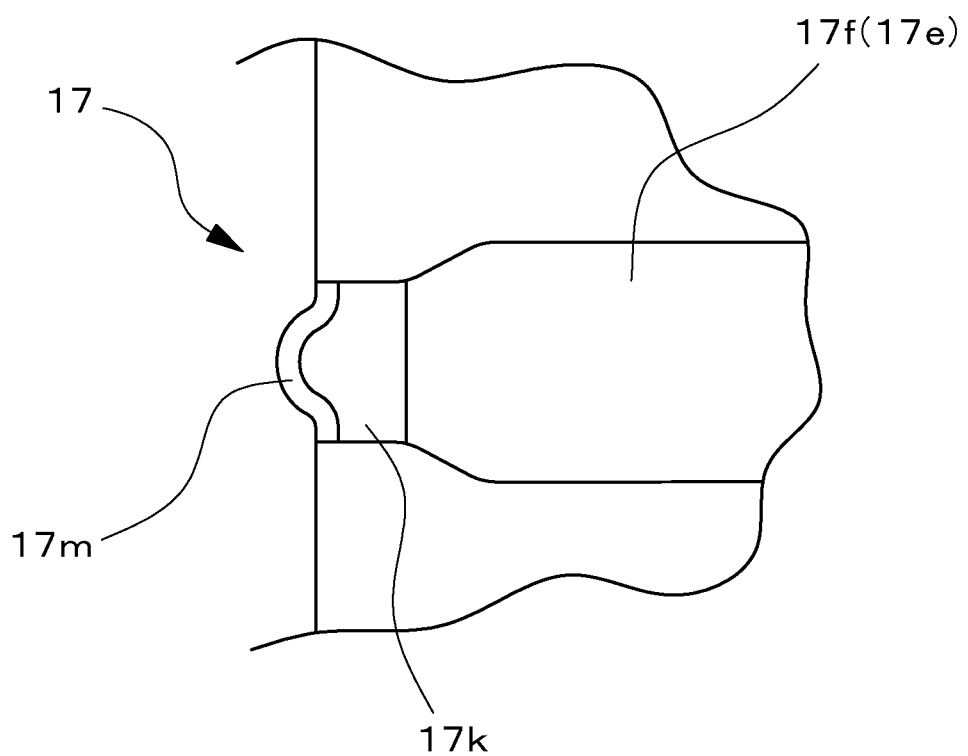
FIG. 78 is a rear view diagram illustrating a seventh modified example of the deformation portion.

Further, in the configuration in which the hole portion 17k is formed in the connection portion 17x between the intermediate plate 17b and the lateral plate 17a of the lower frame base portion 17, as illustrated in FIGS. 75, 76, and 77, the hole portion 17k, the inward fragile portion 17e, and the lateral fragile portion 17m may have different widths (lengths in the up to down direction). For example, as illustrated in FIG. 75, the width of the hole portion 17k may be substantially equal to the width of the lateral fragile portion 17m and may be smaller than the width of the inward fragile portion 17e. Alternatively, as illustrated in FIG. 76, the width of the hole portion 17k may be smaller than the widths of the inward fragile portion 17e and the lateral fragile portion 17m. In contrast, as illustrated in FIG. 76, the width of the hole portion 17k may be noticeably larger than the widths of the inward fragile portion 17e and the lateral fragile portion 17m. Alternatively, as illustrated in FIG. 77, the width may increase in order of the lateral fragile portion 17m, the hole portion 17k, and the inward fragile portion 17e. In this way, since the fragile portions 17e and 17m and the hole portion 17k have a difference in width, the deformation order when the impact load is applied may be adjusted. Furthermore, FIG. 75 is a diagram illustrating a fourth modified example of the deformation portion, FIG. 76 is a diagram illustrating a fifth modified example of the deformation portion, FIG. 77 is a diagram illustrating a sixth modified example of the deformation portion, and FIG. 78 is a diagram illustrating a seventh modified example of the deformation portion.

Further, in the above-described respective embodiments, the seatback S1 of the front seat of the automobile has been described as a detailed example, but the present invention is not limited thereto. For example, the present invention may be also applied to the seatback of the rear seat.

| TABLE OF REFERENCE NUMERALS | |
|---|---|
| S | vehicle seat |
| S1 | seatback |
| S2 | seat base portion |
| S3 | headrest |
| F | seat frame |
| T | fastening member |
| H | harness |
| 1 | seat back frame |
| 2 | seat frame |
| 1a, 2a, 3a | cushion pad (pad material) |
| 1b, 2b, 3b | skin material |
| 4 | back cover |
| 4a | protrusion |
| 4b | end portion |
| 11 | reclining mechanism |
| 11a | reclining shaft |
| 11c | shaft insertion hole |
| 15, 615 | side frame |
| 15a, 615a | side plate (frame side portion) |
| 15b | front edge portion |
| 15c, 615c | rear edge portion (frame extension portion) |
| 15c1 | rear edge outer portion |
| 15c2 | rear edge inner portion (frame extension portion) |
| 15d | protrusion portion |
| 15e | convex portion |
| 15f, 615f | hole portion (deformation portion) |
| 15g, 615g | lateral fragile portion (other deformation portion, fragile portion) |
| 15h, 615h | inward fragile portion (other deformation portion, fragile portion) |
| 15x, 615x | connection portion |
| 150 | deformation starting point |
| 150a | hole portion |
| 150b | groove portion |
| 150c | protruding edge portion |
| 150d | inclined portion |
| 16 | upper frame |
| 16a | side surface portion |
| 16c | upper frame upright portion |
| 16d | pillar attachment portion |
| 16e | fragile portion |
| 17, 617 | lower frame base portion (lower frame) |
| 17a, 617a | lateral plate (frame side portion) |
| 17b, 617b | intermediate plate (frame extension portion) |
| 17b1 | intermediate plate outer portion |
| 17b2 | intermediate plate inner portion (frame extension portion) |
| 17c | shaft insertion hole |
| 17d, 17j | attachment hole |
| 17e | inward fragile portion (other deformation portion, fragile portion) |
| 17f | horizontal portion |
| 17g | bent portion |
| 17h | inclined portion |
| 17i | harness attachment portion (component attachment portion, reinforcement portion) |
| 17k | hole portion (deformation portion) |
| 17m | lateral fragile portion (other deformation portion, fragile portion) |
| 17n | fixing hole |
| 17p | boundary portion |
| 17q | positioning concave portion |
| 17s, 17t | gap |
| 17v | connection portion lateral fragile portion |
| 17x | connection portion |
| 18, 118, 618 | lower frame installation portion |
| 19 | headrest pillar |
| 19a | pillar support portion |
| 20 | pressure receiving member |
| 21 | wire (connection member, upper connection member) |
| 21a | axial support portion |

-continued

TABLE OF REFERENCE NUMERALS

| | |
|---|---|
| 22 | wire (connection member, lower connection member) |
| 30 | movement member (impact reducing member) |
| 32 | shaft portion |
| 35 | tensile coil spring (biasing member) |
| 39 | movement prohibiting portion |
| 40, 140, 240, 340, 440, 540, 640, 643, 740, 840, 940, 1140, 1240, 1340, 1440, 1540, 1640, 2040, 2140, 2240, 2340, 2440, 2540, 3140 | regulation portion |
| 240a | opening portion |
| 1340a | regulation portion connecting portion |
| 41, 141, 241, 341, 441, 541, 641, 644, 741, 841, 941, 1141, 1241, 1341, 1441, 1541, 1641, 2041, 2141, 2241, 2341, 2541, 3141 | first regulation portion |
| 41a, 141a, 241a, 341a, 441a, 541a, 1141a, 1241a, 1341a, 1441a, 1541a, 1641a, 2041a, 2141a, 2241a, 2341a, 2541a | regulation surface (facing portion) |
| 341b | fastening portion |
| 841c | penetration hole |
| 941c | engagement hole |
| 1141b | concavo-convex portion (positioning portion) |
| 1241b, 1541b | locking hole |
| 1441b | fastening portion |
| 1441c | fastening member |
| 2041b, 2141b, 2241b, 2341b, 2541b | holding portion |
| 42, 142, 242, 342, 442, 542, 642, 645, 742, 842, 942, 1142, 1242, 1342, 1442, 1542, 1642, 2042, 2142, 2242, 2342, 3142 | second regulation portion |
| 42a, 142a, 242a, 342a, 442a, 542a, 1142a, 1242a, 1342a, 1442a, 1542a, 1642a, 2042a, 2142a, 2242a, 2342a | regulation surface (facing portion) |
| 342b | fastening portion |
| 1142b | concavo-convex portion (positioning portion) |
| 1242b, 1542b | locking hole |
| 1442b | fastening portion |
| 1442c | fastening member |
| 2042b, 2142b, 2242b, 2342b | holding portion |
| 43, 44, 1143, 1144, 1243, 1244, 1443, | impact absorbing member (impact absorbing portion) |

-continued

TABLE OF REFERENCE NUMERALS

| | |
|---|---|
| 1444, 1543, 1544 | |
| 545, 2243 | regulation portion connecting portion |
| 545a | one end |
| 545b | center portion |
| 545c | other end |
| 546 | another regulation portion connecting portion |
| 547 | another regulation portion connecting portion |
| 1343 | first impact absorbing member |
| 1344 | second impact absorbing member |
| 1245, 1246, 1545, 1546 | locking portion |
| 1347 | impact absorbing member connecting portion |
| 1347a | locking member |
| 1643, 1644 | rear impact absorbing portion (impact absorbing portion) |
| 1645, 1646 | front impact absorbing portion (impact absorbing portion) |
| 2144 | engagement convex portion |
| 2345, 2346 | cushioning portion |
| 2345a, 2346a | penetration hole |
| 50 | waist entry prohibiting member |
| 51 | upper surface |
| 52 | lower surface |
| 53 | front surface |
| 54 | rear surface |
| 58 | lower frame installation portion (frame extension portion, lower frame, reinforcement portion) |
| 58a | forward bulged portion |
| 58b | rear surface |
| 58c | connection surface |
| 58d, 58e | upper end |
| 58f | lateral end |
| 58g | corner portion |
| 59 | reinforcement member |
| 59a | upper end |
| 60, 660 | seat base side frame (frame side portion) |
| 660a | side plate (frame side portion) |
| 660b | rear edge portion (inner extension portion) |
| 670 | installation frame (frame installation portion) |
| 671 | upper installation frame |
| 672 | lower installation frame |
| 70 | side frame member |
| 80 | side airbag unit |
| 81 | main body portion |
| 82 | attachment portion |
| 83 | fastening member |
| 90 | clip |
| 91 | engagement portion |
| 92 | cylindrical portion |
| 92a | insertion hole |
| 93 | cap portion |

The invention claimed is:

1. A vehicle seat comprising:
frame side portions that are located at right and left sides of a seat back frame and extend in an up to down direction; and
a frame extension portion that extends from each frame side portion toward an inside of the seat in the right and left direction,
wherein:
a connection portion that connects a frame side portion that is one of the frame side portions to the frame extension portion is provided with a deformation portion that is deformed when an impact load is applied thereto;
the deformation portion is formed adjacent to other deformation portions having deformation characteristics different from that of the deformation portion; and
the deformation portion is formed to be deformed by a smaller impact load compared to the other deformation portions.

2. The vehicle seat according to claim 1,
wherein the other deformation portions are fragile portions that are provided in at least one of the frame side portion and the frame extension portion and is connected to the deformation portion.

3. The vehicle seat according to any claim 1, further comprising:
a lower frame that is provided at the lower side of the seat back frame,
wherein:
the lower frame includes the frame side portion and the frame extension portion;
the deformation portion is formed in the connection portion connecting the frame side portion and the frame extension portion of the lower frame; and
the other deformation portions are fragile portions that are formed in the frame side portion of the lower frame and are connected to the deformation portion.

4. The vehicle seat according to claim 3,
wherein the deformation portion is formed to be deformed by an smaller impact load compared to the fragile portion.

5. The vehicle seat according to claim 1, further comprising:
a reinforcement portion that is provided in at least one of upper and lower sides of the other deformation portions.

6. The vehicle seat according to claim 5,
wherein the reinforcement portion is provided in at least one of front and rear sides of the other deformation portions.

7. The vehicle seat according to claim 5,
wherein one end of the reinforcement portion is provided at a position that includes at least a boundary portion between the deformation portion and the other deformation portions and overlaps the deformation portion in a front to back direction.

8. The vehicle seat according to claim 1, further comprising:
regulation portions that are disposed at positions sandwiching a part of at least one deformation portion of the deformation portion and the other deformation portions and regulate a deformation amount of the at least one deformation portion.

9. The vehicle seat according to claim 8, wherein:
the regulation portions include two facing portions that are formed at positions sandwiching the at least one deformation portion; and
a distance between the two facing portions is formed smaller than a width of the at least one deformation portion in a direction in which the deformation portion is sandwiched by the regulation portions.

10. The vehicle seat according to claim 8, wherein:
the regulation portions are formed by a first regulation portion and a second regulation portion that respectively include a regulation surface disposed facing each other at a position sandwiching the at least one deformation portion; and
the regulation surface provided in at least one of the first regulation portion and the second regulation portion is formed in a planar shape.

11. The vehicle seat according to claim 8, wherein:
the regulation portions comprise:
a contact portion that is provided in the seat back frame; and
a contacted portion that contacts the contact portion when the at least one deformation portion is deformed; and
the seat back frame is provided with an impact absorbing portion that absorbs a second impact load when the contact portion and the contacted portion contact each other.

12. The vehicle seat according to claim 11, wherein:
the contact portion includes a first regulation portion that is disposed in a periphery of the at least one deformation portion;
the contacted portion includes a second regulation portion that is disposed separated from the first regulation portion and is disposed in the periphery of the at least one deformation portion; and
the impact absorbing portion is formed by an impact absorbing member that is disposed between the first regulation portion and the second regulation portion.

13. The vehicle seat according to claim 1,
wherein the seat back frame is provided with direction regulation portions that regulate a deformation transmission direction of the deformation portion so that the deformation transmission direction is not deviated from a direction from the deformation portion toward the other deformation portions.

14. The vehicle seat according to claim 13,
wherein each of the direction regulation portions is a member that is attached to a position deviated from a line connecting the deformation portion and the other deformation portions in the seat back frame.

15. The vehicle seat according to claim 13, wherein:
the direction regulation portions include a first facing portion and a second facing portion that face each other; and
the first facing portion and the second facing portion are located at positions sandwiching a center line of the other deformation portions.

16. The vehicle seat according to claim 1, further comprising:
a pressure receiving member that is connected to the seat back frame through a connection member to support an occupant; and
an impact reducing member that:
is disposed in at least one frame side portion;
is connected to the connection member; and
rotates by a predetermined impact load applied to the pressure receiving member to move the pressure receiving member rearward,
wherein:
the frame extension portion is provided with the other deformation portions and regulation portions that:
are disposed at positions sandwiching a part of the other deformation portions; and
regulate a deformation amount of the other deformation portions; and
the other deformation portions and the regulation portions are disposed above a rotation center of the impact reducing member.

17. The vehicle seat according to claim 16, wherein:
the seat back frame is further provided with a waist entry prohibiting member that prohibits a movement in which a waist of the occupant moves rearward; and
the rotation center of the impact reducing member is disposed to be located above the waist entry prohibiting member.

18. The vehicle seat according to claim 3, further comprising:
a side airbag unit that is provided in the frame side portion,
wherein the fragile portion is provided in the frame side portion to be located in a range deviated from an overlapping range of the side airbag unit when viewed from the right and left direction.

19. The vehicle seat according to claim 8, wherein:
the regulation portions comprise:
a first regulation portion that is disposed in the periphery of the at least one deformation portion; and
a second regulation portion that is disposed separated from the first regulation portion and is disposed in the periphery of the at least one deformation portion; and
the regulation portions further include a regulation portion connecting portion that connects the first regulation portion to the second regulation portion.

20. The vehicle seat according to claim 8, wherein:
the regulation portions are detachably attached to the seat back frame; and
the regulation portions further include attachment members that are used to attach the regulation portions to the seat back frame.

21. The vehicle seat according to claim 1, further comprising:
a lower frame that is provided at the lower side of the seat back frame, wherein:
lower ends of the frame side portions form a part of the lower frame;
the lower frame includes a frame installation portion that is installed between the lower ends of the frame side portions; and
the deformation portion is formed at a portion deviated from a same position as that of the frame installation portion of the connection portion in the up to down direction.

22. The vehicle seat according to claim 1, wherein:
the seat back frame includes an upper frame that extends upward from an upper side of the frame side portion; and
the upper frame is provided with:
  a third deformation portion that is deformed when an impact load is applied thereto; and
  regulation portions that are disposed at positions sandwiching the third deformation portion and regulate a deformation amount of the third deformation portion.

23. The vehicle seat according to claim 1, wherein:
the seat back frame includes an installation surface provided with the other deformation portions;
the seat back frame includes a wire member at least a part of which is wired to face the installation surface; and
a portion of the wire member facing the installation surface is disposed to be separated from a portion in which the other deformation portions are in the installation surface.

24. The vehicle seat according to claim 1, wherein:
the seat back frame includes the installation surface provided with the other deformation portions;
the seat back frame includes a facing member that extends in a direction intersecting a formation direction of the other deformation portions and faces the seat back frame at the installation surface;
the facing member is assembled to the seat back frame at one end of the facing member in an extension direction, and includes a fixing portion that is provided between both ends thereof in the extension direction to fix the facing member to the seat back frame; and
the facing member is fixed to the seat back frame so that one end and an other end of the other deformation portions in the extension direction are not simultaneously located within a range from one end of the facing member in the extension direction to a position provided with the fixing portion.

25. The vehicle seat according to claim 1, wherein a width of the deformation portion in the up to down direction is larger than a width of each of the other deformation portions in the up to down direction.

* * * * *